US012778310B2

(12) United States Patent
Leng

(10) Patent No.: US 12,778,310 B2
(45) Date of Patent: Nov. 3, 2026

(54) SPRING MODULE AND SPRING CUSHION FOR FURNITURE

(71) Applicant: NEW-TEC INTEGRATION (XIAMEN) CO., LTD., Xiamen (CN)

(72) Inventor: Luhao Leng, Xiamen (CN)

(73) Assignee: NEW-TEC INTEGRATION (XIAMEN) CO., LTD., Xiamen (CN)

( * ) Notice: Subject to any disclaimer, the term of this patent is extended or adjusted under 35 U.S.C. 154(b) by 335 days.

(21) Appl. No.: 17/769,285

(22) PCT Filed: Oct. 16, 2020

(86) PCT No.: PCT/CN2020/121384
§ 371 (c)(1),
(2) Date: Apr. 14, 2022

(87) PCT Pub. No.: WO2021/073589
PCT Pub. Date: Apr. 22, 2021

(65) Prior Publication Data

US 2024/0138581 A1 May 2, 2024

(30) Foreign Application Priority Data

Oct. 17, 2019 (CN) ......................... 201910990436.2
Oct. 15, 2020 (CN) ......................... 202011105707.0

(51) Int. Cl.
*A47C 27/07* (2006.01)
*A47C 23/00* (2006.01)
(Continued)

(52) U.S. Cl.
CPC ............ *A47C 27/07* (2013.01); *A47C 23/002* (2013.01); *A47C 23/0438* (2013.01);
(Continued)

(58) Field of Classification Search
CPC ..... A47C 27/07; A47C 27/053; A47C 27/056; A47C 27/063; A47C 27/064;
(Continued)

(56) References Cited

U.S. PATENT DOCUMENTS 42,053 A * 3/1864 Tylee .................. A47C 27/066 5/261
46,573 A * 2/1865 Mitchell ............... A47C 23/05 5/248
(Continued)

FOREIGN PATENT DOCUMENTS

CN 2609427 Y 4/2004
CN 101411570 A 4/2009
(Continued)

OTHER PUBLICATIONS

Search and Examination Report mailed Oct. 31, 2023 in United Kingdom Patent Application No. GB2311274.1, 6 pages.
(Continued)

*Primary Examiner* — Tara Schimpf
(74) *Attorney, Agent, or Firm* — Ashurst Perkins Coie US LLP

(57) ABSTRACT

The present invention provides a spring module for a spring cushion of furniture and a spring cushion having the same, the spring module may comprise a spring and a spring bracket for accommodating the conical spring, and the spring bracket may comprise a base, an end cover and a flexible connecting part connected therebetween, the spring may be fixed in the spring bracket with a predetermined initial pressure. The present invention further relates to a spring cushion having the spring module.

14 Claims, 175 Drawing Sheets

(51) Int. Cl.

| | |
|---|---|
| ***A47C 23/043*** | (2006.01) |
| ***A47C 23/057*** | (2006.01) |
| ***A47C 27/05*** | (2006.01) |
| ***A47C 27/06*** | (2006.01) |
| ***A47C 27/15*** | (2006.01) |
| ***A47C 27/20*** | (2006.01) |
| *A47C 27/045* | (2006.01) |
| *F16F 1/08* | (2006.01) |
| *F16F 1/12* | (2006.01) |
| *F16F 3/04* | (2006.01) |

(52) U.S. Cl.
CPC .......... *A47C 23/057* (2013.01); *A47C 27/053* (2013.01); *A47C 27/056* (2013.01); *A47C 27/063* (2013.01); *A47C 27/064* (2013.01); *A47C 27/065* (2013.01); *A47C 27/15* (2013.01); *A47C 27/20* (2013.01); *A47C 27/0456* (2013.01); *F16F 1/08* (2013.01); *F16F 1/12* (2013.01); *F16F 3/04* (2013.01)

(58) Field of Classification Search
CPC ....... A47C 27/065; A47C 27/15; A47C 27/20; A47C 27/0456; A47C 27/14; A47C 27/06; A47C 31/105; A47C 23/002; A47C 23/0438; A47C 23/057; A47C 23/005; A47C 23/05; A47C 23/30; F16F 1/128; F16F 1/12; F16F 1/125; F16F 1/123; F16F 1/122; F16F 1/126; F16F 1/06; F16F 1/046
See application file for complete search history.

(56) References Cited

U.S. PATENT DOCUMENTS

| | | | | | | |
|---|---|---|---|---|---|---|
| 66,390 | A | | 7/1867 | Read | | |
| 90,303 | A | * | 5/1869 | Read | A47C 23/05 | 5/264.1 |
| 101,526 | A | * | 4/1870 | Sellig | A47C 23/02 | 5/255 |
| 102,867 | A | * | 5/1870 | Rich | A47C 23/05 | 5/267 |
| 111,364 | A | * | 1/1871 | Arthur | A47C 23/063 | 5/261 |
| 288,533 | A | * | 11/1883 | Whitcomb | A61G 7/015 | 5/617 |
| 348,539 | A | * | 8/1886 | Tuttle, Sr. | A47C 23/05 | 5/264.1 |
| 392,009 | A | * | 10/1888 | Cleaveland | A61G 7/015 | 267/98 |
| 446,203 | A | * | 2/1891 | Cochennour et al. | B60G 11/04 | 267/179 |
| 488,555 | A | * | 12/1892 | Haeseler | A47C 23/007 | 5/260 |
| 606,683 | A | * | 7/1898 | Peugh et al. | A47C 23/05 | 5/269 |
| 735,006 | A | * | 7/1903 | Watkins | A47C 27/066 | 5/259.1 |
| 837,751 | A | * | 12/1906 | Summers | F16F 3/04 | 5/17 |
| 840,522 | A | * | 1/1907 | Stotts | A47C 27/061 | 5/253 |
| 882,600 | A | * | 3/1908 | Weborg | A47C 23/05 | 5/252 |
| 912,855 | A | * | 2/1909 | King | A47C 23/05 | 5/256 |
| 986,723 | A | * | 3/1911 | King | A47C 27/061 | 5/264.1 |
| 1,037,729 | A | * | 9/1912 | Collins | F16F 1/18 | 5/247 |
| 1,127,198 | A | * | 2/1915 | D'Arcy | A47C 23/05 | 5/264.1 |
| 1,146,933 | A | * | 7/1915 | Gallagher, Jr. | F16F 3/06 | 213/29 |
| 1,150,712 | A | * | 8/1915 | Smith | A47C 27/07 | 267/92 |
| 1,203,051 | A | * | 10/1916 | Rockhoff | E06B 9/78 | 5/260 |
| 1,226,737 | A | * | 5/1917 | Young | A47C 23/05 | 5/409 |
| 1,287,662 | A | | 12/1918 | Foster | | |
| 1,292,745 | A | | 1/1919 | Gerald | | |
| 1,329,145 | A | * | 1/1920 | Seelig | A47C 23/30 | 5/247 |
| 1,343,565 | A | * | 6/1920 | Hunt | A47C 23/05 | 5/267 |
| 1,343,656 | A | | 6/1920 | Cavers | | |
| 1,410,039 | A | * | 3/1922 | Steinbach | B60N 2/7041 | 5/248 |
| 1,476,046 | A | * | 12/1923 | Brandel | A47C 23/007 | 5/247 |
| 1,597,012 | A | | 8/1926 | Cable | | |
| 1,684,234 | A | | 9/1928 | Lipps | | |
| 1,703,587 | A | * | 2/1929 | Kraft | A47C 27/062 | 5/252 |
| 1,718,522 | A | * | 6/1929 | Brandreth | A47C 23/057 | 5/264.1 |
| 1,767,632 | A | * | 6/1930 | Warren | A47C 23/055 | 5/261 |
| 1,804,821 | A | | 5/1931 | Stackhouse | | |
| 1,899,188 | A | * | 2/1933 | Falls | A47C 23/05 | 5/409 |
| 1,926,085 | A | * | 9/1933 | Deamer | A47C 23/0433 | 5/252 |
| 1,927,722 | A | * | 9/1933 | Stoerkel | A47C 27/06 | 5/252 |
| 1,944,614 | A | * | 1/1934 | Salmon | A47C 27/065 | 123/169 PH |
| 2,071,275 | A | * | 2/1937 | Schwartzman | A47C 23/32 | 5/267 |
| 2,077,036 | A | * | 4/1937 | Brown | A47C 23/32 | 5/269 |
| 2,595,072 | A | | 4/1952 | Gottschalk | | |
| 2,689,962 | A | * | 9/1954 | Hutcheson | A47C 23/0438 | 5/267 |
| 2,737,666 | A | * | 3/1956 | Herider | F16F 1/122 | 5/264.1 |
| 2,781,083 | A | | 2/1957 | Agrillo | | |
| 3,034,170 | A | * | 5/1962 | Koebel | E06B 3/44 | 16/202 |
| 3,262,137 | A | * | 7/1966 | Beckman | A47C 23/002 | 297/DIG. 8 |
| 3,263,247 | A | * | 8/1966 | Knittel | A47C 27/06 | 297/DIG. 8 |
| 3,559,219 | A | * | 2/1971 | Molt | A47C 23/32 | 5/255 |
| 3,626,523 | A | * | 12/1971 | Robins | A47C 27/062 | 267/92 |
| 4,176,815 | A | * | 12/1979 | Davidson | F16L 3/2053 | 403/349 |
| 4,521,005 | A | * | 6/1985 | Calderoni | F16F 1/122 | 267/179 |
| 4,807,859 | A | * | 2/1989 | Bolthouse | B30B 15/02 | 267/179 |
| 4,956,884 | A | * | 9/1990 | Hwang | A47C 23/0431 | 267/179 |
| 5,027,459 | A | * | 7/1991 | Perry, Jr. | A47C 27/066 | 5/721 |
| 5,113,539 | A | * | 5/1992 | Strell | A47C 27/10 | 297/284.3 |
| 5,246,215 | A | * | 9/1993 | Takamura | F01L 1/462 | 267/179 |
| 5,509,642 | A | * | 4/1996 | Wells | A47C 27/07 | 5/256 |
| 5,531,696 | A | * | 7/1996 | Menes | A61B 17/3401 | 206/805 |
| 5,588,165 | A | * | 12/1996 | Fromme | A47C 23/002 | 5/255 |

(56) References Cited

U.S. PATENT DOCUMENTS 5,632,473 A * 5/1997 Dias Magalhaes Queiroz ............ F16F 3/023 267/164
5,752,284 A * 5/1998 Dabney .................. A47C 23/05 5/247
5,787,533 A * 8/1998 Fromme .............. A47C 23/002 5/255
5,836,027 A * 11/1998 Leventhal ............. A47C 27/20 5/713
5,924,681 A * 7/1999 Bullard ..................... F16F 1/12 267/89
5,924,682 A * 7/1999 Bullard .................. A47C 23/32 267/103
5,927,696 A * 7/1999 Hagemeister ........ A47C 27/065 5/247
5,957,438 A * 9/1999 Workman ................ B68G 9/00 5/655.8
6,050,553 A * 4/2000 Cable ..................... A47C 27/07 5/267
6,098,970 A * 8/2000 Lowe ...................... F16F 1/128 267/74
6,101,651 A * 8/2000 Tang ........................ A47G 9/10 5/255
6,109,599 A * 8/2000 Kringel ..................... F16F 3/10 267/179
6,113,082 A * 9/2000 Fujino ..................... F16F 1/025 267/110
6,173,464 B1 * 1/2001 McCune .................. F16F 3/04 5/655.8
6,237,173 B1 * 5/2001 Schlichter ............ A47C 27/144 5/722
6,427,990 B1 * 8/2002 Hartmann ............ A47C 27/065 5/255
6,477,727 B1 * 11/2002 Fromme .............. A47C 23/002 5/255
6,704,960 B1 * 3/2004 Lumgair .............. A47C 23/002 5/719
6,966,085 B1 * 11/2005 Cretsinger ........... A47C 23/002 5/249
7,418,753 B2 9/2008 Kuchel et al.
D594,685 S * 6/2009 Mai ................................ D6/606
7,661,165 B2 * 2/2010 Piccinini .............. A47C 27/146 5/717
7,677,540 B1 * 3/2010 Duval .................. F16M 11/046 267/221
7,677,831 B2 * 3/2010 Kulp ....................... E01F 9/688 116/63 C
7,811,026 B1 * 10/2010 Kulp ....................... E01F 9/654 116/63 C
D710,130 S * 8/2014 Chen ............................. D6/596
8,984,689 B1 * 3/2015 Hsu .................... A47C 23/0515 5/717
9,072,388 B1 * 7/2015 Brottlund ............... A47C 23/16
D739,162 S * 9/2015 Jorgensen ...................... D6/606
9,161,634 B2 10/2015 Defranks et al.
9,586,453 B2 * 3/2017 Mizukoshi .............. F16F 1/122
10,327,564 B1 * 6/2019 Schulman .............. A47C 27/07
10,405,665 B2 * 9/2019 Long ........................ B68G 9/00
10,512,340 B2 * 12/2019 Jewett .................. A47C 27/056
D878,840 S * 3/2020 Jewett .................. A47C 27/065 D6/606
10,869,559 B2 12/2020 Leng
10,869,669 B2 12/2020 Leng
11,019,937 B2 6/2021 Leng
D993,703 S * 8/2023 Leng ......................... D6/718.31
11,889,926 B1 * 2/2024 Leng ...................... A47C 27/14
2002/0100118 A1 * 8/2002 Mossbeck ............ A47C 23/005 5/255
2004/0123384 A1 * 7/2004 Fromme .............. A47C 23/002 5/255
2005/0005450 A1 * 1/2005 Wakamori ................ F16F 3/04 29/896.9
2006/0016383 A1 * 1/2006 Flamingo ................ E01F 9/688 116/63 C
2006/0145404 A1 * 7/2006 Ostergaard ........... A47C 27/065 267/165
2006/0162087 A1 * 7/2006 Chang .................... A47C 27/20 5/724
2006/0290039 A1 * 12/2006 Cao ......................... F16F 1/373 267/153
2007/0022532 A1 * 2/2007 Ahn ....................... A47C 27/04 5/430
2007/0262634 A1 * 11/2007 Brill ..................... A47C 23/002 297/452.15
2008/0034501 A1 * 2/2008 Hyde ................. A61G 7/05707 5/613
2008/0128965 A1 * 6/2008 Bock ...................... A47C 27/07 267/101
2008/0185760 A1 * 8/2008 Jansen ................. A47C 23/002 267/100
2008/0189868 A1 * 8/2008 Wieland ............... A47C 23/002 5/719
2009/0014929 A1 * 1/2009 Bock .................... A47C 27/065 267/179
2009/0106908 A1 * 4/2009 DeFranks .......... A47C 23/0438 5/716
2009/0134559 A1 * 5/2009 Akahori .................. F16F 1/128 267/179
2010/0257675 A1 * 10/2010 DeMoss ............... A47C 27/065 5/716
2010/0301531 A1 * 12/2010 Delahousse ............. F16F 1/027 267/165
2011/0004998 A1 * 1/2011 Losio ................... A47C 23/002 5/699
2011/0031665 A1 * 2/2011 DeFranks ............ A47C 23/002 267/144
2011/0148018 A1 * 6/2011 DeFranks ............ A47C 27/064 267/166.1
2011/0179580 A1 * 7/2011 Wieland ............... A47C 27/065 5/690
2012/0131752 A1 * 5/2012 Mason ................. A47C 27/148 5/655.8
2012/0200018 A1 * 8/2012 Paz ........................ A47C 7/027 267/166.1
2012/0255119 A1 * 10/2012 Brottlund ............... A47C 23/04 5/247
2012/0273647 A1 * 11/2012 Moruzzi ................... F16F 3/04 248/560
2013/0069290 A1 * 3/2013 Chen ....................... E05B 3/065 267/150
2013/0300044 A1 * 11/2013 Adoline .................. F16F 1/125 267/168
2014/0215722 A1 * 8/2014 Lobry .................... A47C 23/04 267/142
2014/0291906 A1 * 10/2014 Ahn ..................... A47C 23/043 267/142
2014/0312544 A1 * 10/2014 Shah ....................... F16F 1/128 267/170
2014/0366275 A1 * 12/2014 Katan .................. A47C 23/002 5/655.3
2015/0000229 A1 * 1/2015 Leng ....................... B65B 13/20 53/410
2015/0001772 A1 * 1/2015 Fornoff .................... A47C 7/28 267/131
2015/0084250 A1 * 3/2015 Ahn .......................... F16F 1/06 267/142
2015/0345696 A1 * 12/2015 Kimura .................... B41J 29/02 248/309.1
2016/0353899 A1 * 12/2016 Hsu ...................... A47C 27/064
2017/0312784 A1 * 11/2017 Grose, II .................. B07B 1/46
2018/0010662 A1 * 1/2018 de Lima Zocca ........ F16F 1/06
2018/0027976 A1 * 2/2018 Leng .................... A47C 19/005
2018/0199728 A1 * 7/2018 Leng .................... A47C 27/001
2018/0325273 A1 * 11/2018 Cailley ................ A47C 23/067
2018/0325275 A1 * 11/2018 Cailley ................... F16F 1/041
2019/0090652 A1 3/2019 Leng
2019/0374041 A1 * 12/2019 Bayer .................. A47C 27/056
2020/0154901 A1 * 5/2020 Yang .................... A47C 20/048

(56) References Cited

U.S. PATENT DOCUMENTS

| | | | | |
|---|---|---|---|---|
| 2020/0196770 | A1* | 6/2020 | Cailley | A47C 23/0435 |
| 2020/0288875 | A1* | 9/2020 | Jewett | A47C 27/15 |
| 2021/0003184 | A1* | 1/2021 | Mimura | F16F 1/125 |
| 2021/0037988 | A1 | 2/2021 | Leng | |
| 2021/0307531 | A1* | 10/2021 | Lee | A61G 7/05 |
| 2023/0080080 | A1* | 3/2023 | Ko | A47C 27/056 5/260 |
| 2023/0200553 | A1* | 6/2023 | Leng | A47C 23/057 5/720 |
| 2024/0023722 | A1* | 1/2024 | Park | F04D 29/56 |
| 2024/0199278 | A1* | 6/2024 | Chabert | F16F 1/128 |

FOREIGN PATENT DOCUMENTS

| | | | |
|---|---|---|---|
| CN | 204025485 | U | 12/2014 |
| CN | 204812973 | U | 12/2015 |
| CN | 107455992 | A | 12/2017 |
| CN | 207519921 | U | 6/2018 |
| CN | 207795931 | U | 8/2018 |
| CN | 109475237 | A | 3/2019 |
| CN | 208851008 | U | 5/2019 |
| EP | 0686364 | A1 | 12/1995 |
| FR | 1319176 | A | 2/1963 |
| GB | 2403900 | A | 1/2005 |
| JP | S51121211 | U | 10/1976 |
| JP | S54550 | U | 1/1979 |
| JP | 3553346 | B2 | 5/2004 |
| JP | 2007504898 | A | 3/2007 |
| JP | 2008115553 | A | 5/2008 |
| JP | 2014206175 | A | 10/2014 |
| JP | 2016512156 | A | 4/2016 |
| JP | 2017113318 | A | 6/2017 |
| JP | 2019162204 | A | 9/2019 |
| KR | 07016360 | | 4/1995 |
| KR | 200163802 | Y1 | 2/2000 |
| KR | 200479160 | Y1 | 12/2015 |
| KR | 20160028421 | A | 3/2016 |
| RS | 1452 | U1 | 4/2016 |
| WO | 0204838 | A1 | 1/2002 |
| WO | 2011027316 | A2 | 3/2011 |
| WO | 2014152935 | A1 | 9/2014 |
| WO | 2016148594 | A1 | 9/2016 |
| WO | 2017206961 | A1 | 12/2017 |
| WO | 2018203222 | A1 | 11/2018 |
| WO | 2019089429 | A1 | 5/2019 |

OTHER PUBLICATIONS

Extended European Search Report for European Application No. 20875919.1; Date of Mailing: Mar. 21, 2023; 5 pages.

English translation of International Search Report and Written Opinion of International Application No. PCT/CN2020/121384; 7 pages.

* cited by examiner

SPRING MODULE AND SPRING CUSHION FOR FURNITURE

FIELD

The present disclosure relates to a field of furniture, in particular to a spring module and a spring cushion for furniture.

BACKGROUND

Large furniture, such as beds, is an essential part of people's life. Most existing large furniture is not easy to disassemble, or is not easy to reassemble after disassembly. However, with the development of the modern life, furniture like beds, in particular, needs to be disassembled and assembled more and more frequently in order to meet the needs of people's migration and outdoor recreation. During the process of migration, it is very difficult to disassemble and assemble beds, thereby the still useable beds are sometimes discarded for reducing the burden of migration.

A bed is usually composed of a bedstead, a spring cushion and an outer cover. Existing spring cushions are usually integrated, non-disassemble cushions formed by springs and a plurality of superimposed layers. The integral cushions are large in size, thus not easy to disassemble and store.

Existing independent bagged spring bed mattresses are designed to avoid mutual interference between two or more people lying in bed at the same time (for example, in the case of relatively large weight difference between individuals, one of them will inevitably affect other ones when turning over or moving). In such type of bed mattress, each spring is individually packaged in a bag or a sleeve made of non-woven fabrics or other materials. The bags are arranged in a pattern, and then an outer side of the arranged bag set is covered by a whole piece of foam rubber through adhesion, bonding, etc., so as to form a furniture cushion or a desired spring cushion in the form of a furniture cushion. However, the independent bagged spring bed mattress is still an integral product, which is non-disassemble and not easy to transport. In addition, in the independent bagged spring bed mattress, non-woven fabrics used for covering the bagged springs are adhered to each other, so when the bed mattress is squeezed, a plurality of bagged springs cannot move up and down completely independently, thus affecting the comfort of the bed mattress.

In addition, existing bed mattresses also have the disadvantage of being difficult to clean. For a typical bed mattress, generally only the bed cover can be removed, while the sponge part cannot be removed, thus not easy to clean. Even though latex may have a certain anti-mite effect, the sponge part which is difficult to clean will bring great health risks since a bed mattress may usually be used for several years.

Therefore, there is a need for an improved spring cushion, which can be readily disassembled, moved and reassembled, as well as stored in a compact space, and is easy to clean with better comfort.

SUMMARY

In view of the foregoing problems in the prior art, the present disclosure provides a spring module for a spring cushion of furniture, and a spring cushion with the same. The spring module of the present disclosure has at least following advantages: simple structure, easy to assemble and form a spring cushion together with a sponge pad, etc., the spring cushion thus formed is easy to disassemble, and the disassembled spring modules are able to be compressed or stacked and nested one another, which may greatly save storage and transportation space; since the spring module has a flexible connecting part positioned outside a spring, the spring in the spring module is not easy to be wound together with springs or other components in adjacent spring modules, no matter in the state of being assembled into spring cushions or in the state of being stacked and nested one another. Compared with a single spring, since the spring module may have a base, its stress area is larger and more stable, thereby the spring cushion is more stable in use; an initial pressure of the spring in the spring module can be predetermined as desired, so that the spring module has a desired stiffness, furthermore, spring modules with different stiffness can be arranged at different positions of the spring cushion as desired; the spring modules in the spring cushion can realize compressing and releasing motions that are truly independent of each other, enabling the spring cushion of the present disclosure to have a better comfort compared with the existing bagged spring bed mattresses; the sponge part (sponge block and/or sponge pad) in the spring cushion is detachable, which is easy to clean. The spring cushion of the present disclosure can be used for furniture having spring cushions, such as, including but not limited to bed mattresses, sofas, soft pack benches, etc.

In one aspect, the present invention provides a spring module for making a spring cushion of furniture, the spring module comprising: one or more conical springs; and a spring bracket configured to be able to maintain and fix the one or more conical springs therein. The spring bracket comprising: a rectangular base comprising one or more spring mounting seats, each spring mounting seat having a spring fixing part for fixing one end of one conical spring; one or more end covers, each end cover arranged opposite to one corresponding spring mounting seat and cooperate with each other, so as to maintain one conical spring of the one or more conical springs; and one or more groups of flexible straps, each group of flexible straps comprising a plurality of flexible straps spaced from each other and uniformly arranged between a corresponding pair of the spring mounting seat and the end cover, wherein, a pair of opposite sides of the base are respectively provided with connections extending along the sides, the connection comprising: a first flange extending upward along a height direction of the spring module; and a second flange extending downward along the height direction of the spring module, wherein, when the connection of one spring module is arranged adjacent to the connection of another spring module, the adjacently arranged connections are able to be connected together by an independent connector passing therebetween.

According to a preferred embodiment of the present invention, the connector has a pair of upper flanges extending downward and a pair of lower flanges extending upward, and the connector is configured to be able to slide along the first flange and the second flange. The beneficial technical effect of the preferred embodiment is at least that, it is convenient to connect adjacent spring modules together.

According to a preferred embodiment of the present invention, the other pair of opposite sides of the base are respectively provided with a wedge-shaped protrusion and a wedge-shaped groove extending along a respective side and adapted to each other in shape, and the wedge-shaped protrusion is configured to be able to pass through the wedge-shaped groove of the base of another spring module so as to connect two spring modules together. The beneficial technical effect of the preferred embodiment is at least that, adjacent spring modules can be connected with each other without additional connectors.

According to a preferred embodiment of the present invention, two side walls forming the wedge-shaped groove are discontinuous and staggered in a direction along the wedge-shaped groove. The beneficial technical effect of the preferred embodiment is at least that, a connecting process of the spring modules can be smoother and not easy to be get stuck.

According to a preferred embodiment of the present invention, the second flange is provided with a stop part capable of limiting sliding of the connector. The beneficial technical effect of the preferred embodiment is at least that, a movement distance of the connector on the spring modules can be limited.

According to a preferred embodiment of the present invention, the conical spring is installed in the spring bracket with a predetermined initial compression force. The beneficial technical effect of the preferred embodiment is at least that, the spring module can have an ideal initial hardness.

According to a preferred embodiment of the present invention, four flexible straps spaced apart from each other are uniformly distributed around a periphery of the end cover. The beneficial technical effect of the preferred embodiment is at least that, winding between the spring modules can be avoided by means of using a small number of the flexible straps.

According to a preferred embodiment of the present invention, an opening is formed in a center of the end cover. The beneficial technical effect of the preferred embodiment is at least that, it is beneficial for saving materials and costs, and when a plurality of the spring modules are nested together, a space between the end cover and the end cover is communicated with an outer space, which is beneficial for nesting and disassembly.

According to a preferred embodiment of the present invention, a corresponding pair of the spring mounting seat and the end cover forms a shape of a substantially frustocone, wherein the end cover forms a small end of the frustocone, the spring mounting seat forms a large end of the frustocone, and an opening is formed at a central position of the spring mounting seat, such that the end cover and most or all of the flexible straps of another spring module are able to enter into the interior of the spring module via the opening so as to form a nesting. The beneficial technical effect of the preferred embodiment is at least that, the spring module can maintain a posture more stably and it is beneficial for nesting of a plurality of the spring modules.

According to a preferred embodiment of the present invention, the spring bracket is integrally formed. The beneficial technical effect of the preferred embodiment is at least that, the spring bracket has a low manufacturing cost, and is strong and durable.

According to a preferred embodiment of the present invention, at least a portion of the conical spring is a double-wire spring part. The beneficial technical effect of the preferred embodiment is at least that, the spring module can have an ideal hardness or elastic coefficient.

According to a preferred embodiment of the present invention, the double-wire spring part extends from a large-diameter end of the conical spring to about ⅔ height of the conical spring. The beneficial technical effect of the preferred embodiment is at least that, the spring module can have an ideal hardness or elastic coefficient.

In another aspect, the present invention further provides a spring module assembly for making a spring cushion of furniture, the spring module assembly comprising a plurality of the spring modules according to the above-mentioned embodiments, and connectors. The connector comprises: an intermediate wall; a pair of upper flanges extending downward on both sides of the intermediate wall; and a pair of lower flanges extending upward on both sides of the intermediate wall; wherein, the intermediate wall of the connector is able to pass through between two adjacently arranged connections of two adjacently arranged spring modules so as to connect the two adjacently arranged spring modules together through the upper flanges and the lower flanges.

According to a preferred embodiment of the present invention, the upper flange and the lower flange of the connector located on the same side of the intermediate wall form a slideway in which the first flange and the second flange of the spring module can slide through. The beneficial technical effect of the preferred embodiment is at least that, it is convenient to connect adjacent spring modules together.

According to a preferred embodiment of the present invention, the slideway has a wedge-shaped configuration. The beneficial technical effect of the preferred embodiment is at least that, the spring modules can be prevented from being accidentally released from the connector.

According to a preferred embodiment of the present invention, the connector is configured to accommodate the first flanges and the second flanges of a plurality of the spring modules arranged in alignment within the slideway on the same side of the connector. The beneficial technical effect of the preferred embodiment is at least that, one single connector can connect a plurality of the spring modules in a row.

In another aspect, the present invention further provides a spring cushion used for furniture, the spring cushion comprising: a plurality of the spring module assemblies according to the above-mentioned embodiments; a first sponge pad having a plurality of holes, and each hole is configured to allow a portion of a corresponding spring module to pass through; a second sponge pad laid on one or more of the first sponge pads; and an outer cover covering the second sponge pad, thereby wrapping the spring modules, the first sponge pad and the second sponge pad.

According to a preferred embodiment of the present invention, the first sponge pad comprises a plurality of separate parts arranged side by side, each separate part having a different hardness and a different color, respectively. The beneficial technical effect of the preferred embodiment is at least that, different hardness can be provided at different positions of a mattress depending on personal preference or ergonomics, and the parts of sponge pad with different hardness can be easily distinguished.

According to a preferred embodiment of the present invention, the spring cushion further comprises a fixing net arranged below the first sponge pad, the fixing net having a plurality of ring parts, each ring part being configured to allow a portion of a corresponding spring module to pass through. The beneficial technical effect of the preferred embodiment is at least that, the integrated net can help to fix positions and postures of the spring modules, making the whole more stable and less likely to be dislocated.

According to a preferred embodiment of the present invention, when the fixing net is arranged on the spring modules, a vertical distance between the ring part and a top of the spring module is about ⅓ of an overall height of the spring module. The beneficial technical effect of the preferred embodiment is at least that, the connection relationship among a plurality of the spring modules will be more stable and not easy to collapse.

According to a preferred embodiment of the present invention, the spring cushion further comprises a fixing net assembly, the fixing net assembly comprising: a flexible sheet having a plurality of holes; and a plurality of caps, each cap having a cavity and a flange extending around the cavity; wherein a size of the hole is larger than that of a wall forming the cavity and smaller than that of the hole, such that the wall is able to pass through the hole while the flange engages a flexible sheet portion around the hole, and wherein the flange is fixedly coupled to the flexible sheet portion around the hole by adhesive or ultrasonic welding, and wherein the cavity is configured to receive a top of the spring module. The beneficial technical effect of the preferred embodiment is at least that, the fixing net assembly can help to fix positions and postures of the spring modules, making the whole more stable and less likely to be dislocated.

According to a preferred embodiment of the present invention, the spring cushion further comprises a fixing net assembly, the fixing net assembly comprising: a flexible sheet without holes; a plurality of upper caps positioned on one side of the flexible sheet, each upper cap having a first snap feature; and a plurality of lower caps positioned on the other side of the flexible sheet, each lower cap having a second snap feature; wherein the first snap feature of the upper cap is configured to be able to engage together with the second snap feature of the lower cap and clamp the flexible sheet between the upper cap and the lower cap, and wherein the lower cap is configured to receive a top of the spring module. The beneficial technical effect of the preferred embodiment is at least that, the fixing net assembly can help to fix positions and postures of the spring modules, making the whole more stable and less likely to be dislocated.

In another aspect, the present invention further provides a spring cushion for furniture, the spring cushion comprising: a plurality of the spring module assemblies according to the above-mentioned embodiments; a spring pad laid on the spring modules, the spring pad comprising a first non-woven fabric layer, a second non-woven fabric layer, and a plurality of small cylindrical springs which are tightly arranged between the first non-woven fabric layer and the second non-woven fabric layer, wherein the first non-woven fabric layer and the second non-woven fabric layer are jointed together around each small cylindrical spring so as to form compartments for accommodating the plurality of small cylindrical springs, thereby enabling adjacent small cylindrical springs to be spaced apart from each other; and an outer cover comprising a quilted sponge layer and covering the spring pad so as to wrap the spring module assemblies and the spring pad.

According to a preferred embodiment of the present invention, an elastic coefficient of the small cylindrical spring is smaller than that of the spring in the spring module. The beneficial technical effect of the preferred embodiment is at least that, the spring pad can provide hardness close to the sponge.

According to a preferred embodiment of the present invention, the plurality of small cylindrical springs are arranged more tightly than the spring modules. The beneficial technical effect of the preferred embodiment is at least that, the spring pad can provide comfort close to the sponge pad.

It is obvious that the elements or features described in the above single embodiment may be used alone or in combination in other embodiments.

BRIEF DESCRIPTION OF THE DRAWINGS

The dimensions and proportions in the accompanying drawings do not represent the dimensions and proportions of the actual products. The accompanying drawings are merely illustrative, and some unnecessary elements or features are omitted for clarity.

Figure 33D:
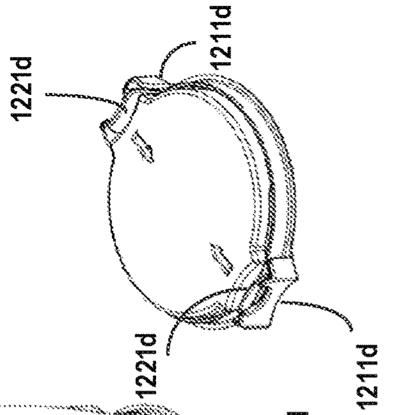
FIG. 33D exemplarily shows a condition when the base and the end cover of the spring module shown in FIG. 33A are snapped together.
Figure 33A:
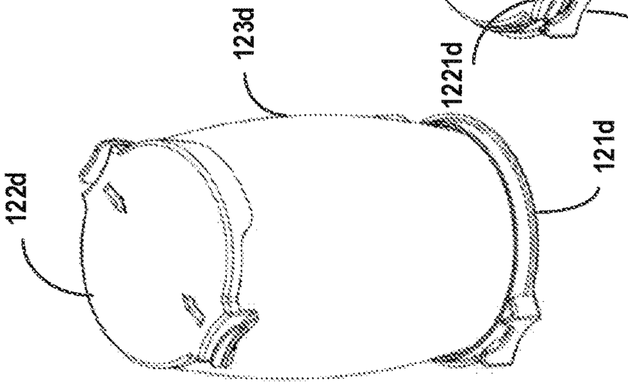
FIG. 33A exemplarily shows a spring module in which a base and an end cover can be snapped together according to another preferred embodiment of the present disclosure.
Figure 33B:
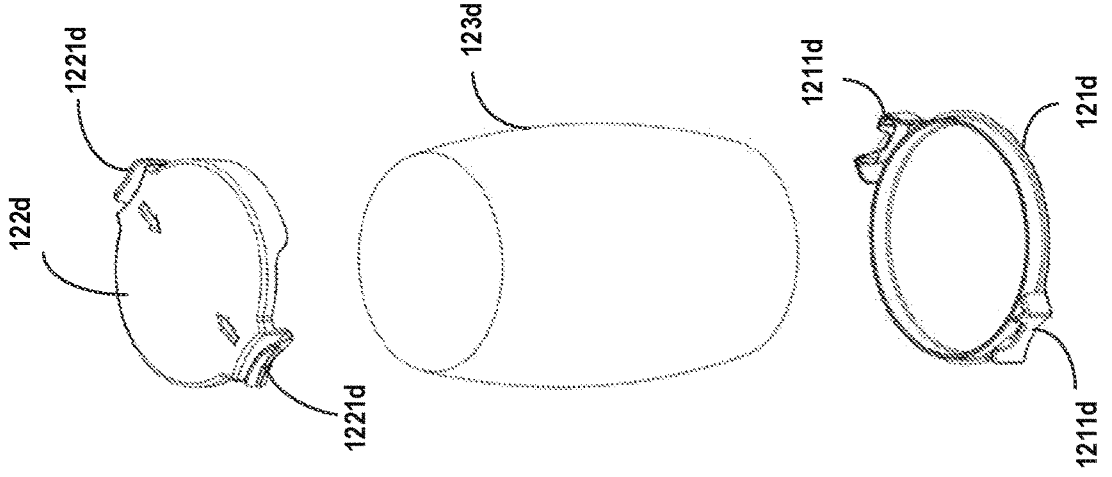
FIG. 33B exemplarily shows an exploded view of the spring module shown in FIG. 33A.
Figure 33C:
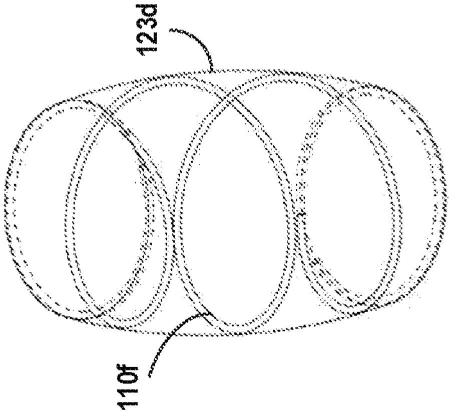
FIG. 33C exemplarily shows a perspective view of a spring bag in the spring module shown in FIG. 33A.
Figure 33E:
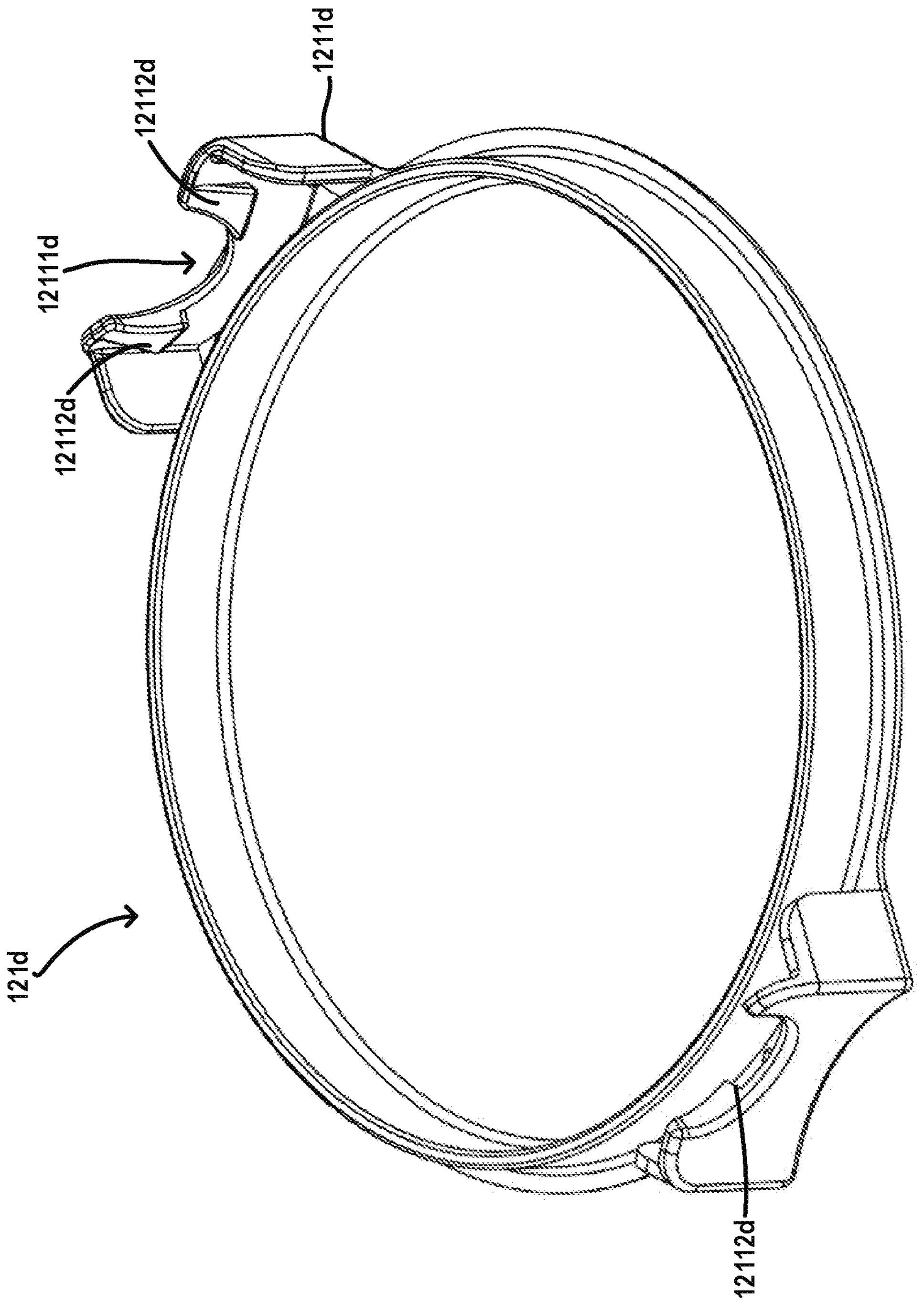
FIG. 33E exemplarily shows the base of the spring module shown in FIG. 33A.
Figure 33F:
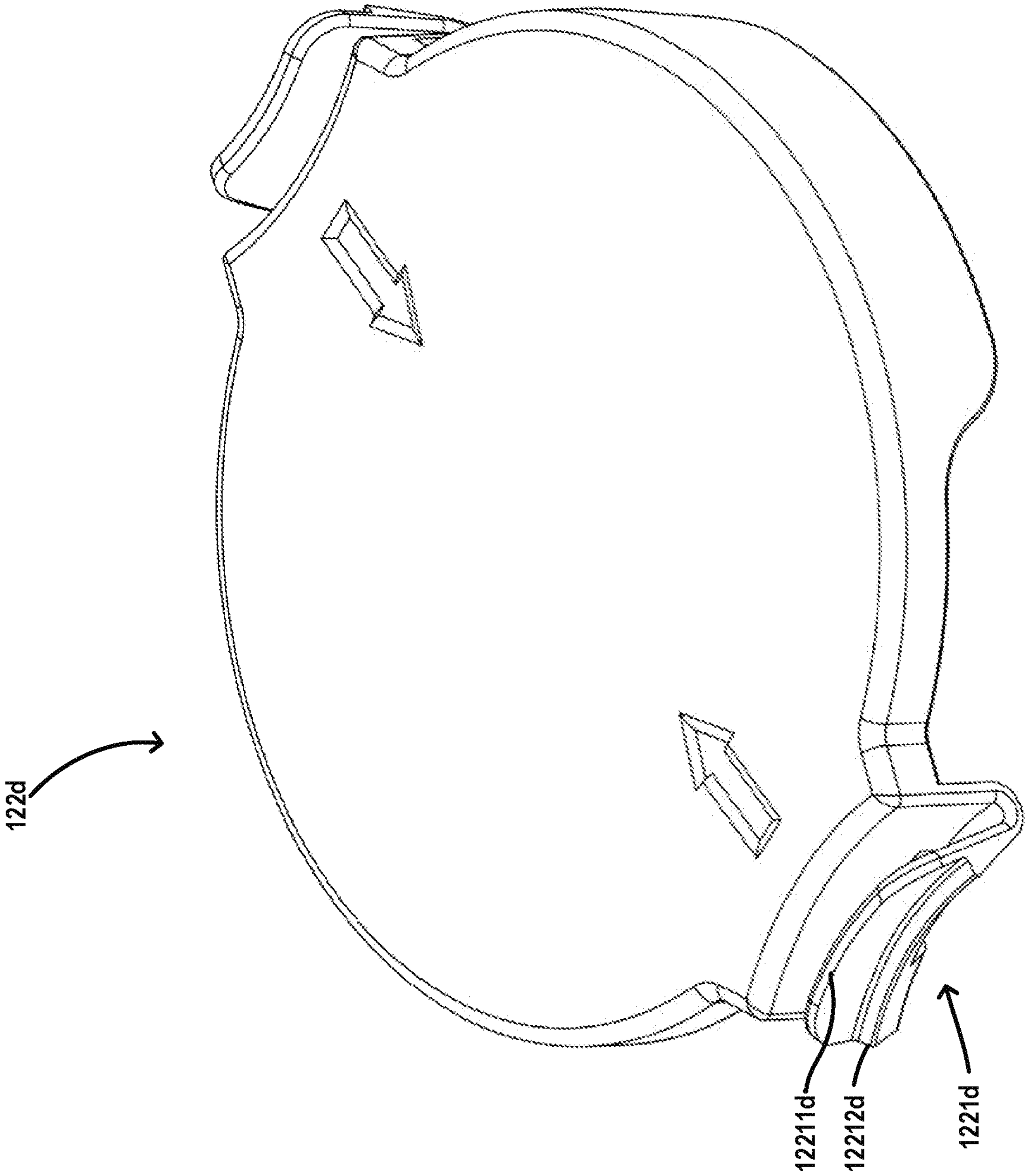
FIG. 33F exemplarily shows the end cover of the spring module shown in FIG. 33A.
Figure 33G:
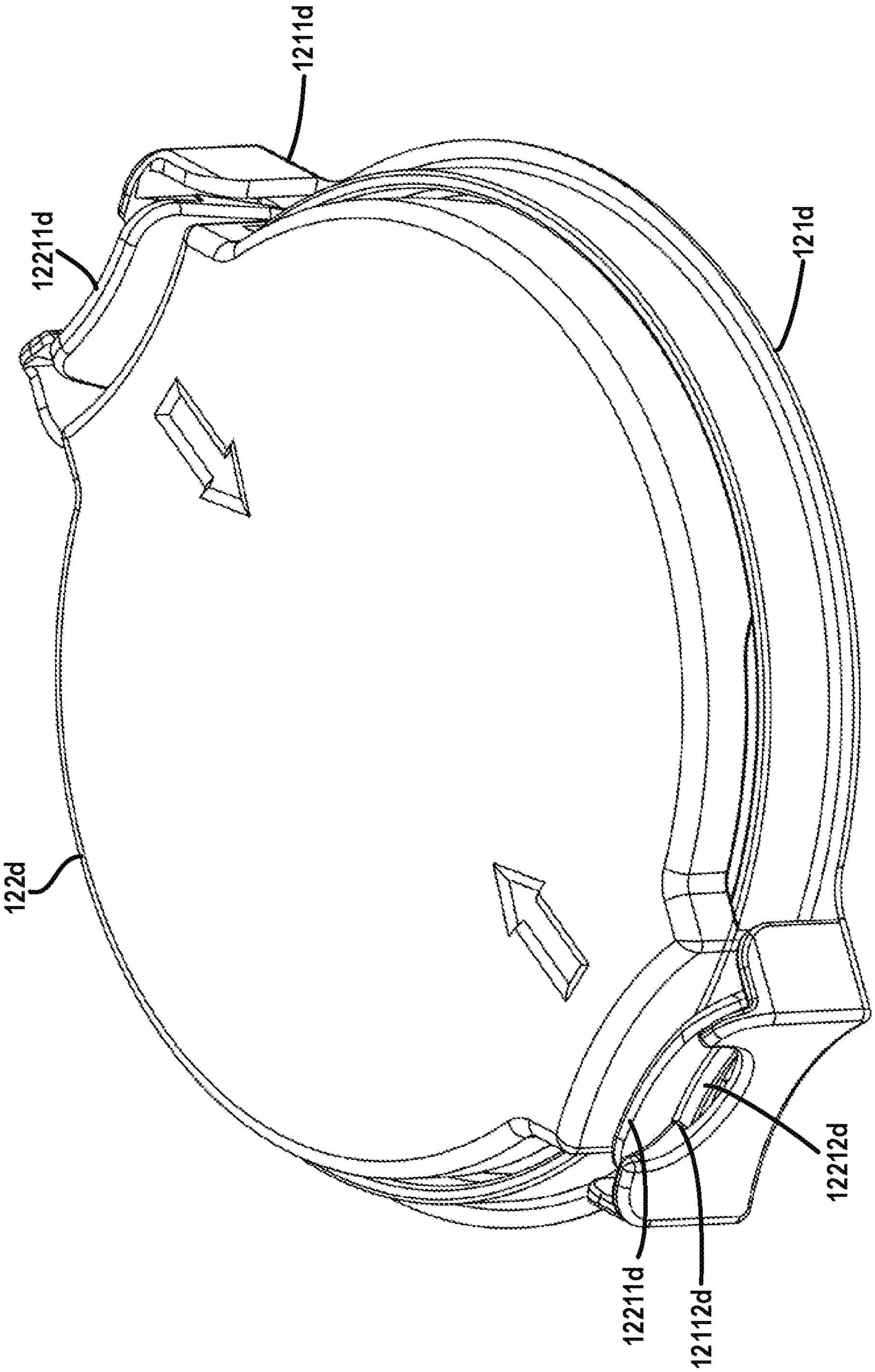
FIG. 33G exemplarily shows a condition when the base and the end cover of the spring module shown in FIG. 33A are snapped together.
Figure 33H:
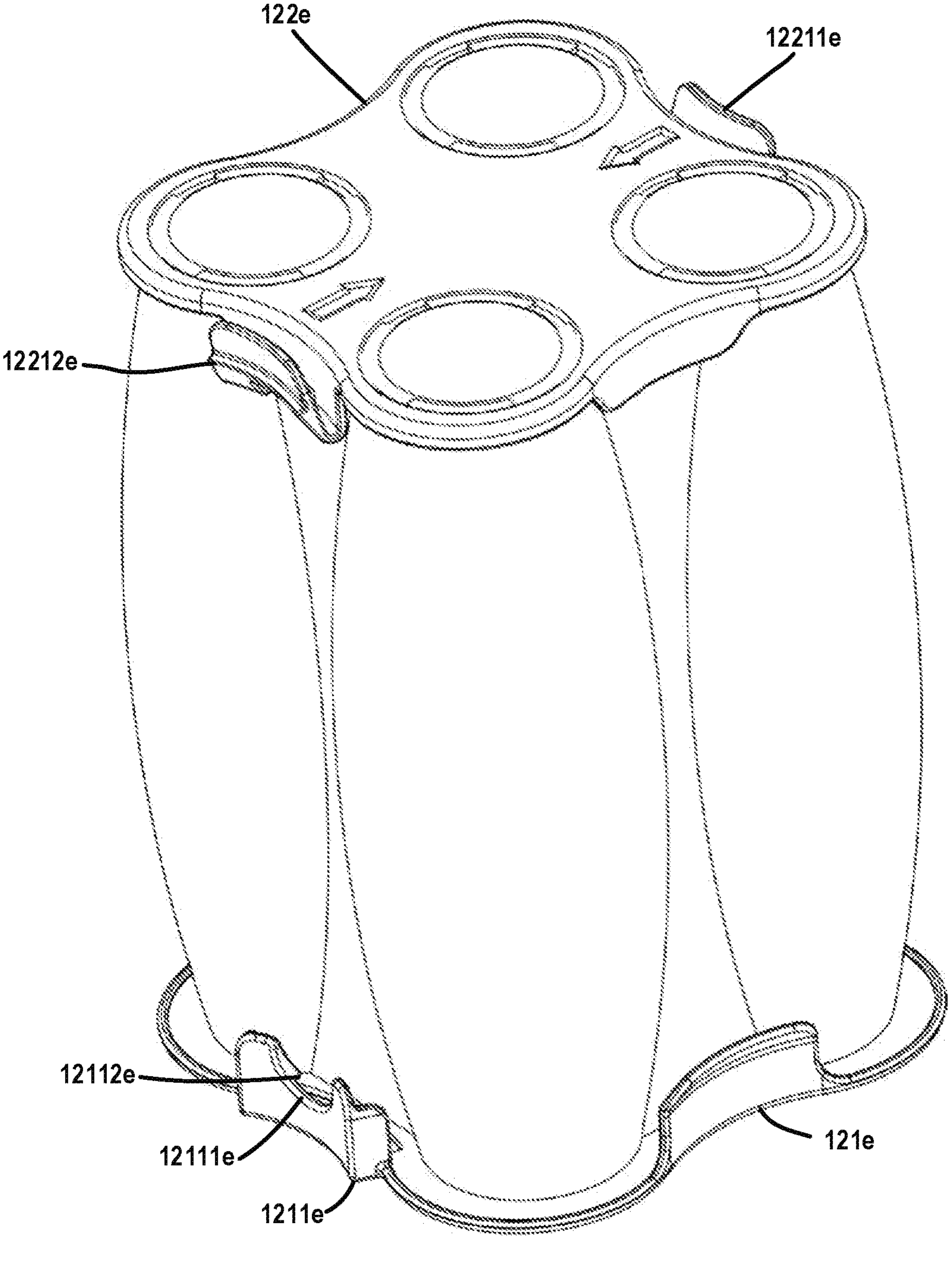
FIG. 33H exemplarily shows a spring module in which a base and an end cover can be snapped together according to yet another preferred embodiment of the present disclosure.
Figure 33I:
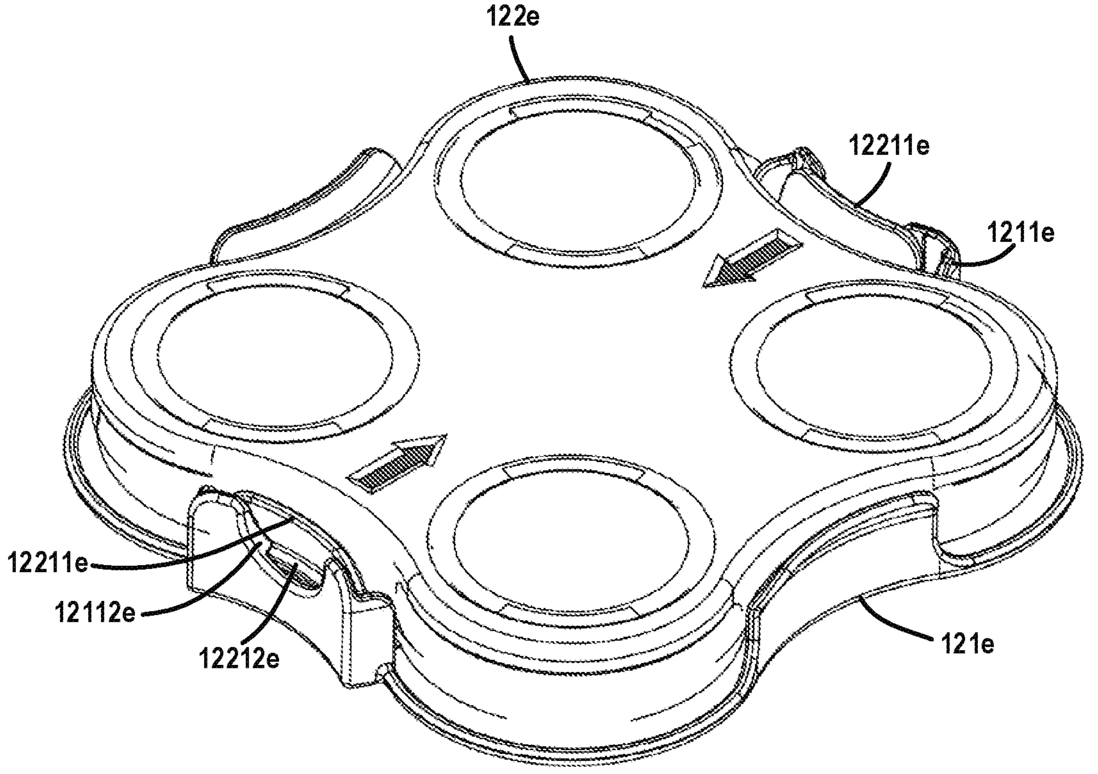

FIG. 33I exemplarily shows a condition when the base and the end cover of the spring module shown in FIG. 33H are snapped together.

Figure 33J:
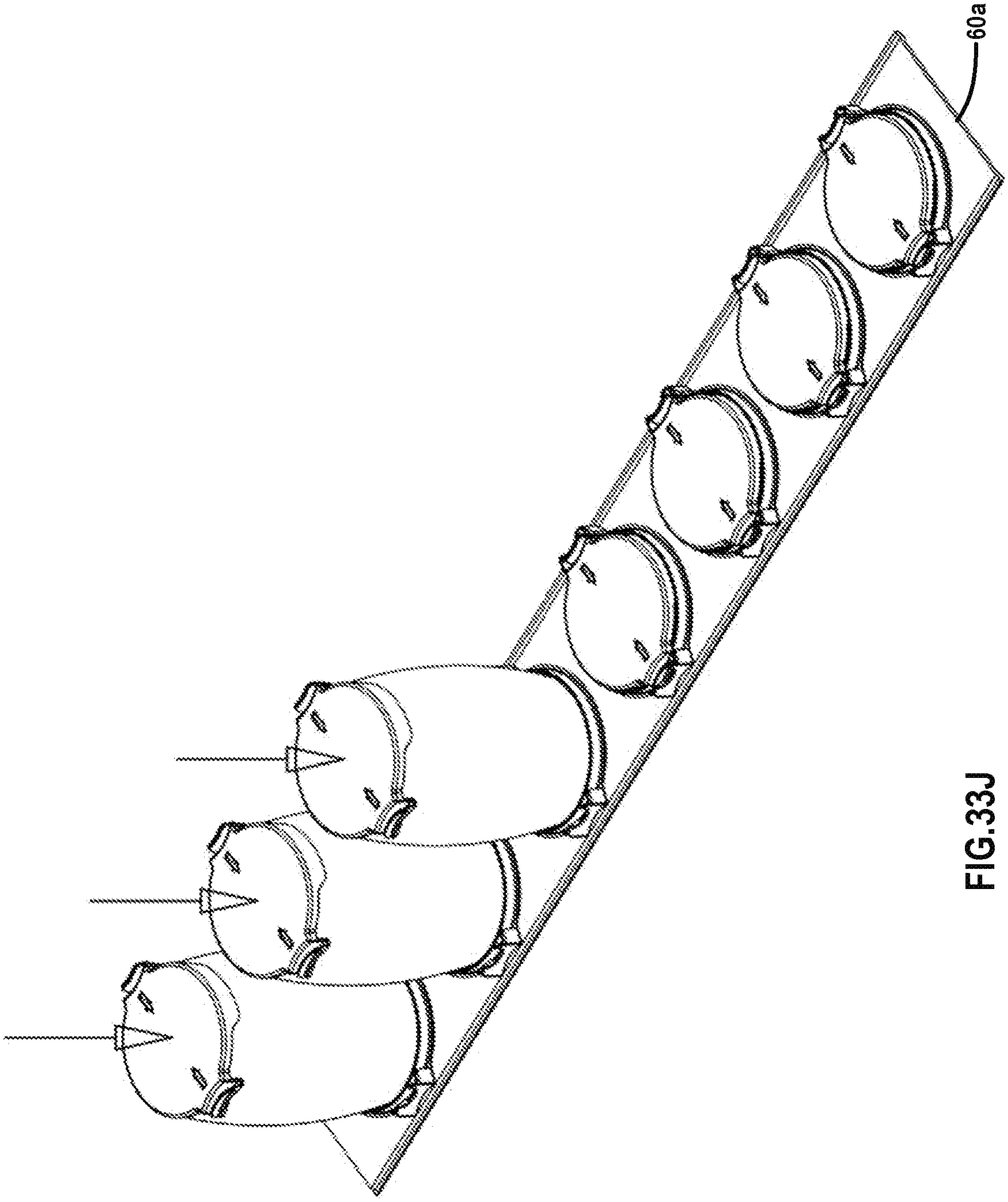

FIG. 33J exemplarily shows a condition when a plurality of the spring modules shown in FIG. 33A are connected together via a flexible bottom pad.

Figure 33K:
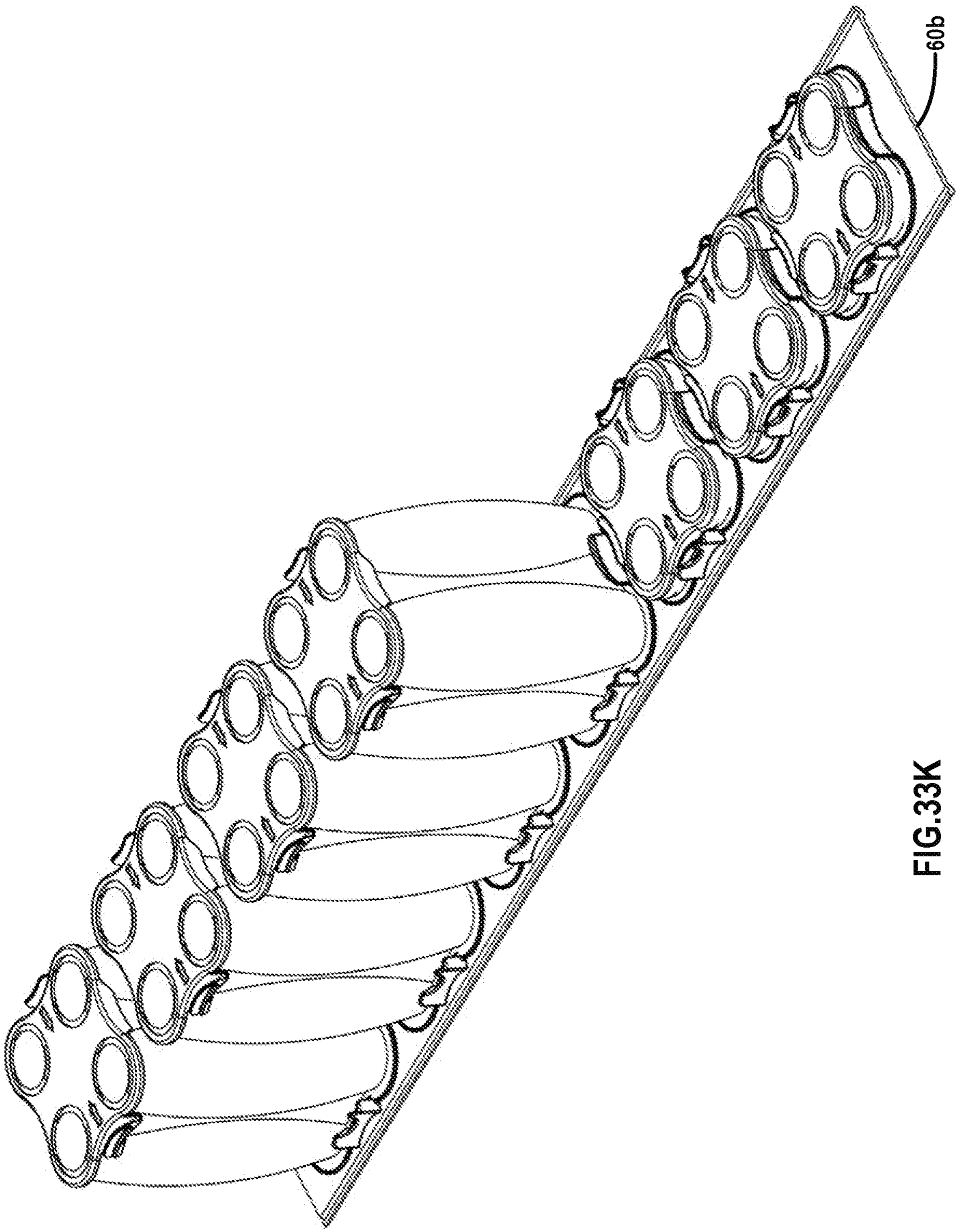

FIG. 33K exemplarily shows a condition when a plurality of the spring modules shown in FIG. 33H are connected together via a flexible bottom pad.

Figure 33L:
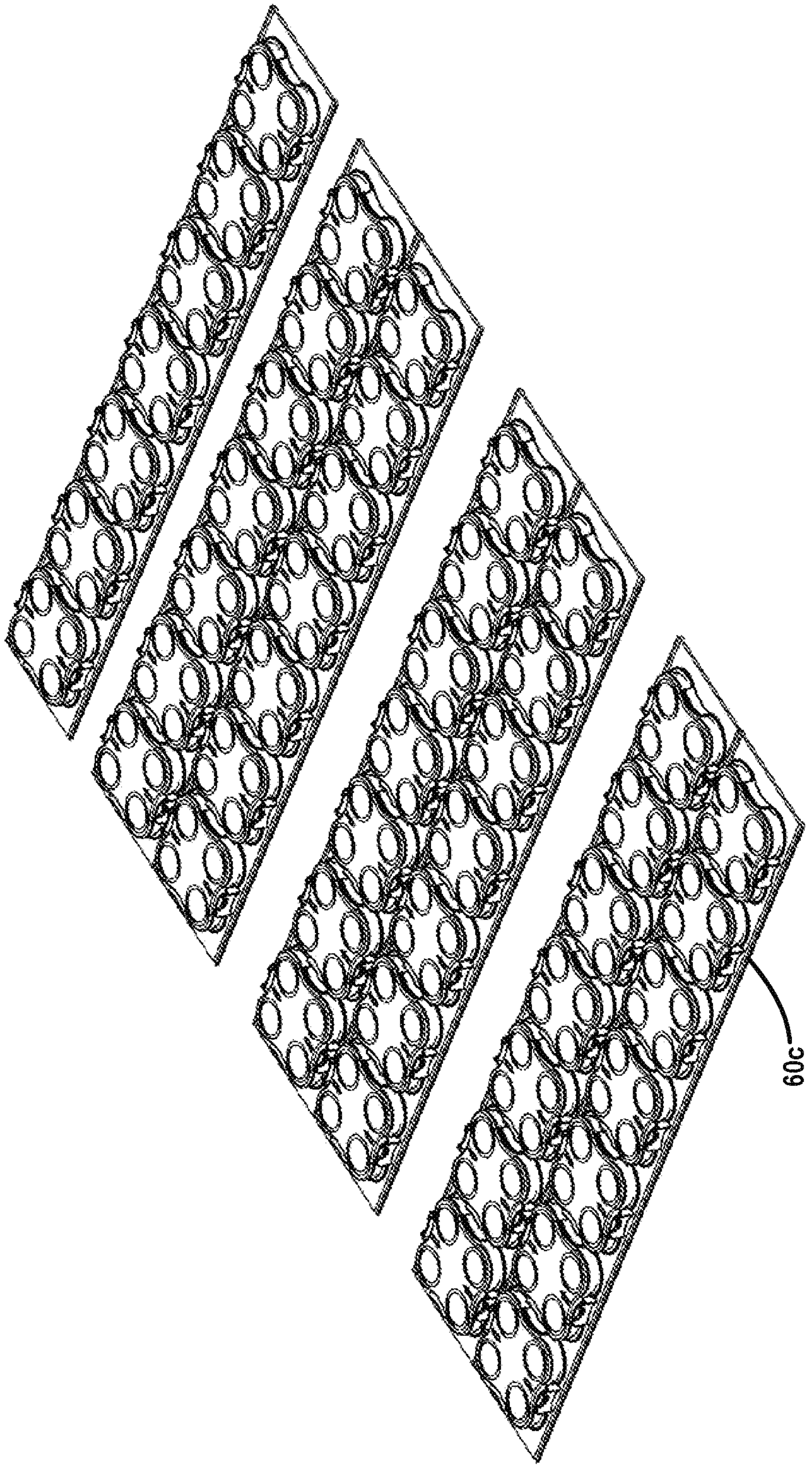

FIG. 33L exemplarily shows a condition when two rows of the spring modules shown in FIG. 33H are connected together via a flexible bottom pad.

Figure 33M:
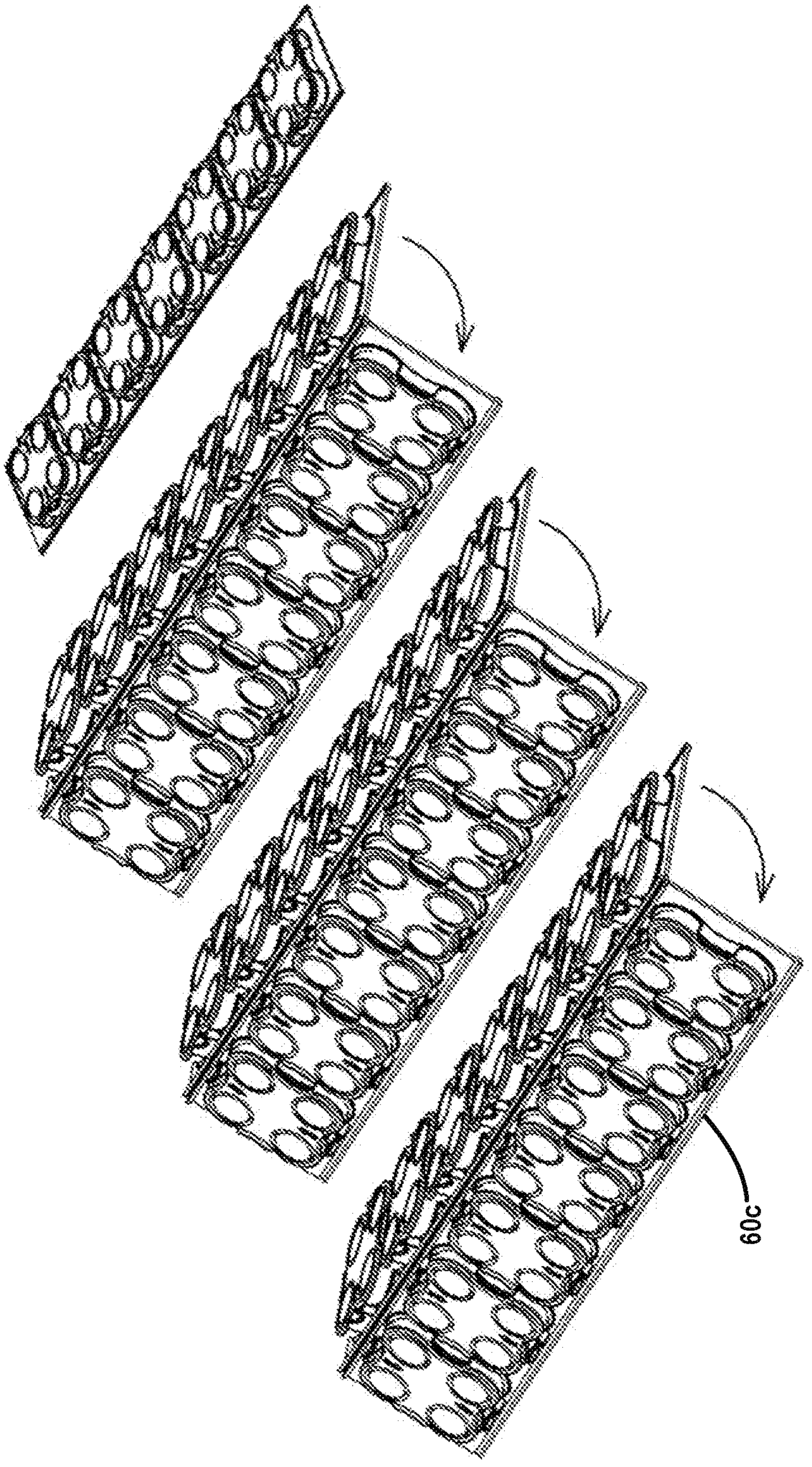
Figure 33N:
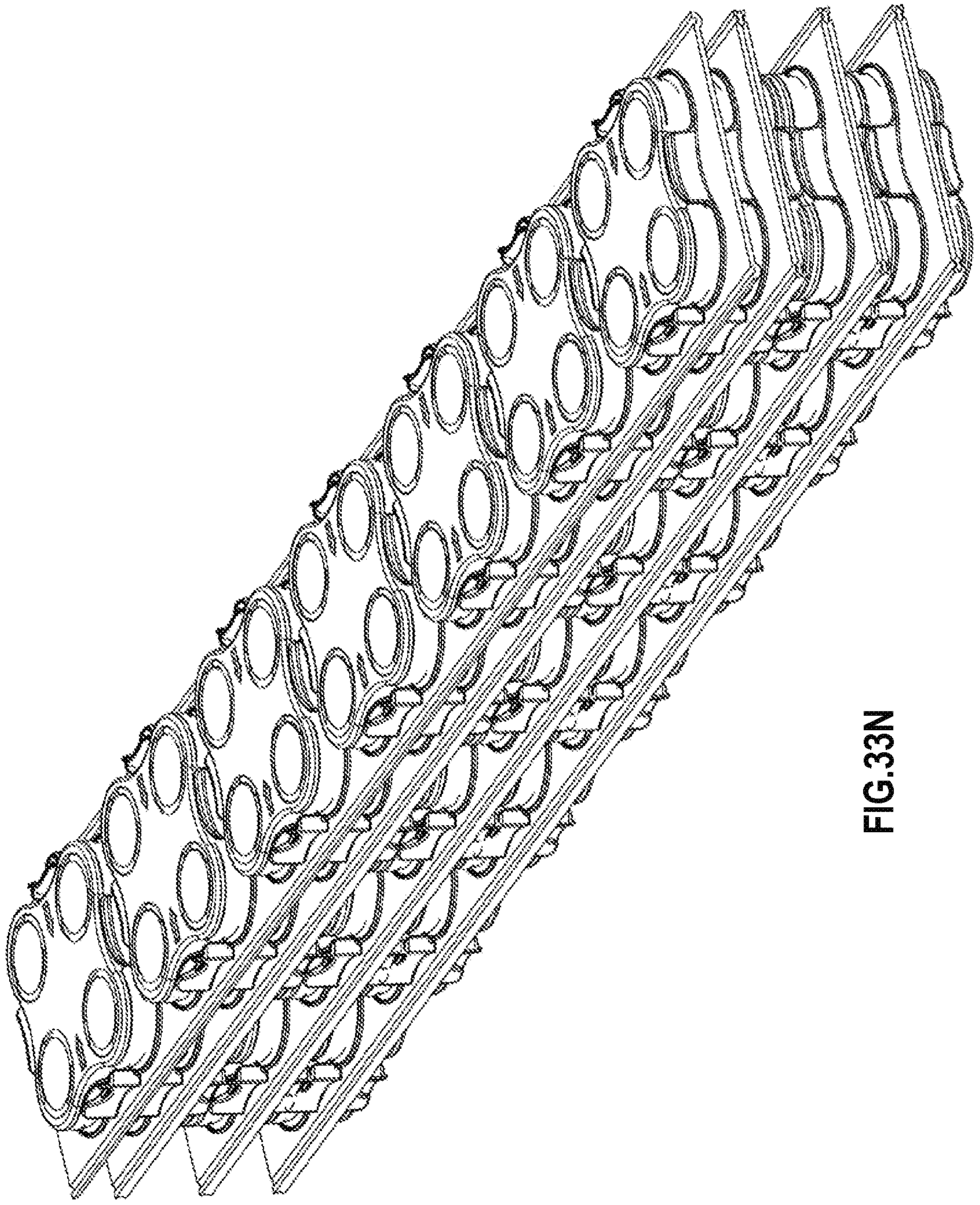

FIGS. 33M and 33N exemplarily show a condition when the bottom pad with two rows of the spring modules mounted thereon shown in FIG. 33L is folded.

Figure 33P:
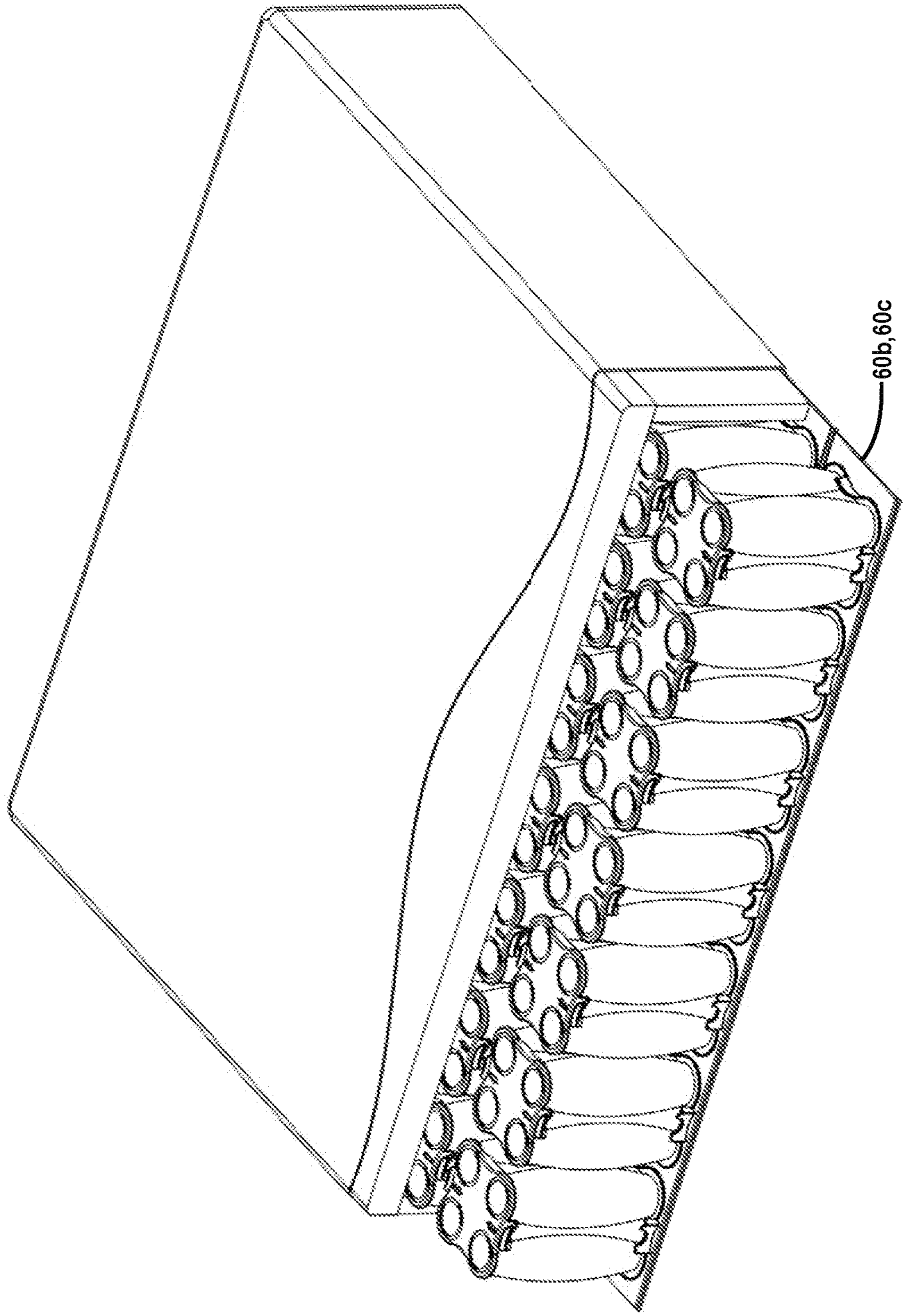

FIG. 33P exemplarily shows a spring cushion having the spring modules and the flexible bottom pads as shown in FIG. 33L.

Figure 34A:
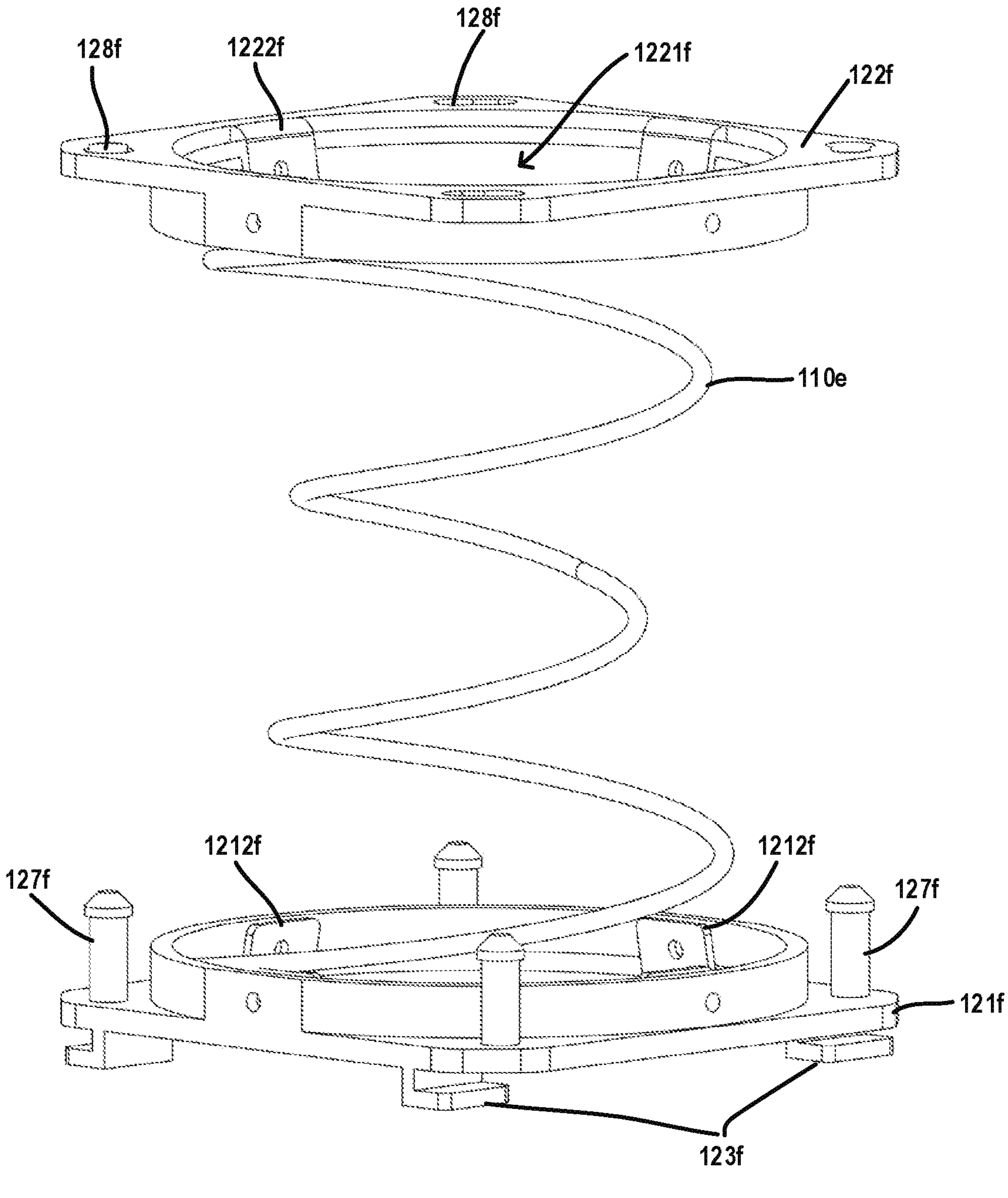

FIG. 34A exemplarily shows a spring module in which a base and an end cover can be snapped together according to yet another preferred embodiment of the present disclosure.

Figure 34B:
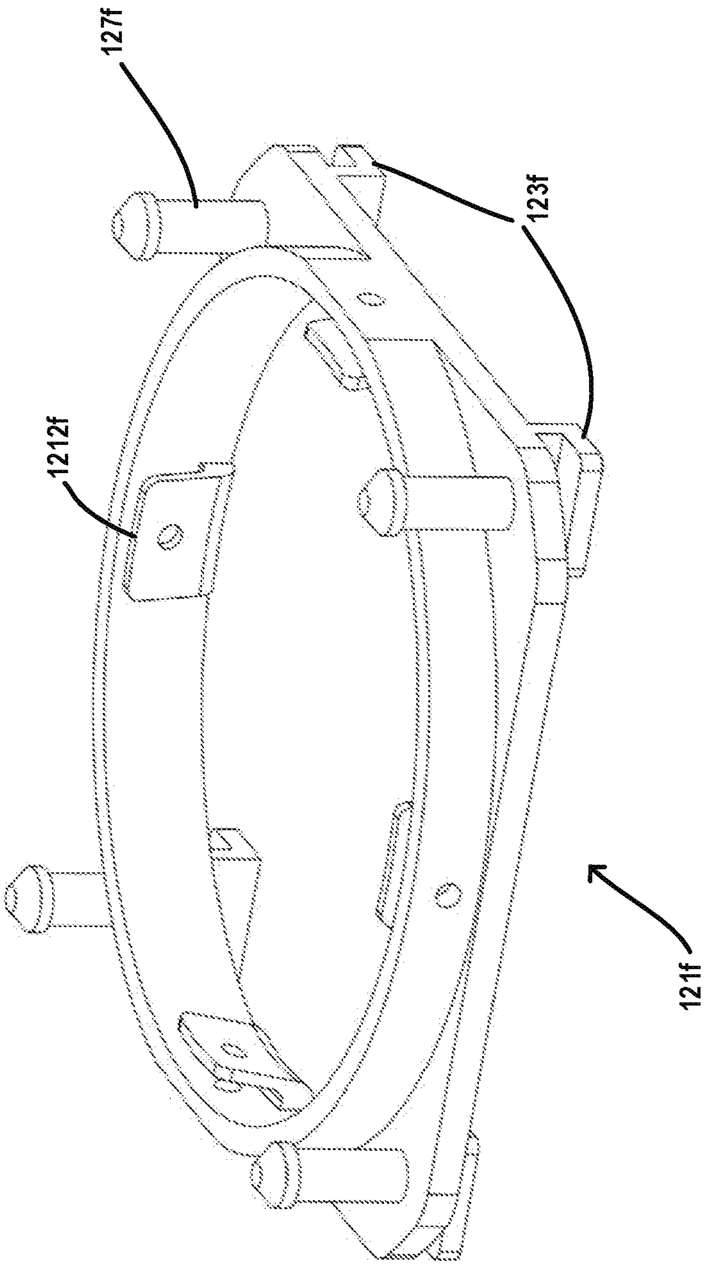
Figure 34C:
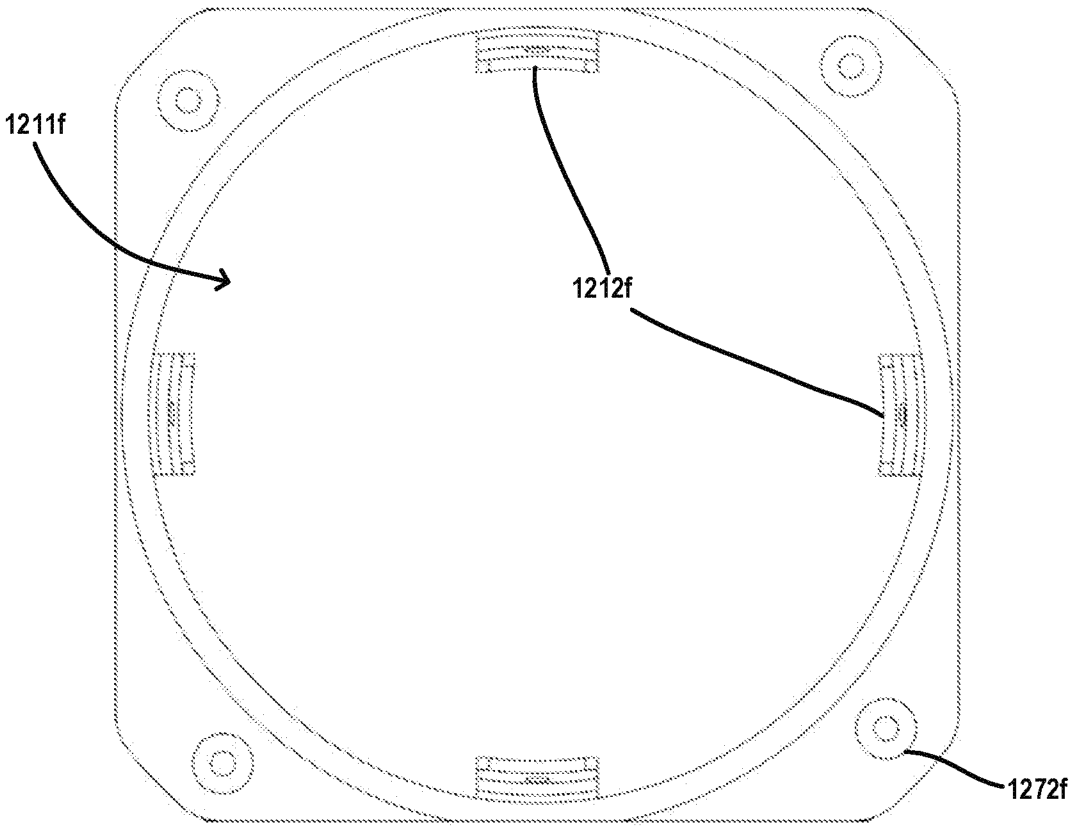
Figure 34D:
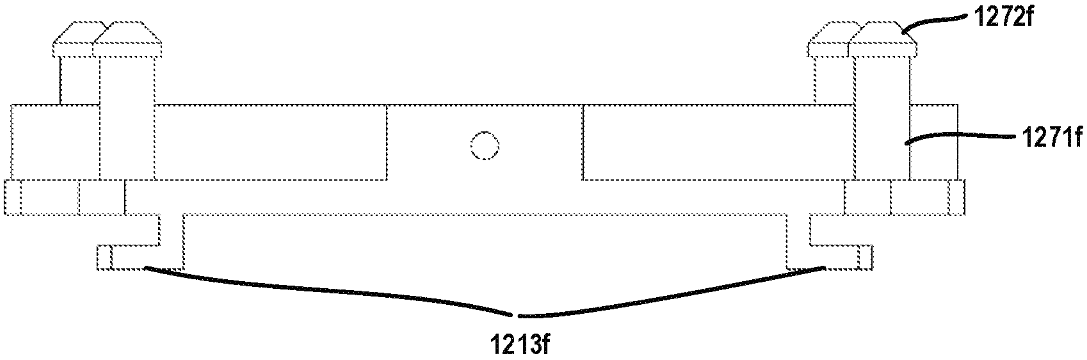

FIGS. 34B-34D exemplarily show a perspective view, a top view and a side view of the base of the spring module shown in FIG. 34A, respectively.

Figure 34E:
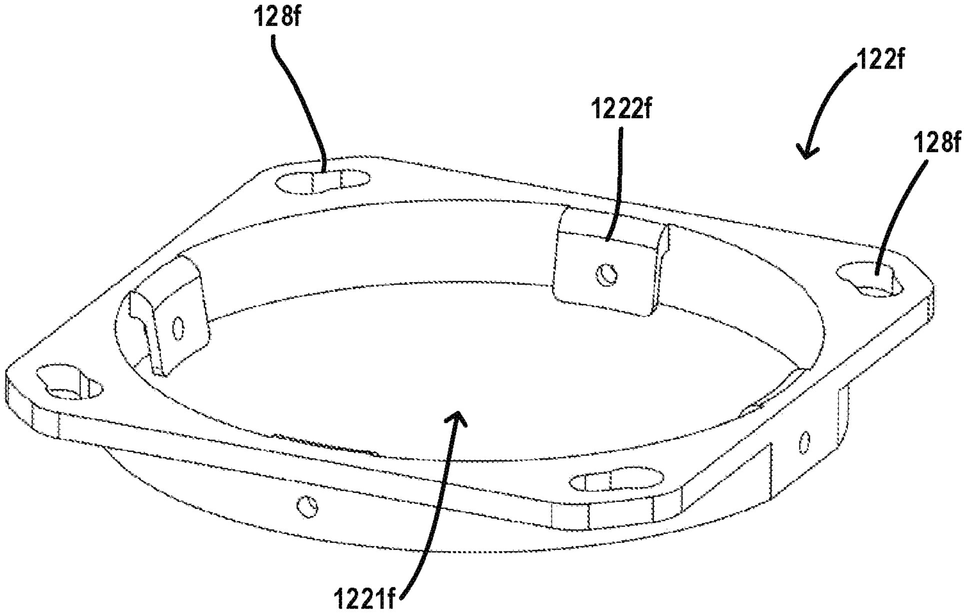
Figure 34F:
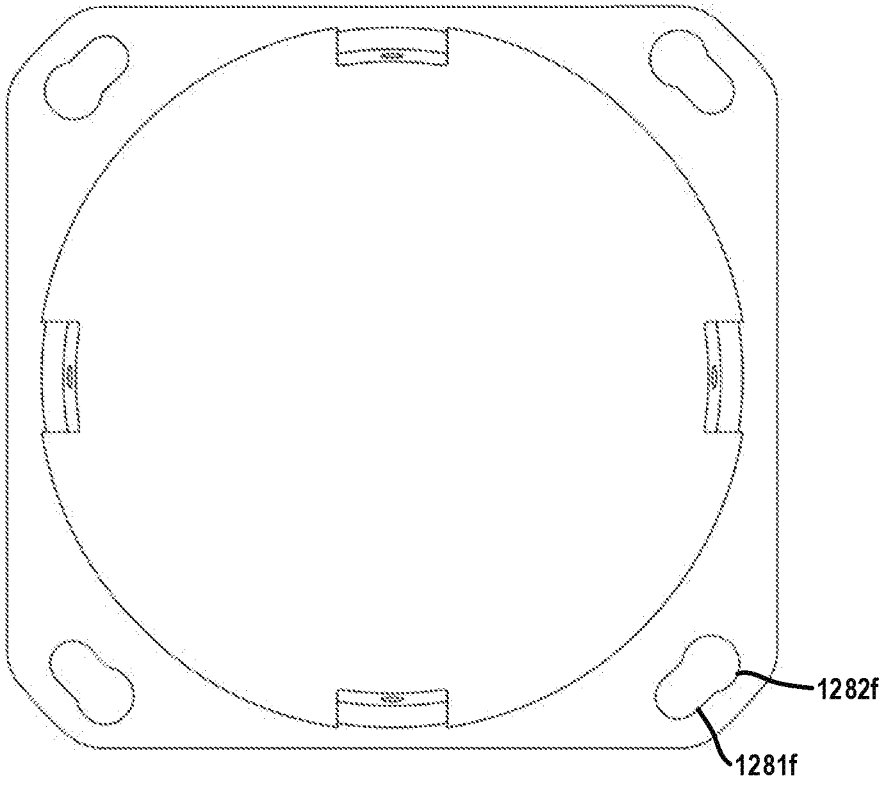

FIGS. 34E and 34F exemplarily show a perspective view and a top view of the end cover of the spring module shown in FIG. 34A, respectively.

Figure 34G:
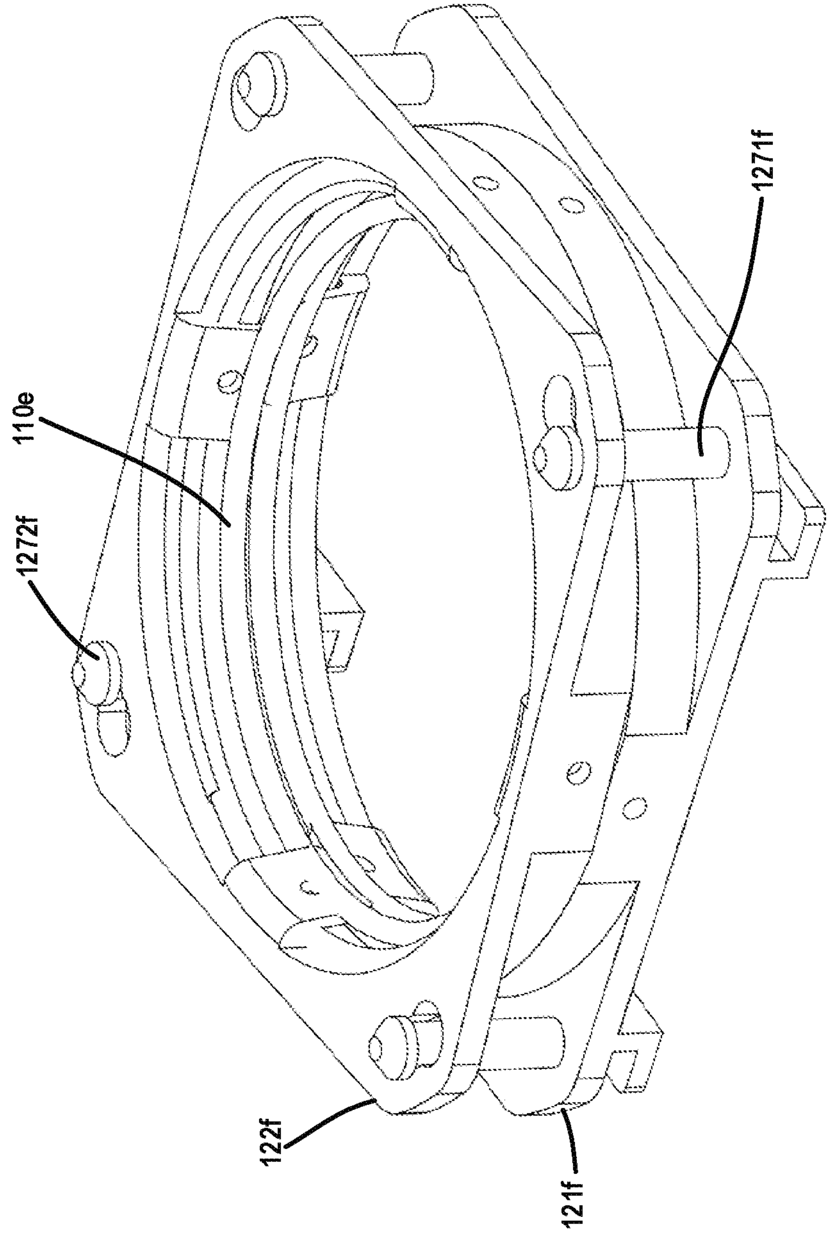

FIG. 34G exemplarily shows a condition when the base and the end cover of the spring module shown in FIG. 33A are snapped together.

Figure 35B:
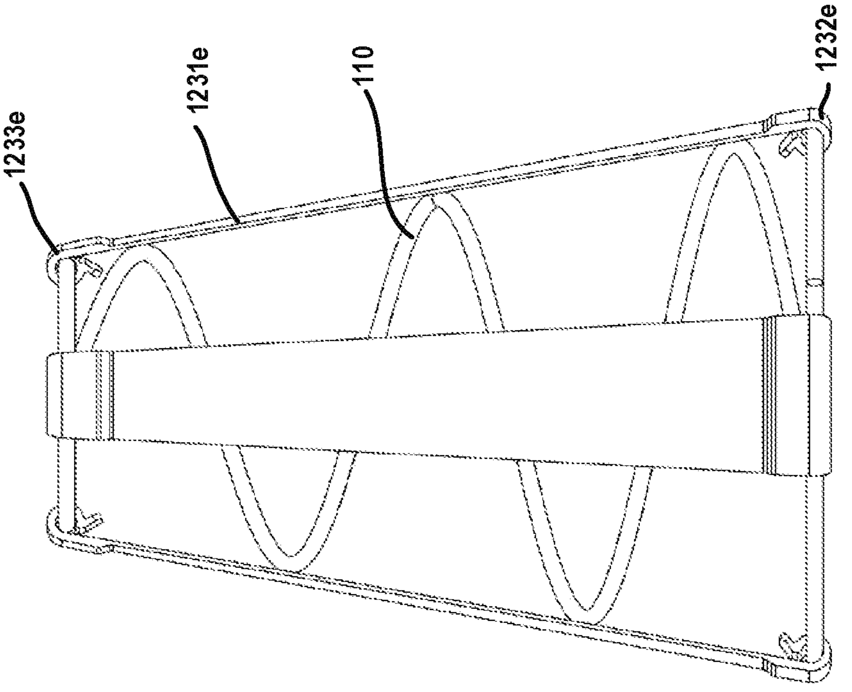
Figure 35A:
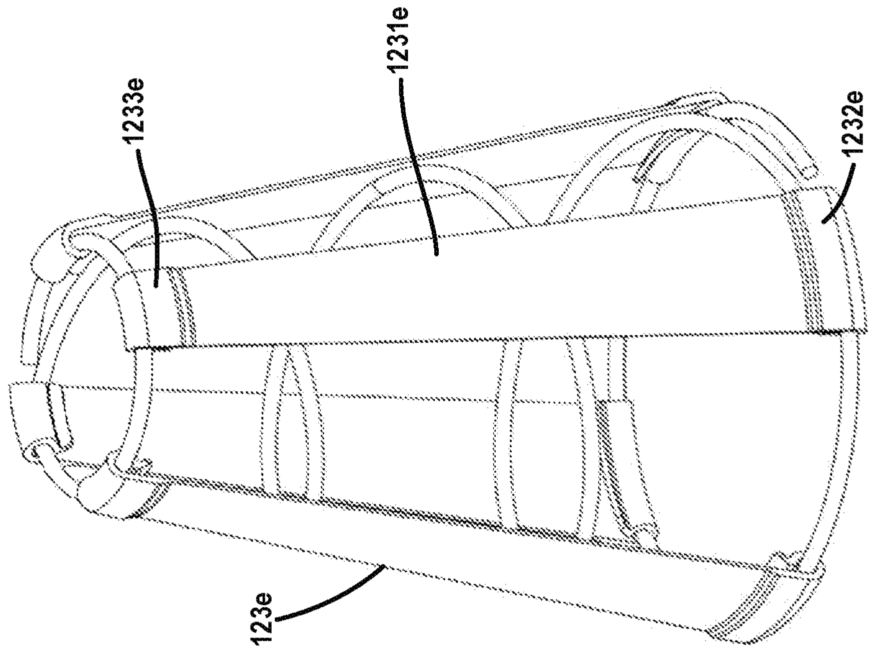

FIGS. 35A and 35B exemplarily show a perspective view and a side view of a spring module according to yet another preferred embodiment of the present disclosure, respectively.

Figure 35D:
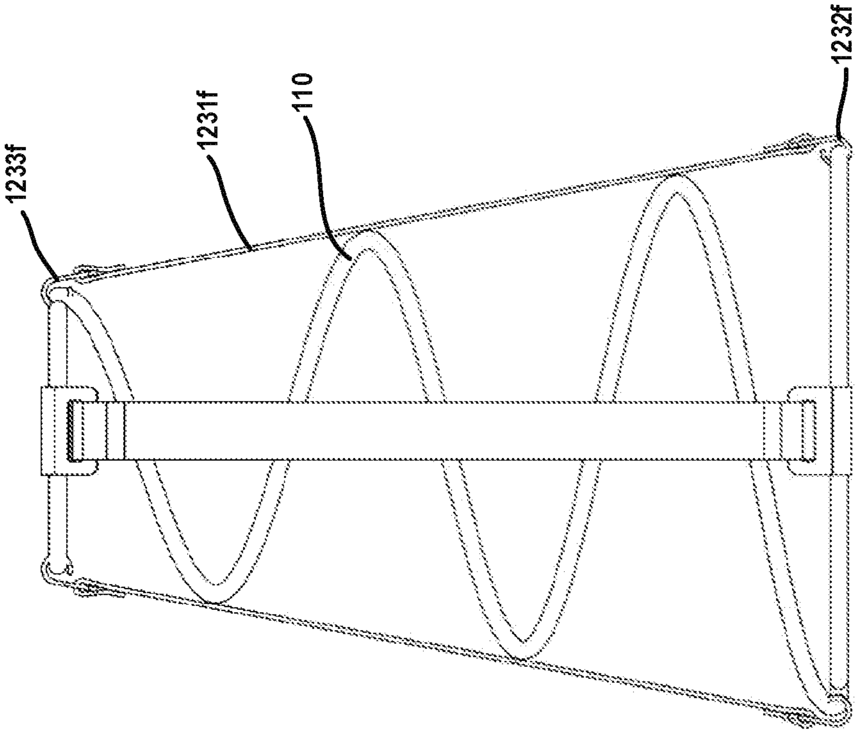
Figure 35C:
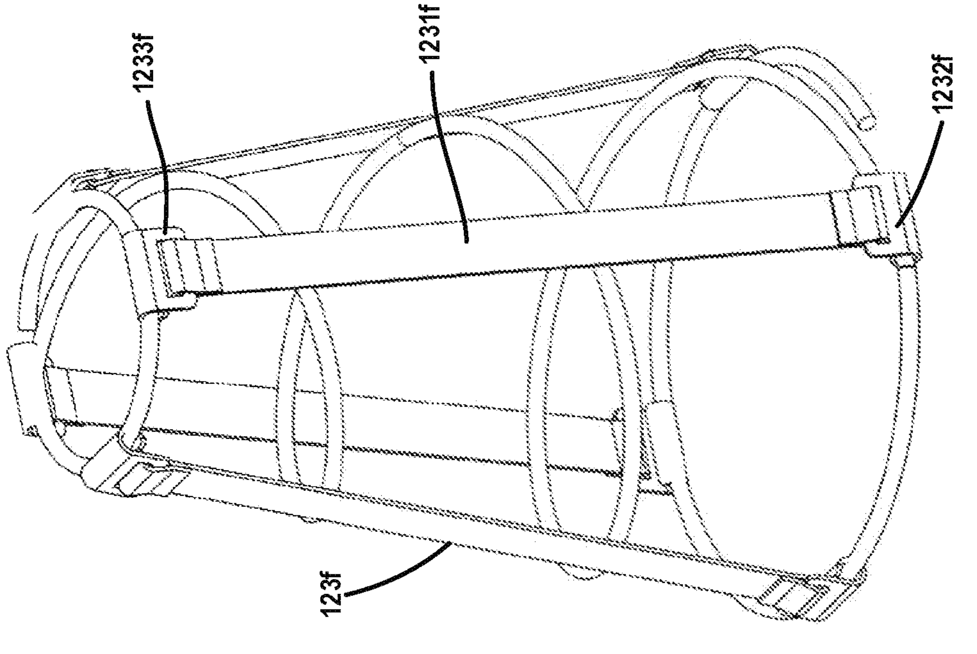

FIGS. 35C and 35D exemplarily show a perspective view and a side view of a spring module according to yet another preferred embodiment of the present disclosure, respectively.

Figure 35E:
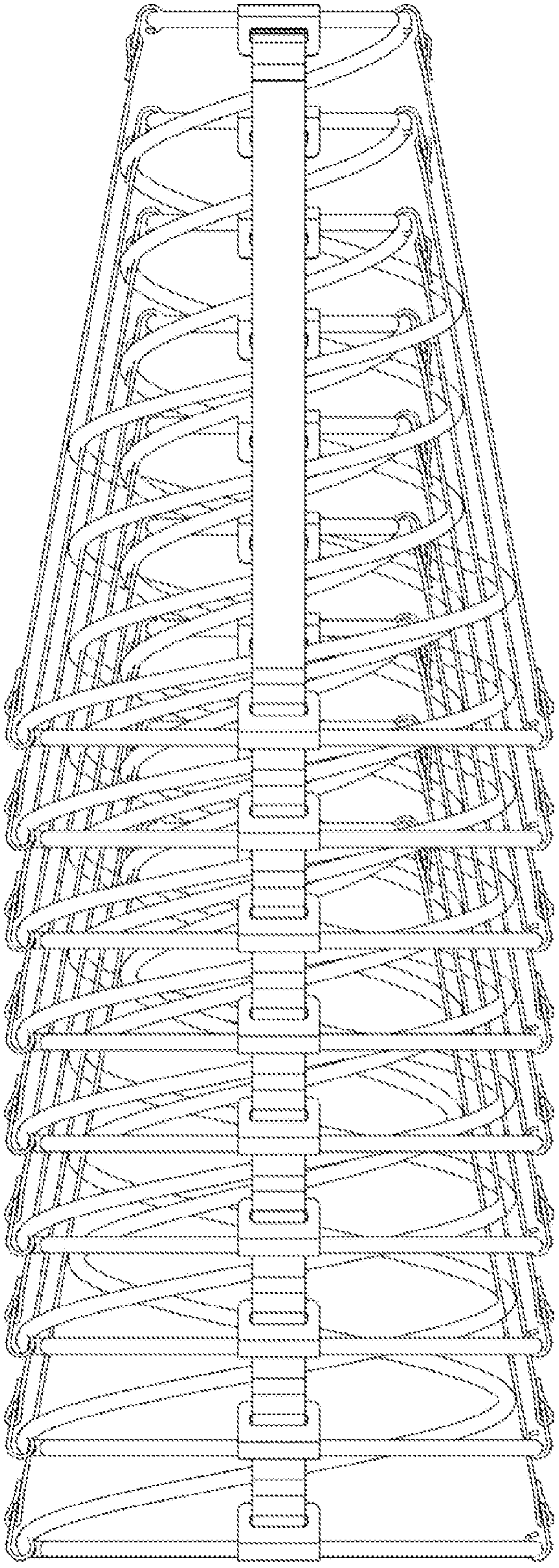

FIG. 35E exemplarily shows a condition when a plurality of the spring modules shown in FIGS. 35A to 35D are nested together.

Figure 35F:
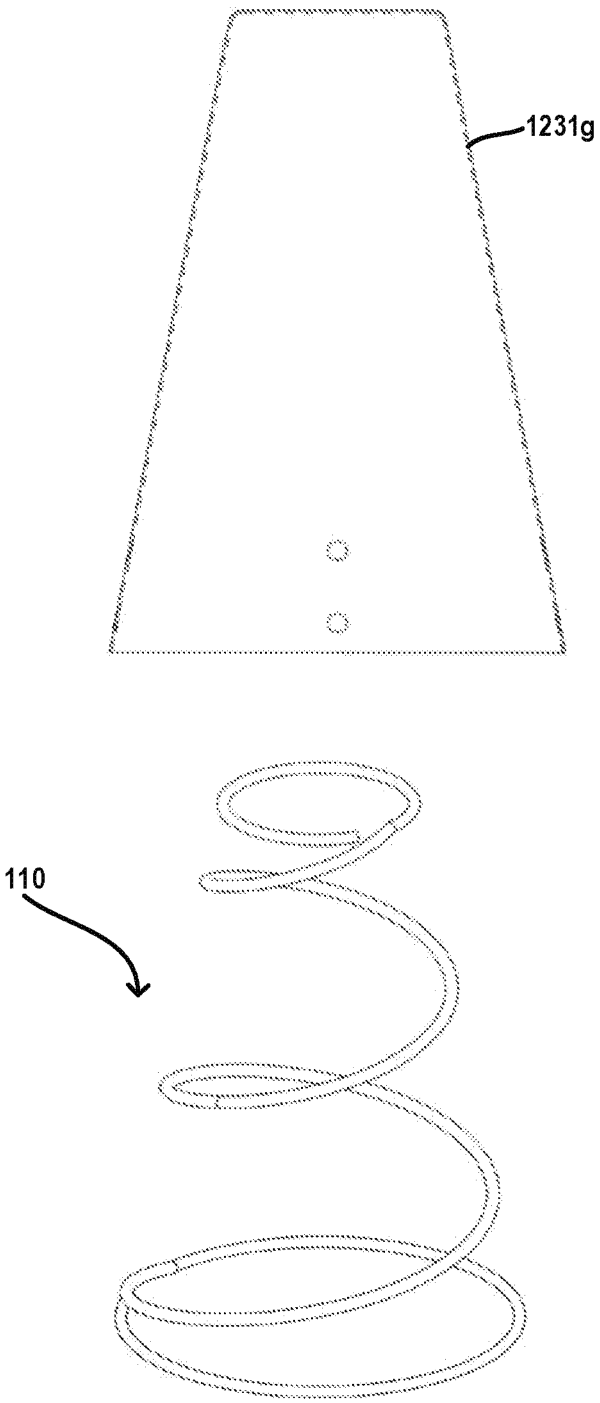
Figure 35G:
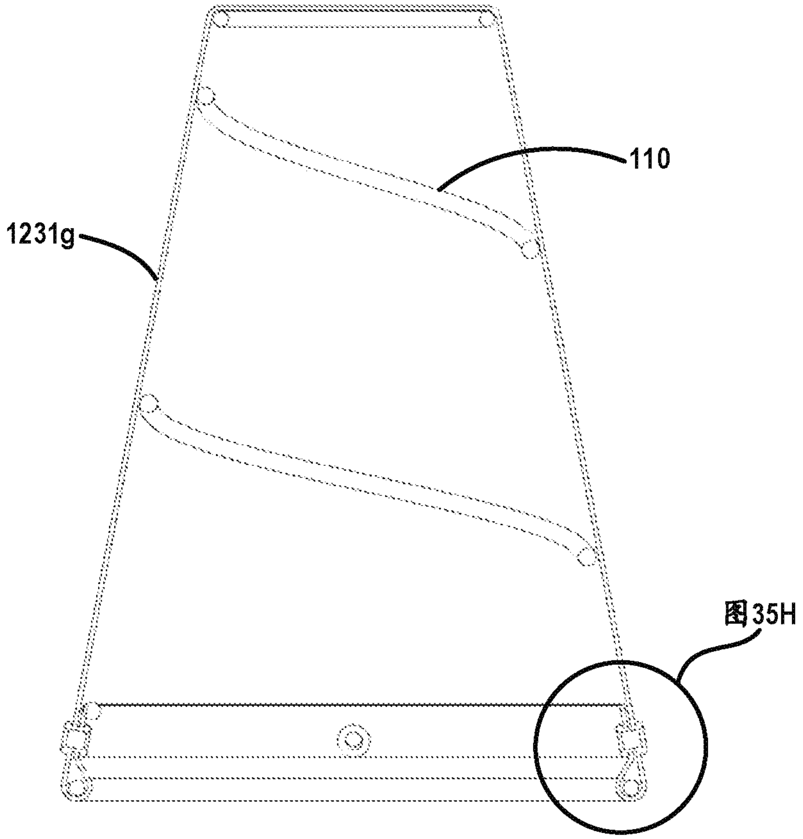

FIGS. 35F and 35G exemplarily show an exploded view and a sectional view of a spring module according to yet another preferred embodiment of the present disclosure, respectively.

Figure 35H:
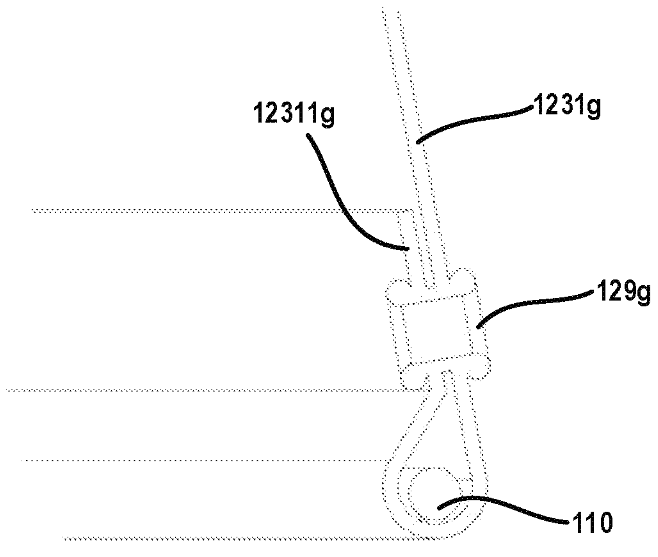

FIG. 35H is a partial enlarged view of FIG. 35G.

Figure 35I:
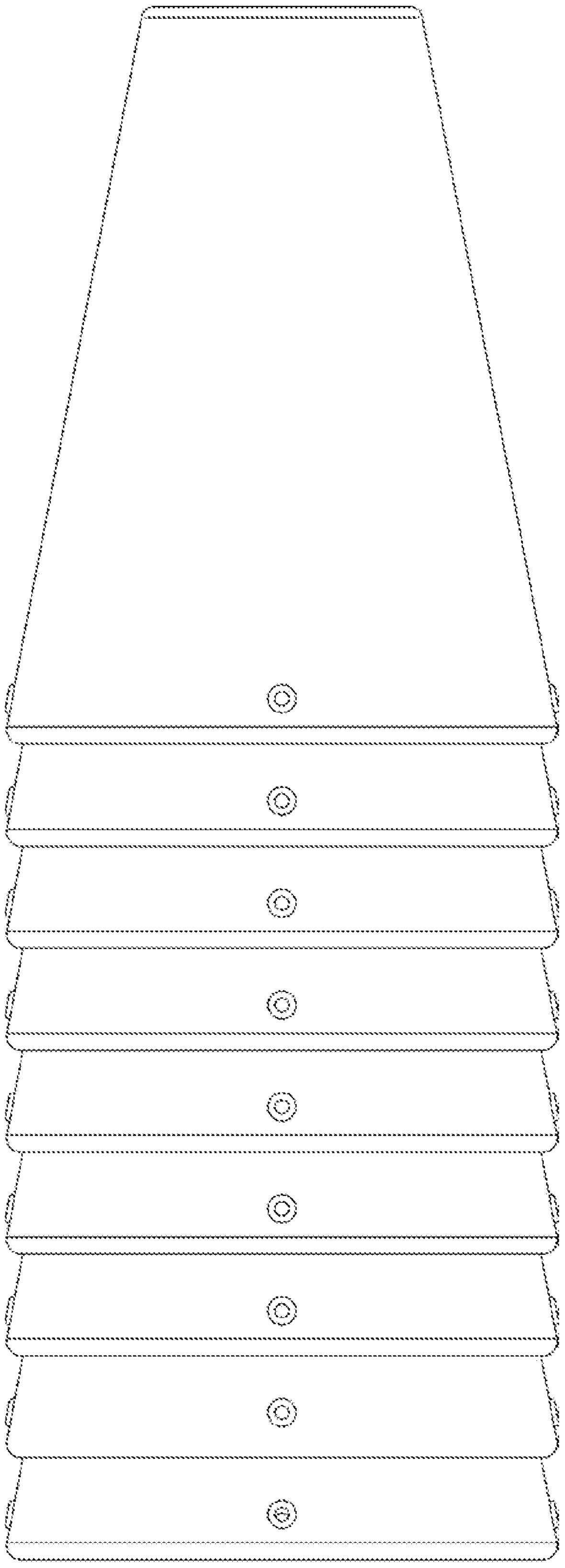

FIG. 35I exemplarily shows a condition when a plurality of the spring modules shown in FIGS. 35F and 35G are nested together.

Figure 35J:
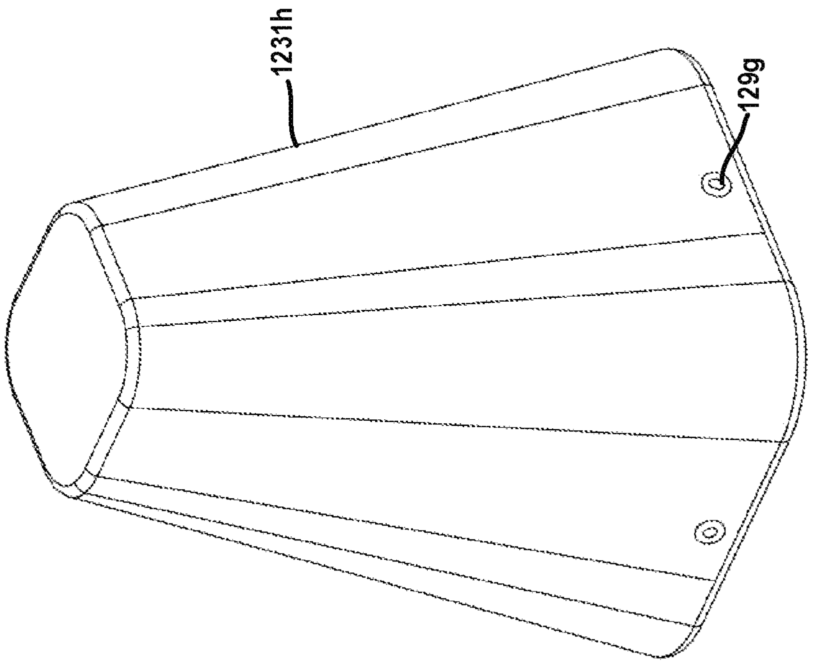

FIG. 35J exemplarily shows a perspective view of a spring module according to yet another preferred embodiment of the present disclosure.

Figure 35K:
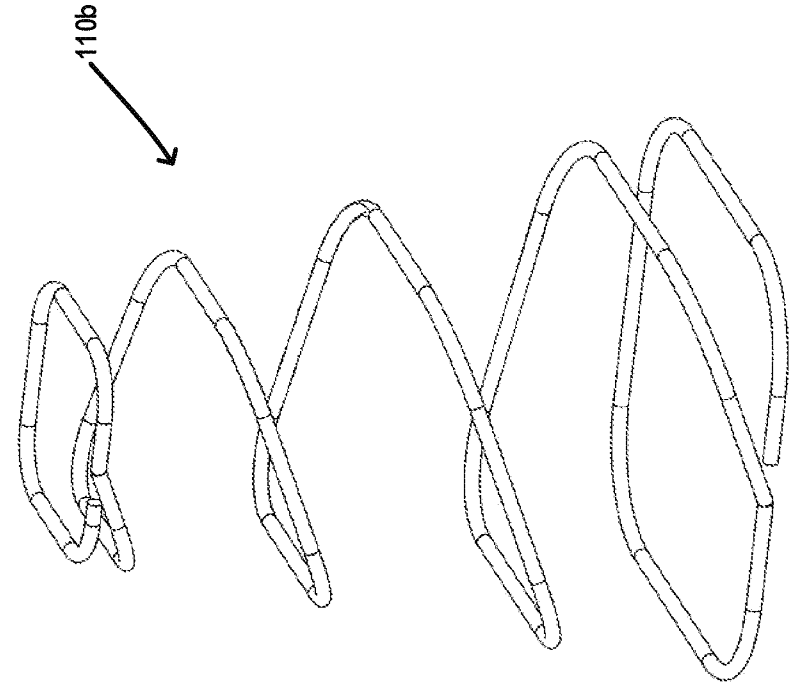

FIG. 35K exemplarily shows a conical spring in the spring module shown in FIG. 35J.

Figure 36A:
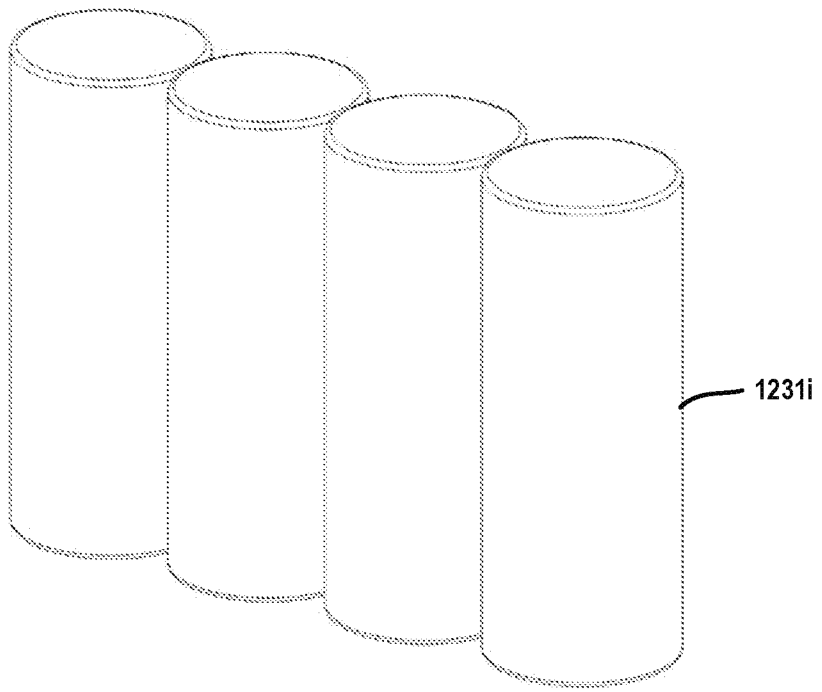
Figure 36B:
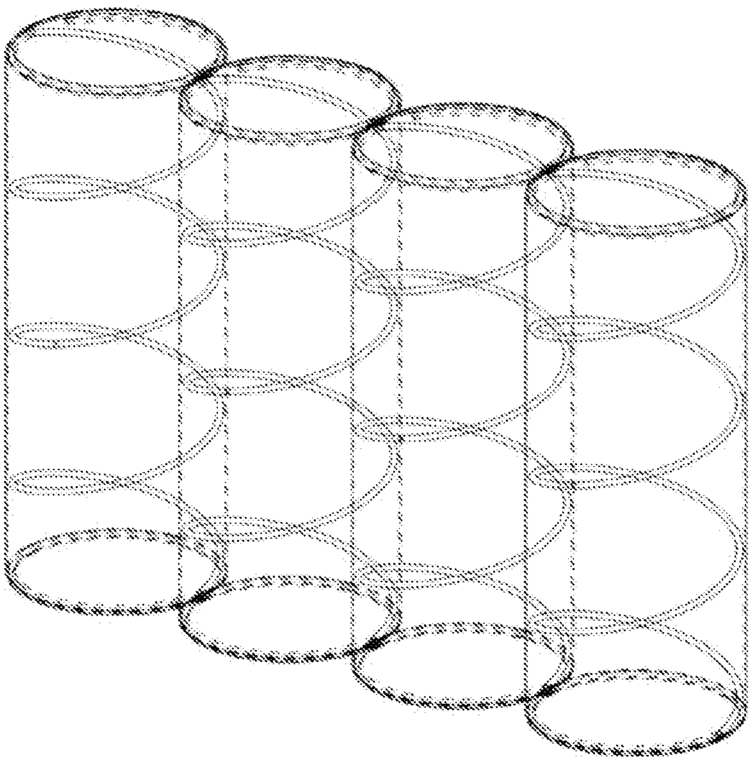

FIGS. 36A and 36B exemplarily show a perspective view and a perspective view of a spring module according to yet another preferred embodiment of the present disclosure, respectively.

Figure 36C:
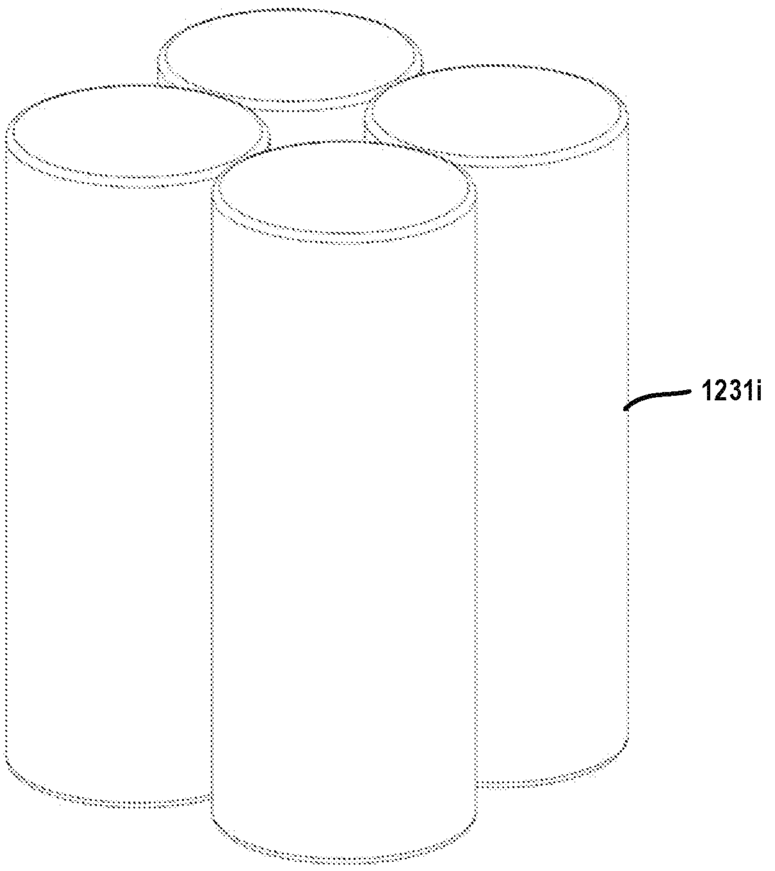

FIG. 36C exemplarily shows a perspective view of a spring module according to yet another preferred embodiment of the present disclosure.

Figure 36D:
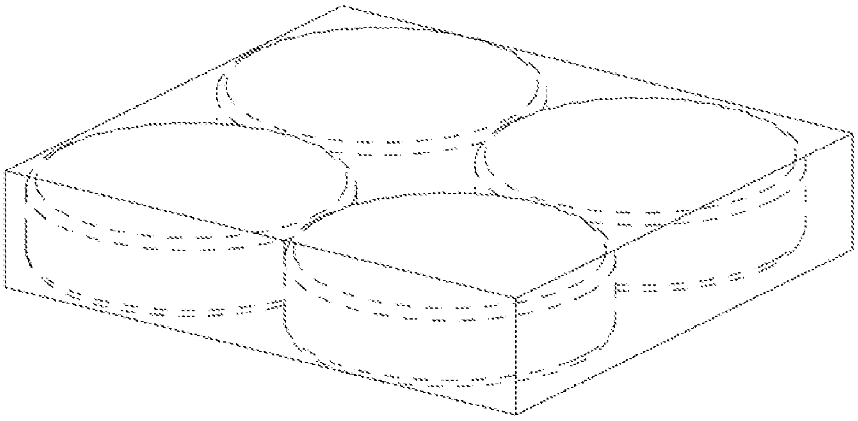

FIG. 36D exemplarily shows a condition when the spring module shown in FIG. 36C is compressed and stored in a storage box.

Figure 36E:
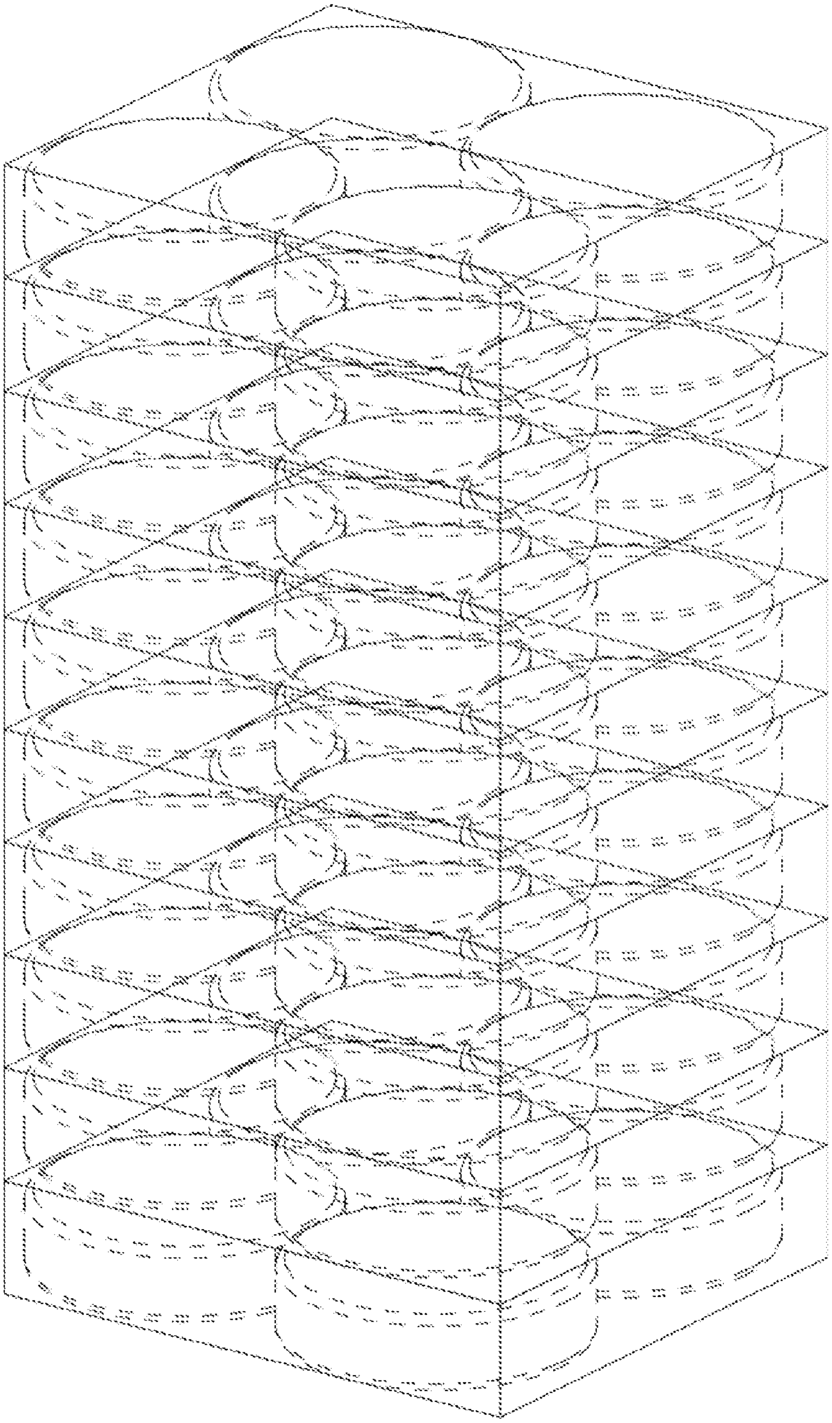

FIG. 36E exemplarily shows a condition when a plurality of the storage boxes shown in FIG. 36D are stacked together.

Figure 37:
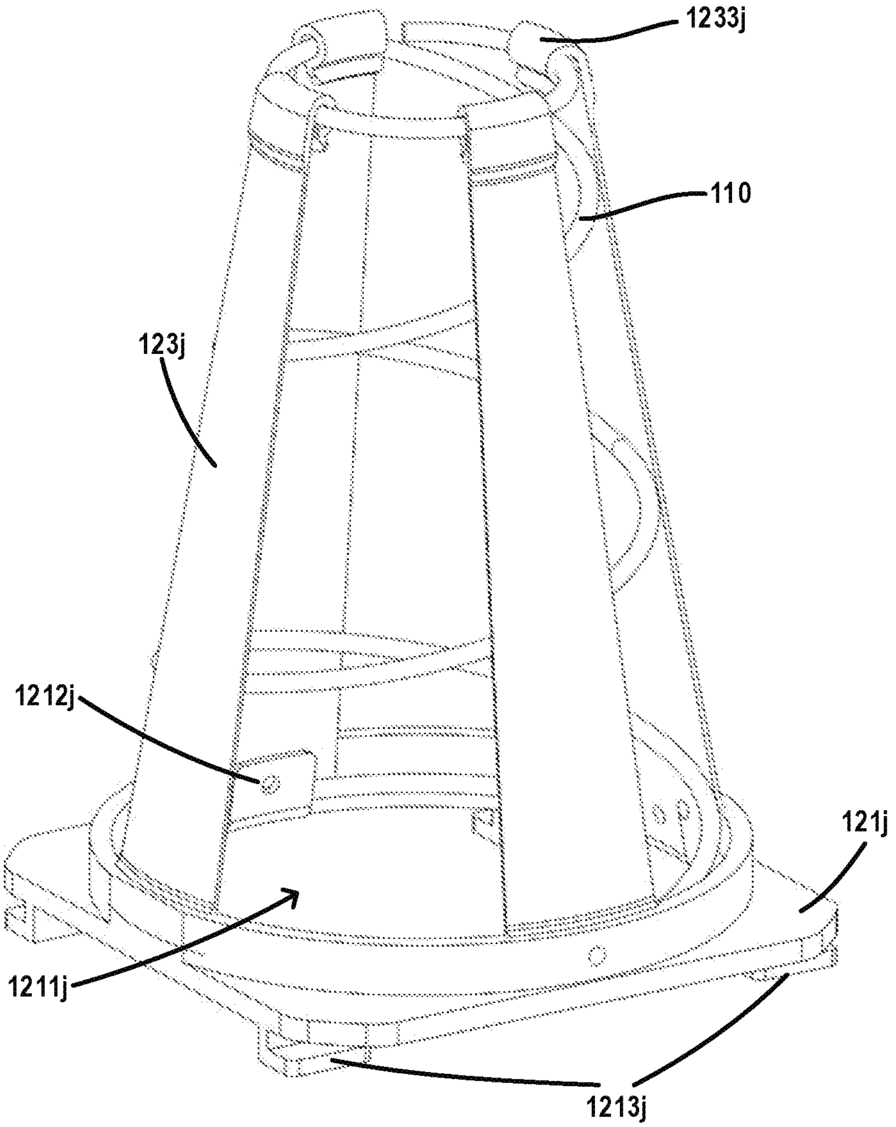

FIG. 37 exemplarily shows a perspective view of a spring module according to yet another preferred embodiment of the present disclosure.

Figure 38A:
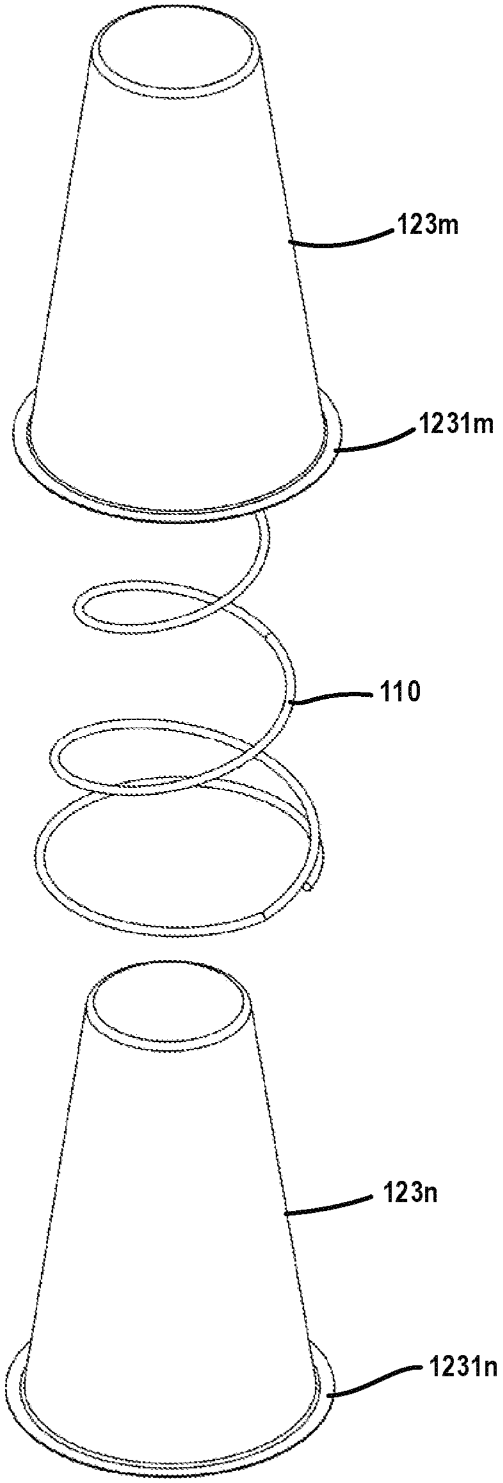
Figure 38B:
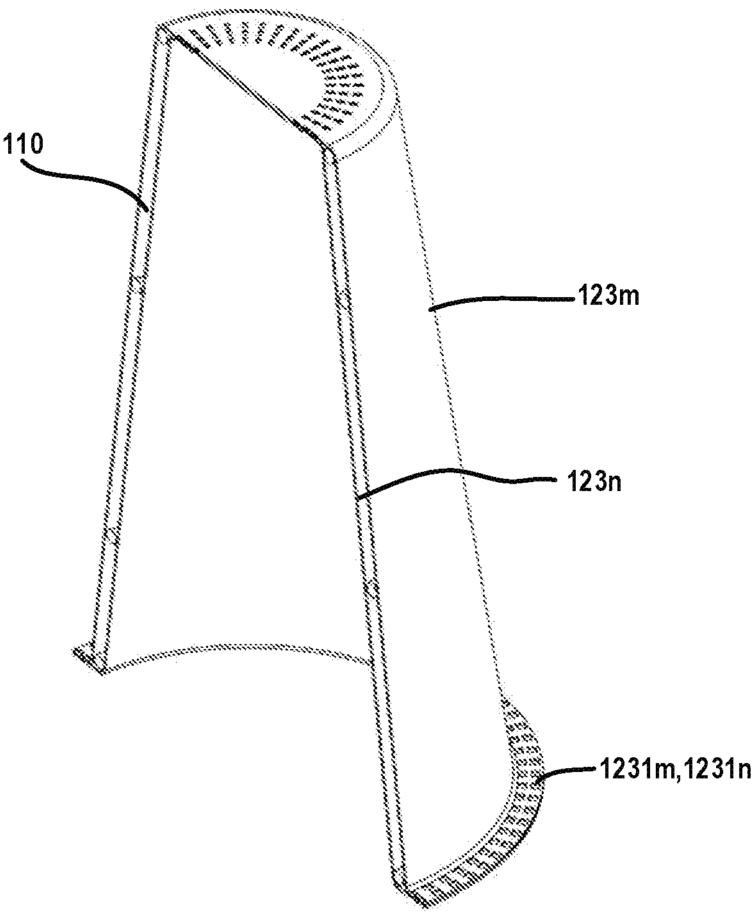

FIGS. 38A and 38B exemplarily show a stereoscopic exploded view and a stereoscopic sectional view of a spring module (spring bag) according to yet another preferred embodiment of the present disclosure, respectively.

Figure 39B:
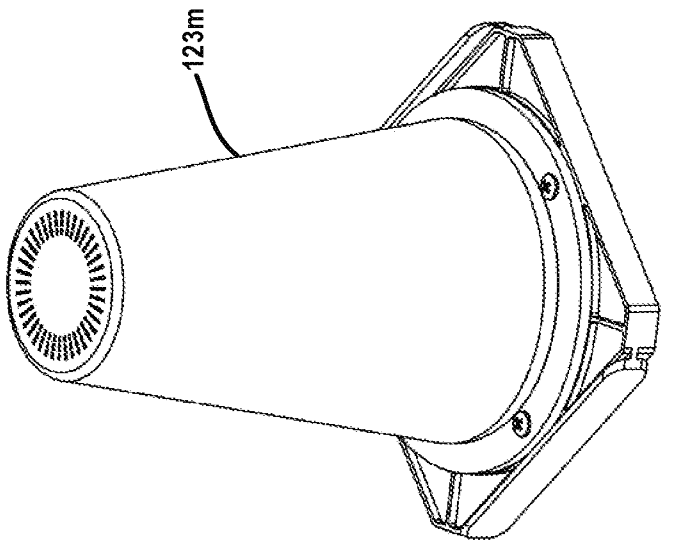
Figure 39A:
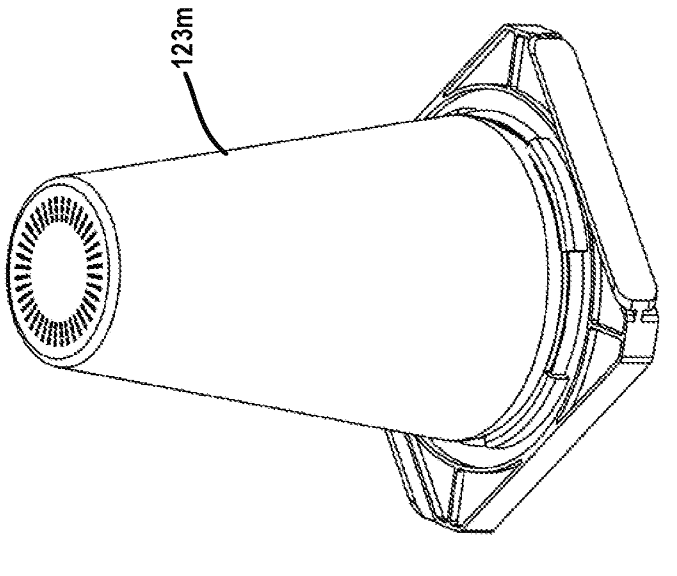

FIGS. 39A and 39B exemplarily illustrate conditions when the spring bag shown in FIGS. 38A and 38B are fixed on the base in different fixing ways, respectively.

Figure 39C:
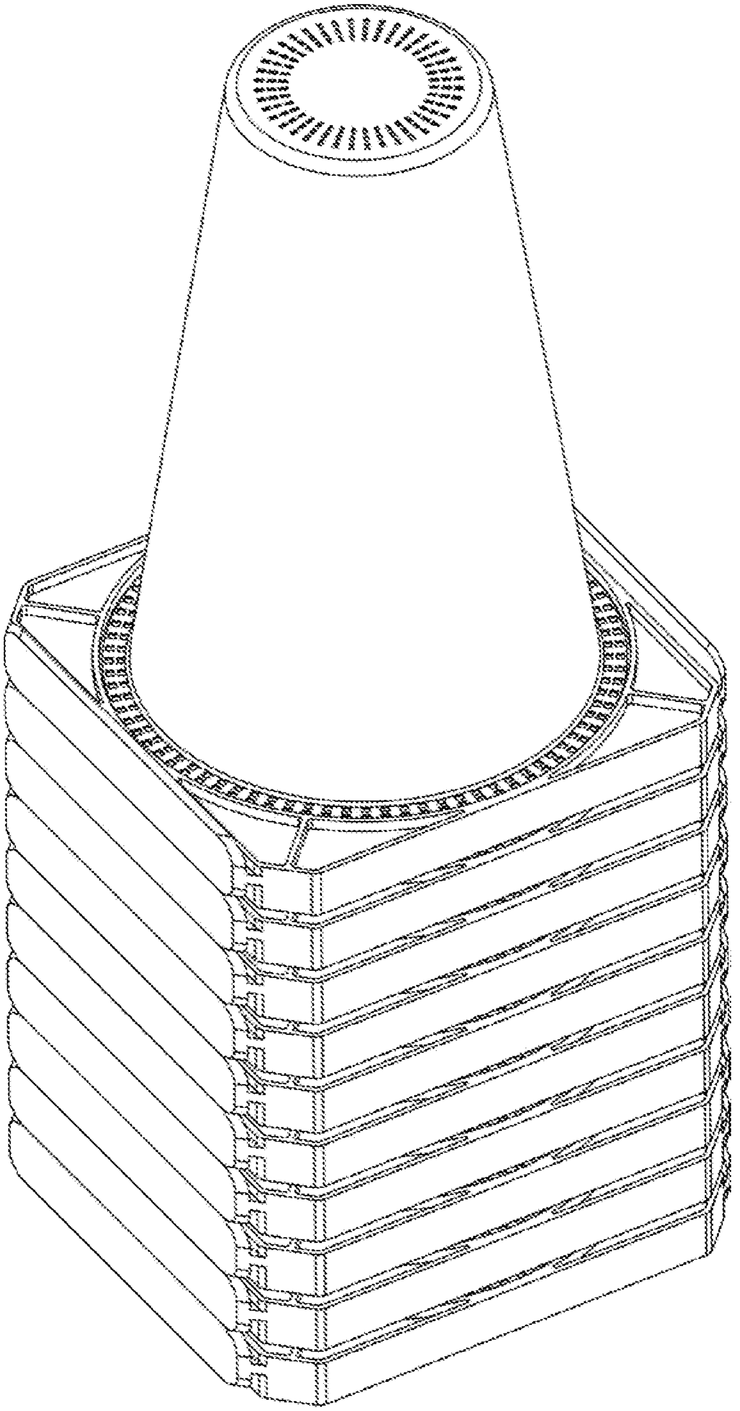

FIG. 39C exemplarily shows a condition when a plurality of the spring modules shown in FIG. 39A or 39B are nested together.

Figure 40C:
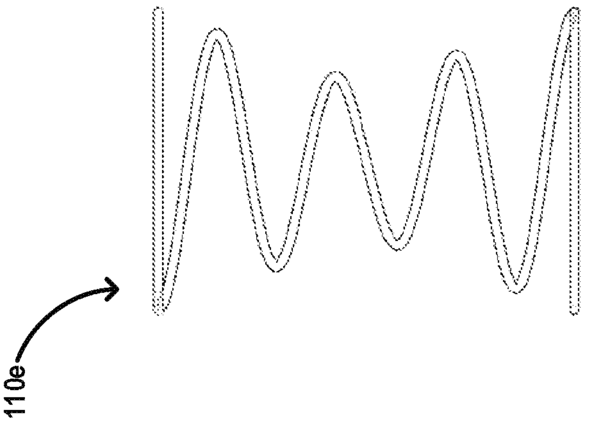
Figure 40B:
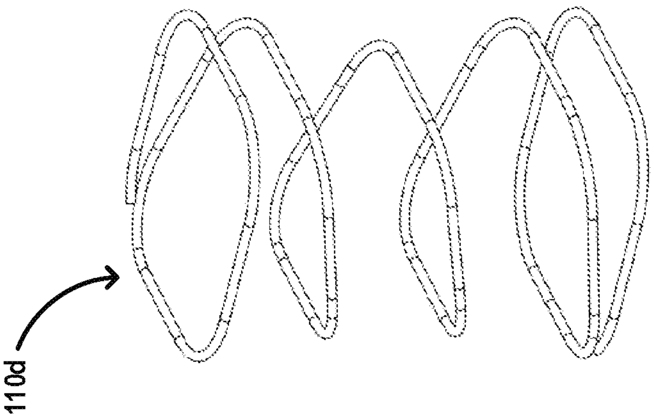
Figure 40A:
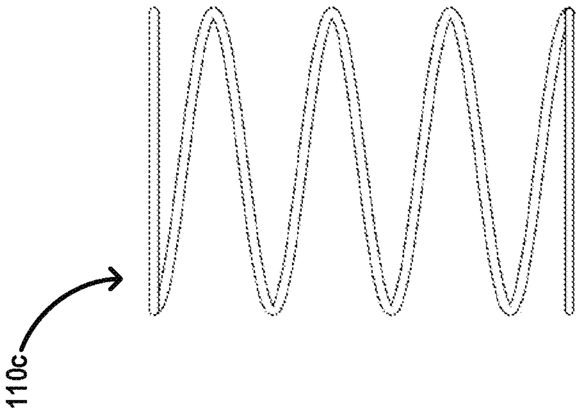

FIGS. 40A to 40C exemplarily show different embodiments of non-conical springs that can be used in the spring module of the present disclosure.

Figure 40F:
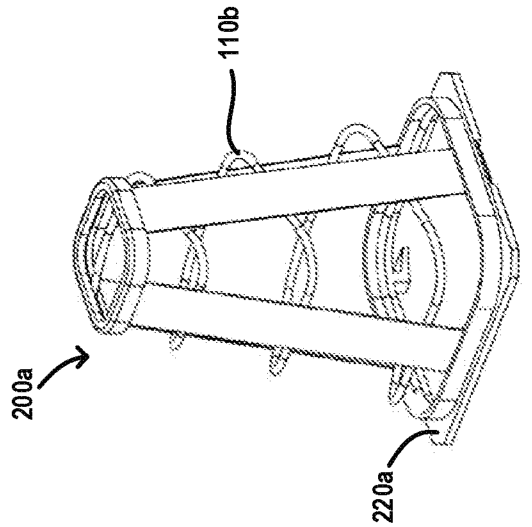
Figure 40E:
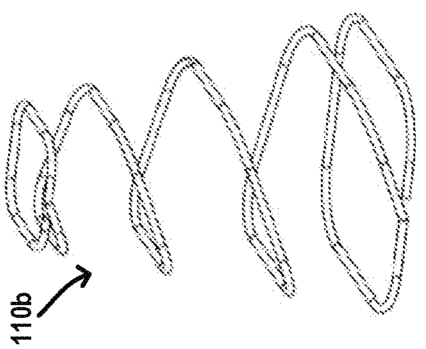
Figure 40D:
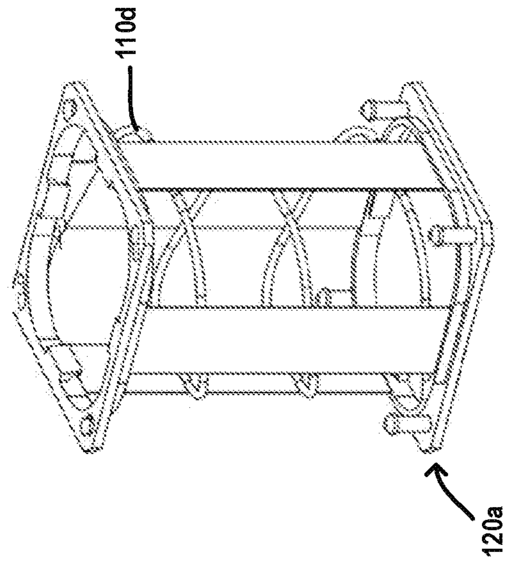

FIG. 40D exemplarily shows a spring module having the spring shown in FIG. 40B.

FIG. 40E exemplarily shows a different embodiment of a conical spring that can be used in the spring module of the present disclosure.

FIG. 40F exemplarily shows a spring module having the conical spring shown in FIG. 40E.

Figure 40H:
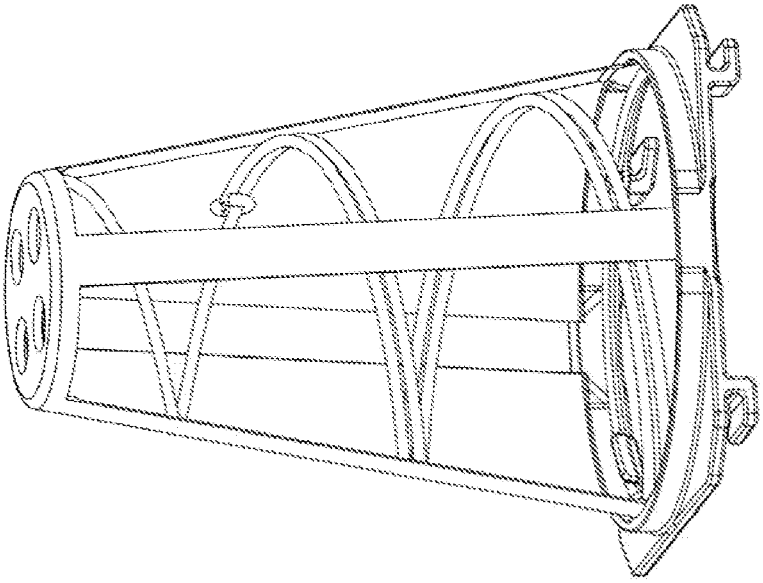
Figure 40G:
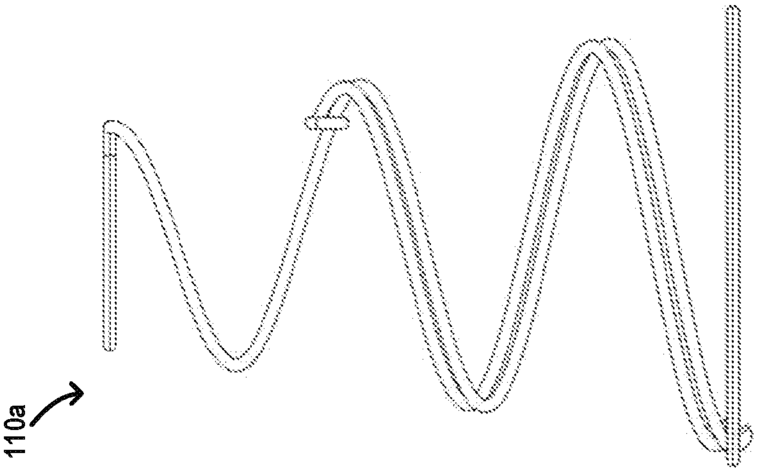

FIG. 40G exemplarily shows a different embodiment of a conical spring that can be used in the spring module of the present disclosure.

FIG. 40H exemplarily shows a spring module having the conical spring shown in FIG. 40G.

Figure 41A:
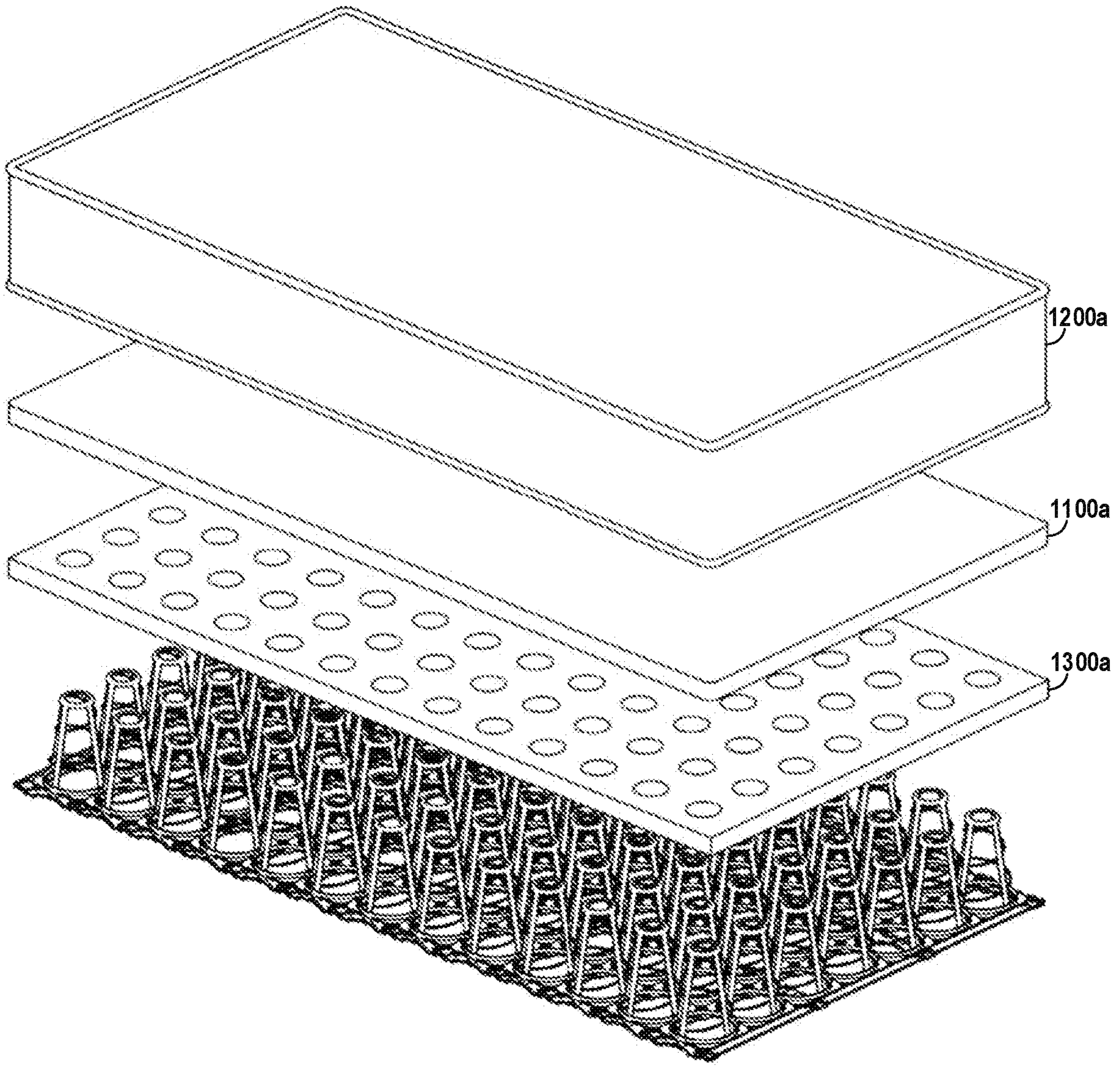

FIG. 41A exemplarily shows a spring cushion according to yet another preferred embodiment of the present disclosure.

Figure 41B:
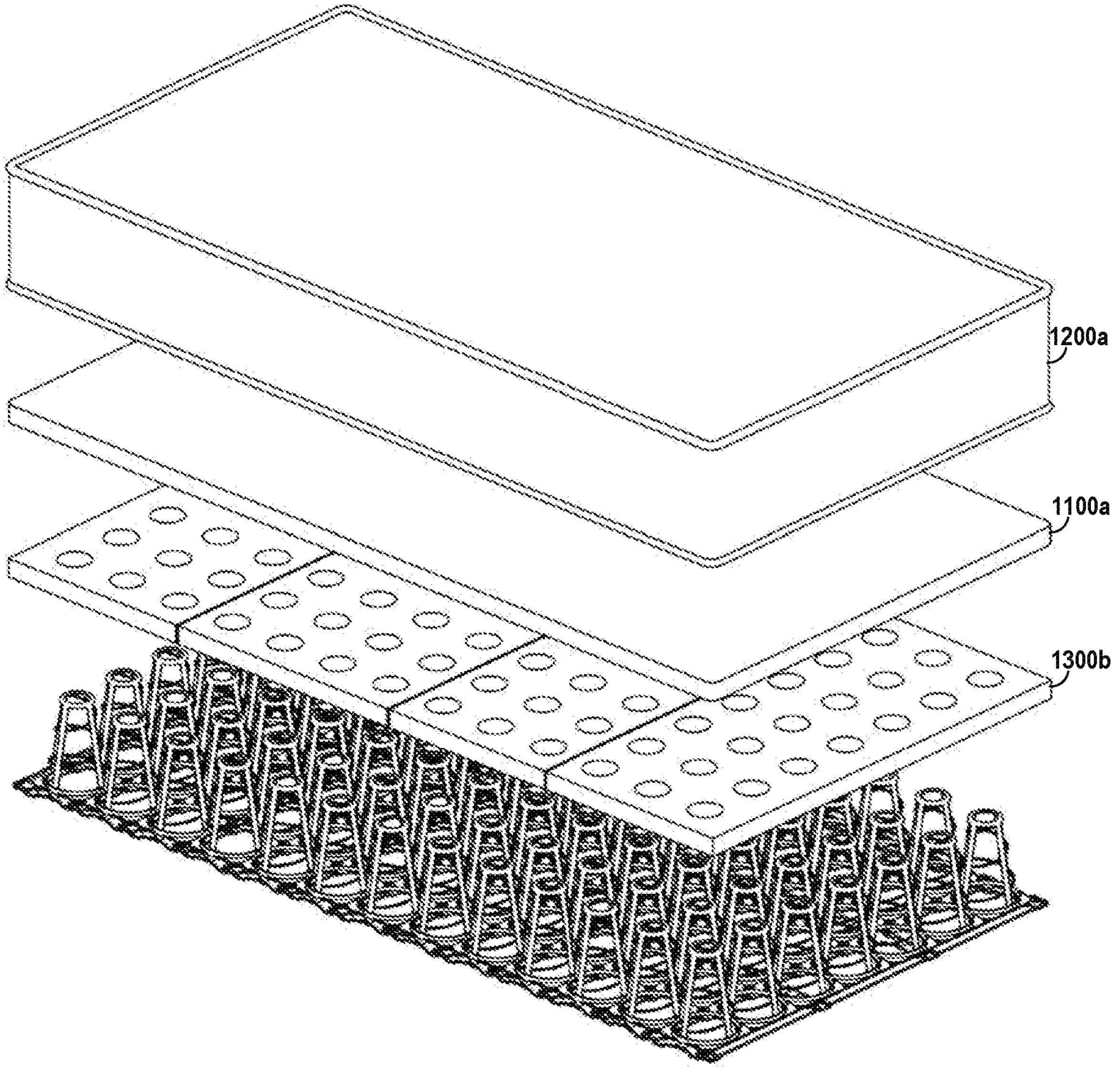

FIG. 41B exemplarily shows a spring cushion according to yet another preferred embodiment of the present disclosure.

Figure 41C:
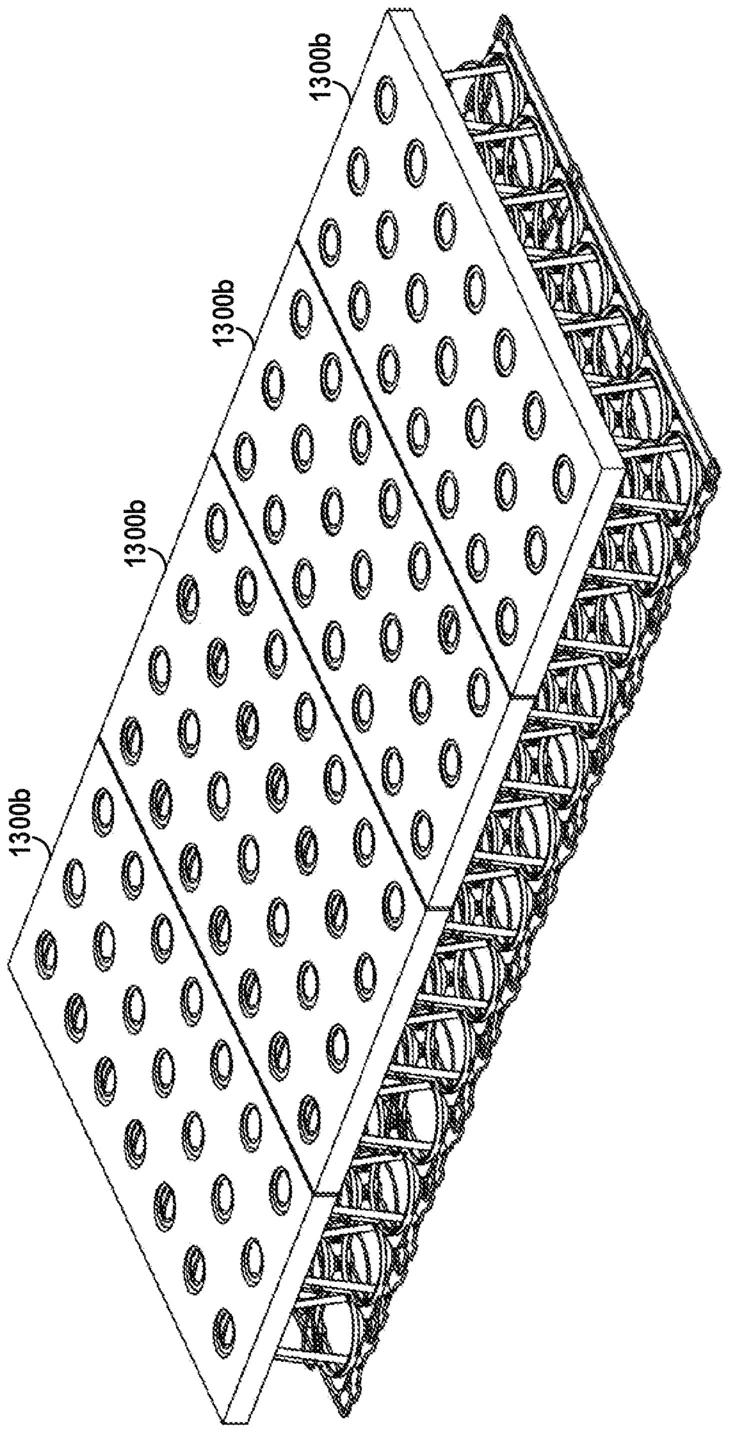

FIG. 41C exemplarily shows a sponge pad in the spring cushion shown in FIG. 41B.

Figure 41D:
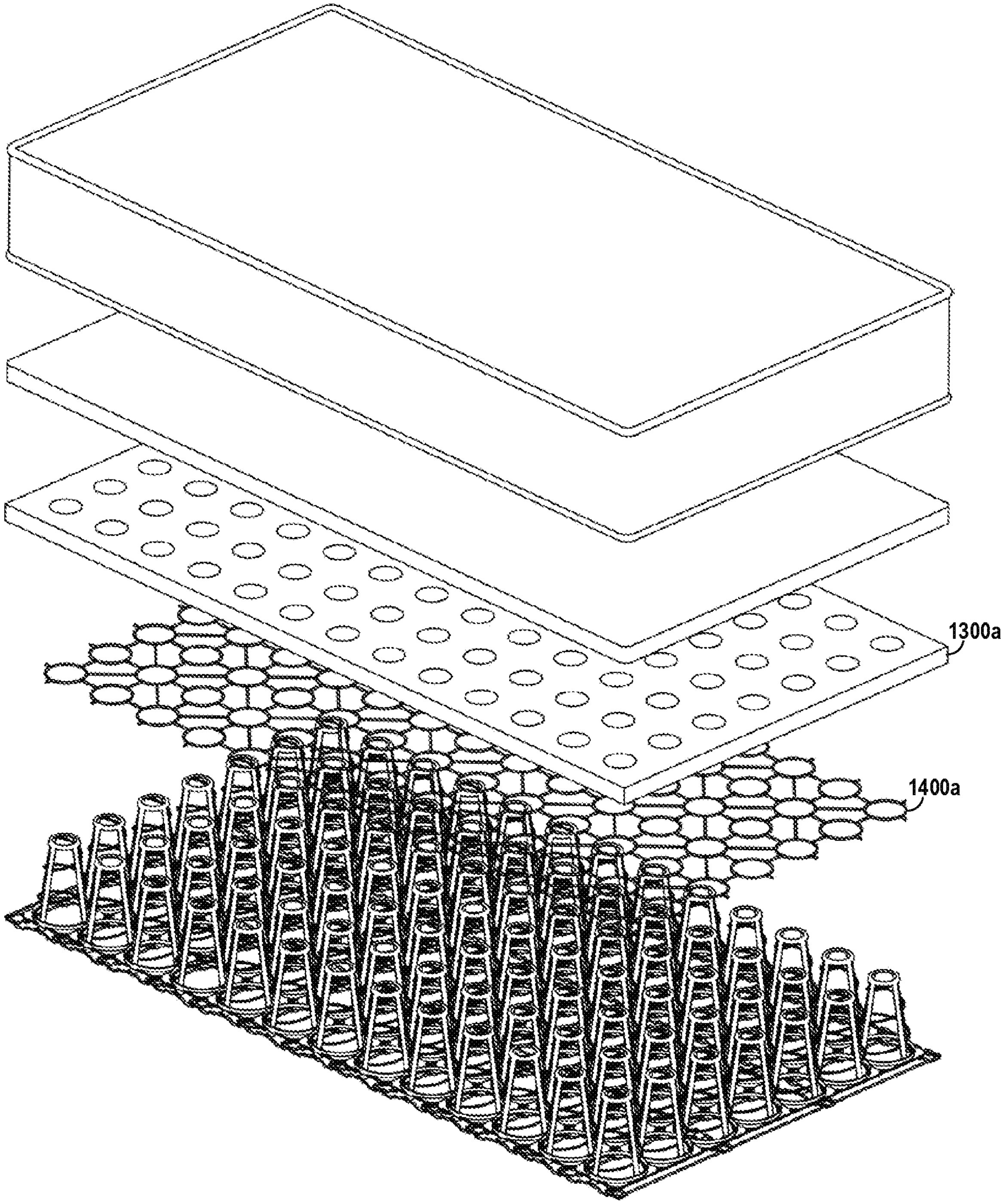

FIG. 41D exemplarily shows a spring cushion according to yet another preferred embodiment of the present disclosure.

Figure 42A:
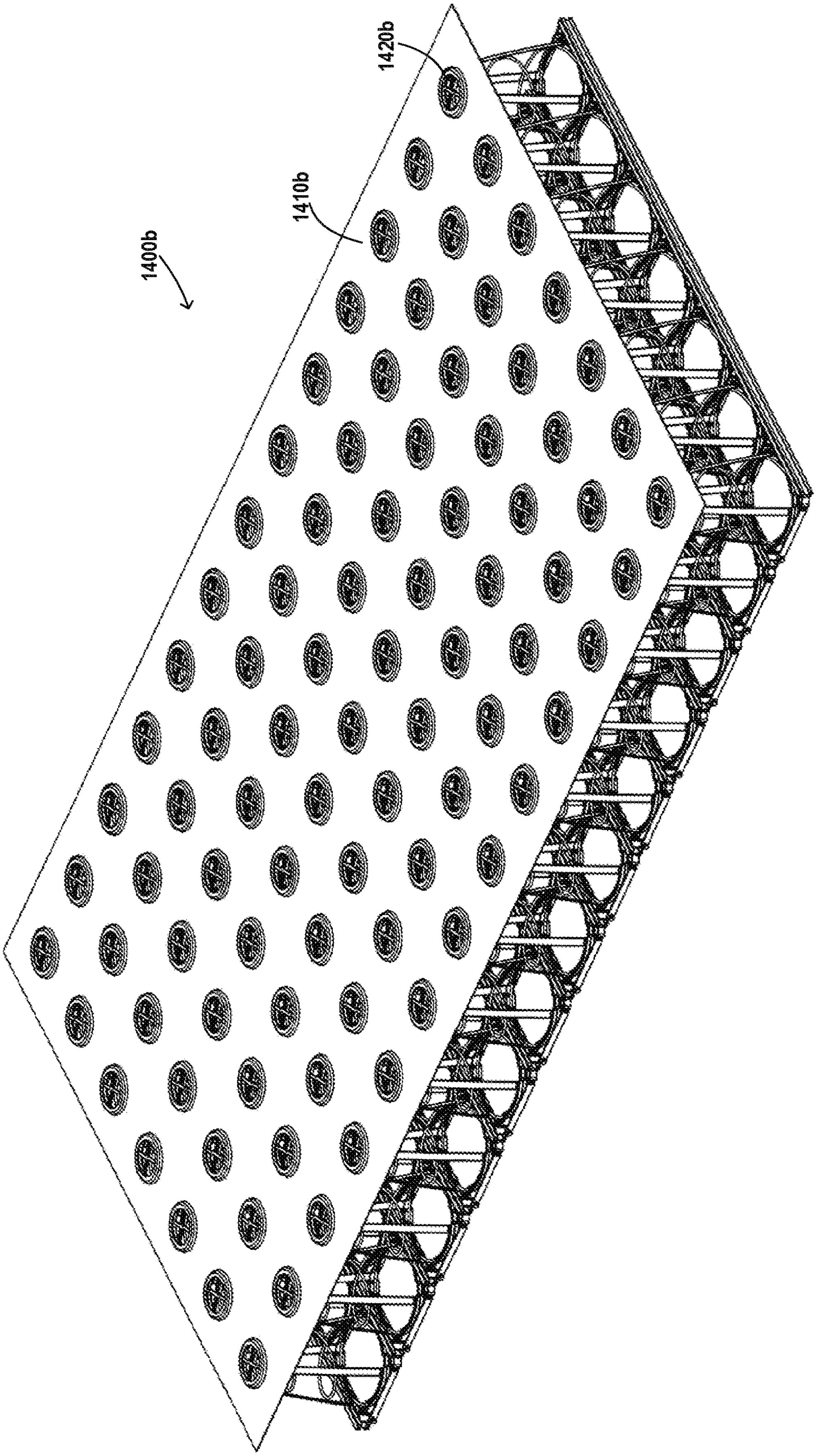

FIG. 42A exemplarily shows a fixing net assembly for a spring cushion according to yet another preferred embodiment of the present disclosure.

Figure 42B:
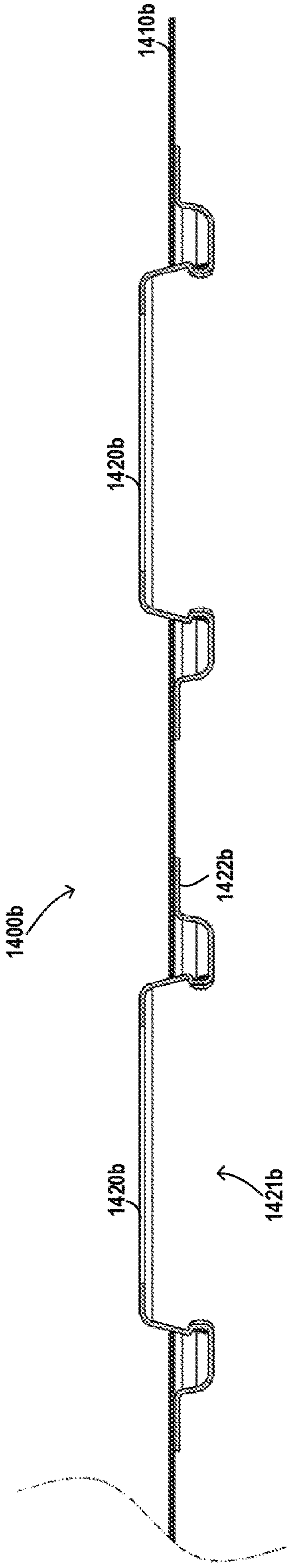

FIG. 42B exemplarily shows a partial sectional view of the fixing net assembly shown in FIG. 42A.

Figure 42C:
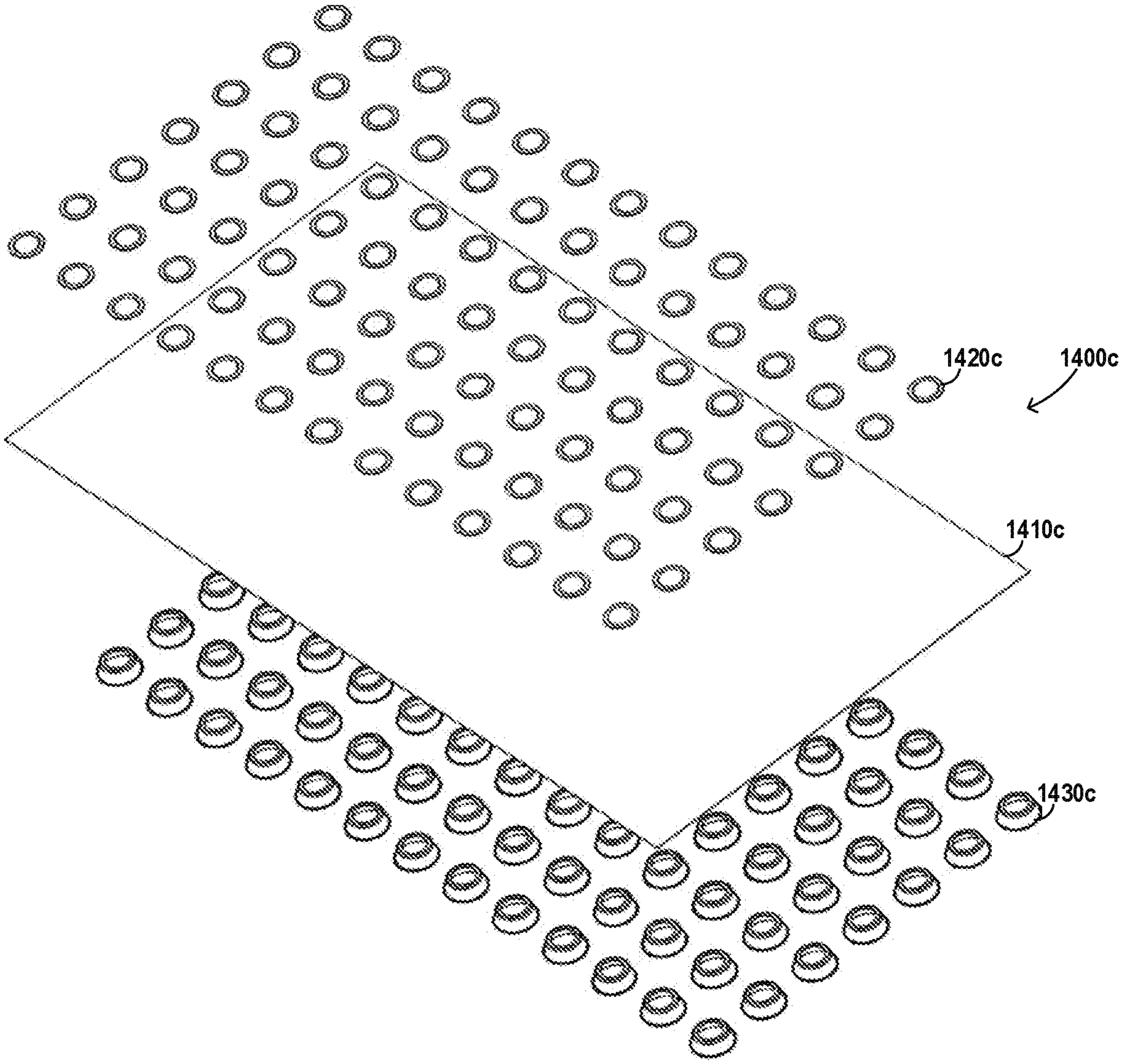

FIG. 42C exemplarily shows an exploded view of a fixing net assembly for a spring cushion according to yet another preferred embodiment of the present disclosure.

FIGS. 42D to 42G exemplarily show partial cross-sectional views of the fixing net assembly shown in FIG. 42C.

Figure 42D:
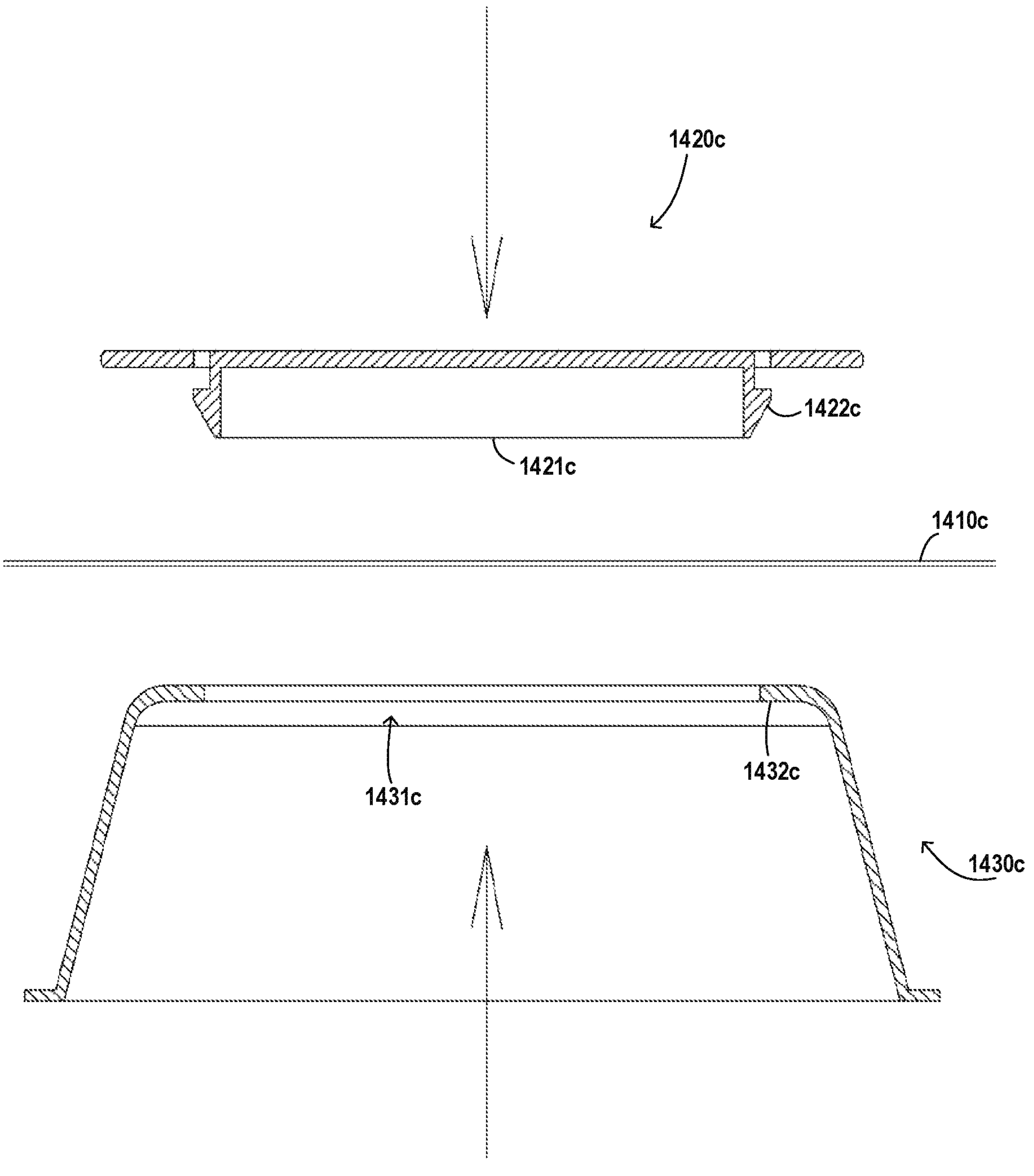
Figure 42E:
Figure 42F:
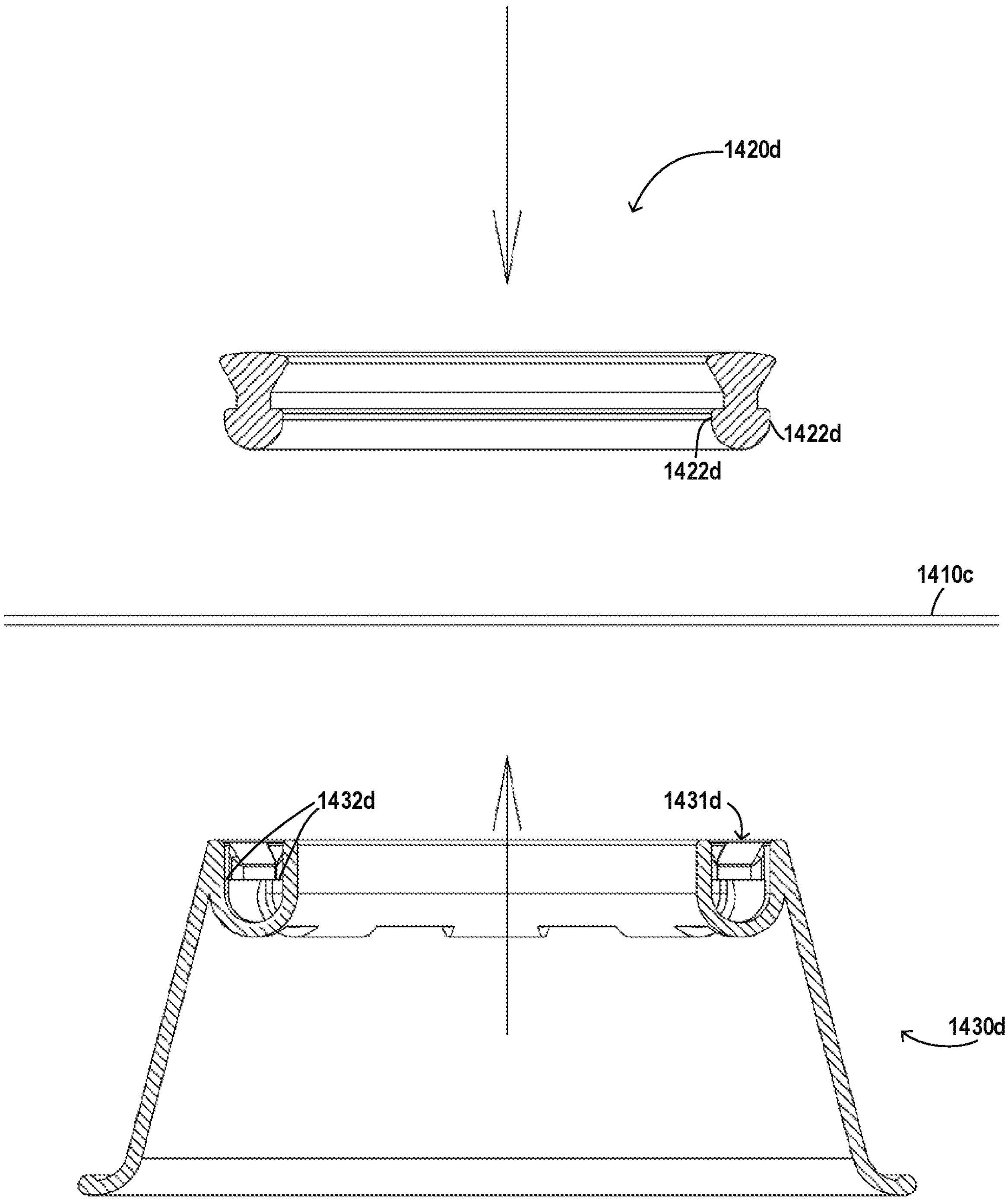
Figure 42G:
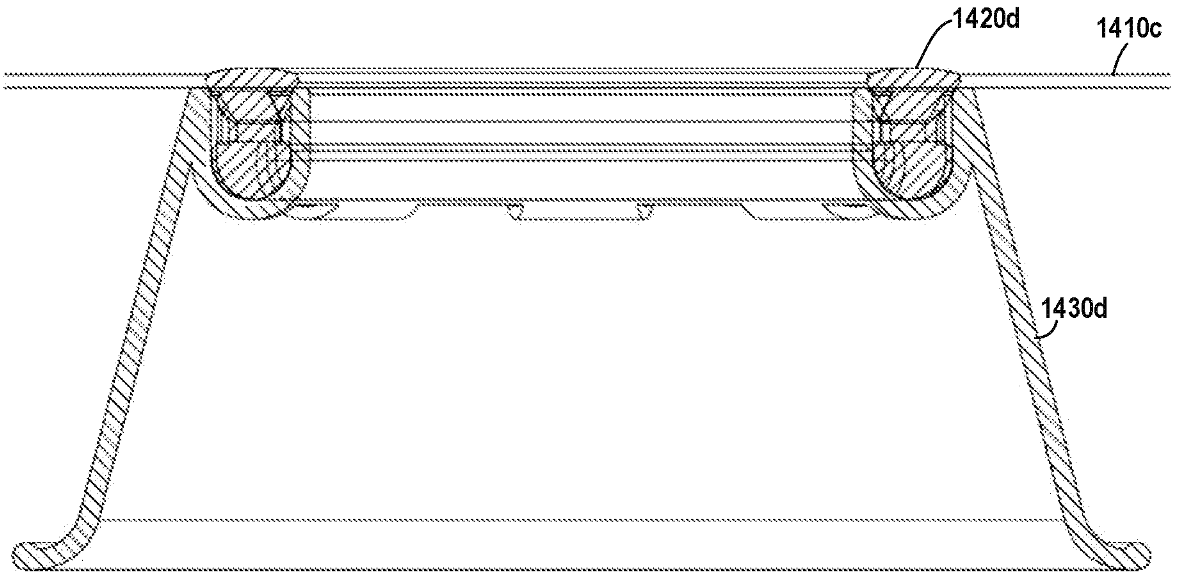
Figure 42H:
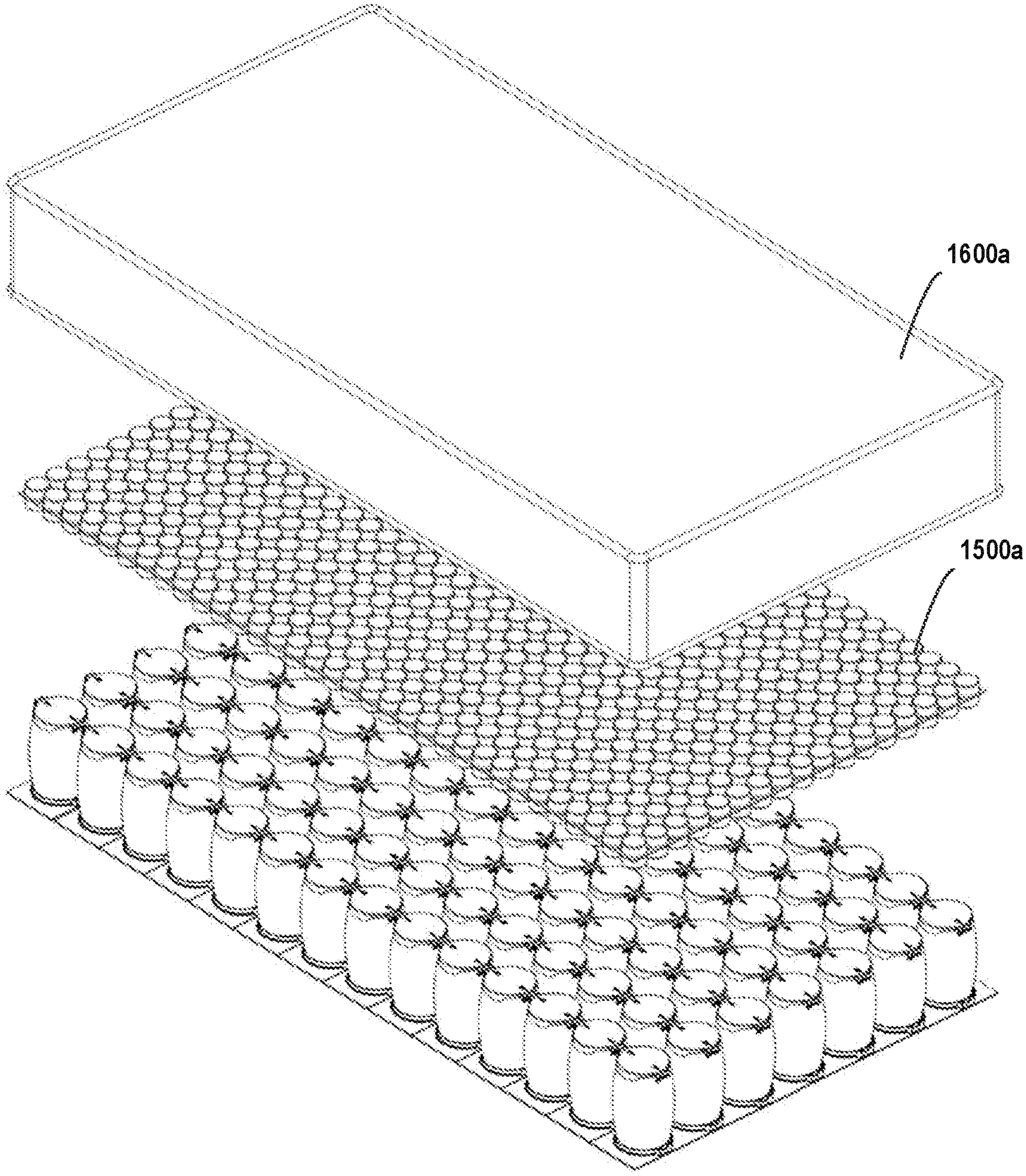

FIG. 42H exemplarily shows a spring cushion according to yet another preferred embodiment of the present disclosure.

Figure 42I:
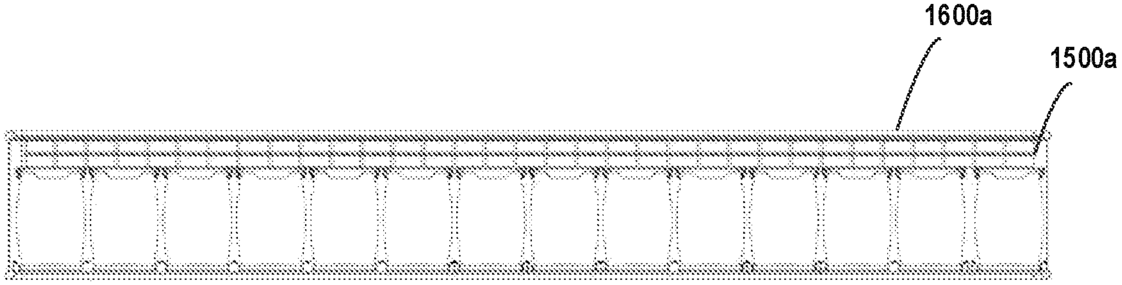

FIG. 42I exemplarily shows a sectional view of the spring cushion shown in FIG. 42H.

Figure 42J:
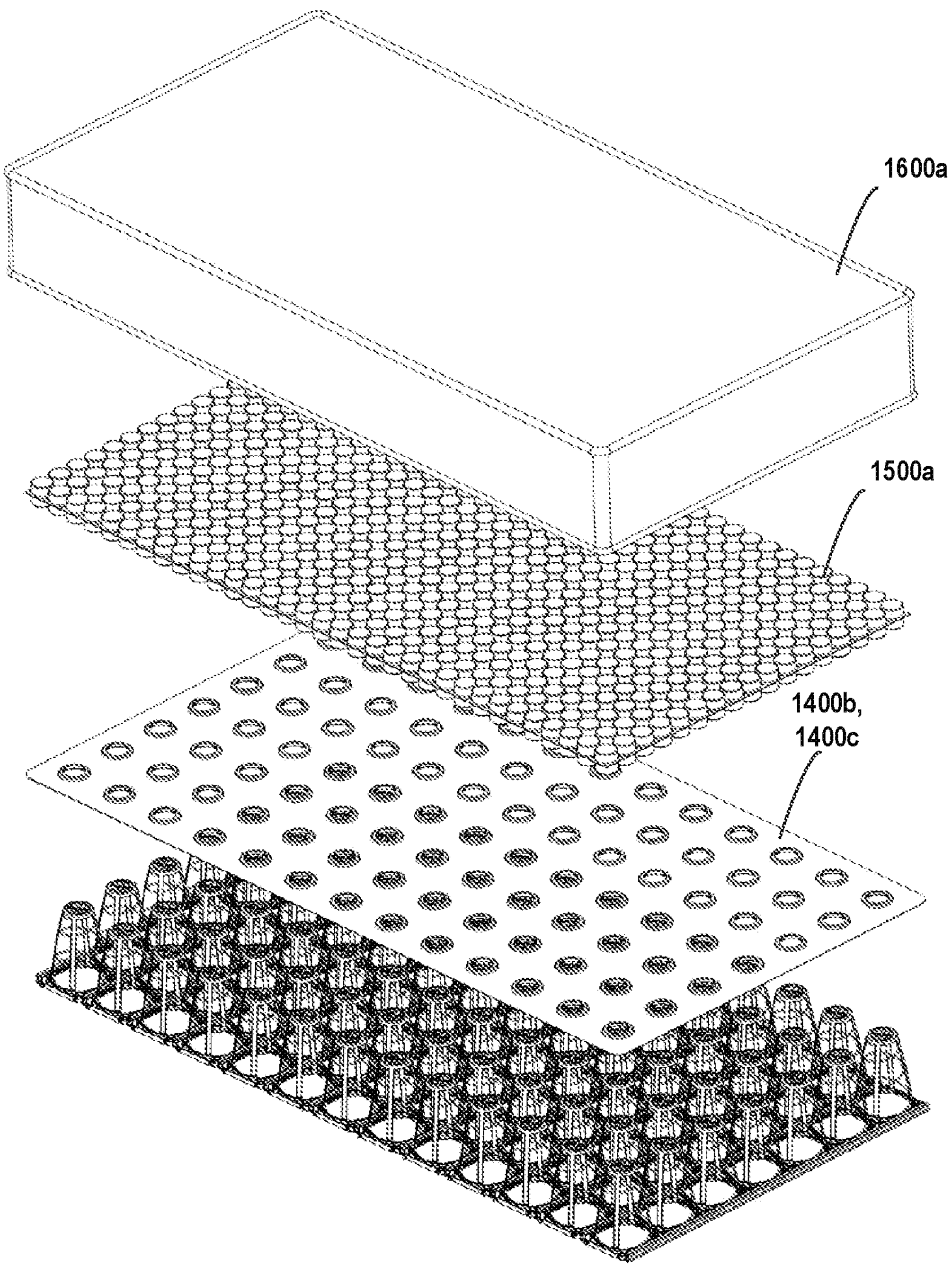

FIG. 42J exemplarily shows a spring cushion according to yet another preferred embodiment of the present disclosure.

Figure 42K:
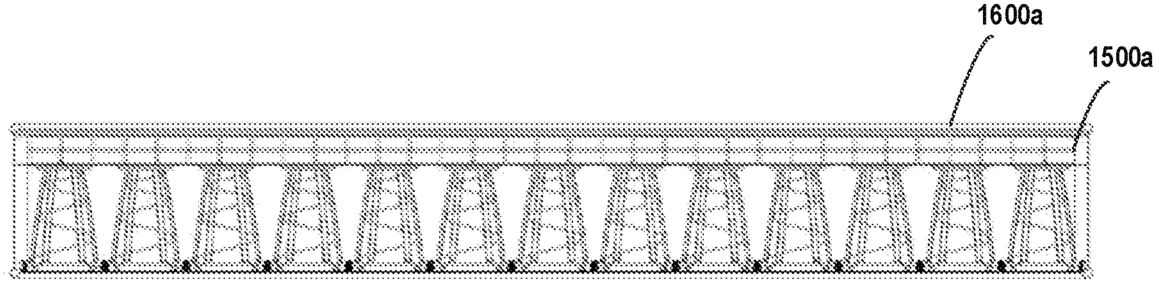

FIG. 42K exemplarily shows a sectional view of the spring cushion shown in FIG. 42J.

Figure 42L:
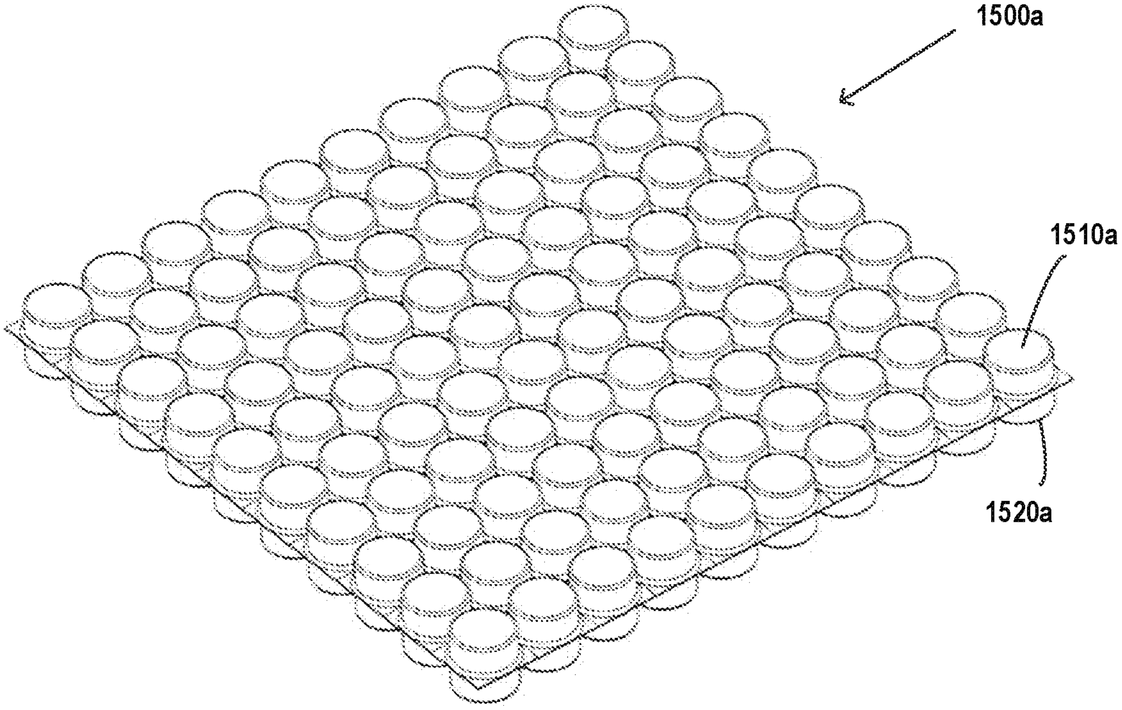

FIG. 42L exemplarily shows a spring pad in the spring cushions shown in FIGS. 42H and 42J.

Figure 42M:
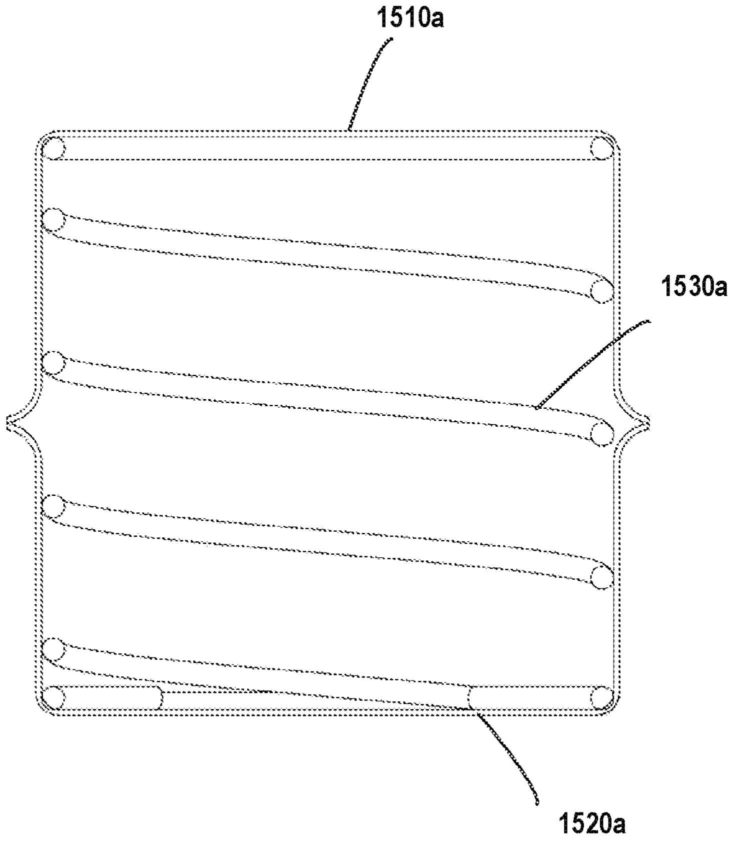

FIG. 42M exemplarily shows a partial sectional view of the spring pad shown in FIG. 42L.

Figure 42N:
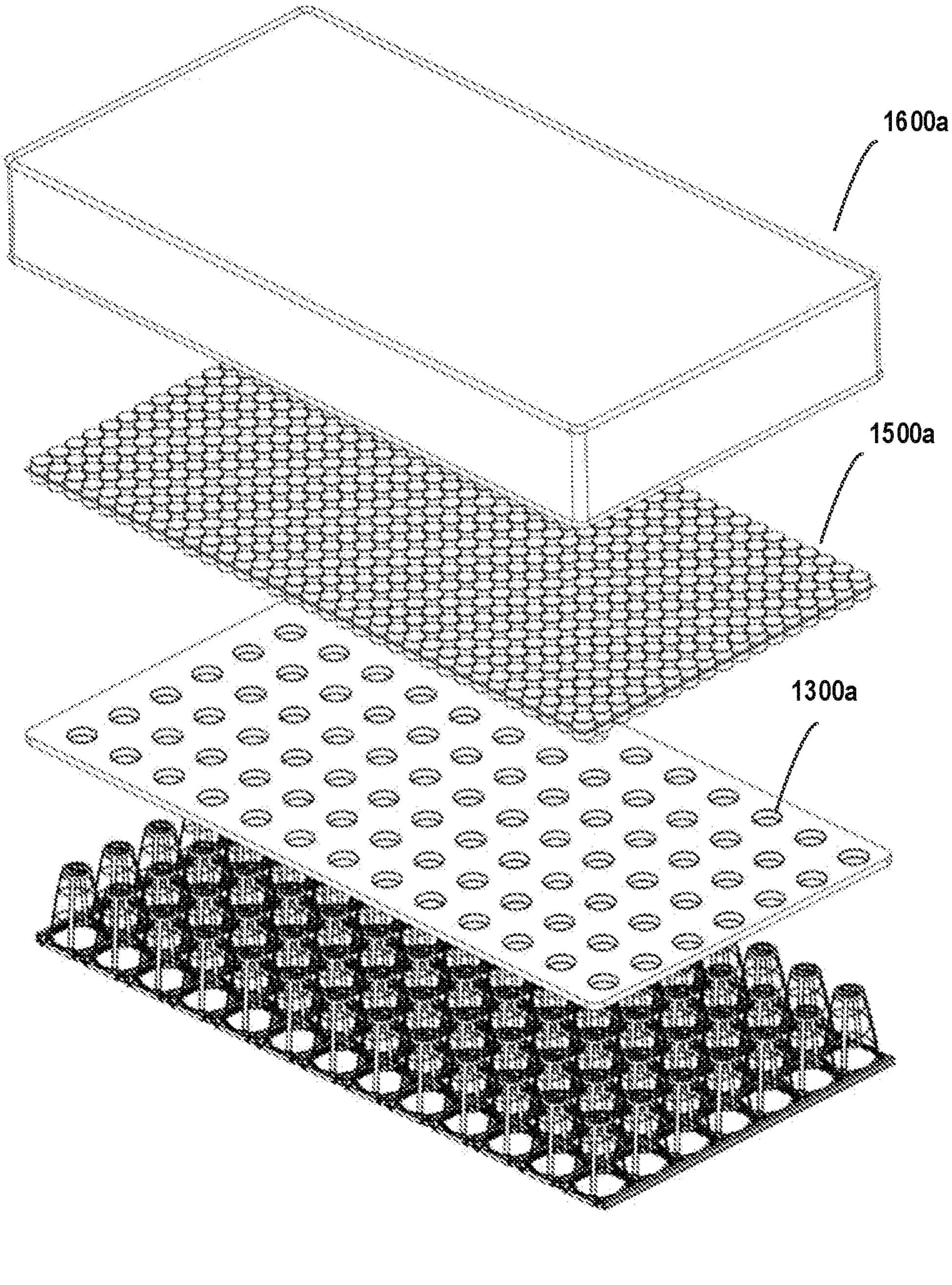

FIG. 42N exemplarily shows a spring cushion according to yet another preferred embodiment of the present disclosure.

Figure 42P:
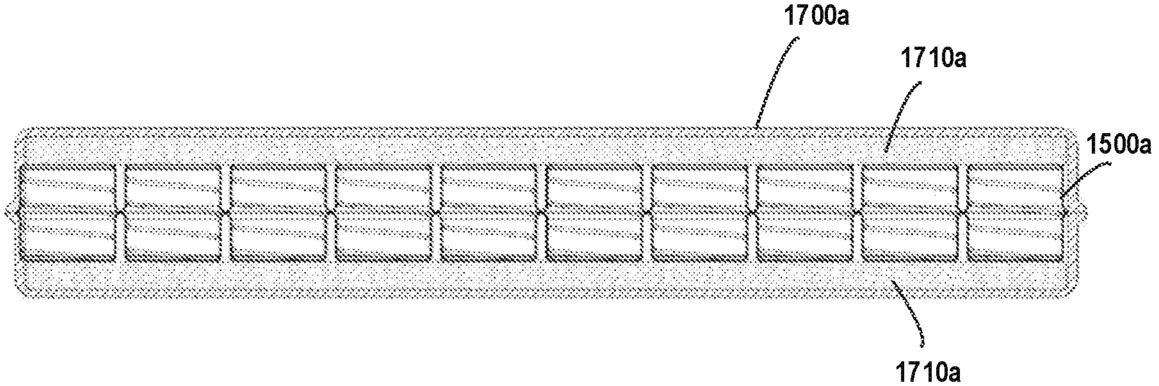

FIG. 42P exemplarily shows a spring cushion according to yet another preferred embodiment of the present disclosure.

Figure 42Q:
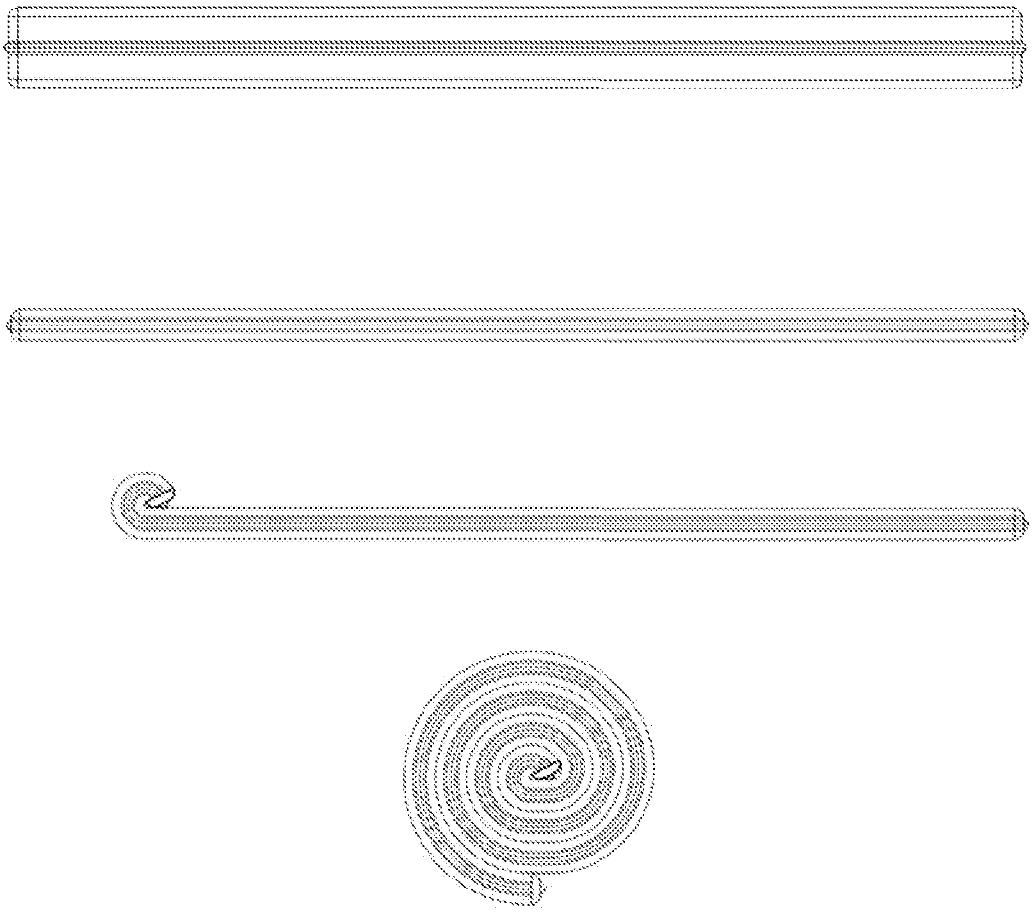

FIG. 42Q exemplarily shows a retracted state of the spring cushion shown in FIG. 42P.

Figure 43A:
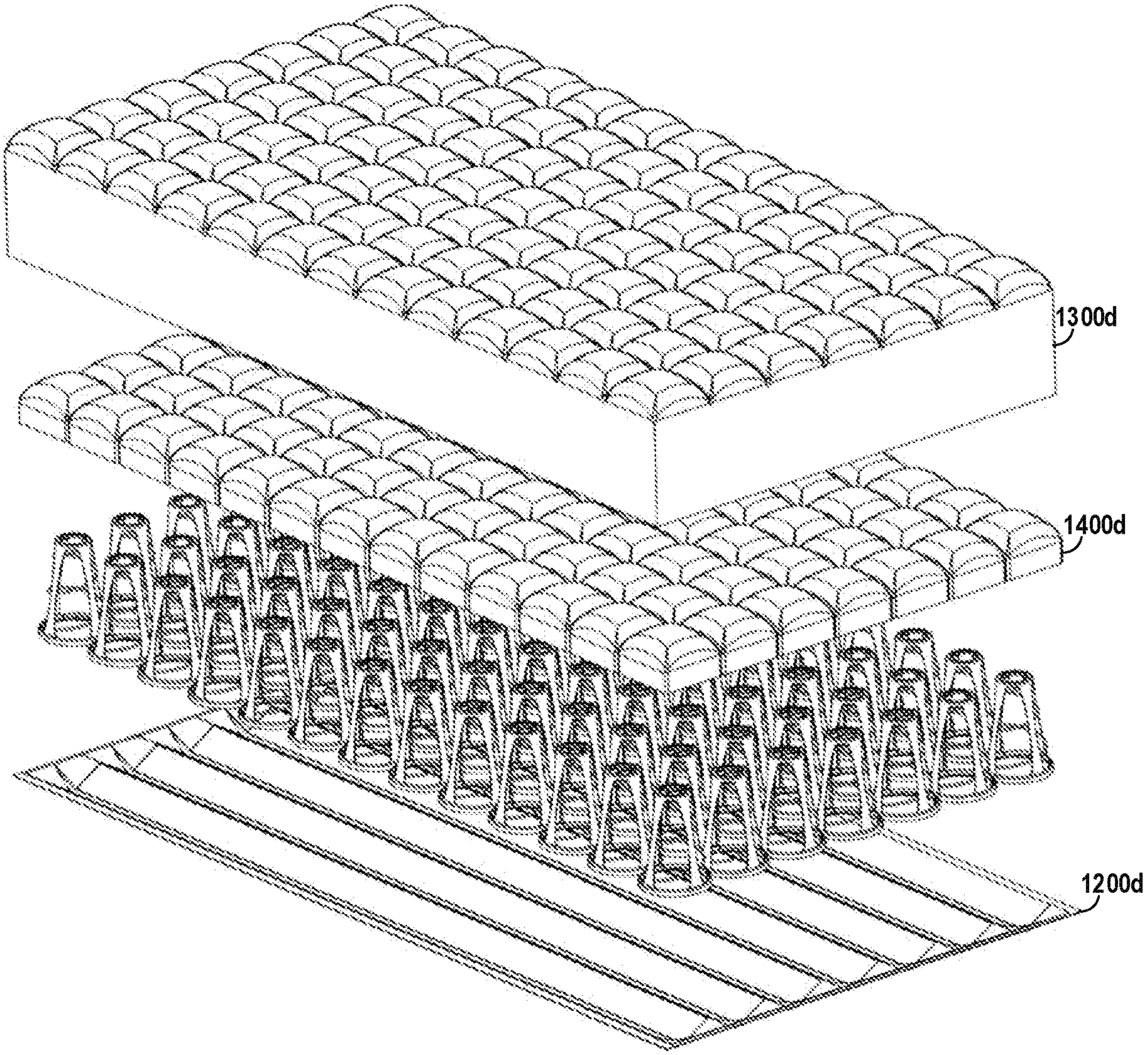

FIG. 43A exemplarily shows a spring cushion according to yet another preferred embodiment of the present disclosure.

Figure 43B:
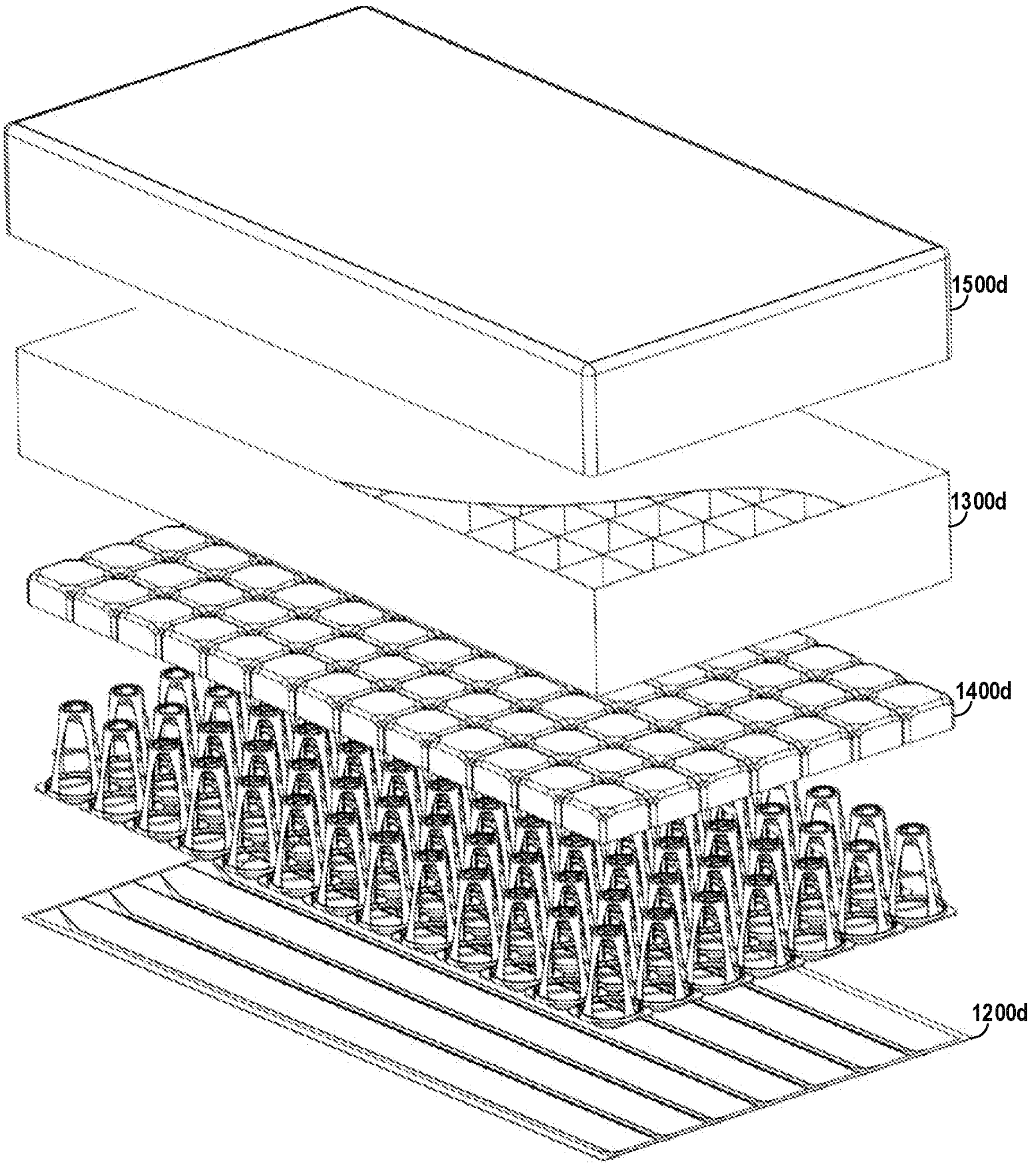

FIG. 43B exemplarily shows a spring cushion according to yet another preferred embodiment of the present disclosure.

Figure 43C:
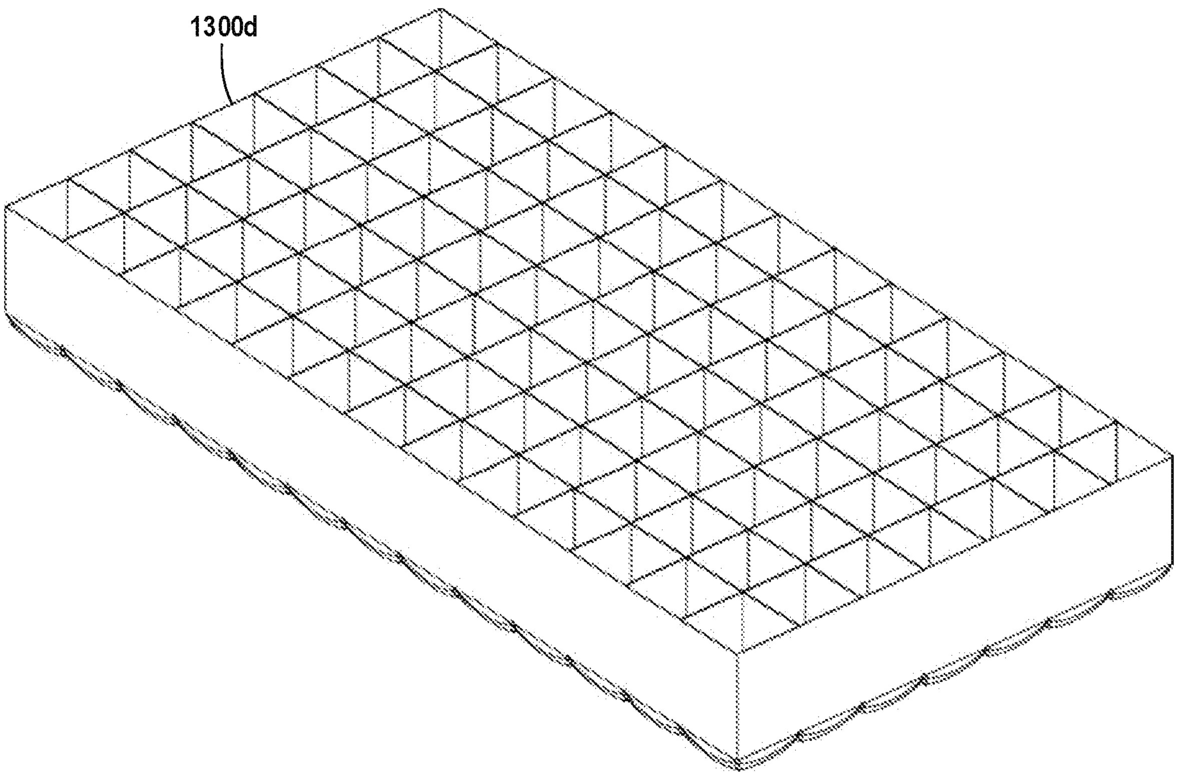

FIG. 43C exemplarily shows an outer cover having compartments in the spring cushions shown in FIGS. 43A and 43B.

Figure 43D:
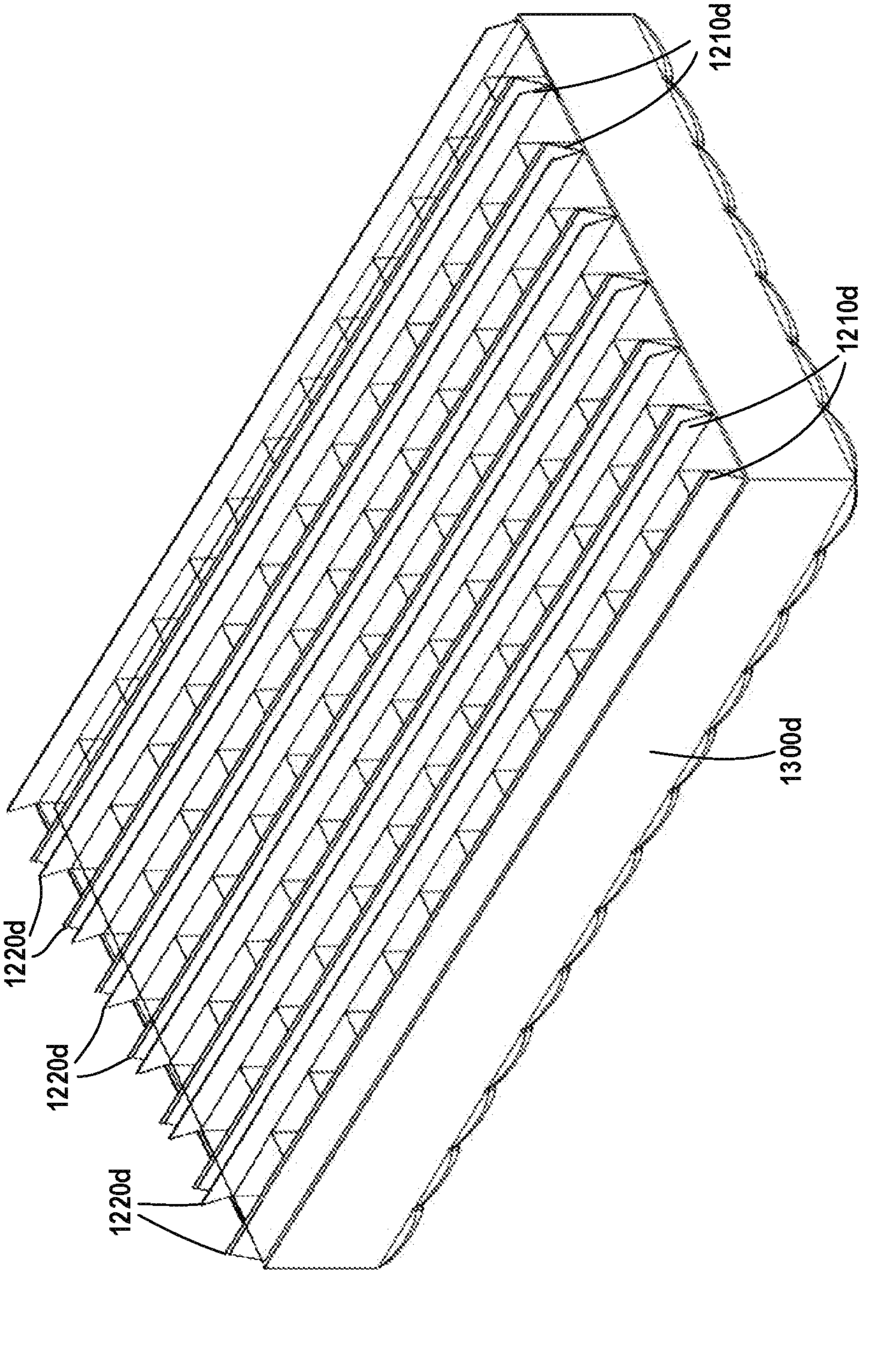

FIG. 43D exemplarily shows a base cloth in the spring cushions shown in FIGS. 43A and 43B, wherein curtains of the base cloth is in an open state.

Figure 43E:
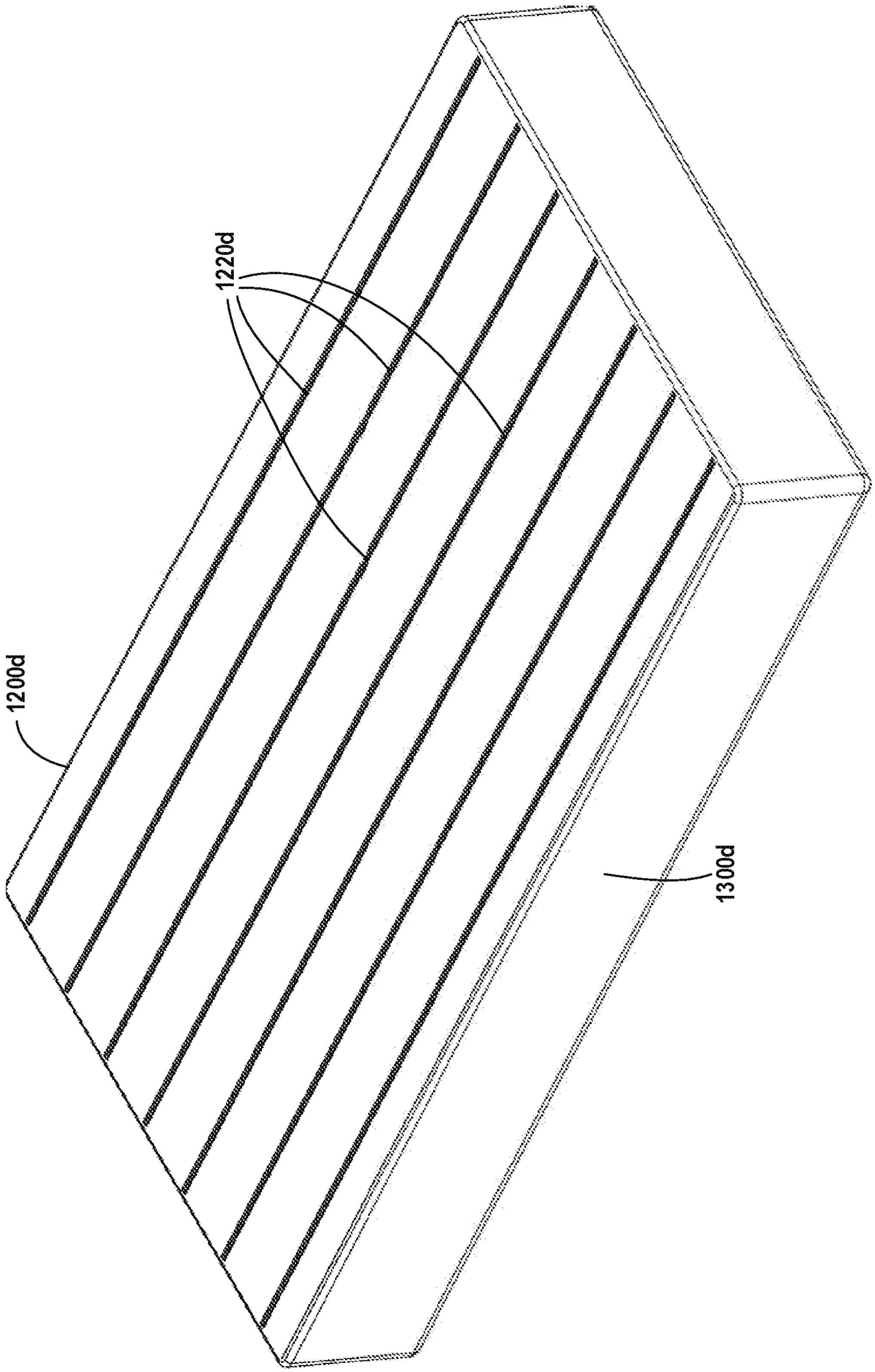

FIG. 43E exemplarily shows the base cloth in the spring cushion shown in FIGS. 43A and 43B, wherein the curtains of the base cloth is in a closed state.

Figure 43F:
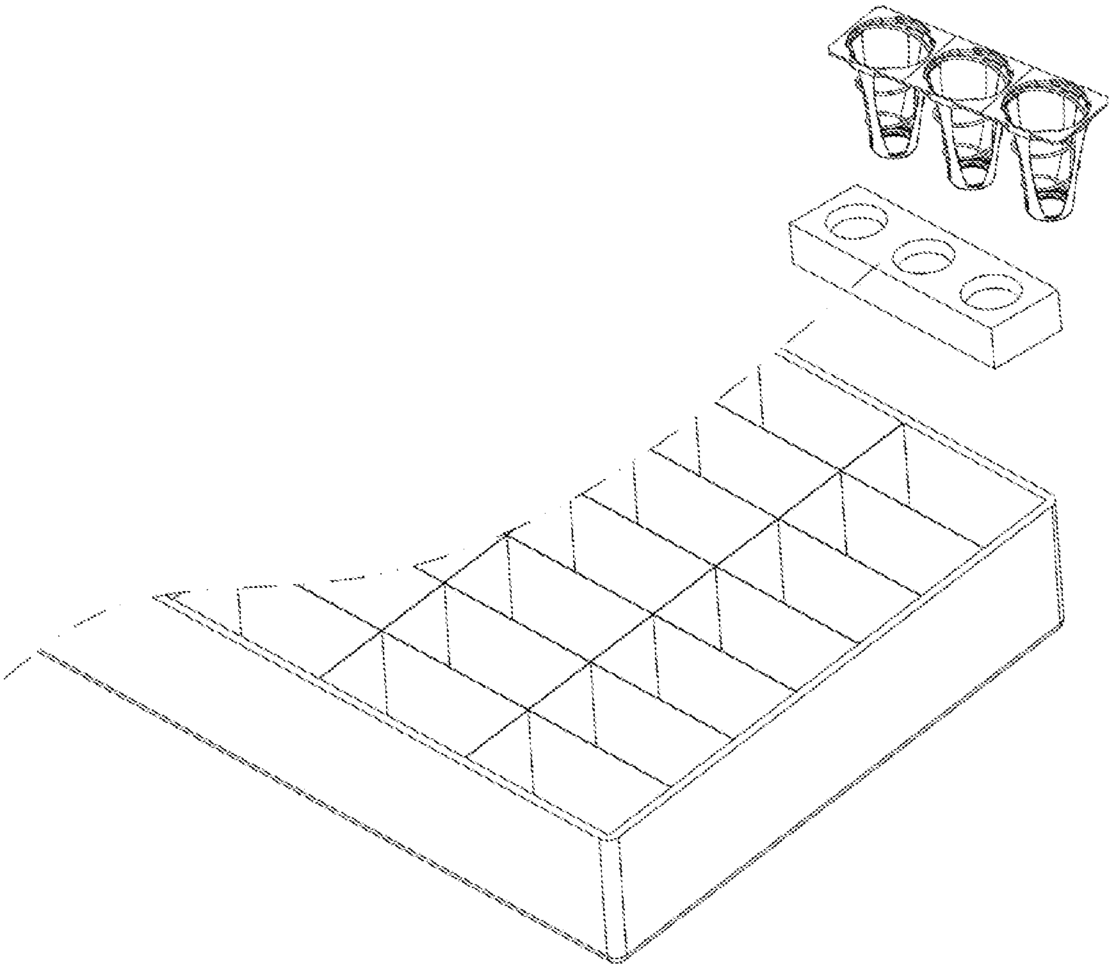
Figure 43G:
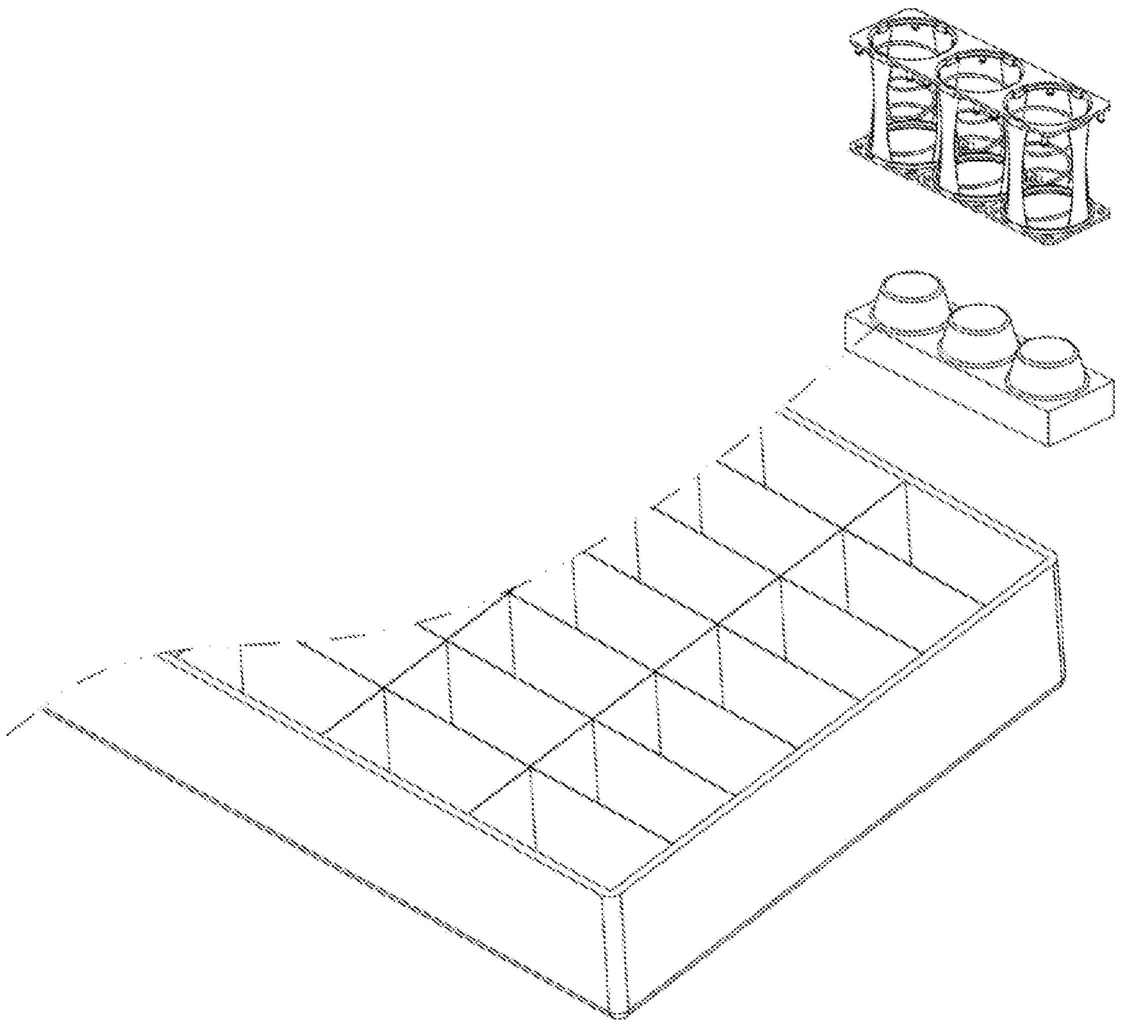
Figure 43H:
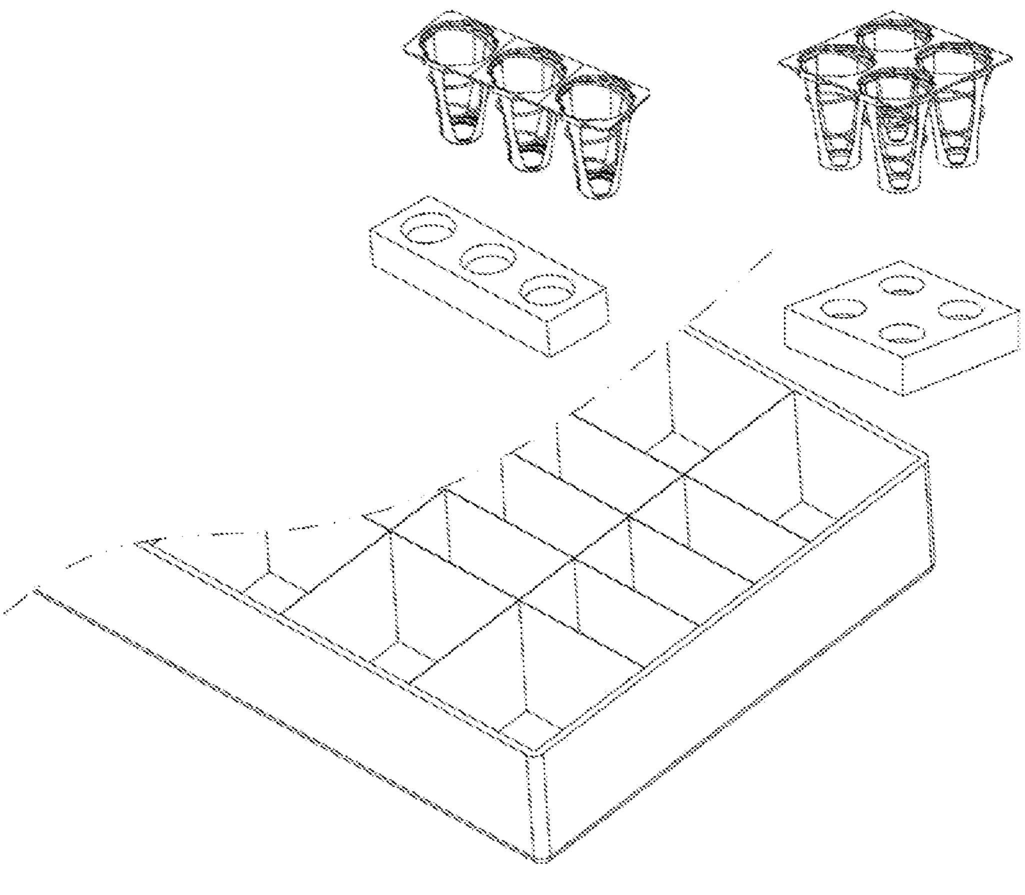

FIGS. 43F to 43H exemplarily show outer covers having compartments of different shapes/sizes according to different embodiments of the present disclosure.

Figure 43I:
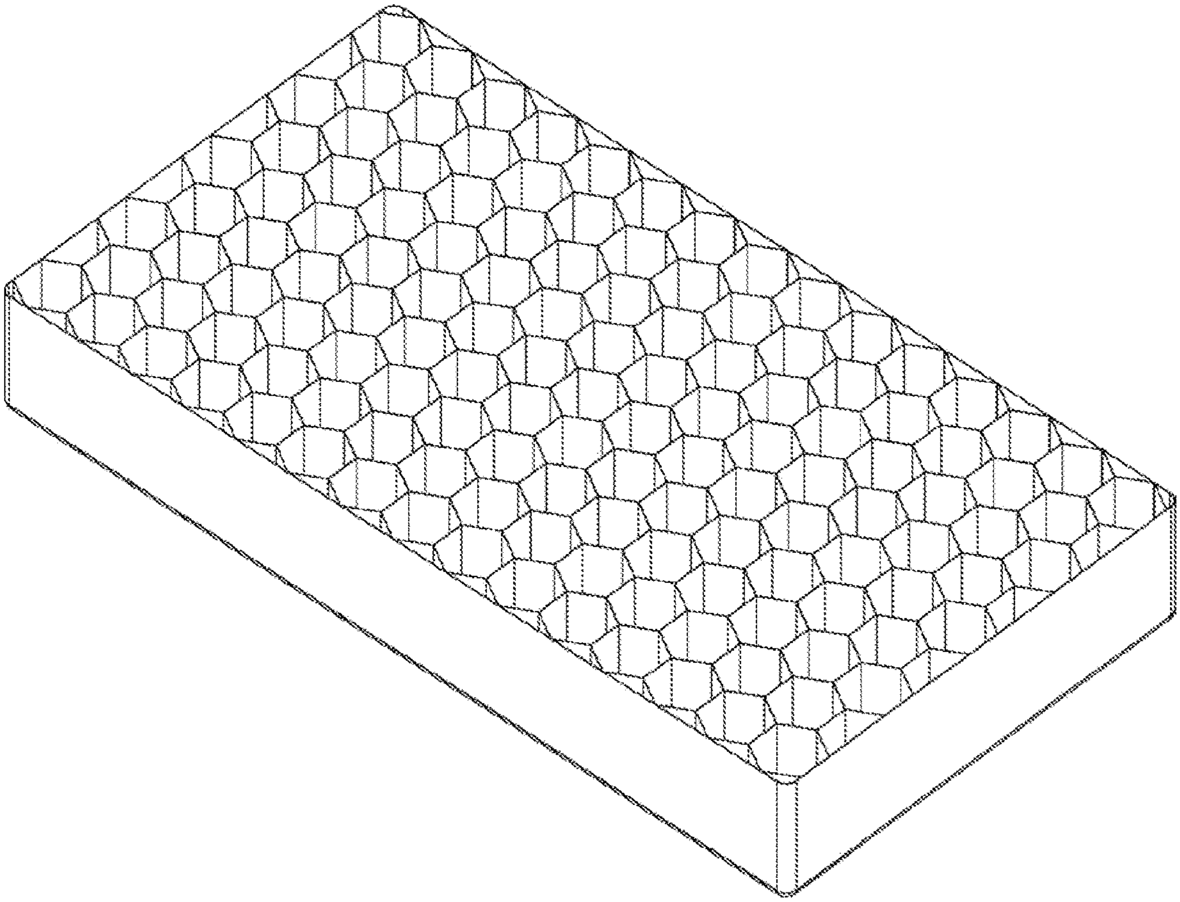
Figure 44A:
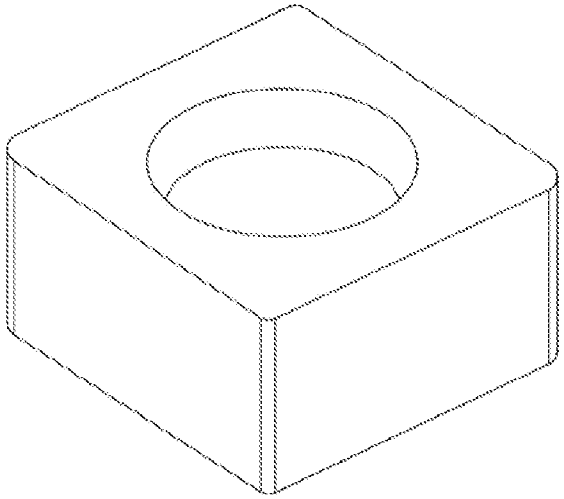
Figure 44B:
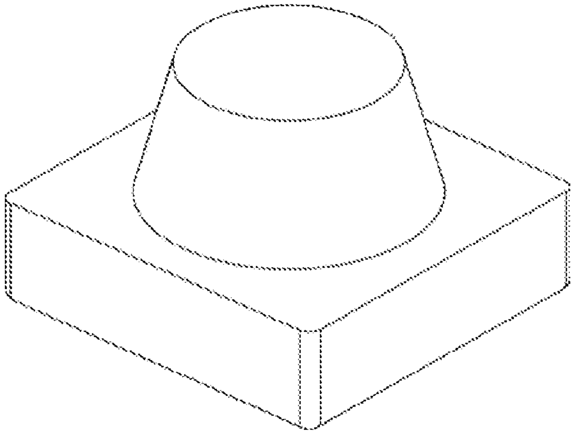
Figure 44C:
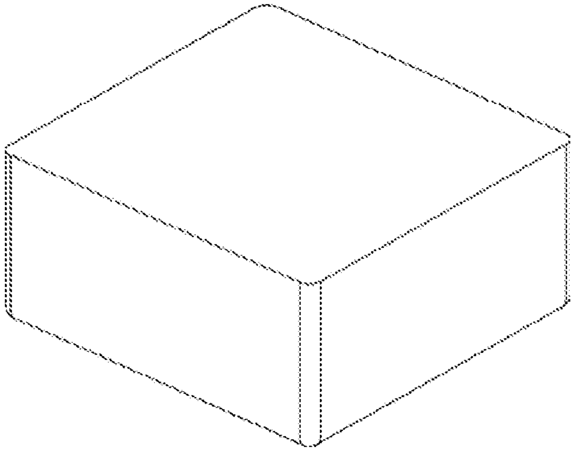
Figure 44D:
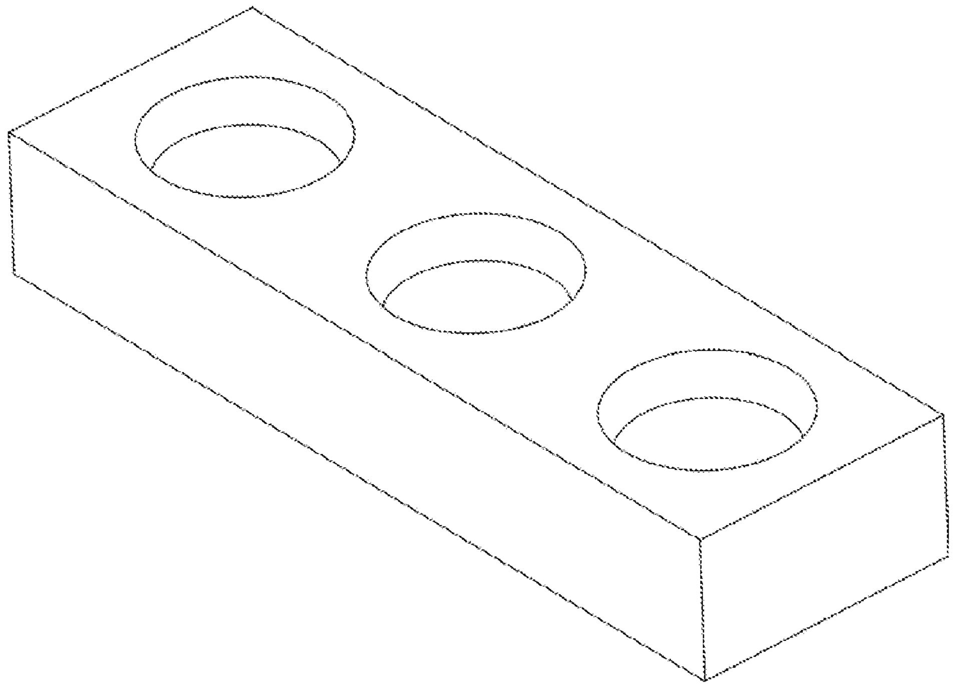
Figure 44E:
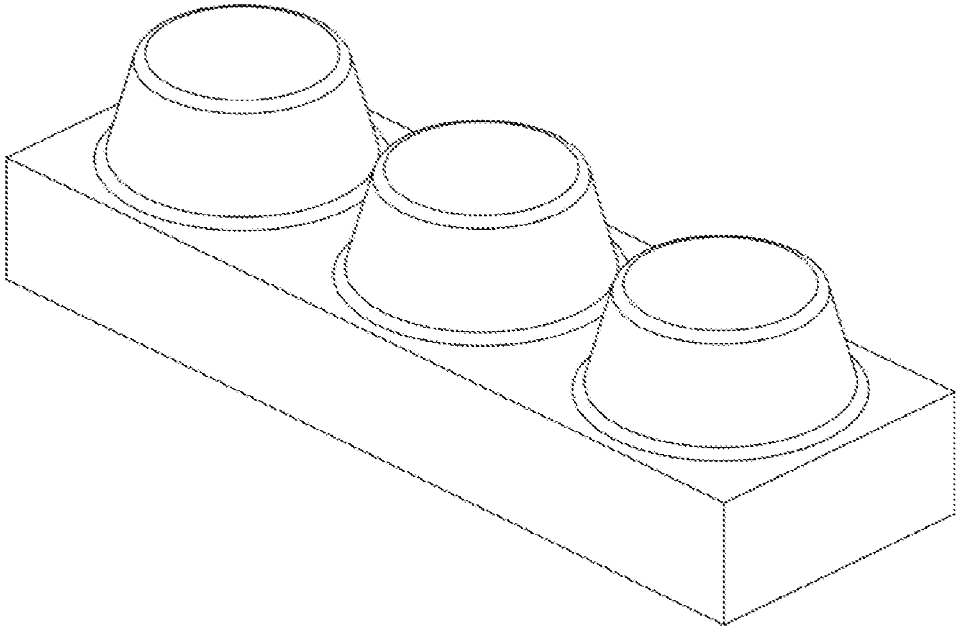

FIG. 43I exemplarily shows an outer cover having honeycomb-shaped (hexagonal) compartments according to a preferred embodiment of the present disclosure.

FIGS. 44A to 44E exemplarily show sponge blocks according to different embodiments of the present disclosure.

Figure 45A:
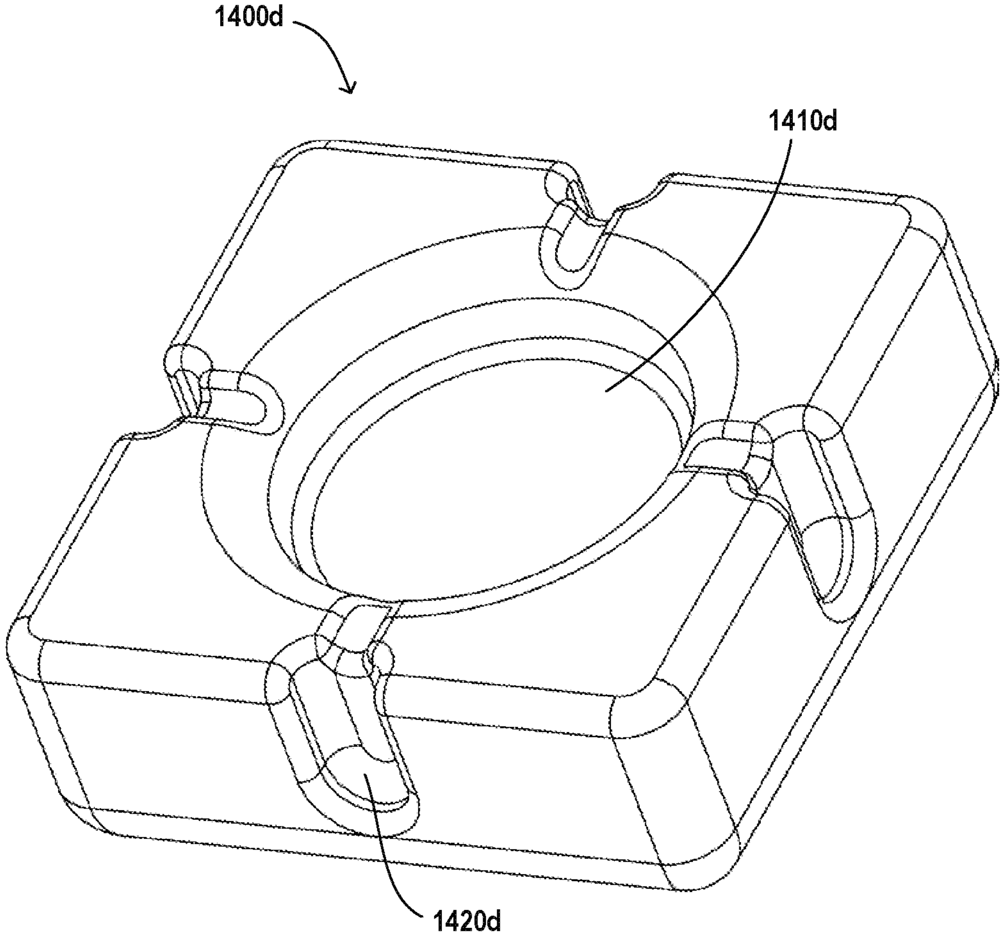

FIG. 45A exemplarily shows a sponge block according to a preferred embodiment of the present disclosure.

Figure 45B:
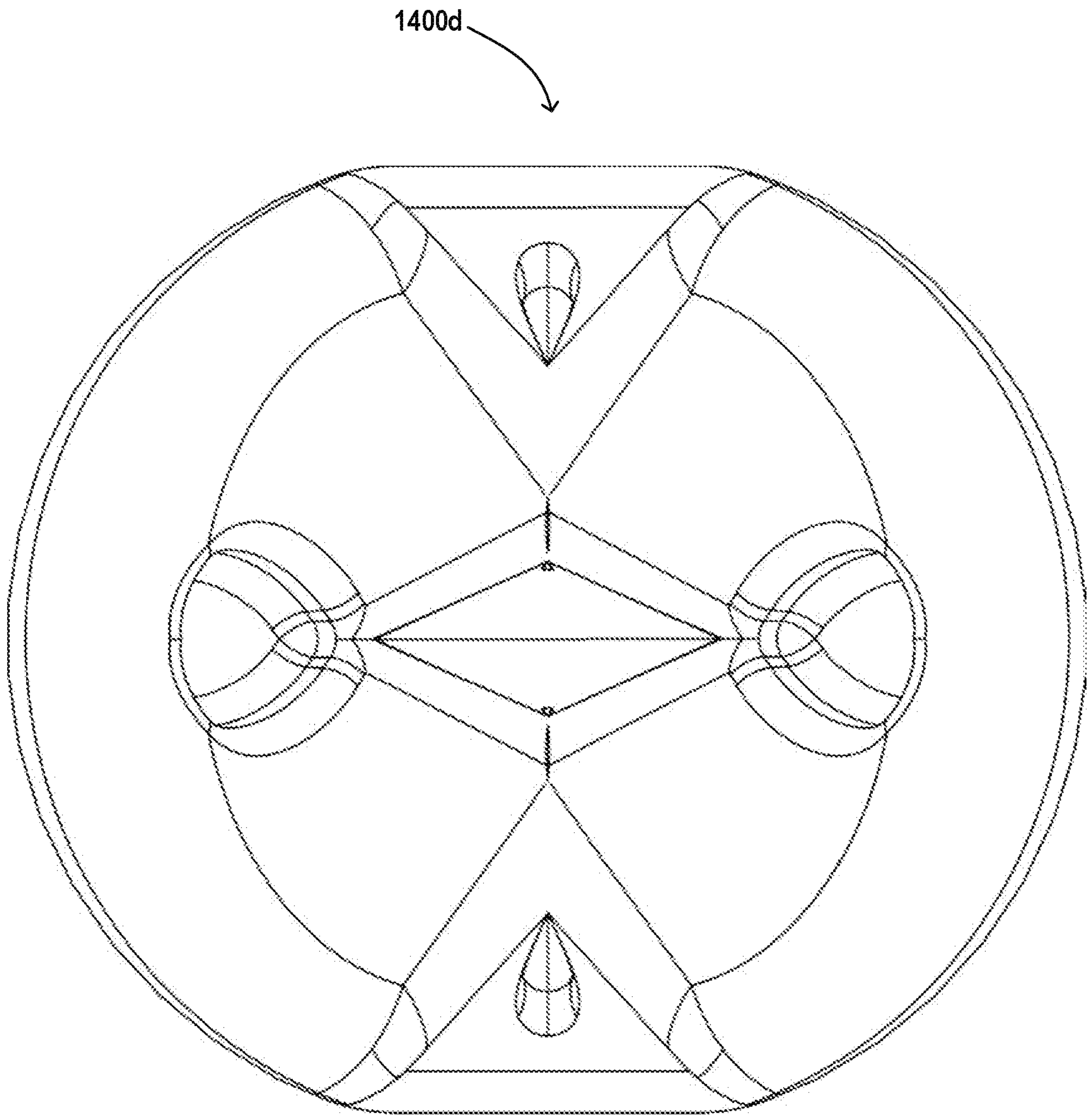

FIG. 45B exemplarily shows the sponge block shown in FIG. 45A in a folded/compressed state.

Figure 45C:
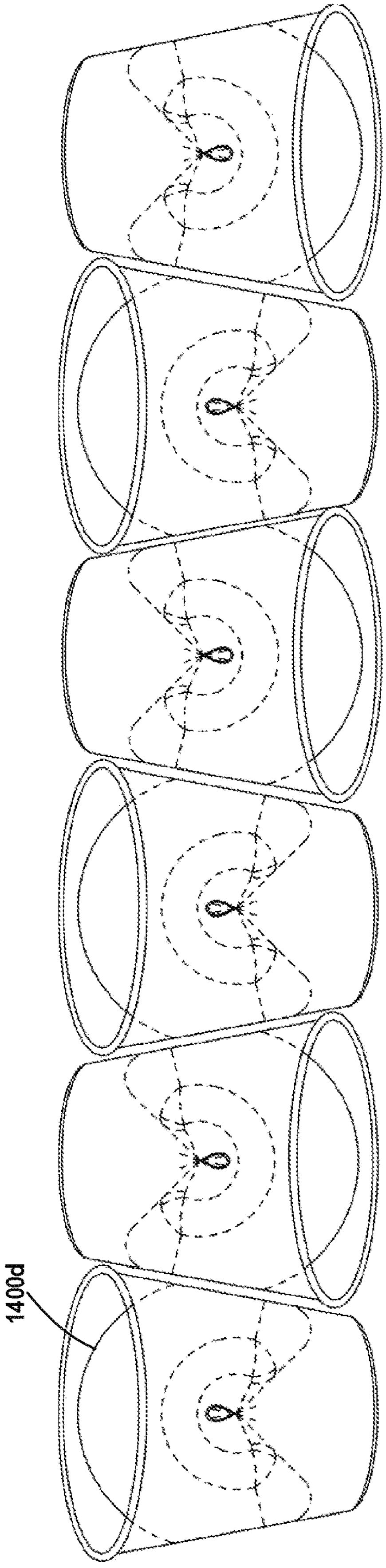

FIG. 45C exemplarily shows that the sponge block in a folded/compressed state is received in a storage cup.

Figure 46A:
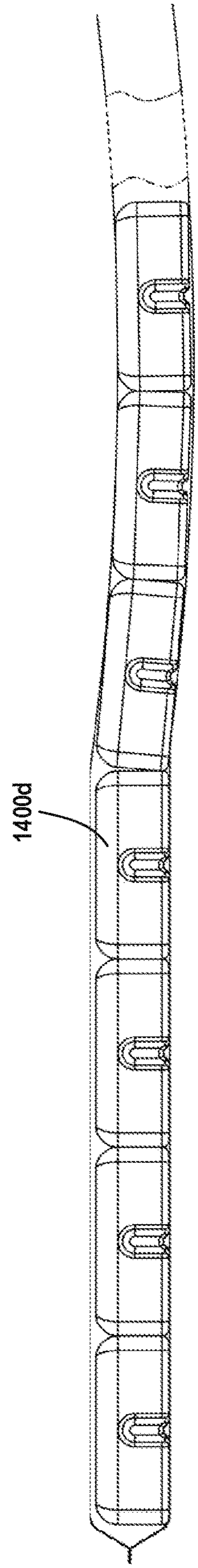

FIG. 46A exemplarily shows a condition when a plurality of the sponge blocks shown in FIG. 45A are received in an elongated storage bag.

Figure 46B:
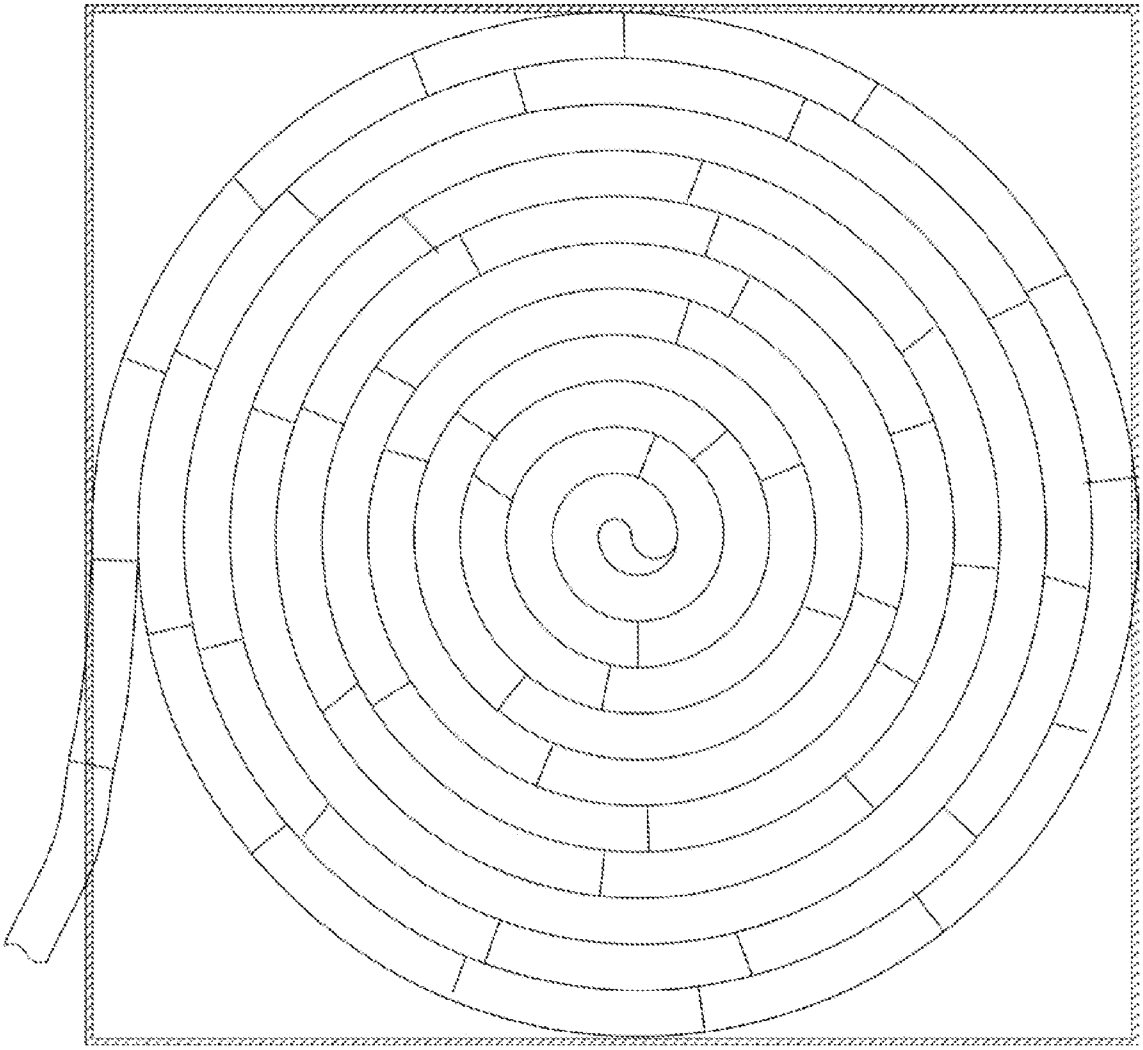
Figure 46C:
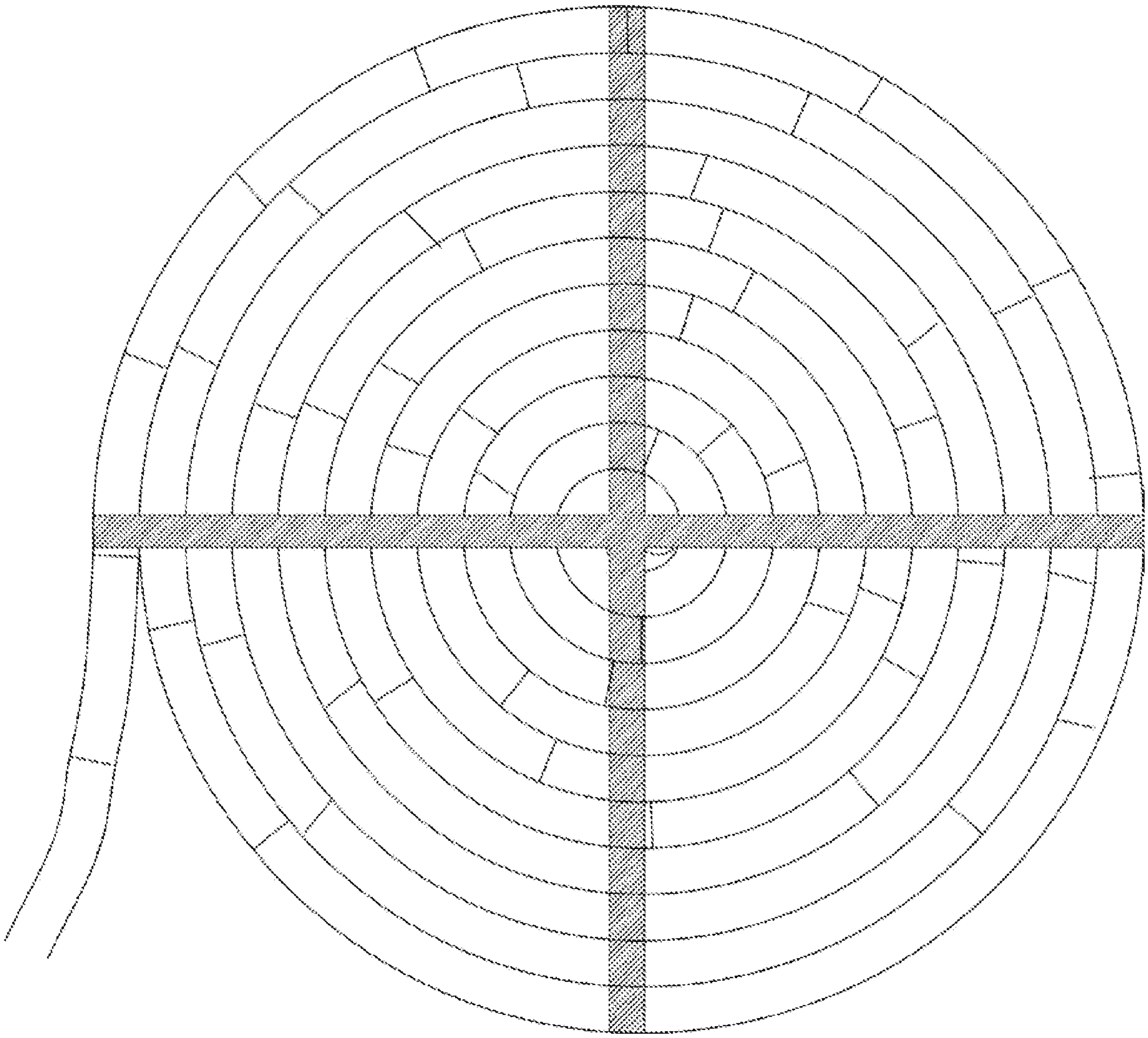

FIGS. 46B and 46C exemplarily illustrate packaging methods of the elongated storage bag receiving a plurality of the sponge blocks shown in FIG. 46A, respectively.

Figure 47A:
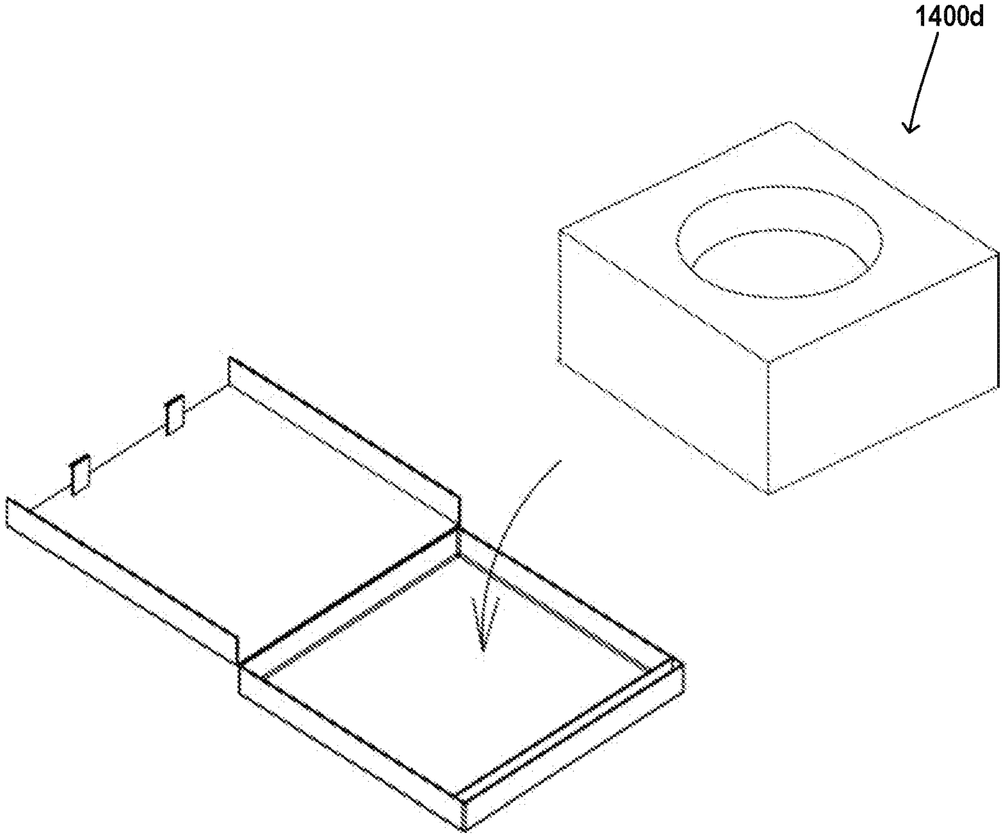
Figure 47B:
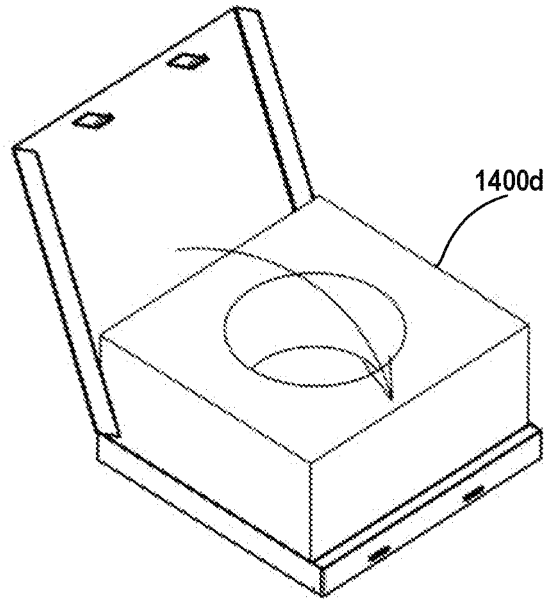
Figure 47C:
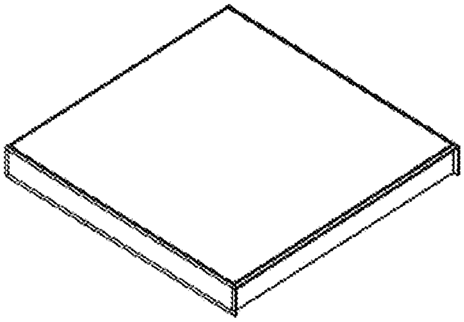
Figure 48A:
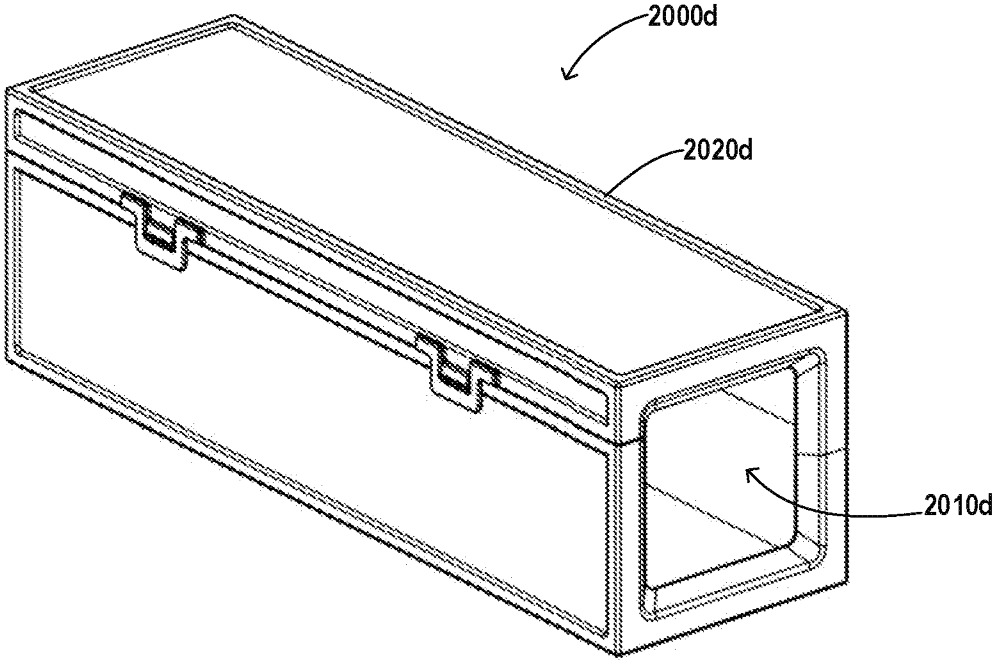
Figure 48B:
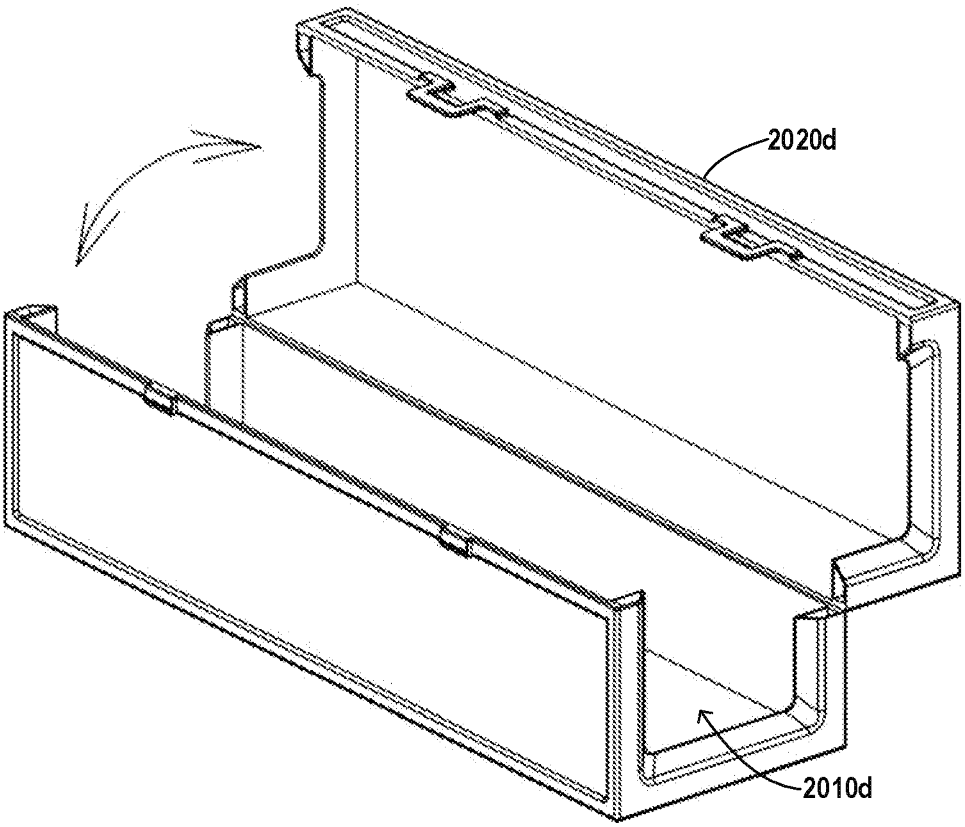
Figure 48C:
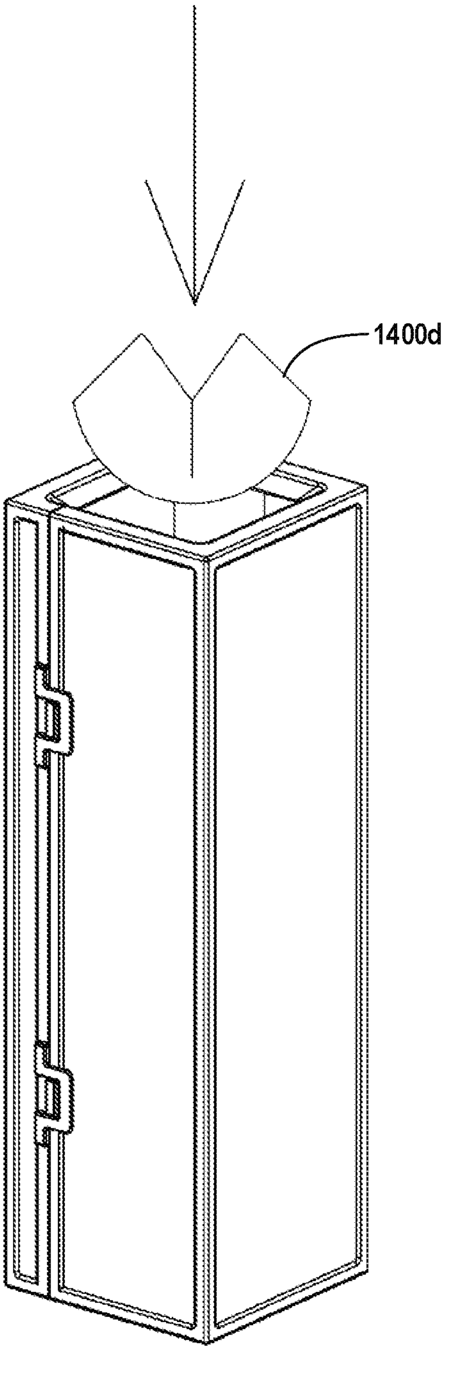
Figure 48D:
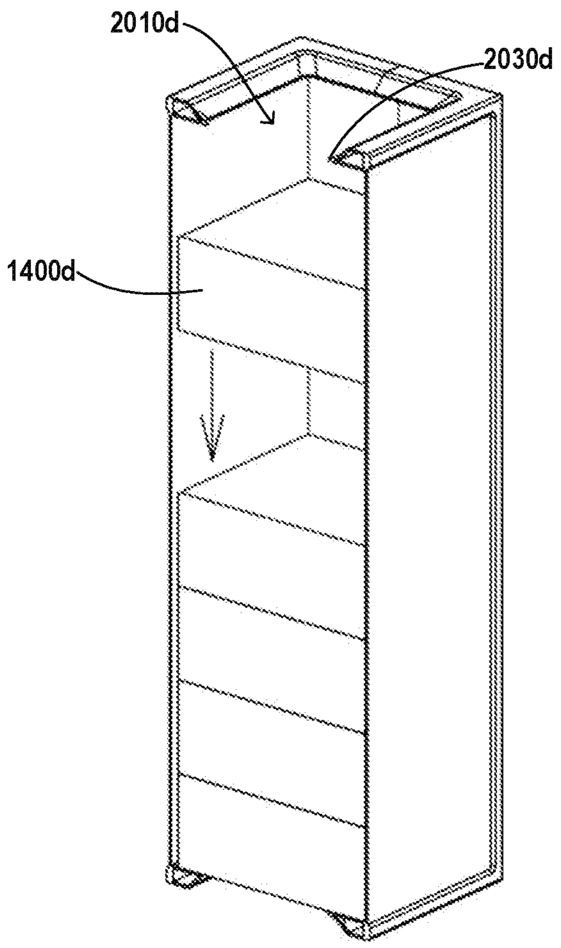
Figure 48E:
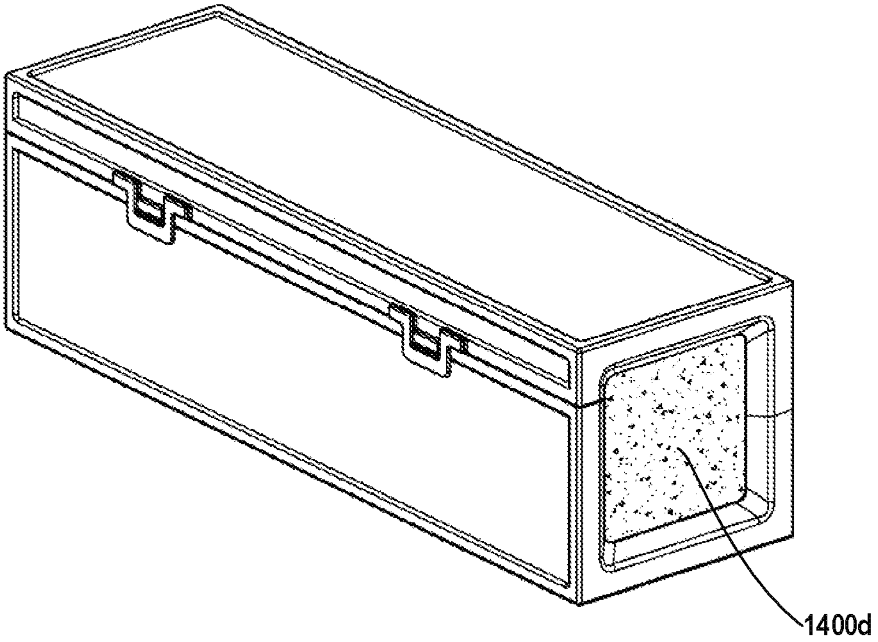
Figure 48F:
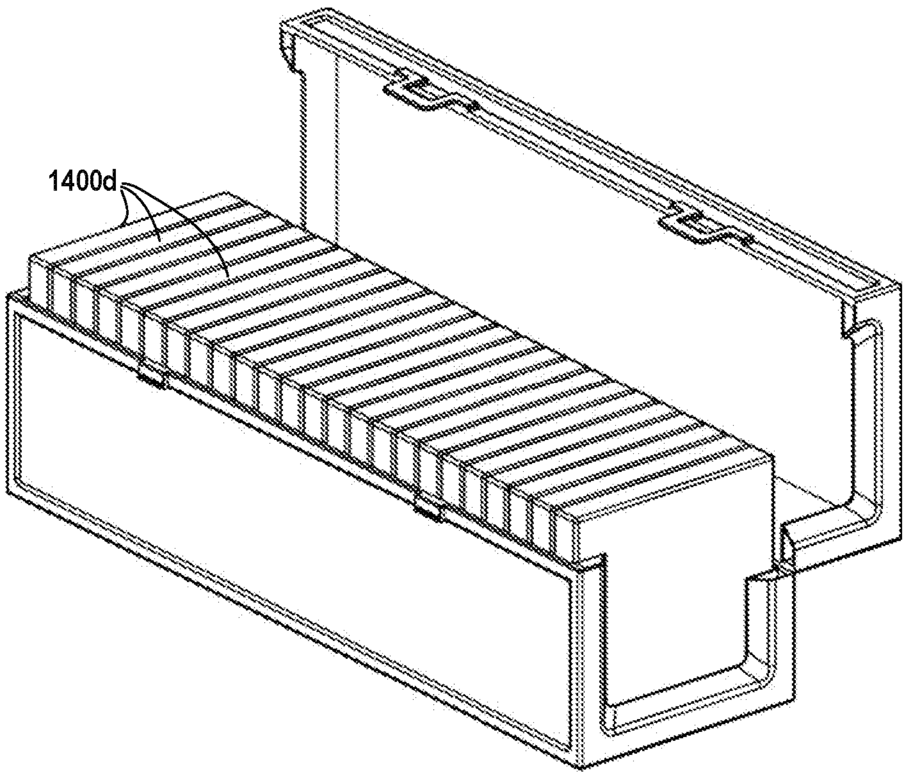

FIGS. 47A to 47C exemplarily show yet another packaging method of the sponge block according to the present disclosure.

FIGS. 48A to 48F exemplarily show a sponge block storage box and a sponge block receiving method according to a preferred embodiment of the present disclosure.

Figure 49A:
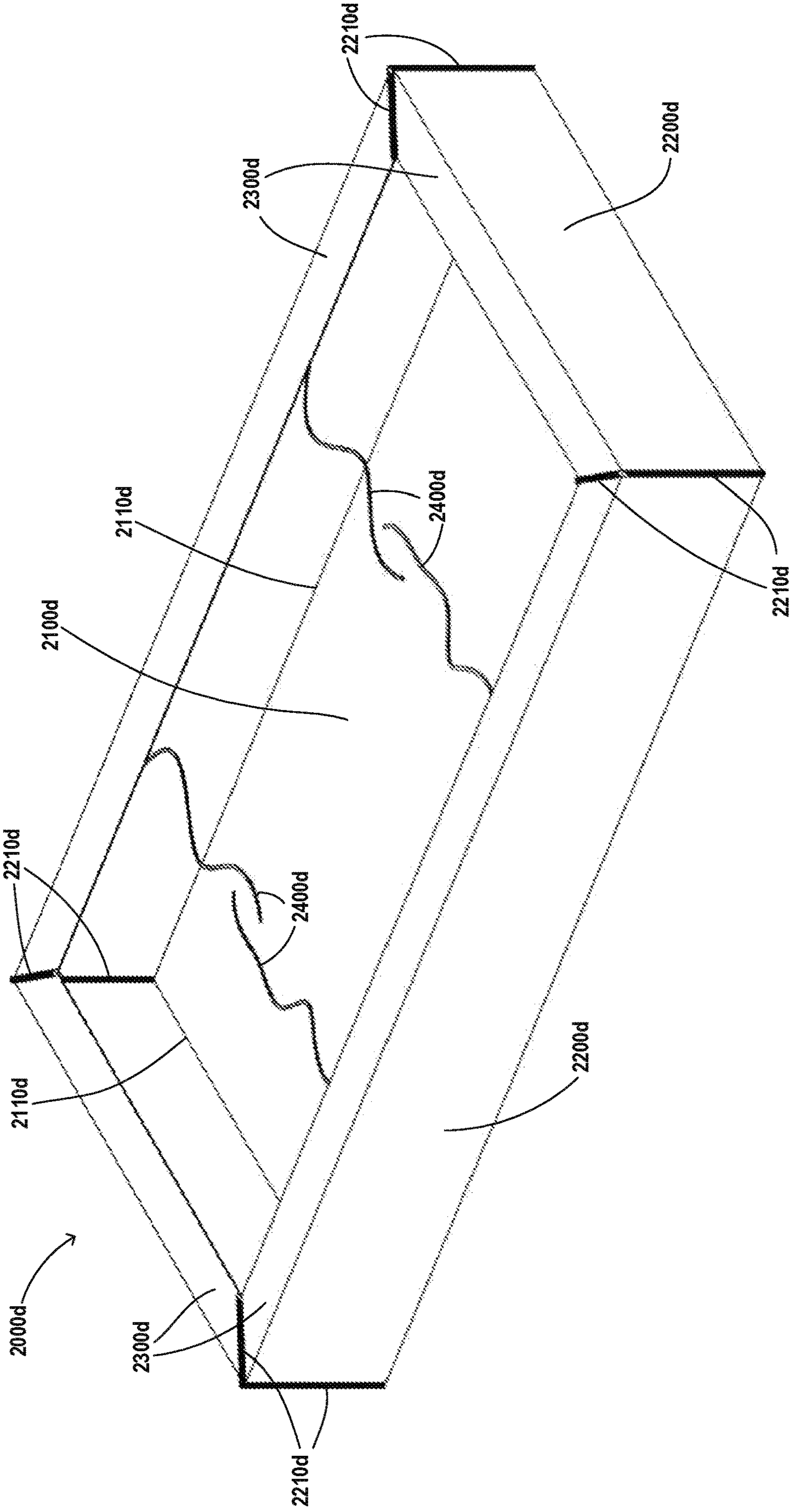
Figure 49B:
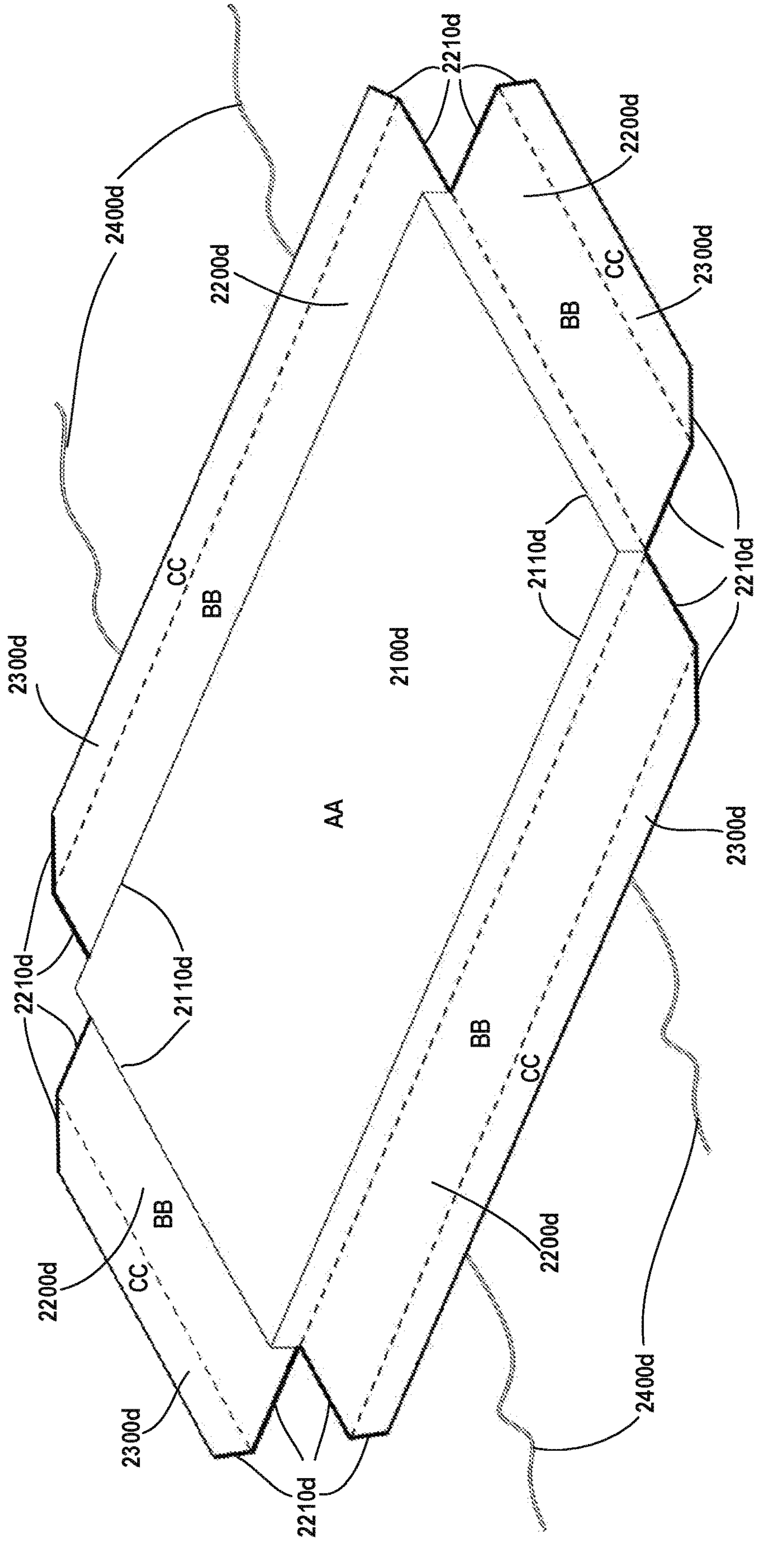

FIGS. 49A and 49B exemplarily show an outer cover for a spring cushion according to a preferred embodiment of the present disclosure.

Figure 50A:
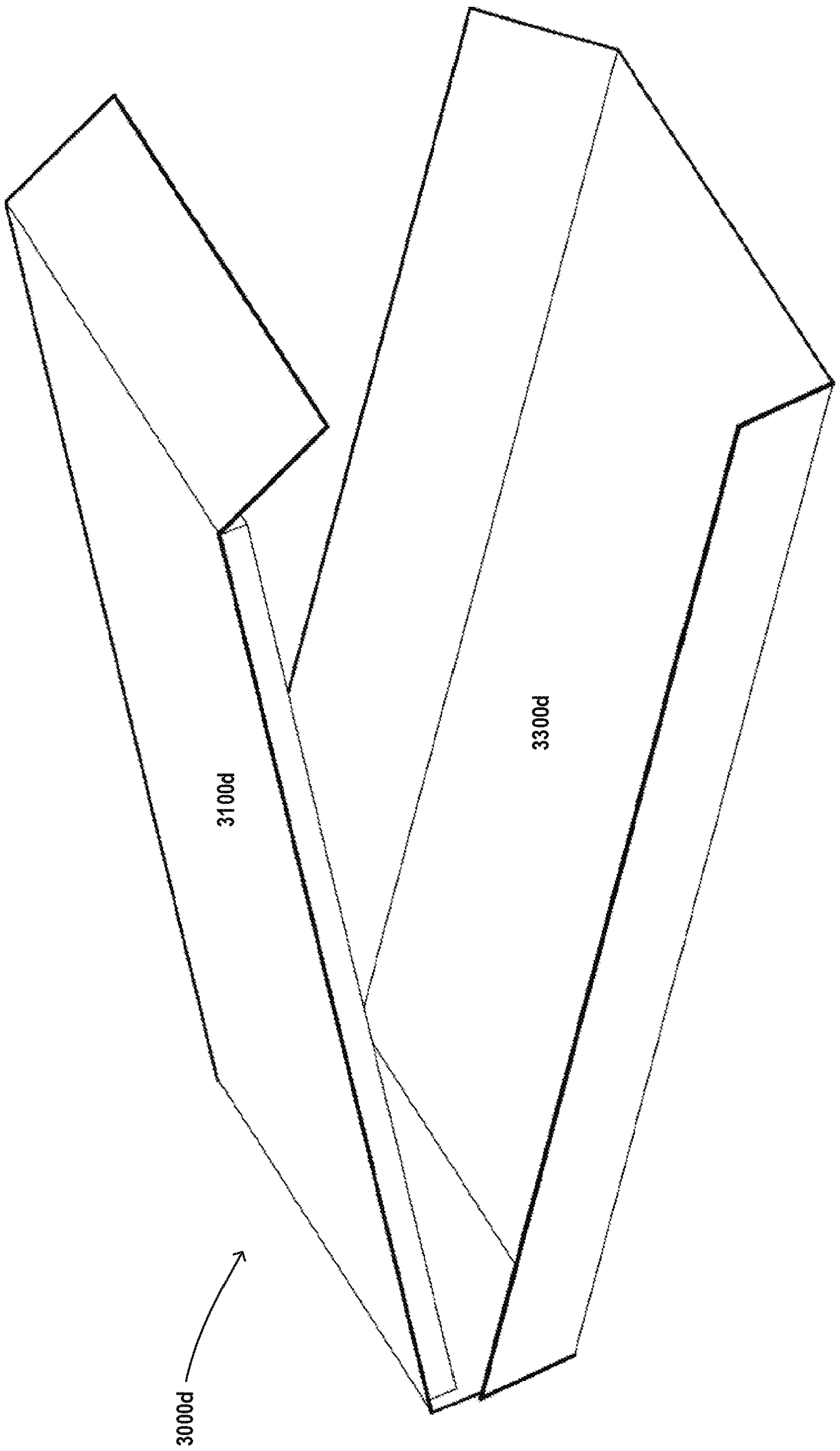
Figure 50B:
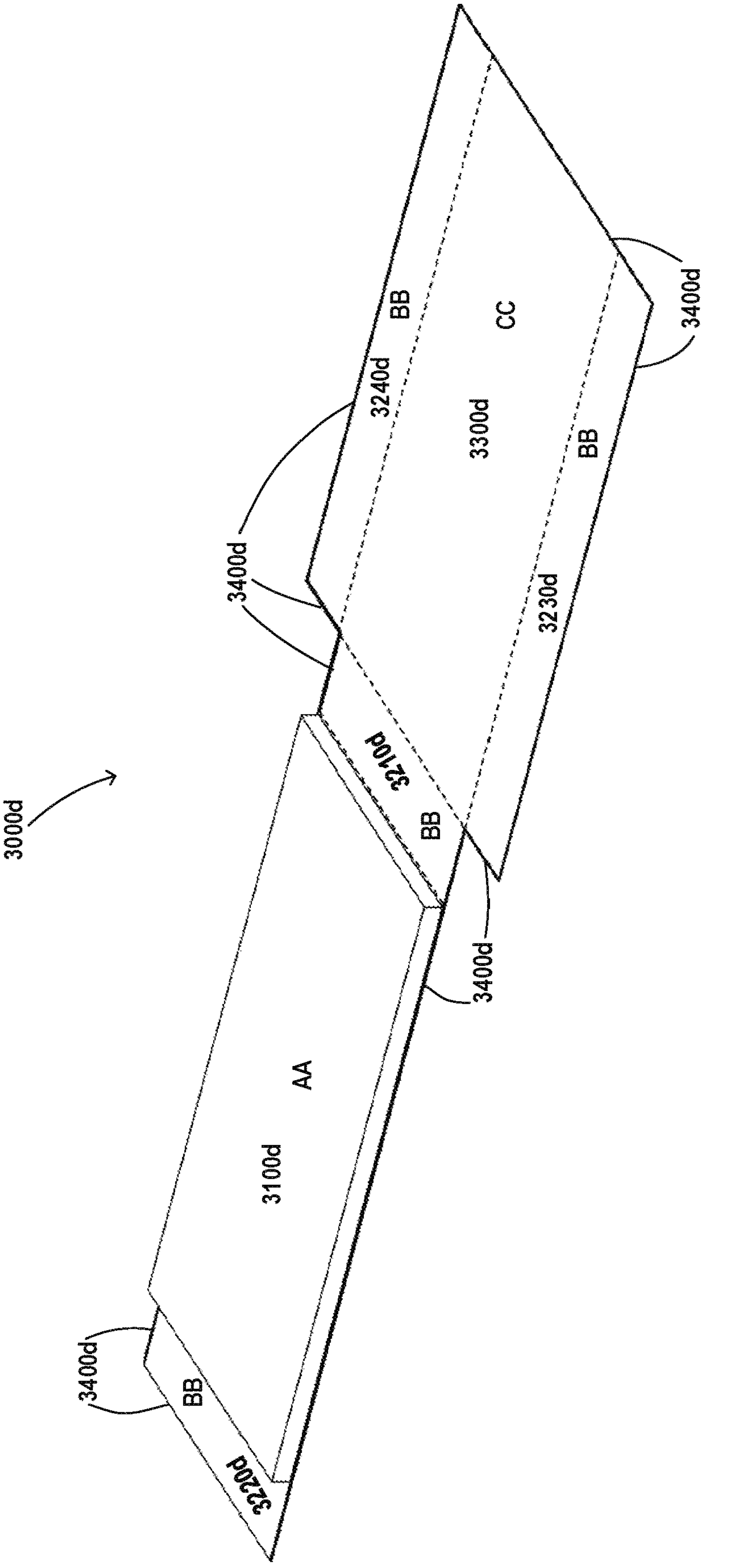

FIGS. 50A and 50B exemplarily show an outer cover for a spring cushion according to another preferred embodiment of the present disclosure.

Figure 51A:
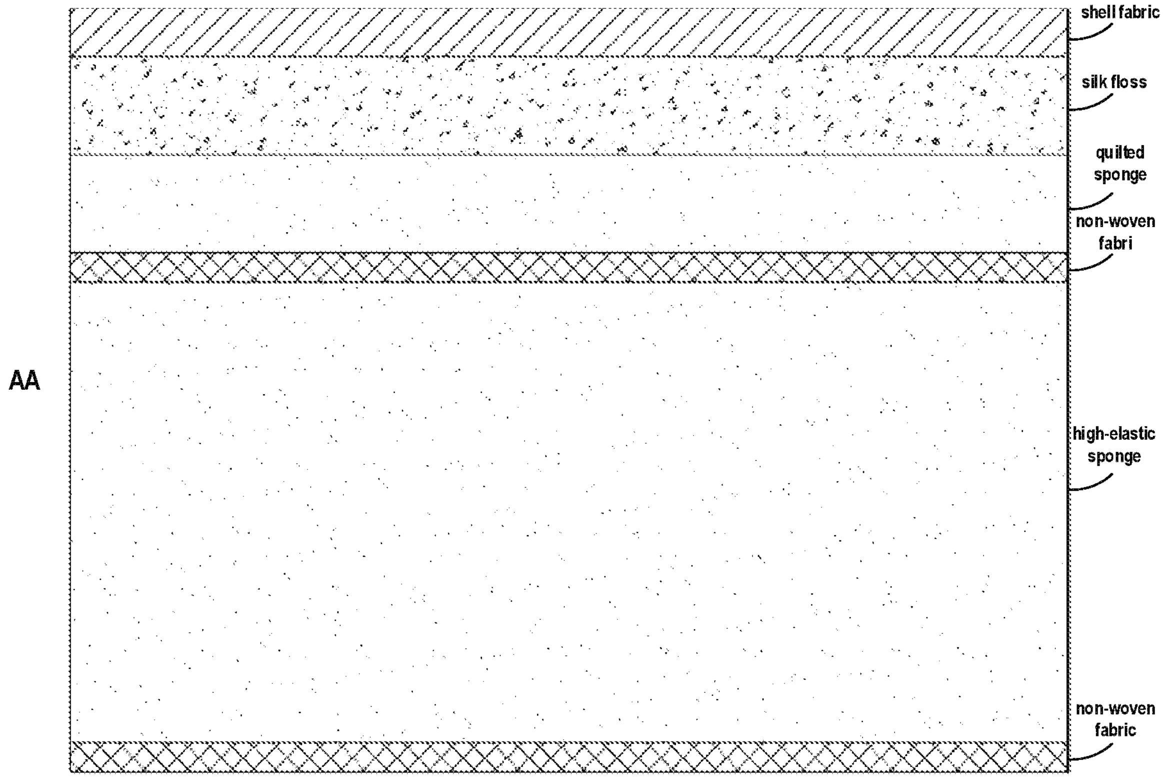
Figure 51B:
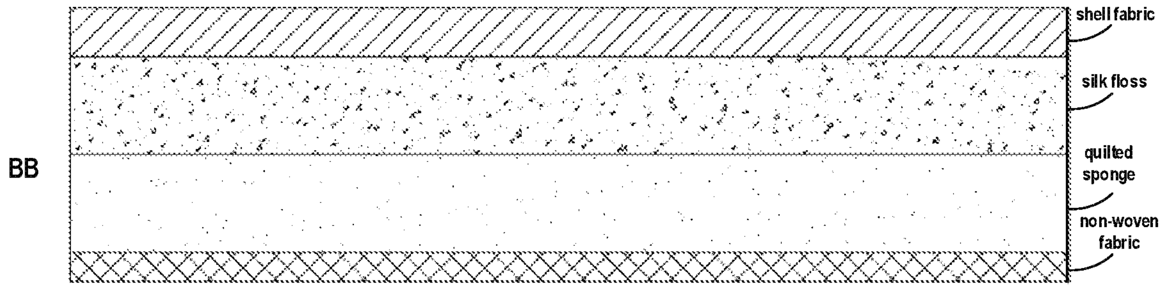
Figure 51C:
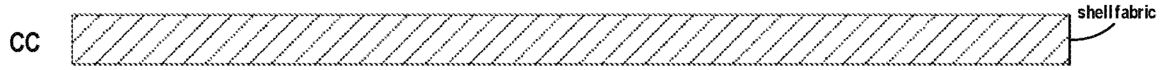

FIGS. 51A to 51C exemplarily illustrate components of different parts of the outer covers shown in FIGS. 49A and 49B as well as FIGS. 50A and 50B, respectively.

DETAILED DESCRIPTION OF EMBODIMENTS

The spring module and the spring cushion of the present disclosure will be described in detail below with reference to the accompanying drawings. What are described herein are only preferred embodiments according to the present disclosure, and those skilled in the art can think of other ways to achieve the present disclosure on the basis of the preferred embodiments, which also fall within the scope of the present disclosure.

FIGS. 1A to 1F exemplarily show a spring module 100 according to a first preferred embodiment of the present disclosure. As shown in the figures, the spring module 100 comprises a spring bracket 120 and a conical spring 110 provided in the spring bracket 120. The spring bracket 120 is used for removably mounting the spring module 100 to a foldable mounting rack. The spring bracket 120 comprises a base 121, an end cover 122 and a plurality of flexible straps 123, in a preferred embodiment, the number of the flexible straps 123 is four, and the flexible straps 123 are uniformly distributed around the periphery of the spring bracket 120. Of course, the number of the flexible straps 123 may also be two, six or other numbers. The base 121 has a spring mounting seat, the center of which is provided with an opening 1211 and a spring fixing part for fixing the conical spring 110, the base 121 further optionally comprises an module mounting part for removably mounting the spring module to the mounting rack, the large-diameter end of the conical spring 110 is fixed to the spring fixing part, and the small-diameter end of the conical spring 110 abuts against the end cover 122. In various embodiments of the present disclosure, the spring fixing part may be a hook part or a recess, and in the present embodiment, the spring fixing part is configured as a plurality of hook parts 1212 uniformly arranged around the inner circumference of the opening 1211. The flexible straps 123 are provided outside the conical spring 110, and two ends of each flexible strap 123 are fixedly connected to the base 121 and the end cover 122, respectively. When the spring 110 is installed in the spring bracket 120, it can have a predetermined initial pressure, such that the spring module has a desired stiffness. With the support of the spring, the spring module 100 is substantially frustoconical.

Preferably, the spring bracket 120 is a one-piece spring bracket formed integrally, however, of course, it can also be an assembly assembled from a plurality of components.

Figure 6:
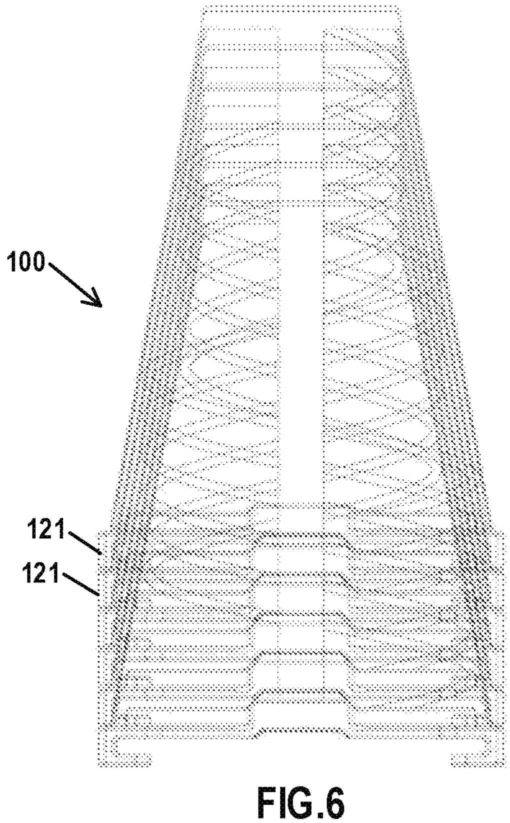
FIG. 6 exemplarily shows a condition when a plurality of the spring modules in FIG. 1A are stacked and nested together.

As mentioned above, the spring bracket 120 is substantially frustoconical, which enables the end cover 122 of the spring module 100 to enter into the interior of another spring module through the opening 1211 of the base 121 of the other spring module, thus forming nesting, as shown in FIG. 6.

Figure 7A:
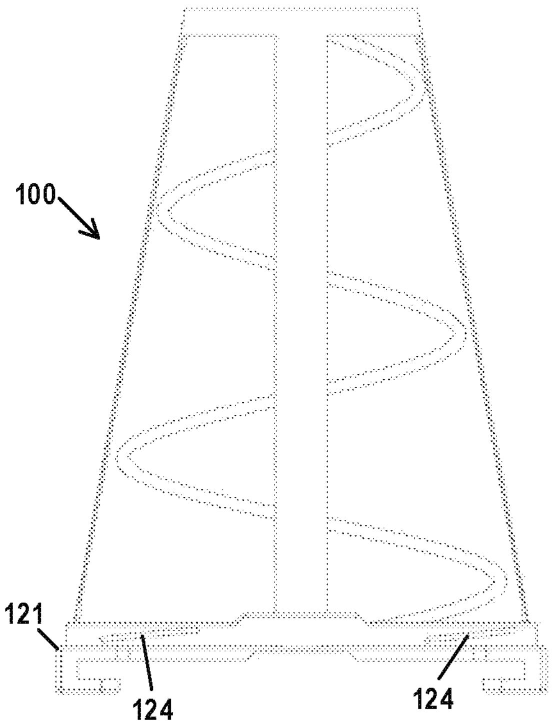
FIG. 7A exemplarily shows a spring module with threads.
Figure 7B:
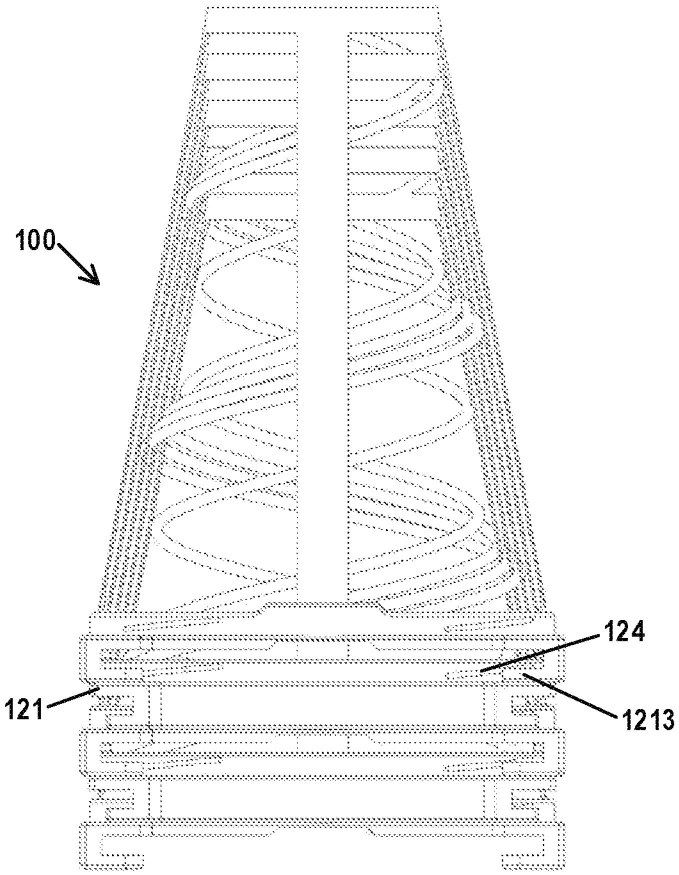
FIG. 7B exemplarily shows a condition when a plurality of the spring modules in FIG. 7A are stacked and nested together.
Figure 7C:
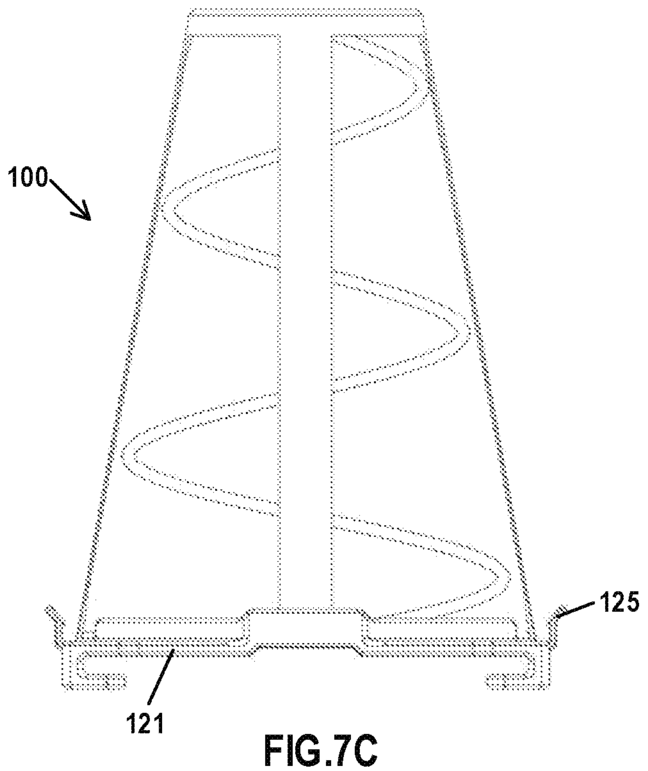
FIG. 7C exemplarily shows a spring module having a snap structure.
Figure 7D:
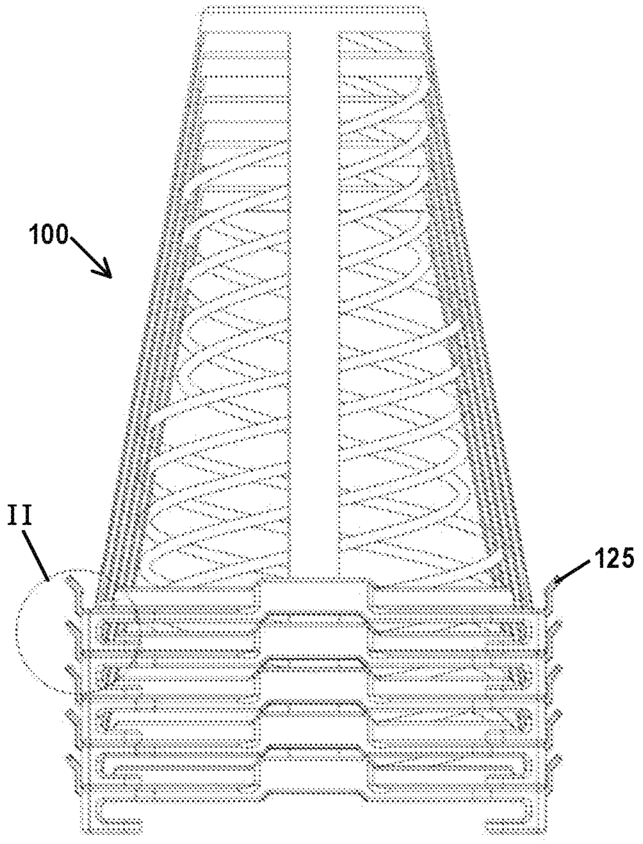
FIG. 7D exemplarily shows a condition when a plurality of the spring modules in FIG. 7C are stacked and nested together.
Figure 7E:
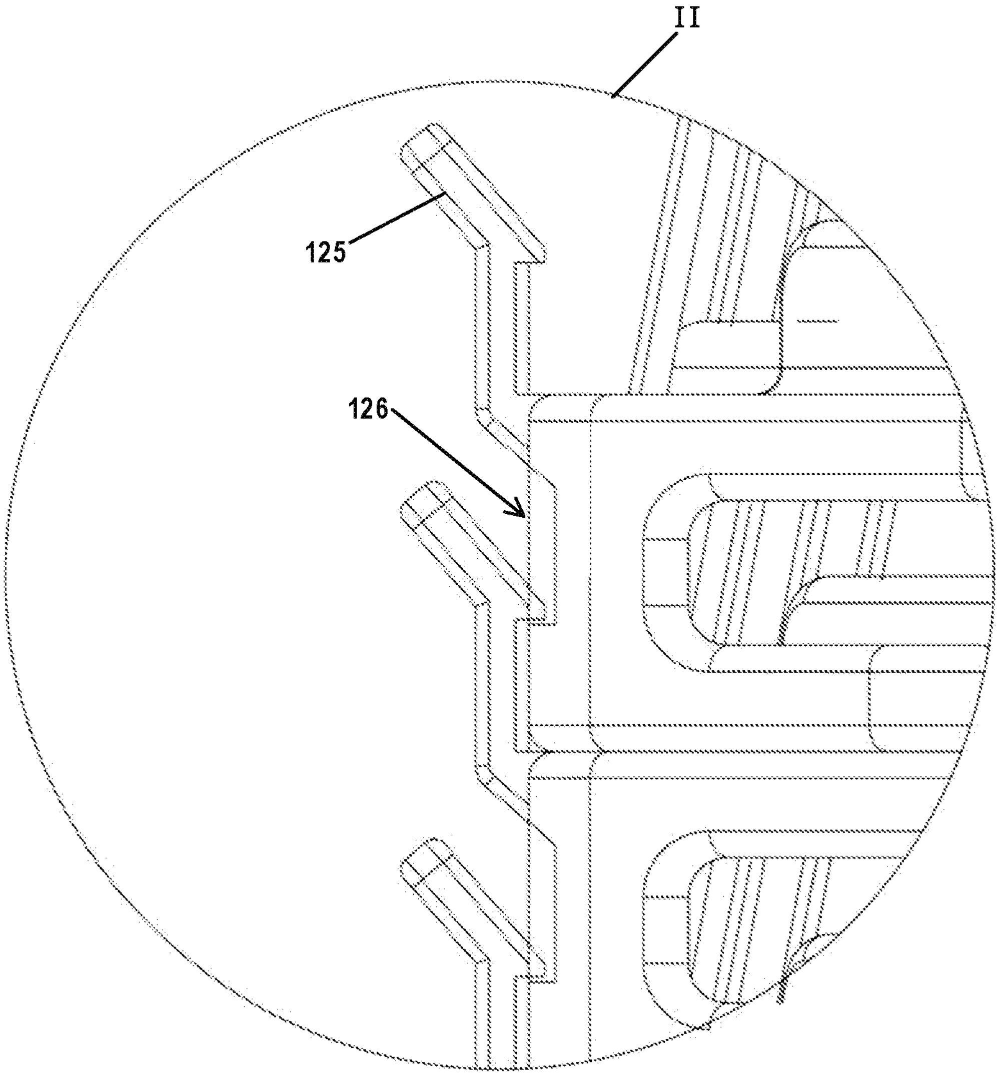
FIG. 7E exemplarily shows a partial enlarged view of part II in FIG. 7D.
Figure 8:
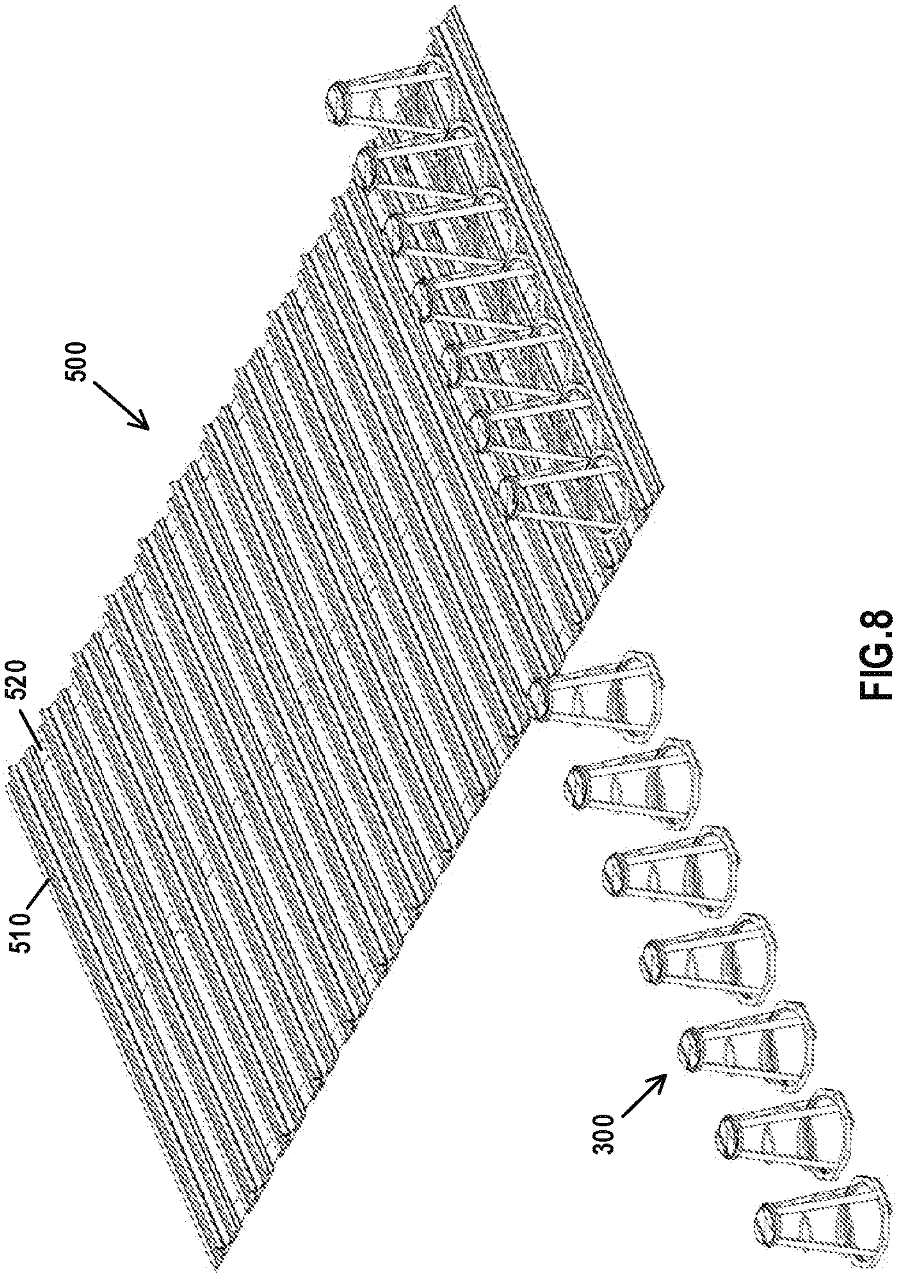
FIG. 8 exemplarily shows a perspective view when spring modules according to yet another preferred embodiment of the present disclosure are mounted on a mounting rack according to another preferred embodiment of the present disclosure.

In order to form a more stable nesting, preferably, the top of the base 121 is provided with an annular wall extending around the opening 1211, and the outside surface of the annular wall is provided with threads 124 (as shown in FIG. 7A), when a plurality of spring modules 100 are nested, the bottom wall of the slideway 1213 of one spring module 100 can enter between the threads 124 and the top of the base 121 of another spring module 100 by rotation, thus forming a stable nesting (as shown in FIG. 7B). Alternatively or additionally, the outer periphery of the base 121 is provided with one or more snap parts 125 extending upward, and one or more snap notches 126 located below the snap parts 125 (as shown in FIG. 7C), then when a plurality of spring modules 100 are nested, the snap parts 125 of the lower spring module can be snapped into the corresponding snap notches 126 of the upper spring module, thus forming a stable nesting (as shown in FIGS. 7D and 7E).

Preferably, the module mounting part is configured as two slideways 1213 arranged in parallel at the bottom of the base 121, and the base 121 can be slidably mounted onto the slide rails of the foldable mounting rack, and the slideways 1213 are configured to be hook parts which can be hooked onto the slide rails of the mounting rack in order to prevent the spring module 100 from being separated from the mounting rack.

Figure 1A:
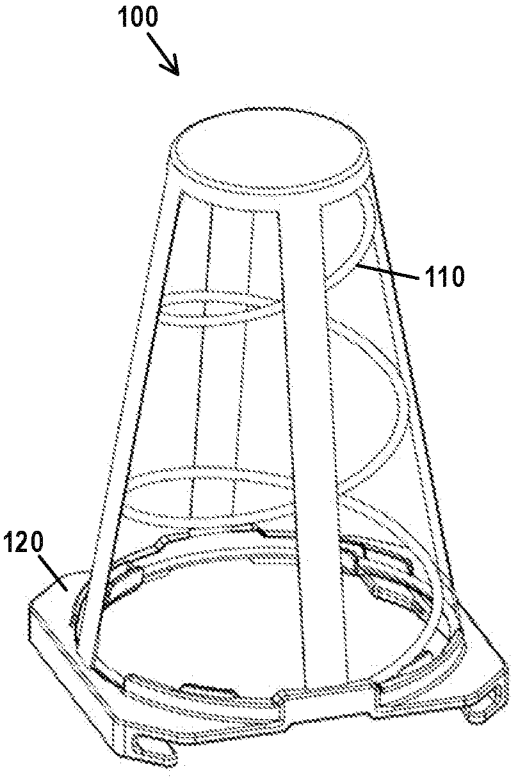
FIG. 1A exemplarily shows a perspective view of a spring module according to a preferred embodiment of the present disclosure.
Figure 1B:
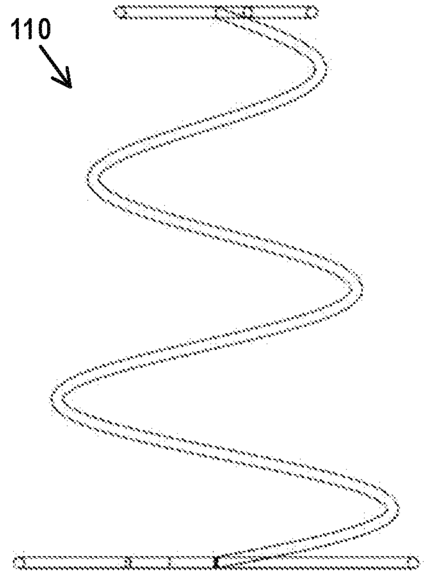
FIG. 1B exemplarily shows a spring of the spring module in FIG. 1A.
Figure 1C:
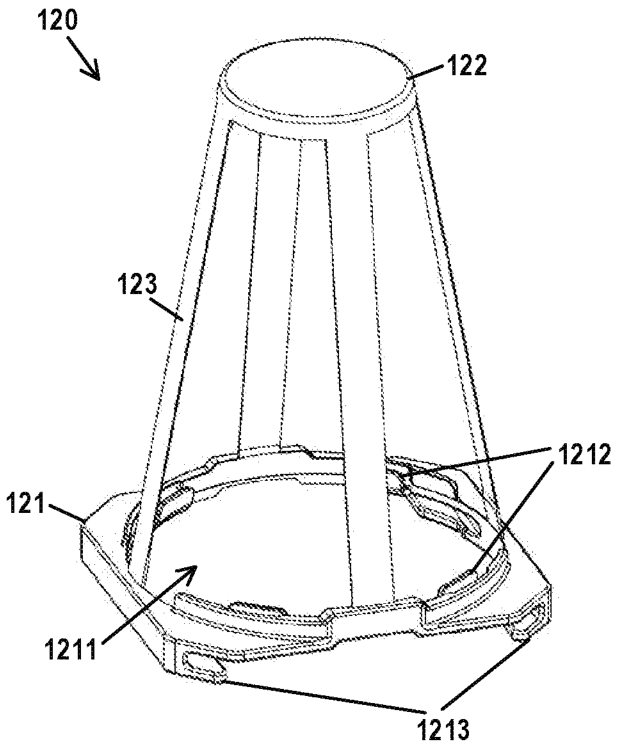
FIG. 1C exemplarily shows a spring bracket of the spring module in FIG. 1A.
Figure 1D:
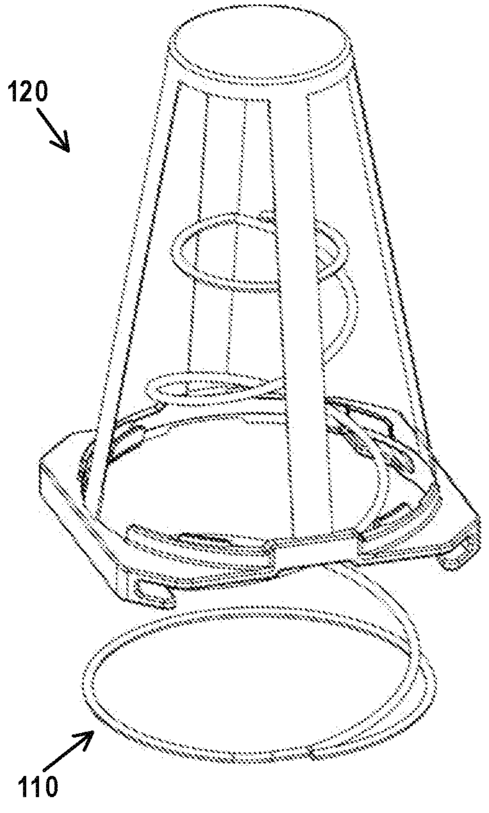
FIG. 1D exemplarily shows an exploded view of the spring module in FIG. 1A.
Figure 1E:
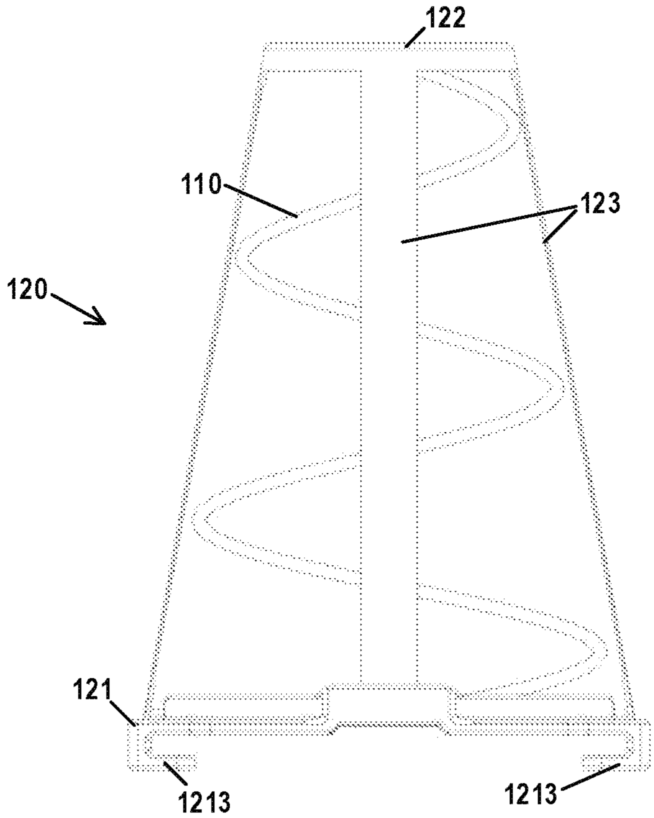
FIG. 1E exemplarily shows a front view of the spring module in FIG. 1A.
Figure 1F:
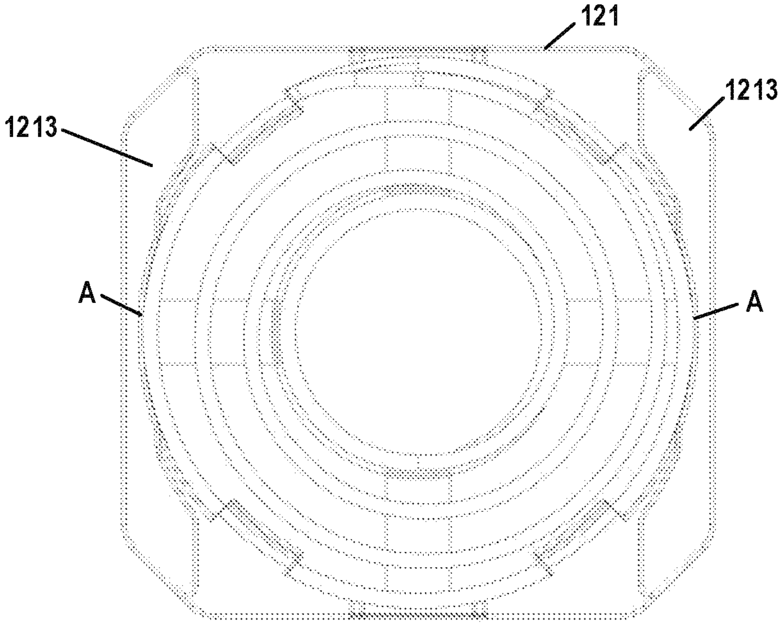
FIG. 1F exemplarily shows a bottom view of the spring module in FIG. 1A.

Preferably, the opening 1211 is a circular opening, and the middle part of each slideway 1213 is formed with an arc part matching the circular radian of the opening 1211, such as part A in FIG. 1F, so as not to hinder the superposition and nesting of a plurality of spring modules. Alternatively, each slideway 1213 may be configured as segmented slideways which are discontinuous in-between.

Figure 2:
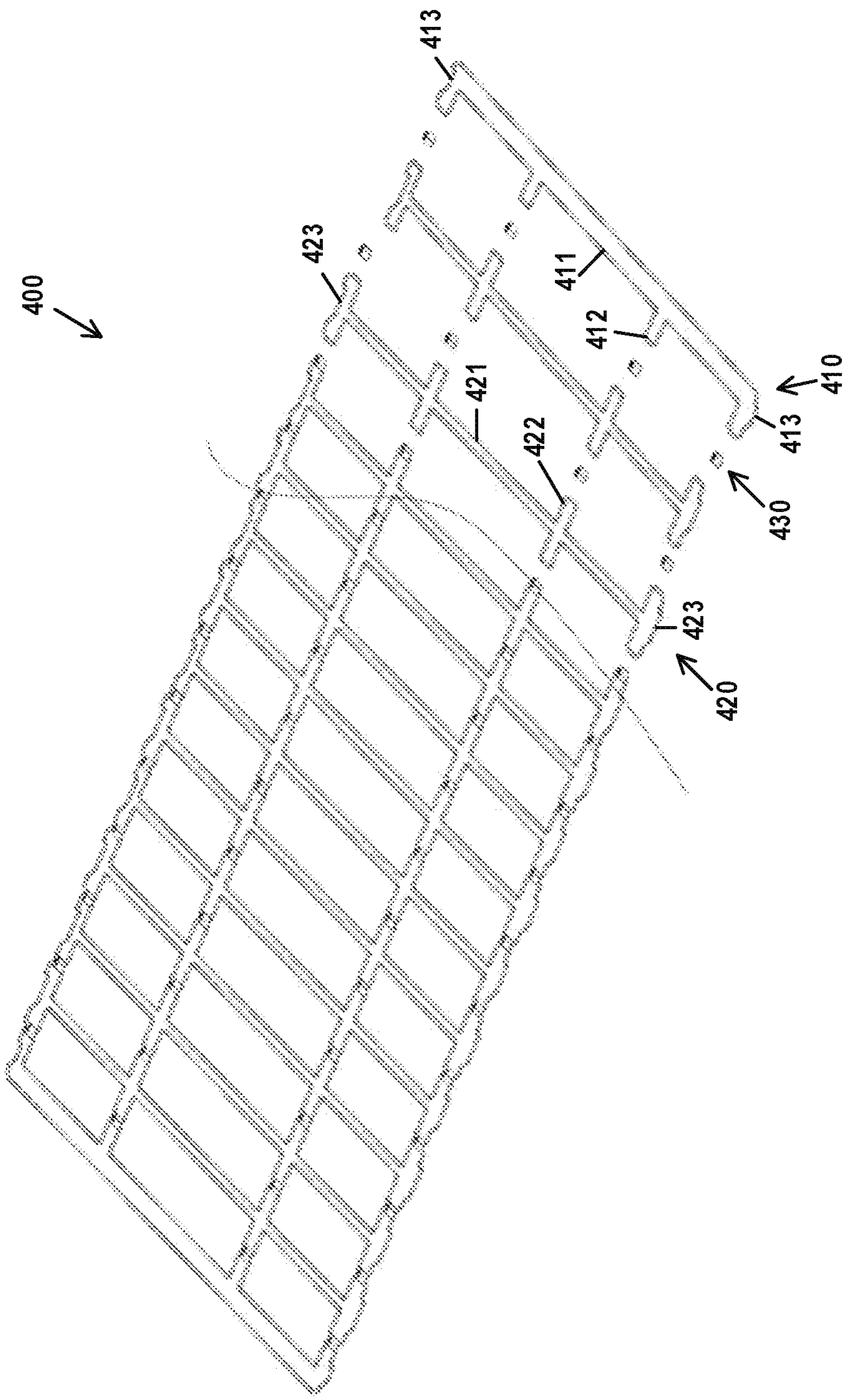
FIG. 2 exemplarily shows a perspective view of a mounting rack according to a preferred embodiment of the present disclosure.
Figure 3A:
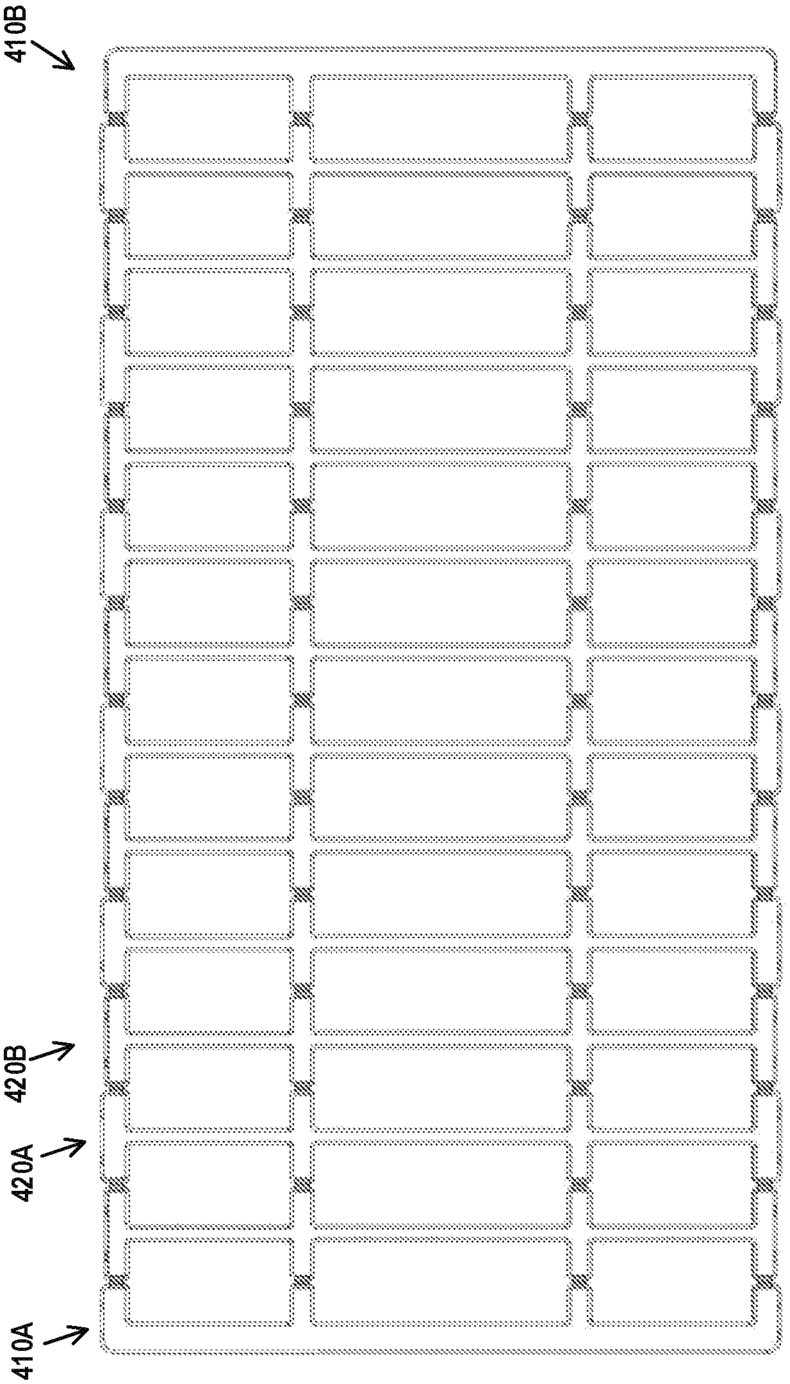
FIG. 3A exemplarily shows a front view of the mounting rack in FIG. 2 in an unfolded state.
Figure 3B:
FIG. 3B exemplarily shows a bottom view of the mounting rack in FIG. 2 in an unfolded state.
Figure 3C:
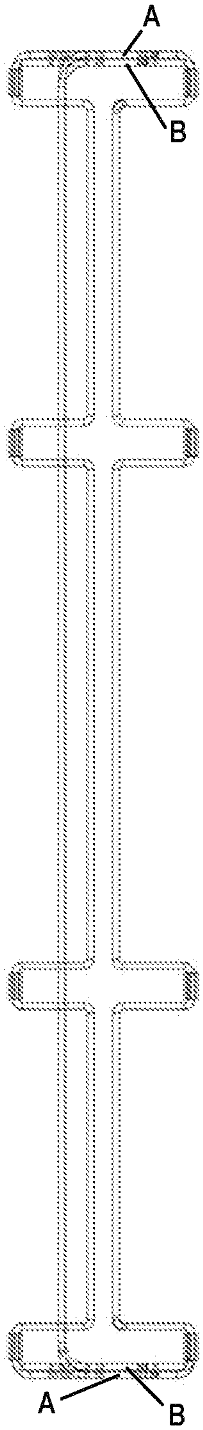
FIG. 3C exemplarily shows a side view of the mounting rack in FIG. 2 in a folded state.
Figure 3D:
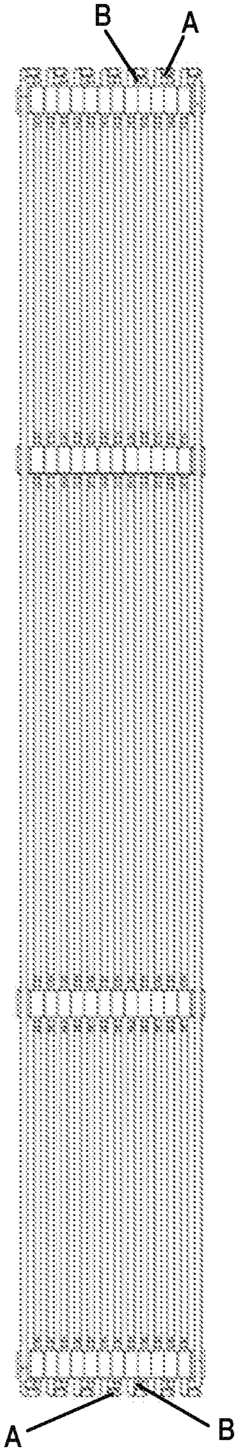
FIG. 3D exemplarily shows a front view of the mounting rack in FIG. 2 in a folded state.
Figure 4A:
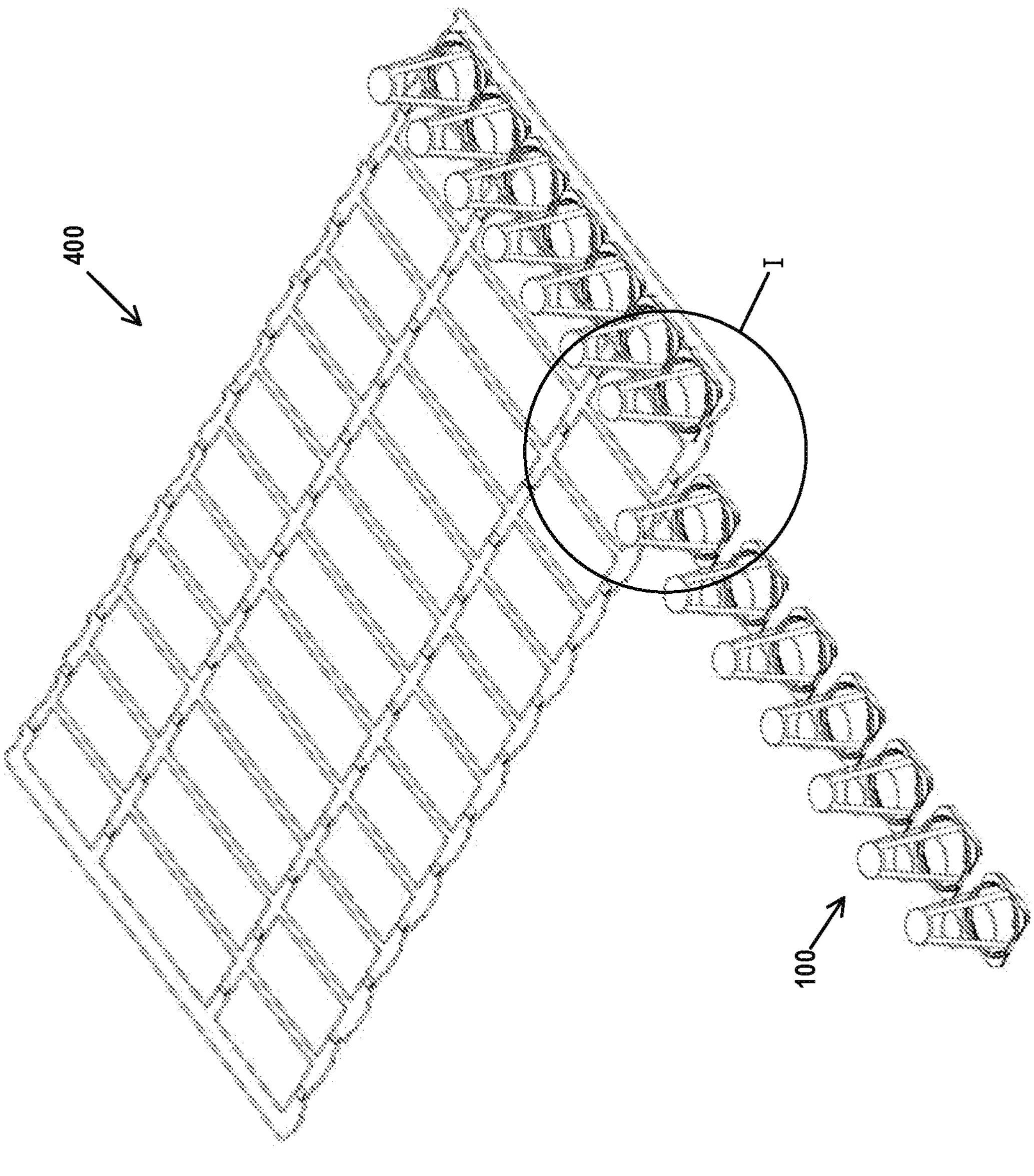
FIG. 4A exemplarily shows that the spring modules in FIG. 1A are assembled to the mounting rack in FIG. 2.
Figure 4B:
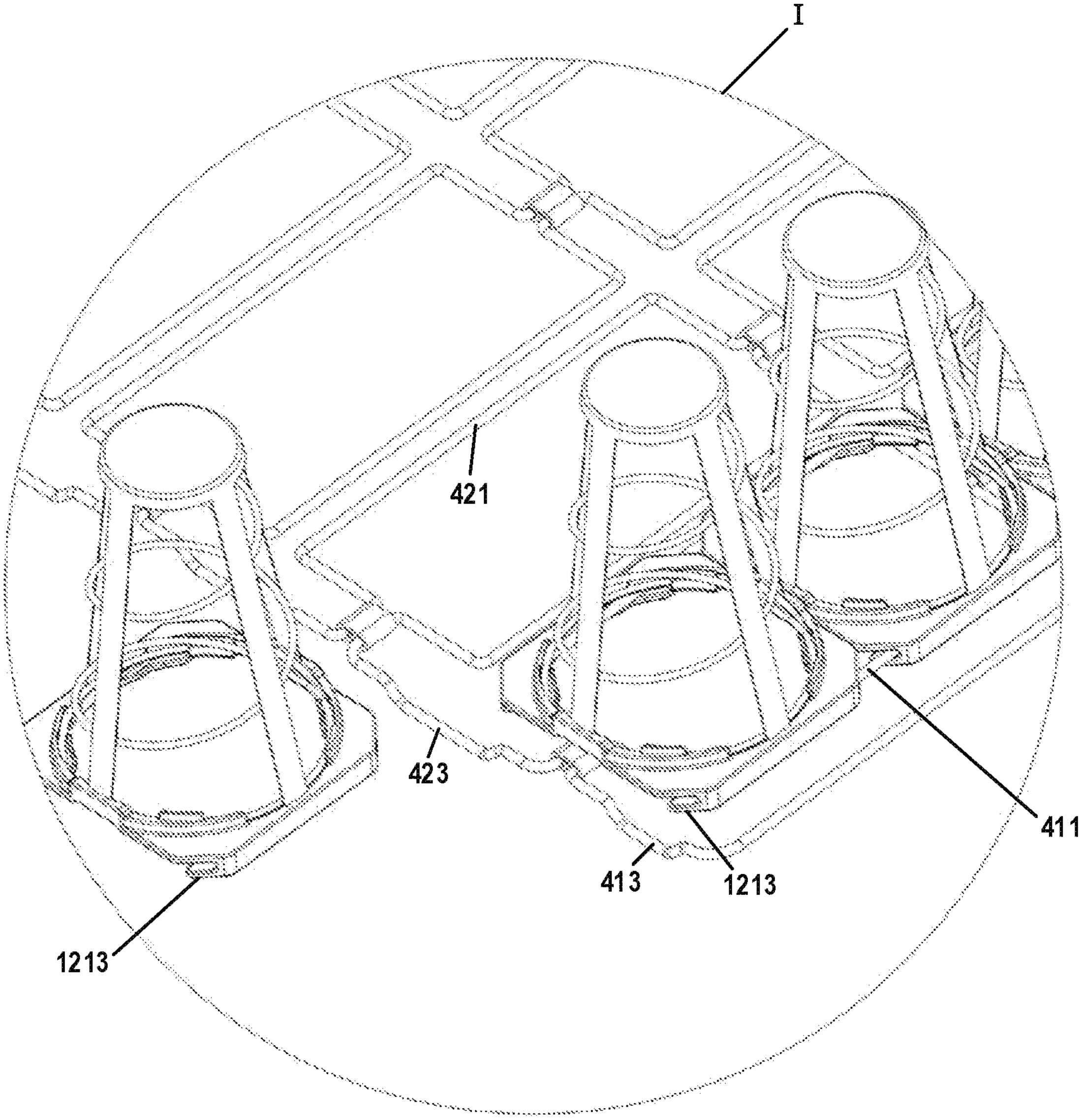
FIG. 4B exemplarily shows a partial enlarged view of part I in FIG. 4A.
Figure 4C:
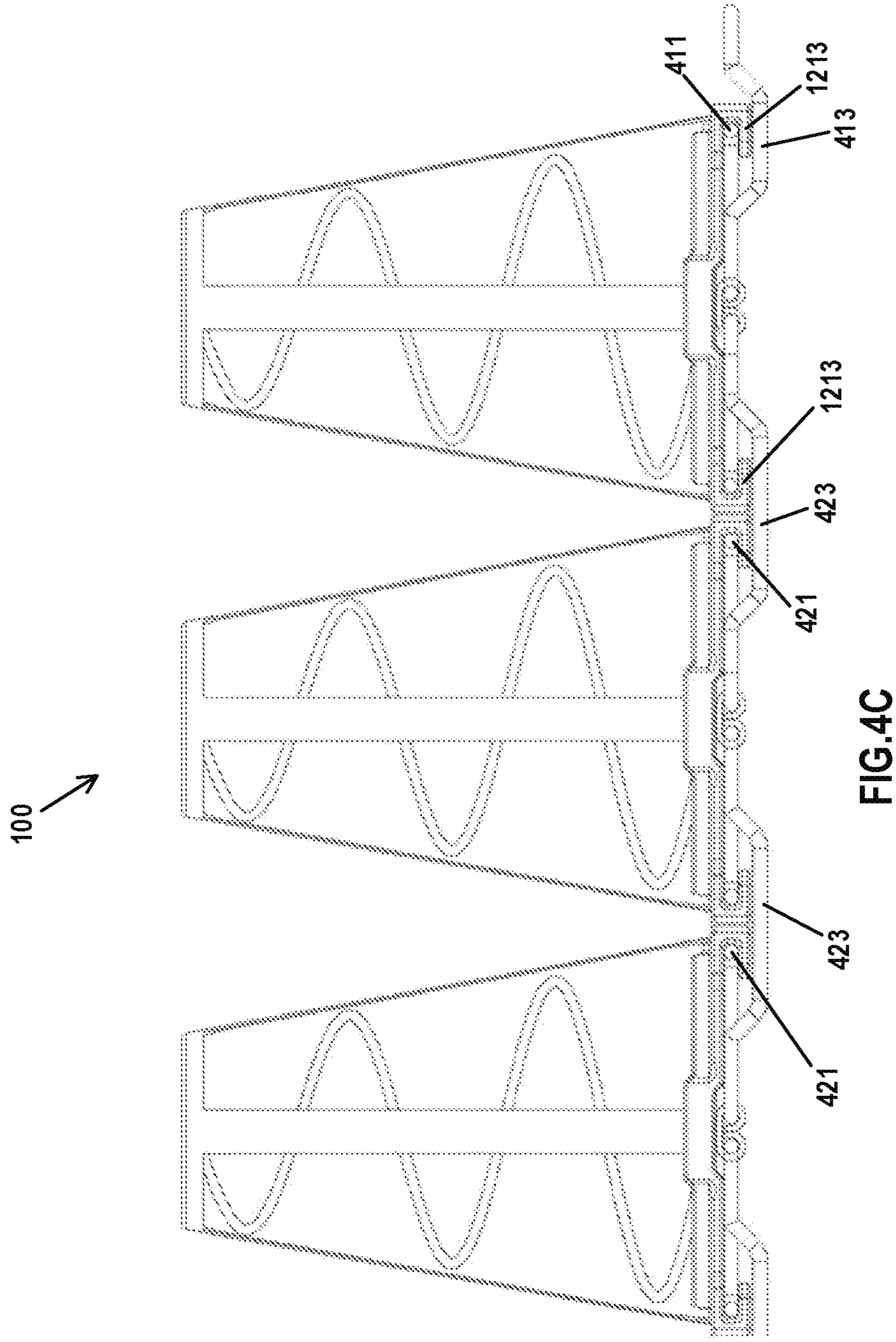
FIG. 4C exemplarily shows a partial front view when the spring modules in FIG. 1A is assembled to the mounting rack in FIG. 2.
Figure 4D:
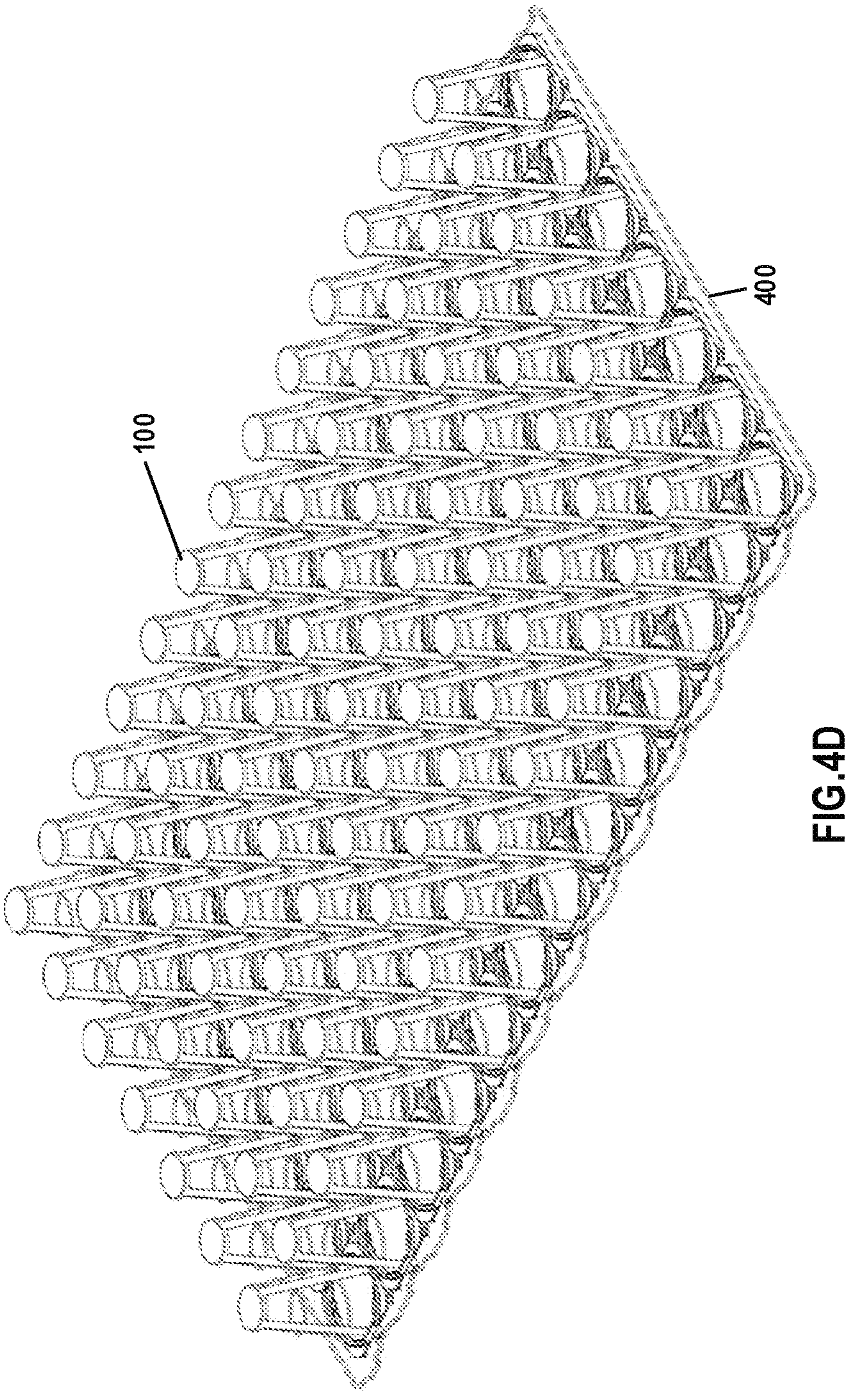
FIG. 4D schematically shows a perspective view when the spring modules in FIG. 1A is assembled to the mounting rack in FIG. 2.

FIGS. 2 and 3A-3D exemplarily show a mounting rack 400 according to a first preferred embodiment of the present disclosure. As shown in the figures, the mounting rack 400 comprises two side frames 410 located at both lateral sides of the mounting rack 400, a plurality of intermediate frames 420 located between the two side frames 410, and a plurality of connectors 430 rotatably connecting the side frames 410 and the intermediate frames 420 with each other. Since the side frames 410 and the intermediate frames 420 can rotate around the connectors 430, the mounting rack 400 is foldable, as shown in FIGS. 3C and 3D in which the mounting rack 400 is in a folded state.

Preferably, the side frames 410, the intermediate frames 420 and the connectors 430 are all formed of metal, more preferably, the side frames 410 and the intermediate frames 420 are made of steel bars by bending and welding while the connectors 430 are made of metal sheets by winding. And as shown in FIG. 2, both the side frames 410 and the intermediate frames 420 are closed frames.

As shown in FIG. 2, the side frame 410 has a longitudinal extending part 411 extending along its length and a plurality of transverse protruding parts 412 perpendicular to the longitudinal extending part and extending to one side, the intermediate frame 420 has a longitudinal extending part 421 extending along its length and a plurality of transverse protruding parts 422 perpendicular to the longitudinal extending part and extending to both lateral sides, and the connectors 430 rotatably connect the corresponding transverse protruding parts of two adjacent frames together, such that the mounting rack 400 is foldable.

As described above, the steel bars at the longitudinal extending parts 411 is configured to be slidably engaged with the slideways 1213 of the base 121, so that the base 121 of the spring module 100 can be slidably mounted onto the mounting rack 400 along the longitudinal extending parts 411, 421 of the mounting rack 400. That is, the longitudinal extending parts 411, 421 can serve as slide rails cooperating with the slideways 1213 of the base 121. Preferably, the middle portions 413, 423 of the steel bars at the longitudinal ends of the side frames 410 and the intermediate frames 420 protrude in a direction perpendicular to the plane of the longitudinal extending parts and the transverse protruding parts (downward direction shown in the figure), so that the slideways of the spring module can slide through the ends of the frames and further along the longitudinal extending parts 411, 421.

In a preferred embodiment according to the present disclosure, there may be two types of side frames and two types of intermediate frames with different lengths, in order to facilitate the folding of the mounting rack. For example, the side frame 410 may comprise a first side frame 410A having a longer length and a second side frame 410B having a shorter length, and the intermediate frame 420 may comprise a plurality of first intermediate frames 420A and a plurality of second intermediate frames 420B spaced apart from each other, and wherein, similarly, the longitudinal length of the first intermediate frames 420A are slightly greater than that of the second intermediate frames 420B. The purpose of arranging frame members with different lengths is that, when folding, the protrusions 413, 423 at the ends of adjacent frame members can readily realize folding without interfering with each other. FIGS. 3C and 3D show the folded state of the frame 400 with frame members having different lengths, in which the ends A of the longer frame members and the ends B of the shorter frame members are staggered from each other without interference.

FIGS. 4A-4D exemplarily show that the spring modules 100 according to the first preferred embodiment of the present disclosure are mounted onto the mounting rack 400 according to the first preferred embodiment of the present disclosure. As shown in the figures, the slideways 1213 of the spring module 100 can be slidably mounted onto the longitudinal extending parts 411, 421 of the frame members at the notches formed by the protrusions 413, 423.

FIGS. 5A-5E exemplarily show a spring module 200 according to a second preferred embodiment of the present disclosure and its installation on the mounting rack 400. As shown in the figures, the spring module 200 comprises a spring bracket 220 and a conical spring 110 provided in the spring bracket 220. The spring bracket 220 is used to removably mount the spring module 200 to the mounting rack 400 which is foldable. The spring bracket 220 comprises a base 221, an end cover 222 and a plurality of flexible straps 223. In a preferred embodiment, the number of the flexible straps 223 is four, and the flexible straps 223 are uniformly distributed around the periphery of the spring bracket 220. The base 221 comprises a spring mounting seat, the center of the spring mounting seat is provided with an opening 2211, and a spring fixing part for fixing the conical spring 110, and the base 221 further comprises a module mounting part for detachably mounting the spring module onto the mounting rack, the large-diameter end of the conical spring 110 is fixed to the spring fixing part while the small-diameter end of the conical spring 110 abuts against the end cover 222. In this preferred embodiment, the spring fixing part is configured as a plurality of hook parts 2212 uniformly arranged around the inner circumference of the opening 2211. The flexible straps 223 are provided outside the conical spring 110, and two ends of each flexible strap 223 are fixedly connected to the base 221 and the end cover 222, respectively. When the spring 110 is installed in the spring bracket 220, it can have a predetermined initial pressure, such that the spring module has a desired stiffness. With the support of the spring, the spring module 200 is substantially frustoconical. Different from the spring bracket 120, the center of the end cover 222 of the spring bracket 220 has a circular opening 224, that is, the end cover 222 is an annular end cover.

Preferably, the spring bracket 220 is a one-piece spring bracket formed integrally, although of course, it can also be an assembly assembled from a plurality of components.

As described above, the spring bracket 220 is substantially frustoconical, which enables the end cover 222 of the spring module 200 to enter into the interior of another spring module through the opening 2211 of the base 221 of the other spring module, thus forming nesting. In order to form more stable nesting, the threads and the snap structures of the base 121 of the spring module 100 can similarly be applied to the base 221 of the spring module 200.

Figure 5A:
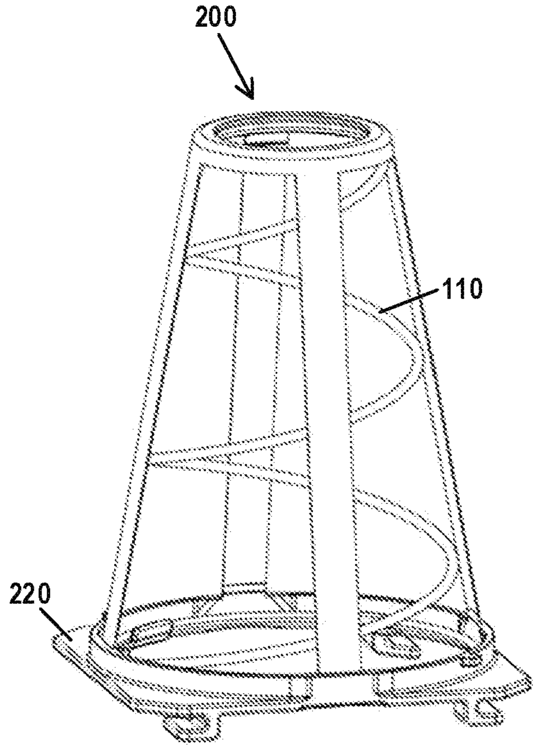
FIG. 5A exemplarily shows a perspective view of a spring module according to another preferred embodiment of the present disclosure.
Figure 5B:
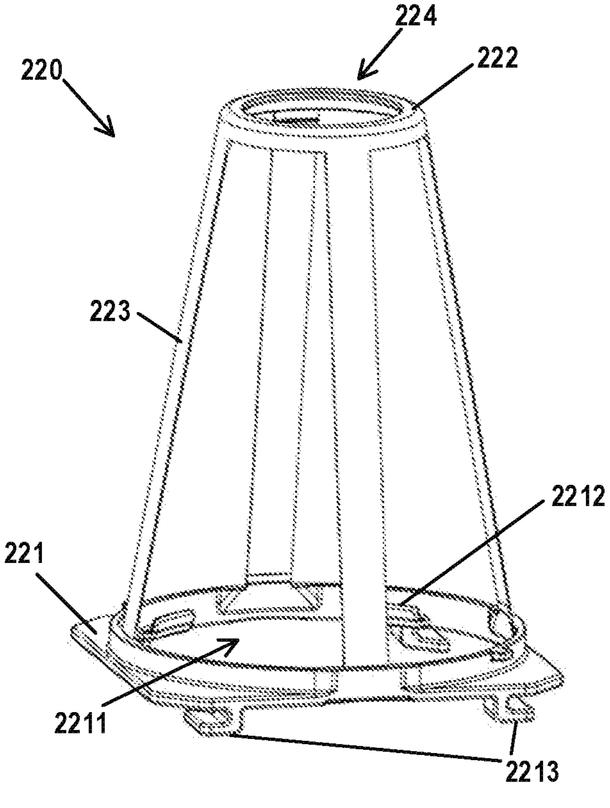
FIG. 5B exemplarily shows a spring bracket of the spring module in FIG. 5A.
Figure 5C:
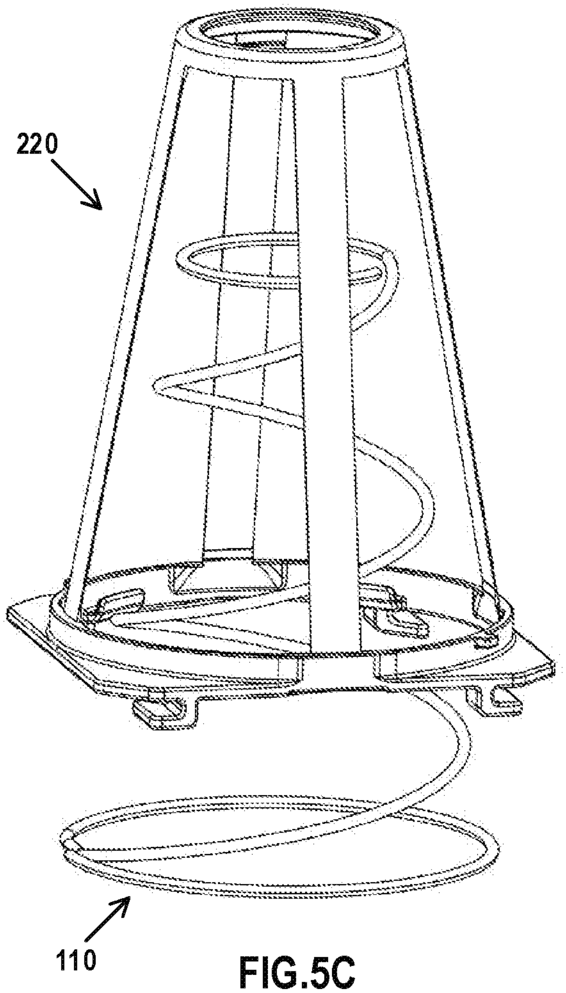
FIG. 5C exemplarily shows an exploded view of the spring module in FIG. 5A.
Figure 5D:
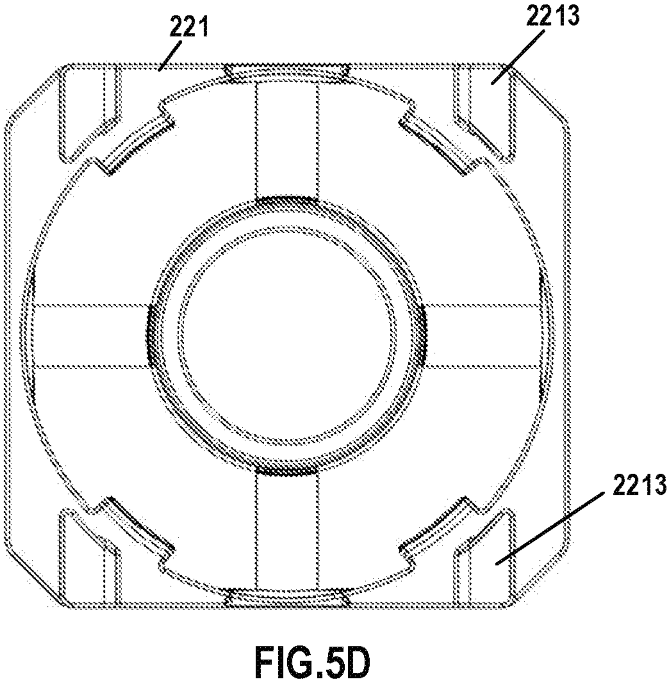
FIG. 5D exemplarily shows a bottom view of the spring module in FIG. 5A.

Preferably, the module mounting part of the spring module 200 is configured as two slideways 2213 parallel with each other arranged at the bottom of the base 121, unlike the inward slideways 1213 with the directions of the openings facing with each other, the slideways 2213 are outward slideways with the directions of the openings facing away from each other. The base 221 can be slidably mounted onto the slide rails of the mounting rack 400, i.e., the longitudinal extending parts 411, 421 of the frame members, through the slideways 2213. In the present embodiment, as shown in FIG. 5D, each slideway 1213 may be configured as segmented slideways which are discontinuous in-between. Moreover, similar to the slideway 1213, the slideway 2213 is a hook part, which can be hooked onto the slide rail of the mounting rack in order to prevent the spring module 200 from being disengaged from the mounting rack.

Figure 5E:
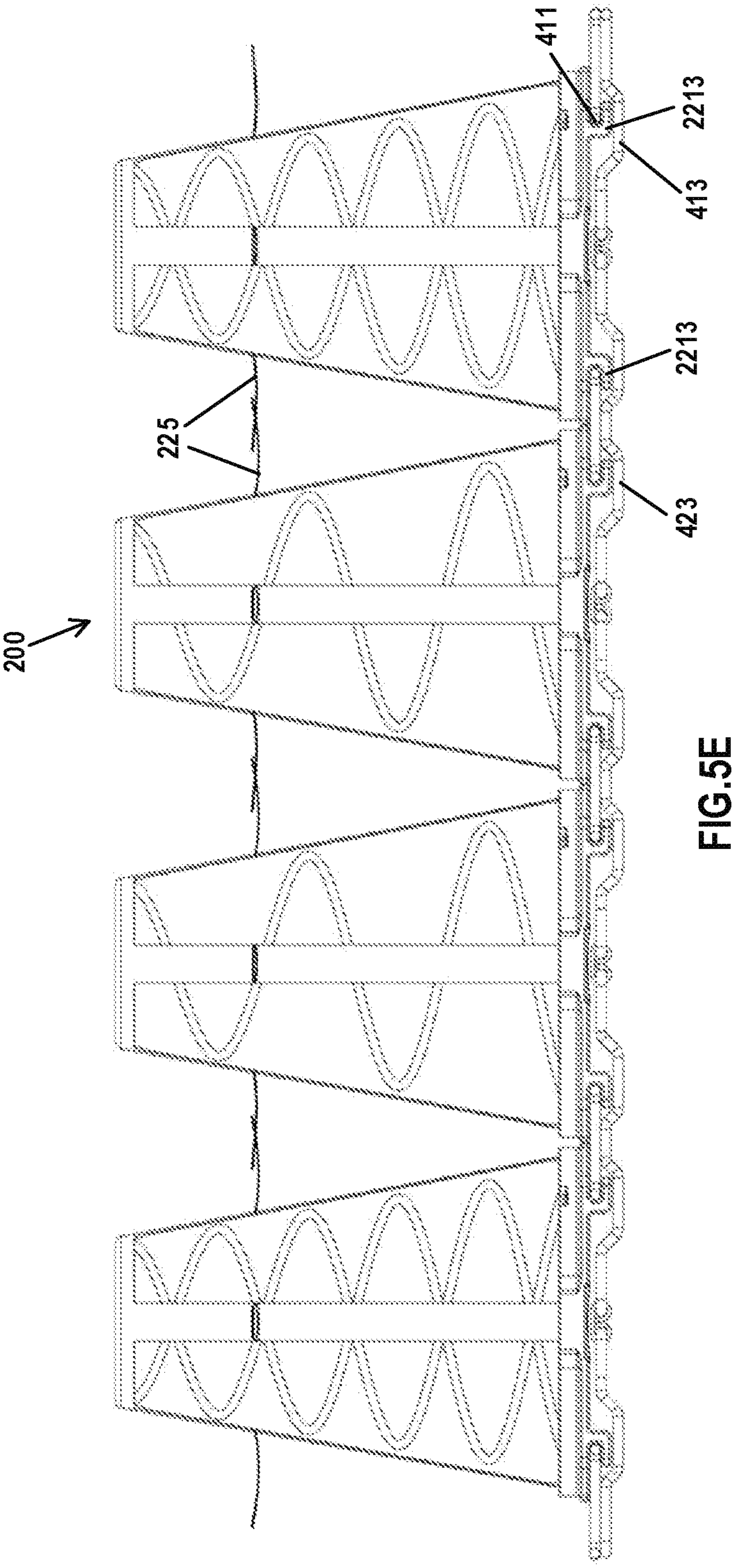
FIG. 5E schematically shows a partial front view when the spring modules in FIG. 5A is assembled to the mounting rack in FIG. 2.
Figure 5F:
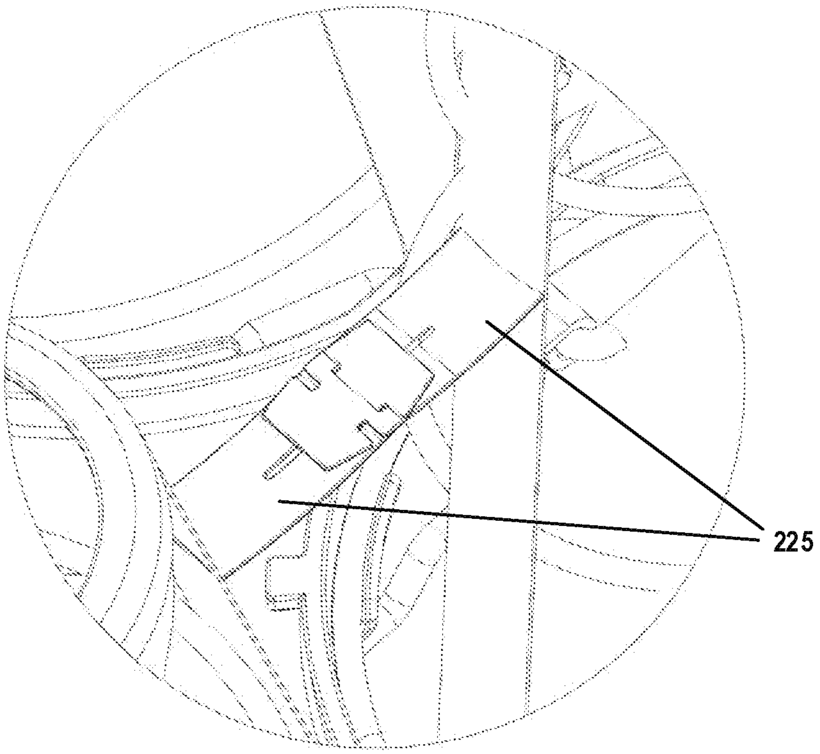
FIG. 5F exemplarily shows a condition in which a flexible connecting piece of the spring module in FIG. 5A is connected with the flexible connecting piece of an adjacent spring module.
Figure 5G:
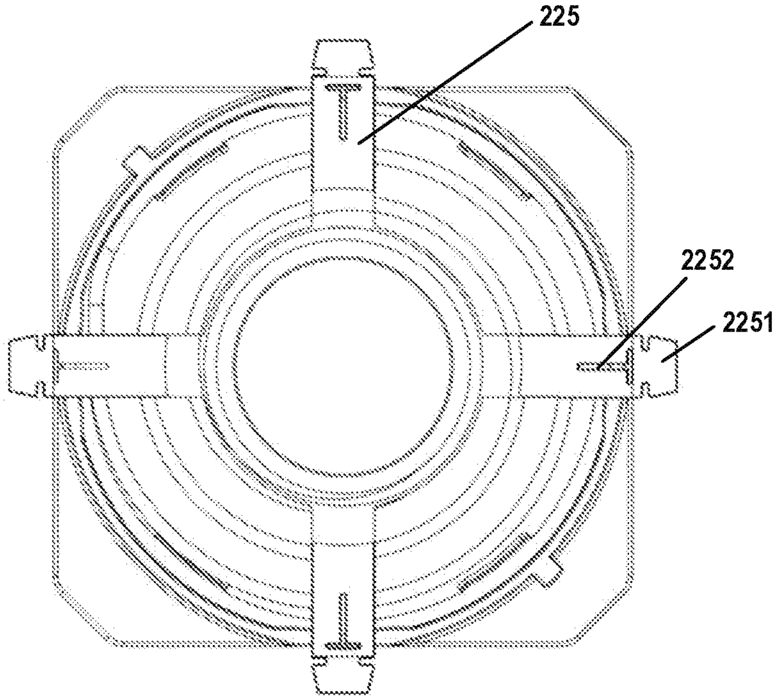
FIG. 5G exemplarily shows the flexible connecting piece of the spring module in FIG. 5A.

FIGS. 5E-5G exemplarily illustrate a flexible connecting piece structure that may be applied to the spring module 200, which may be used to form a connecting relationship between a plurality of spring modules mounted on the mounting rack, such that a single spring module is not easy to flip and fall over, and the springs of the plurality of spring modules are not easy to wind together. As shown in the figures, a flexible connecting piece 225 may be integrally formed on the outer side of the flexible strap 223, when the plurality of spring modules 200 are mounted onto the mounting rack, the flexible connecting piece 225 of one spring module can be detachably connected with the corresponding flexible connecting piece 225 of an adjacent spring module. Preferably, the flexible connecting piece 225 comprises a neck part 2251 and a T-shaped groove 2252, and the neck 2251 as well as the T-shaped groove 2252 are such designed that one of two adjacent flexible connecting pieces can be detachably locked in the T-shaped groove 2252 of the other flexible connecting piece through the neck 2251. More preferably, the vertical distance between the flexible connecting piece 225 and the end cover 222 is about ⅓ of the overall height of the spring module 200.

Figure 5H:
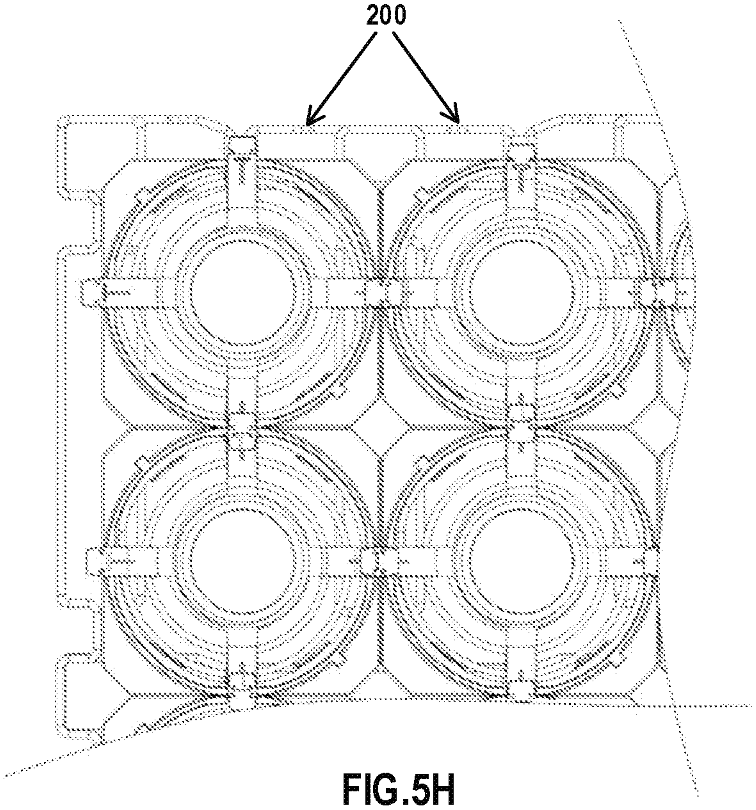
FIG. 5H exemplarily shows a condition in which the flexible connecting pieces of the spring module in 5A is connected with the flexible connecting pieces of adjacent spring modules when the spring module is mounted on the mounting rack.

FIG. 5H exemplarily shows that a plurality of spring modules 200 mounted on the mounting rack are connected with each other via flexible connecting pieces 225.

Those skilled in the art will know that the above-mentioned flexible connecting piece structure may also be applied to flexible straps of spring modules in other preferred embodiments of the present disclosure, such as the spring module 100 and the spring module 300 to be described below.

Figure 9A:
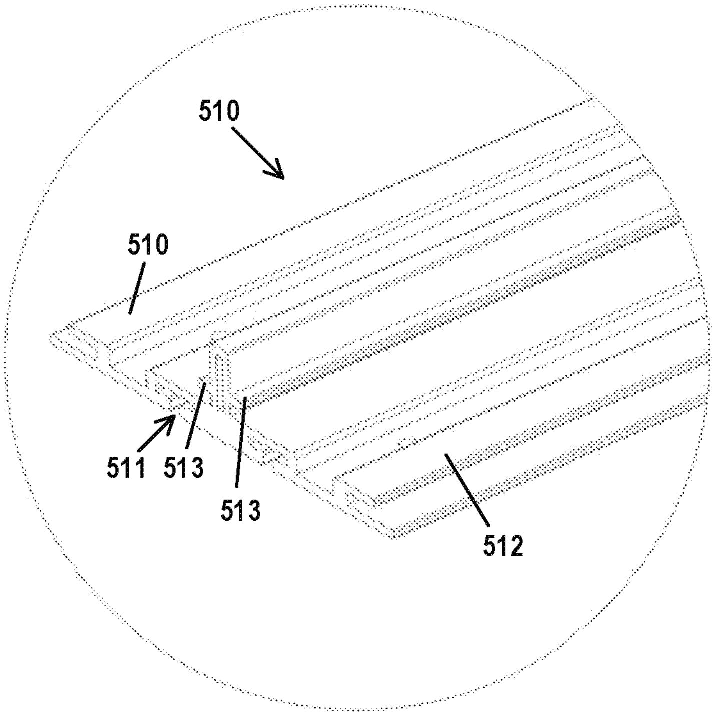
FIG. 9A exemplarily shows a partial perspective view of a longitudinally extending section bar of the mounting rack in FIG. 8.
Figure 9B:
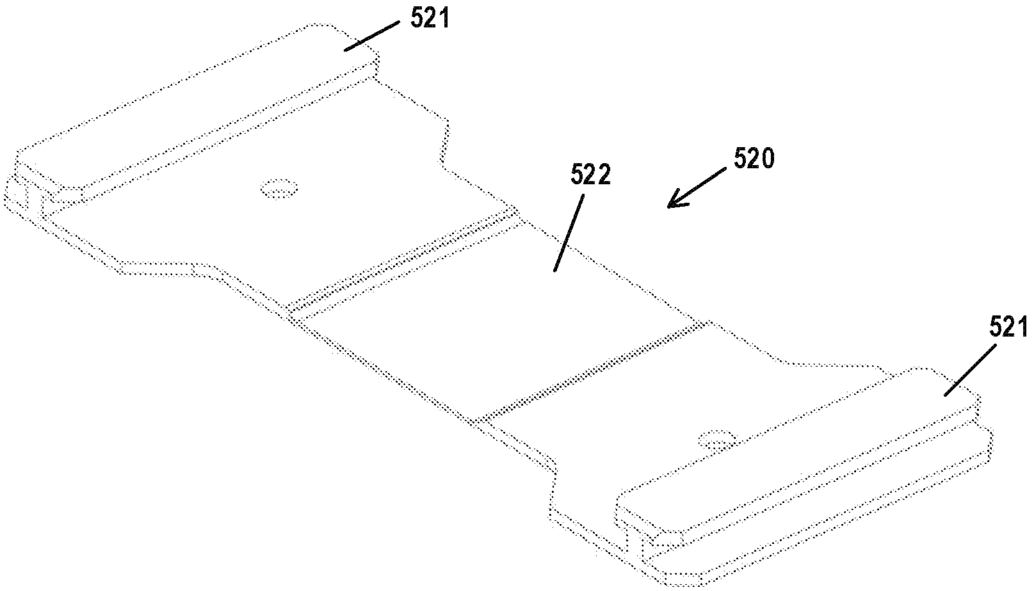
FIG. 9B exemplarily shows a perspective view of a flexible connector of the mounting rack in FIG. 8.
Figure 9C:
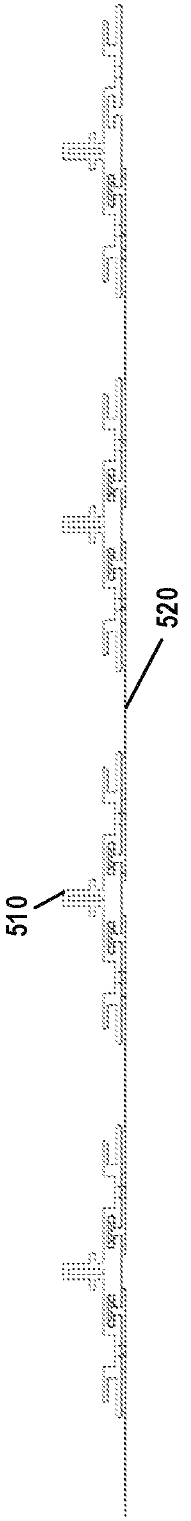
FIG. 9C exemplarily shows a partial front view of the mounting rack in FIG. 8 in an unfolded state.

FIGS. 8 and 9A-9D exemplarily illustrate a foldable mounting rack 500 according to a second preferred embodiment of the present disclosure. As shown in the figures, the mounting rack 500 comprises a plurality of longitudinally extending section bars 510 and a plurality of flexible connectors 520 positioned between the plurality of longitudinal section bars and configured to connect them together, a middle portion 522 of the flexible connector 520 is thin and can be bent to form a flexible hinge. Both the longitudinal section bar 510 and the flexible connector 520 may be made of plastic, and the longitudinal section bar 510 may be a plastic part formed by extrusion. As shown clearly in FIGS. 9A and 9B, the middle portion of the longitudinal section bar 510 is provided with two T-shaped grooves 511 with downward openings, and the top of the flexible connector 520 is provided with T-shaped projections 521 matching the shapes of the T-shaped grooves 511, and the T-shaped grooves 511 can slidably accommodate the T-shaped projections 521, thus enabling the plurality of longitudinal section bars 510 to be connected together through the flexible connectors 520, as shown in FIG. 9C.

Figure 9D:
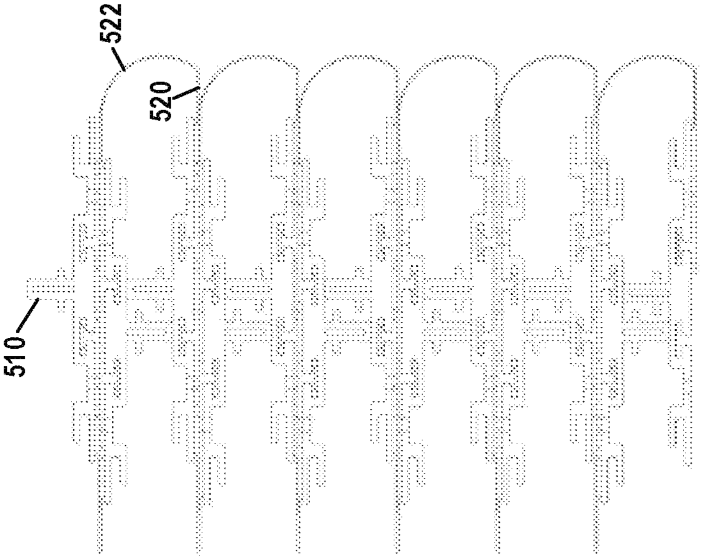
FIG. 9D exemplarily shows a front view of the mounting rack in FIG. 8 in a folded state.

Since the middle portion 522 of the flexible connector 520 is thin and can be bent, the mounting rack 500 is substantially foldable, and FIG. 9D shows the mounting rack 500 in a folded state.

As shown in FIGS. 9A and 9B, the longitudinal section bar 510 comprises a pair of first transverse projections 512 extending transversely and a pair of second transverse projections 513 provided above which, the distance between the pairs of first transverse projections 512 is greater than the distance between the pairs of second transverse projections 513.

FIGS. 10A to 10D exemplarily illustrate a spring module 300 according to a third preferred embodiment of the present disclosure. As shown in the figures, similar to the spring modules 100, 200, the spring module 300 comprises a spring bracket 320 and a conical spring 110 provided in the spring bracket 320. The spring bracket 320 is used to removably mount the spring module 300 onto the foldable mounting rack 500. The spring bracket 320 comprises a base 321, an end cover 322 and a plurality of flexible straps 323. In a preferred embodiment, the number of the flexible straps 323 is four, and the flexible straps 323 are uniformly distributed around the periphery of the spring bracket 320. The base 321 comprises a spring mounting seat, the center of which is provided with an opening 3211 at the center and a spring fixing part for fixing the conical spring 110, and the base 321 further comprises a module mounting part for removably mounting the spring module onto the mounting rack, the large-diameter end of the conical spring 110 is fixed to the spring fixing part while the small-diameter end of the conical spring 110 abuts against the end cover 322. In this preferred embodiment, the spring fixing part is configured to be an annular groove 3212 formed around the inner circumference of the opening 3211. The flexible straps 323 are provided outside the conical spring 110, and two ends of each flexible strap 323 are fixedly connected to the base 321 and the end cover 322, respectively. When the spring 110 is installed in the spring bracket 320, it may have a predetermined initial pressure, such that the spring module has a desired stiffness. With the support of the spring, the spring module 300 is substantially frustoconical.

As described above, the spring bracket 320 is substantially frustoconical, which enables the end cover 322 of the spring module 300 to enter into the interior of another spring module through the opening 3211 of the base 321 of the other spring module, thus forming nesting. In order to form a more stable nesting, the segmented threads and the snap structure of the bases 121, 221 of the spring modules 100, 200 may also be applied to the base 321 of the spring module 300.

Figure 11A:
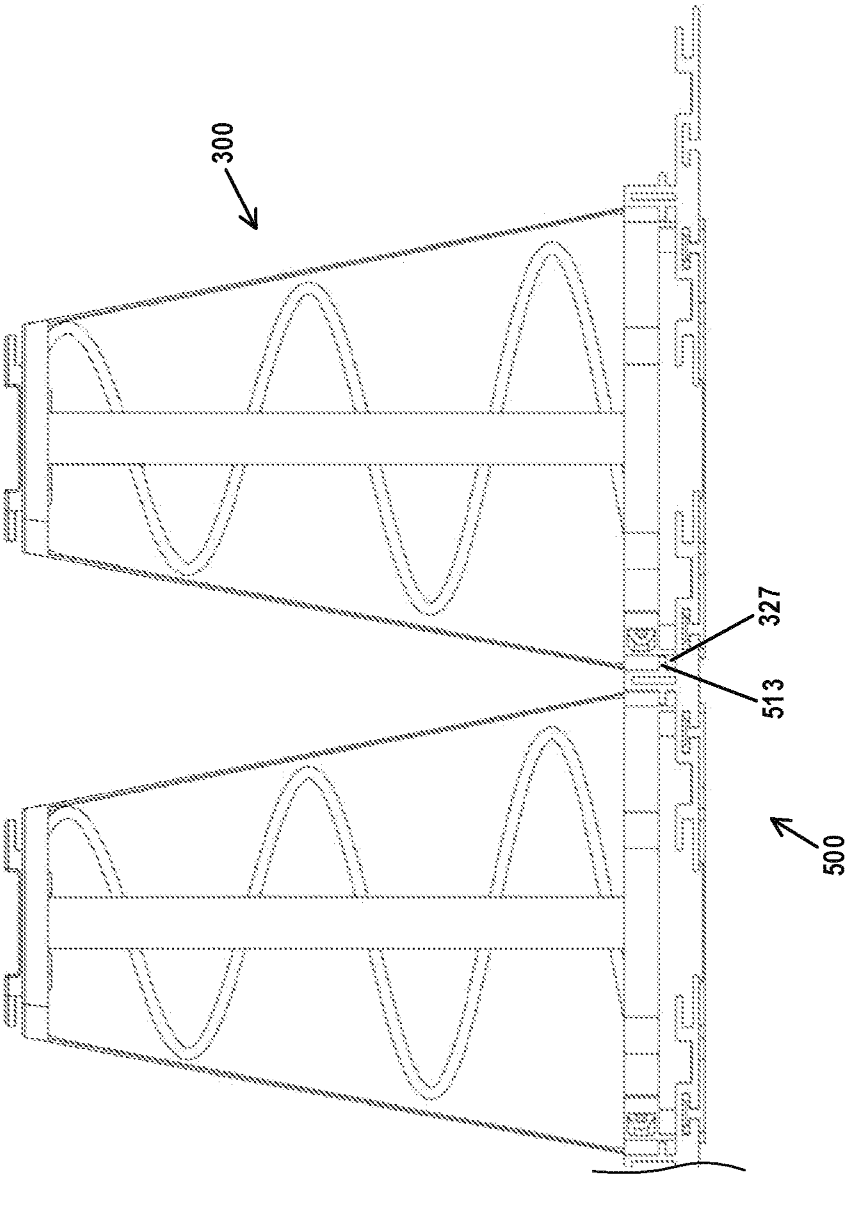
FIG. 11A exemplarily shows a partial front view of the spring module and the mounting rack in FIG. 8 in a first assembled state.
Figure 11B:
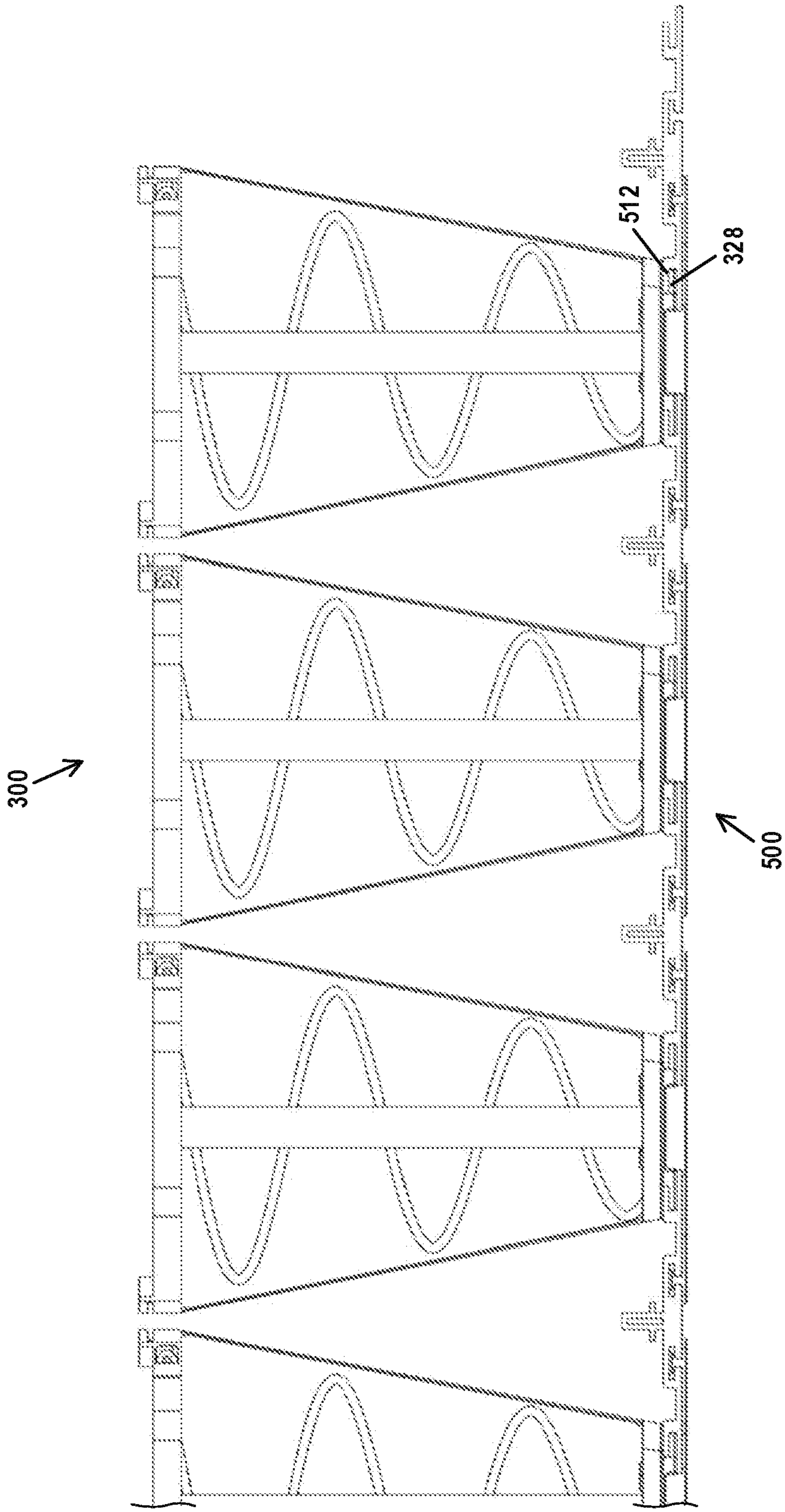
FIG. 11B exemplarily shows a partial front view of the spring module and the mounting rack in FIG. 8 in a second assembled state.
Figure 12A:
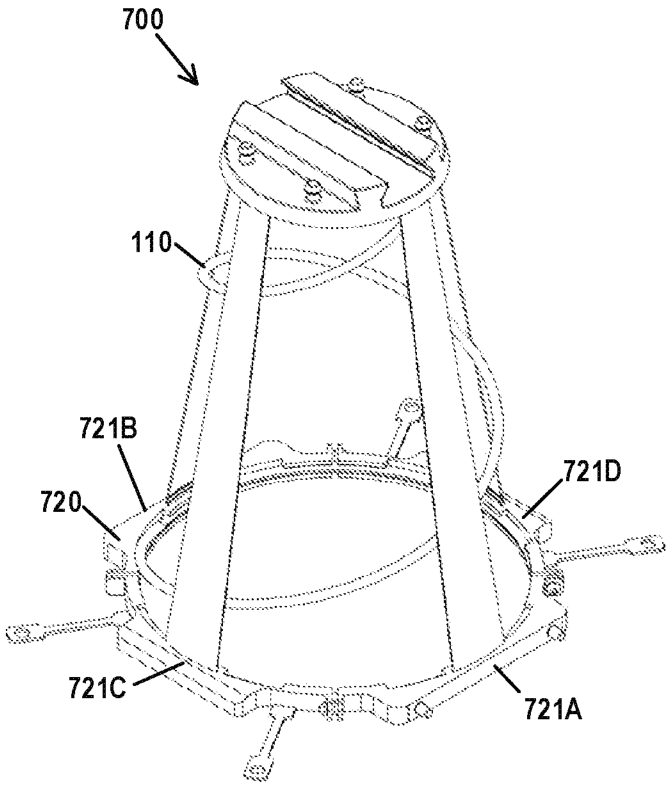
FIG. 12A exemplarily shows a perspective view of a spring module according to yet another preferred embodiment of the present disclosure.
Figure 12B:
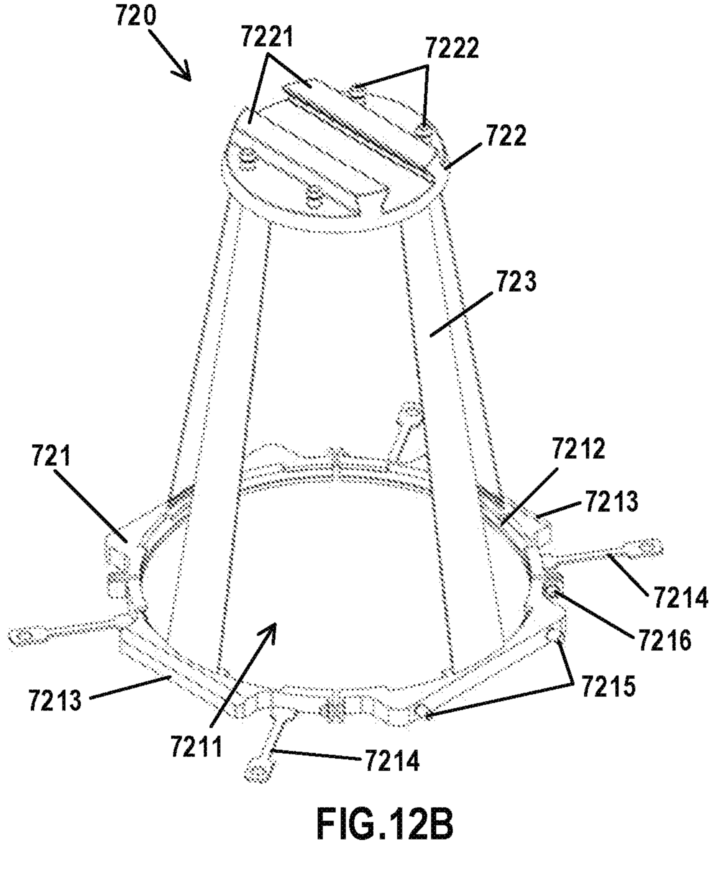
FIG. 12B exemplarily shows a perspective view of a spring bracket of the spring module in FIG. 12A.
Figure 12C:
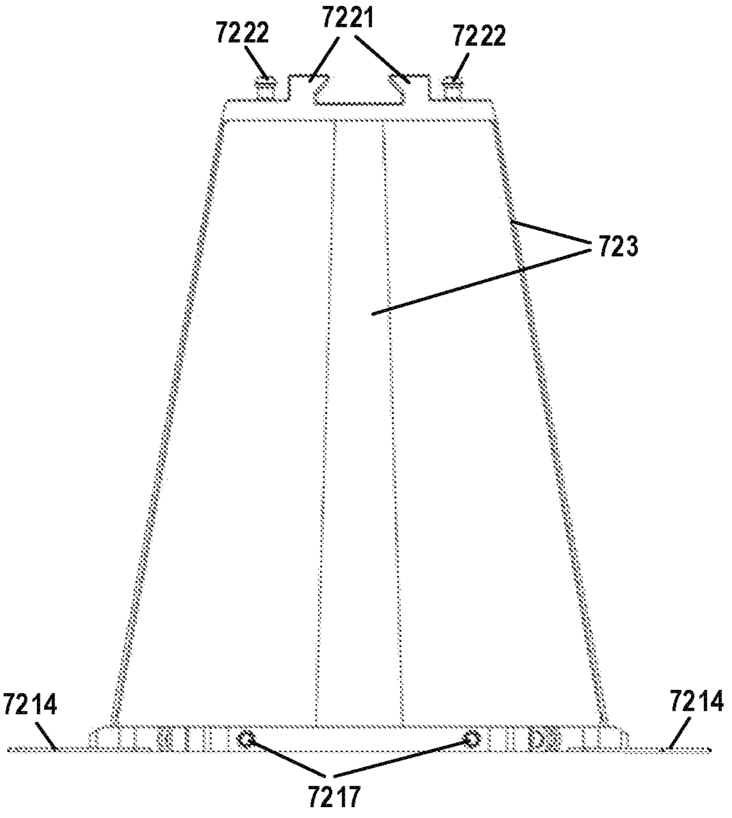
FIG. 12C exemplarily shows a front view of the spring bracket in FIG. 12A.
Figure 12D:
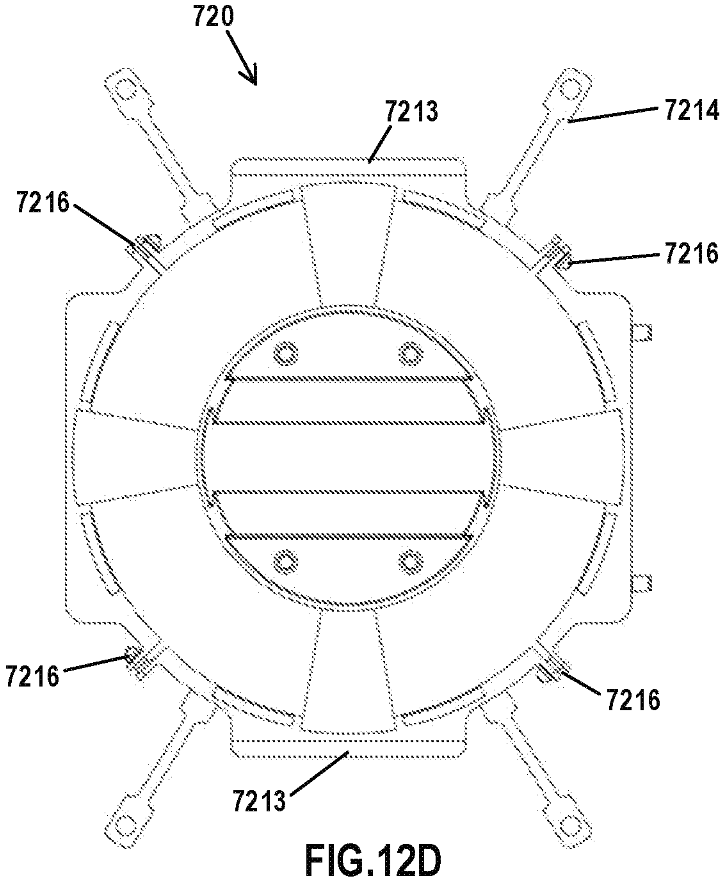
FIG. 12D exemplarily shows a top view of the spring bracket in FIG. 12A.
Figure 13A:
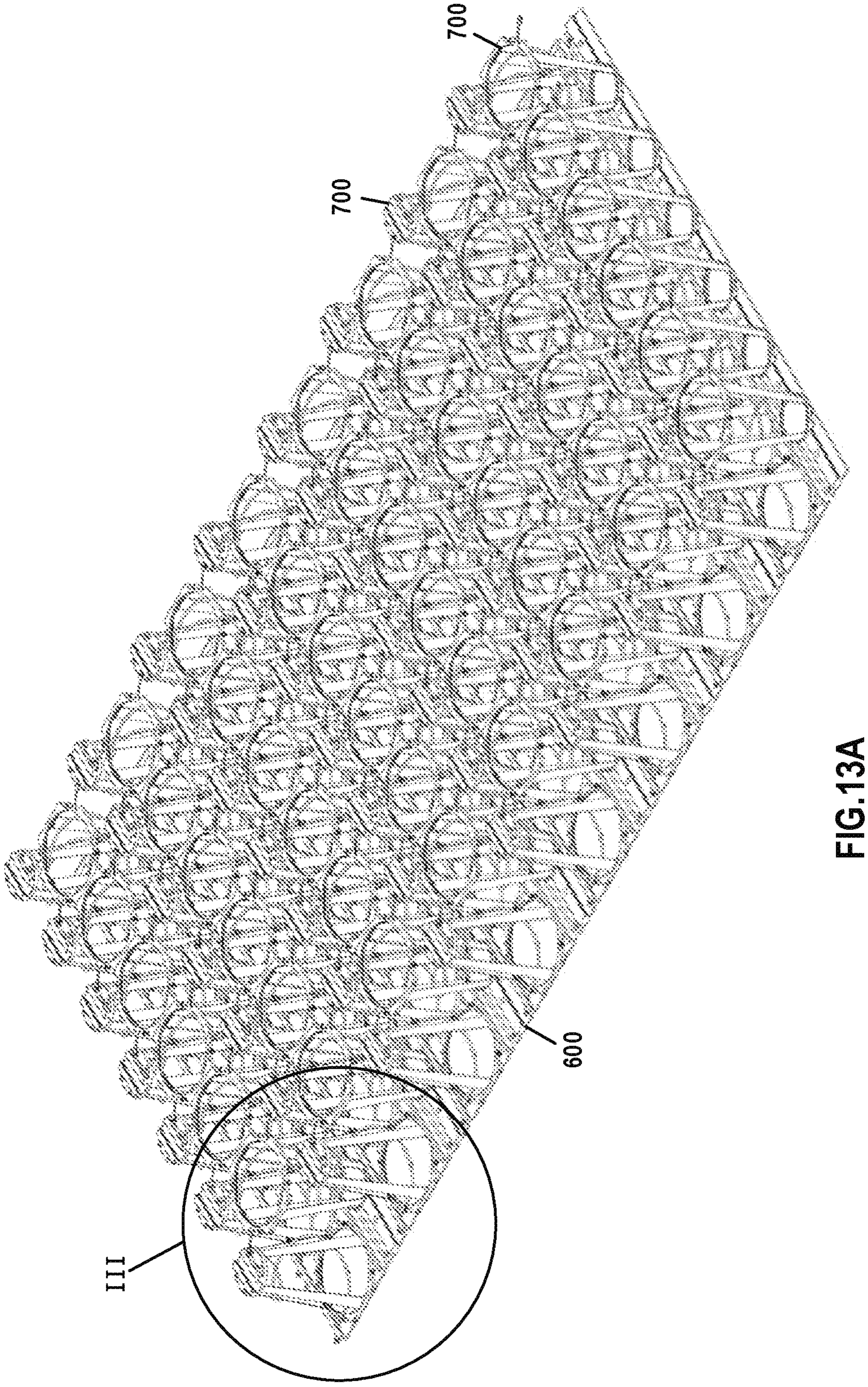
FIG. 13A exemplarily shows that the spring modules in FIG. 12A are assembled to a mounting rack.
Figure 13B:
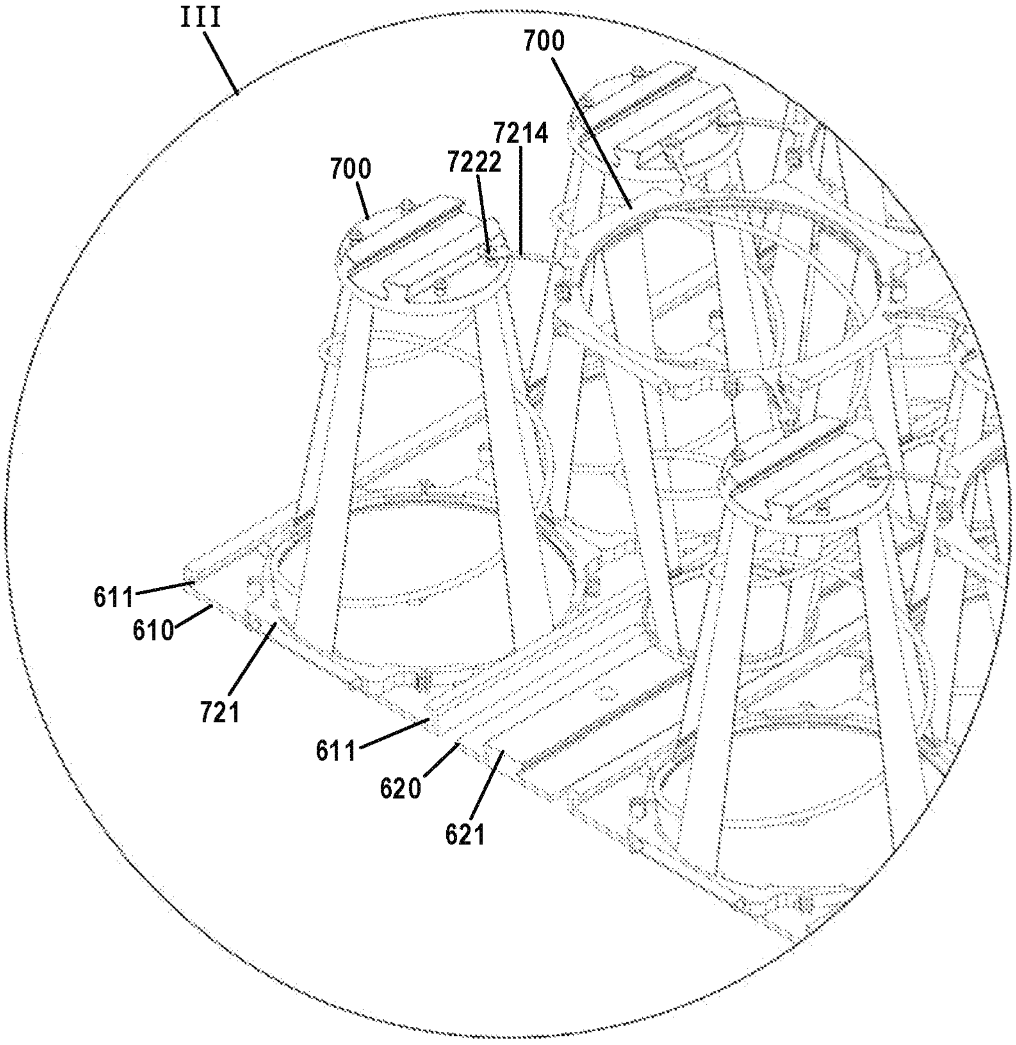
FIG. 13B exemplarily shows a partial enlarged view of part III in FIG. 13A.
Figure 13C:
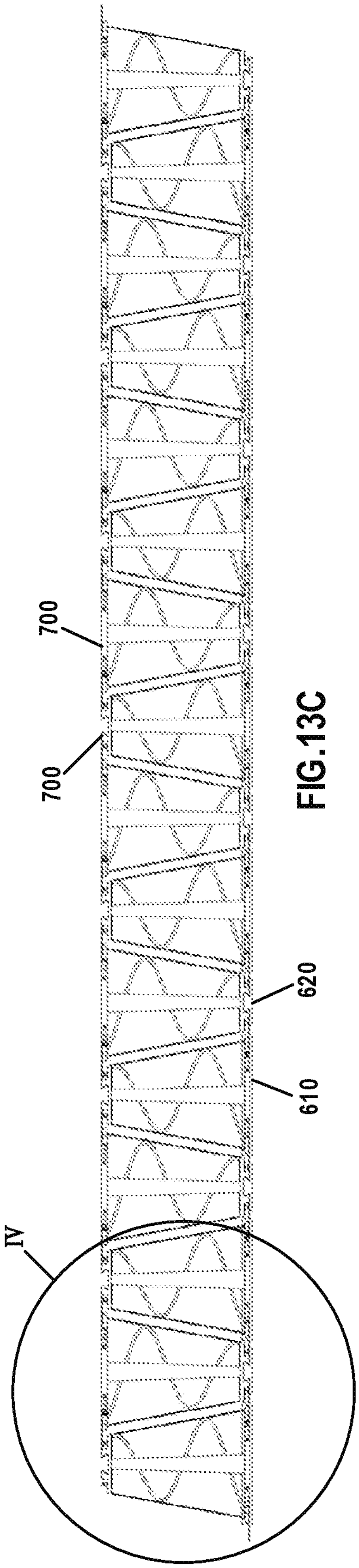
FIG. 13C schematically shows a partial front view when the spring modules in FIG. 13A is assembled to the mounting rack.
Figure 13D:
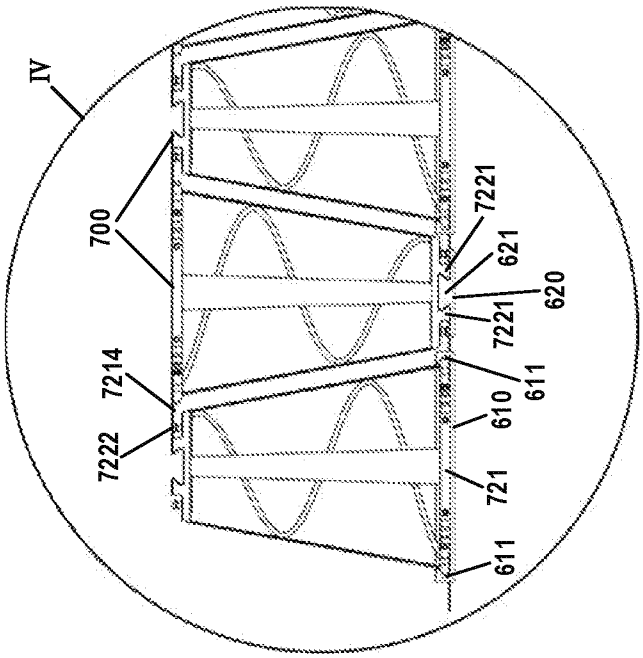
FIG. 13D exemplarily shows a partial enlarged view of part IV in FIG. 13C.

Preferably, the module mounting part of the spring module 300 comprises two slideways 327 parallel with each other arranged at the bottom of the base 321, through which the base 321 can be slidably mounted onto the slide rails of the mounting rack 500, i.e., the first transverse projections 512 of the longitudinal section bar 510. The slideways 327 at the bottom of the base 321 may be slidably cooperated with the first transverse projections 512, such that the spring module 300 may be mounted onto the mounting rack 500 through the base 321, as shown in FIG. 11A. Alternatively or additionally, the module mounting part of the spring module further comprises two slideways 328 arranged parallel to each other at the top of the end cover 322, which may be slidably cooperated with the slide rails of the longitudinal section bar 510, i.e., the second transverse projections 513, so that the spring module 300 may be mounted onto the mounting rack 500 through the end cover 322, as shown in FIG. 11B.

Figure 10A:
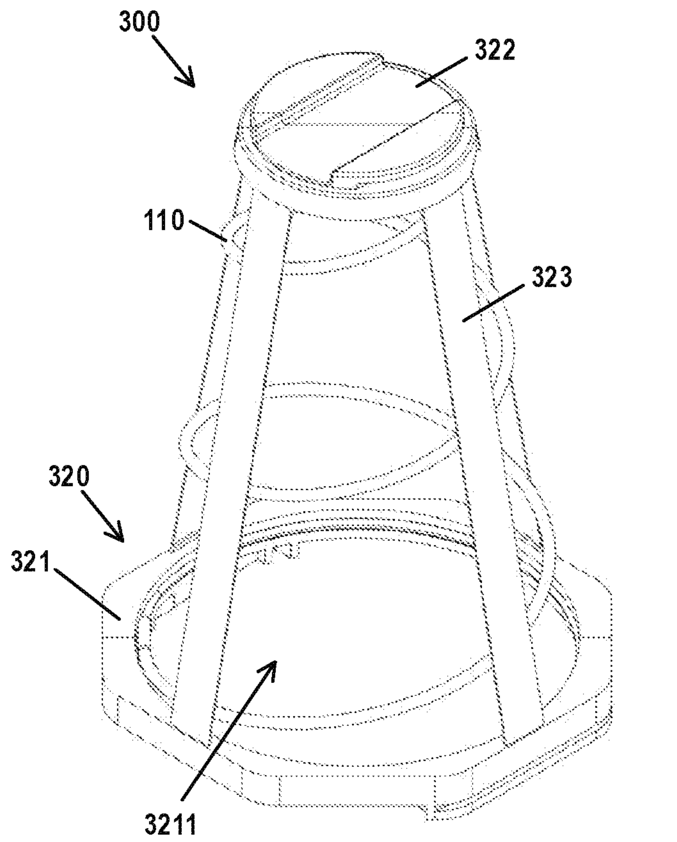
FIG. 10A exemplarily shows a perspective view of the spring module in FIG. 8.
Figure 10B:
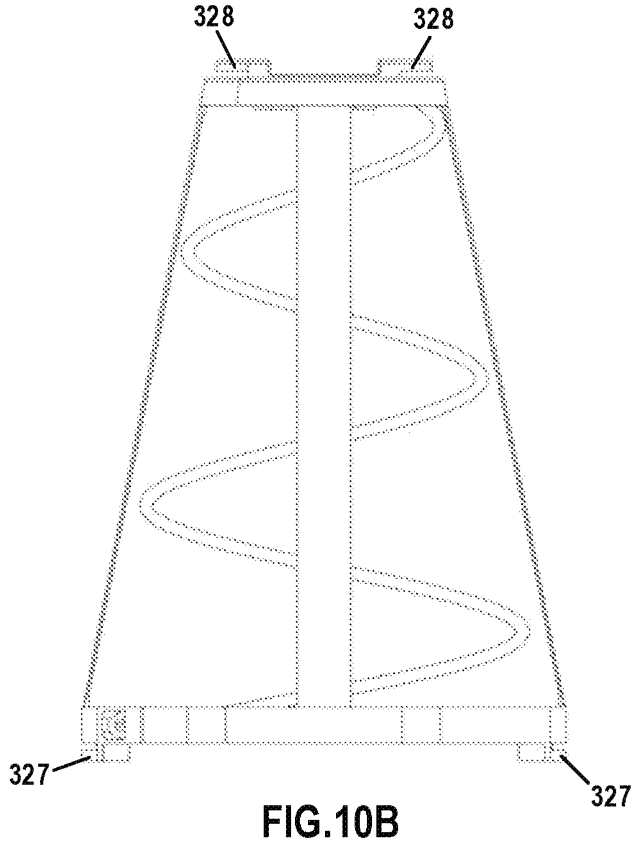
FIG. 10B exemplarily shows a front view of the spring module in FIG. 8.
Figure 10C:
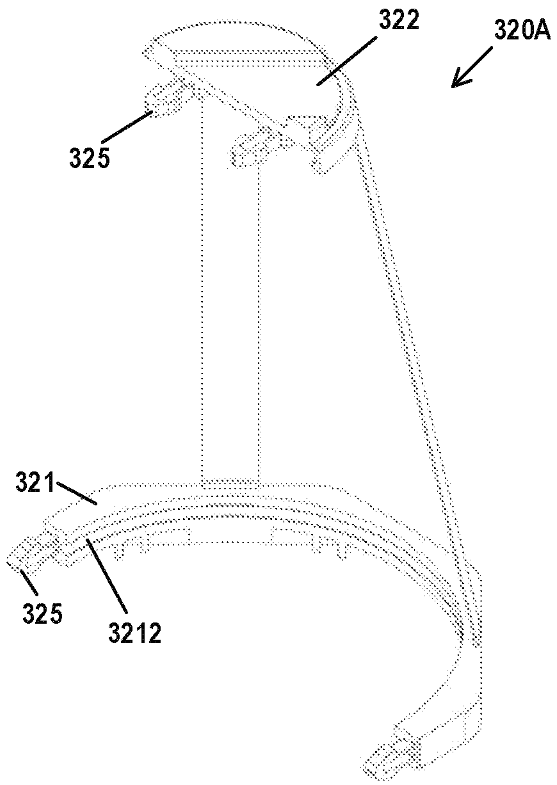
FIG. 10C exemplarily shows a first half of a spring bracket of the spring module in FIG. 10A.
Figure 10D:
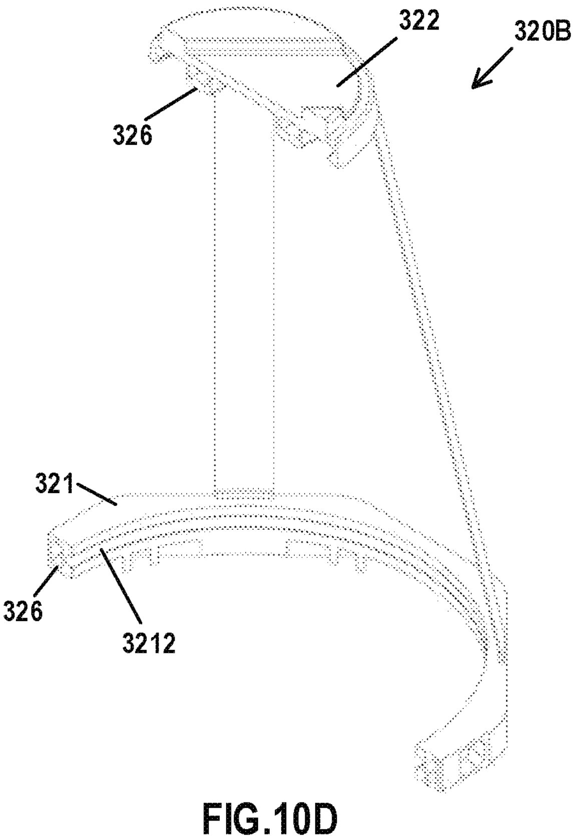
FIG. 10D exemplarily shows a second half of the spring bracket of the spring module in FIG. 10A.

Different from the spring modules 100 and 200, the spring bracket 320 of the spring module 300 is a two-piece spring bracket, which is removably assembled from a first half 320A as shown in FIG. 10C and a second half 320B as shown in FIG. 10D through a snap device such as a plug 325 and a socket 326. The first half 320A and the second half 320B respectively comprise one or more complete flexible straps 323, part of the base 321 and part of the end cover 322, and the first half 320A as well as the second half 320B are integrally formed. Preferably, the first half 320A and the second half 320B respectively comprise two complete flexible straps 323, a half base 321 and a half end cover 322.

FIGS. 12A to 12D exemplarily show a spring module 700 according to a fourth preferred embodiment of the present disclosure. As shown in the figures, the spring module 700 comprises a spring bracket 720, and a conical spring 110 provided in the spring bracket 720. The spring bracket 720 is used to detachably mount the spring module 700 onto the foldable mounting rack. The spring bracket 720 comprises a base 721, an end cover 722 and a plurality of flexible straps 723. In a preferred embodiment, the number of the flexible straps 723 is four, and the flexible straps 723 are uniformly distributed around the periphery of the spring bracket 720. The base 721 comprises a spring mounting seat, the center of which is provided with a circular opening 7211 and a spring fixing part 7212 for fixing the conical spring 110, and the base 721 further comprises a module mounting part 7213 for removably mounting the spring module onto the mounting rack, the large-diameter end of the conical spring 110 is fixed to the spring fixing part 7212 while the small-diameter end of the conical spring 110 abuts against the end cover 722. In various embodiments of the present disclosure, the spring fixing part may be a hook part or a groove. In the present embodiment, the spring fixing part is a groove 7212 arranged around the inner circumference of the circular opening 7211. The flexible straps 723 are provided outside the conical spring 110, and two ends of each flexible strap 723 are fixedly connected to the base 721 and the end cover 722, respectively. When the spring 110 is installed in the spring bracket 720, it may have a predetermined initial pressure, such that the spring module has a desired stiffness. With the support of the spring, the spring module 700 is substantially frustoconical.

As mentioned above, the spring bracket 720 is substantially frustoconical, which enables the end cover 722 of the spring module 700 to enter into the interior of another spring module through the circular opening 7211 of the base 721 of the other spring module, thus forming nesting.

Preferably, the spring bracket 720 is a one-piece spring bracket formed integrally, as shown in FIGS. 12A-12D, the base 721 of the spring bracket 720 is configured as four parts splicing together, namely a first part 721A, a second part 721B, a third part 721C and a fourth part 721D, wherein the second part 721B is arranged parallel to and opposite to the first part 721A, the third part 721C is arranged adjacent to the first part 721A and is transversely to the first part 721A, and the fourth part 721D is arranged parallel to and opposite to the third part 721C, and further adjacent to the first part 721A as well as the second part 721B. At least one flexible strap 723 is fixedly connected at the top surface of each of said four parts, and the four parts may be detachably butted mutually through a locking device 7216 to form the base 721.

Preferably, the module mounting part 7213 is configured as two slideways 7213 parallel with each other formed at the outer sides of the third part 721C and the fourth part 721D of the base 721, such that the base 721 may be slidably assembled onto the mounting rack 600 through the sliding fit between the slideways 7213 and the slide rails 611 of the mounting rack 600 (which will be described below), that is, the spring module 700 may be assembled onto the mounting rack with its thick end down. In addition, the top surface of the end cover 722 is further provided with two second slideways 7221 parallel to the slideways 7213, so that the end cover 722 may be slidably assembled onto the mounting rack 600 through the sliding fit between the slideways 7221 and the sliding rails 621 of the mounting rack 600, that is, the spring module 700 may be assembled onto the mounting rack 600 with its thin end down.

Preferably, in order to enable the relative positions among a plurality of spring modules 700 to be more stable and not easy to be dislocated, flexible connecting belts 7214 are respectively arranged at both sides of the ends of the slideways 7213 positioned at the outer sides of the third part 721C and the fourth part 721D of the base 721, the ends of the flexible connecting belts 7214 are provided with holes, and on the top surface of the end cover 722, two projections 7222 are respectively provided outside each slideway 7221. When a plurality of spring modules 700 are mounted onto the mounting rack 600, the plurality of spring modules 700 may be mounted onto the mounting rack 600 with the thick end down and the thin end down successively at intervals in order to take full advantage of space. The flexible connecting belts 7214 of one spring module 700 mounted onto the mounting rack 600 through the end cover 722 (with the thin end down) may be snapped to the projections 7222 of another adjacent spring module 700 mounted onto the mounting rack 600 through the base 721 (with the thick end down), thereby enabling the relative positions among the plurality of spring modules 700 to be more stable.

More preferably, in order to further enable the relative positions among the spring modules 700 assembled in the same orientation to be more stable and prevent them from being dislocated, at least one cylindrical pin 7215 (two in the figures) is arranged at the outer side of the first part 721A of the base 721, and at least one receiving hole 7217 (two in the figures) is arranged at the corresponding position of the outer side of the second part 721B of the base 721. When the plurality of spring modules 700 are mounted onto the mounting rack 600 in rows, the cylindrical pin 7215 of one spring module 700 may be inserted into the corresponding receiving hole 7217 of the adjacent spring module 700 so as to assist alignment and fixation.

FIGS. 13A to 13D exemplarily show a foldable mounting rack 600 according to a third preferred embodiment of the present disclosure. As shown in the figures, the mounting rack 600 comprises a plurality of longitudinally extending first section bars 610 and a plurality of longitudinally extending second section bars 620, wherein the first section bar 610 comprises a longitudinally extending flat body and longitudinally extending slide rails 611 on both transverse sides of the flat body, and the second section bar 620 comprises a longitudinally extending flat body and a longitudinally extending slide rail 621 located in the middle of the top surface of the flat body. The first section bars 610 and the second section bars 620 are arranged at intervals along the transverse direction and connected together through a plurality of flexible connectors, which can be bent thus allowing the mounting rack 600 to be foldable.

Furthermore, the base 721 of the spring module 700 may be slidably mounted onto the mounting rack 600 through the sliding fit between the slideways 7213 and the slide rails 611, and the end cover 722 of the spring module 700 may be slidably mounted onto the mounting rack 600 through the sliding fit between the slideways 7221 and the slide rails 621. The longitudinal section bars 610, 620 as well as the flexible connectors may all be made of plastic, and the longitudinal section bars 610, 620 may be plastic parts formed by extrusion. As clearly shown in FIG. 13D, the cross-sectional shape of the slide rails 621 is substantially inverted trapezoidal, and the shape of the gap between two slide rails 7221 corresponds to the cross-sectional shape of the slide rails 621, such that the spring module 700 mounted with the thin end down is impossible to move in the direction perpendicular to the mounting rack 600. Similarly, the slide rail 611 is a hook part, which prevents the spring module 700 mounted with the thick end down from moving in the direction perpendicular to the mounting rack 600.

The spring module described in the above embodiments only comprises a single conical spring, and the spring module according to the present disclosure may also comprise a plurality of conical springs, in this way, the assembly and disassembly times of the spring modules in the spring cushion may be reduced.

FIGS. 14A to 14E exemplarily show a spring module 5000 according to a fifth preferred embodiment of the present disclosure. As shown in the figures, the spring module 5000 comprises a spring bracket 5220 and three conical springs 110 arranged in rows in the spring bracket 5220. The spring bracket 5220 may be used to detachably mount the spring module 5000 onto the mounting rack of the spring cushion. The spring bracket 5220 comprises a common base 5221, a plurality of end covers 5222 and a plurality of flexible straps 5223, wherein two ends of each flexible strap 5223 are fixedly connected to the base 5221 and a corresponding end cover 5222, respectively, in a preferred embodiment, each end cover 5222 is connected with four flexible straps 5223 which are uniformly distributed around the outer side of the corresponding conical spring 110. The base 5221 comprises three spring mounting seats, each of which has a spring fixing part 52212 for fixing the conical spring 110, and a module mounting part 52213 for removably mounting the spring module onto the mounting rack. Each end cover 5222 together with the plurality of flexible straps 5223 connected thereto are configured as substantially frustoconical as a whole, and the internal shape of which matches the shape of the conical spring 110. Each end cover 5222 forms a frustoconical-shaped small-diameter end, and the corresponding spring mounting seats of the base 5221 form a plurality of frustoconical-shaped large-diameter ends, the base 5221 has an opening 52211 at the central position of each large-diameter end, such that a plurality of end covers 5222 as well as most or all flexible straps 5223 of another spring module 5000 may enter into the interior of said spring module 5000 via the corresponding openings 52211 thus forming nesting. The large-diameter end of the conical spring 110 is fixed to the spring fixing part 52212 of the corresponding spring mounting seat while the small-diameter end of the conical spring 110 abuts against the end cover 5222. In this preferred embodiment, the spring fixing part 52212 is configured as a plurality of hook parts 52212 uniformly arranged around the inner circumference of the opening 52211. The flexible straps 5223 are arranged outside the conical spring 110, and two ends of each flexible strap 5223 are fixedly connected to the base 5221 and the corresponding end cover 5222, respectively. When the spring 110 is installed in the spring bracket 5220, it may be provided with a predetermined initial pressure, such that the spring module has a desired stiffness. The center of the end cover 5222 of the spring bracket 5220 may be provided with a circular opening 5224, that is, the end cover 5222 may be an annular end cover.

Preferably, the spring bracket 5220 is a one-piece spring bracket formed integrally.

Figure 15:
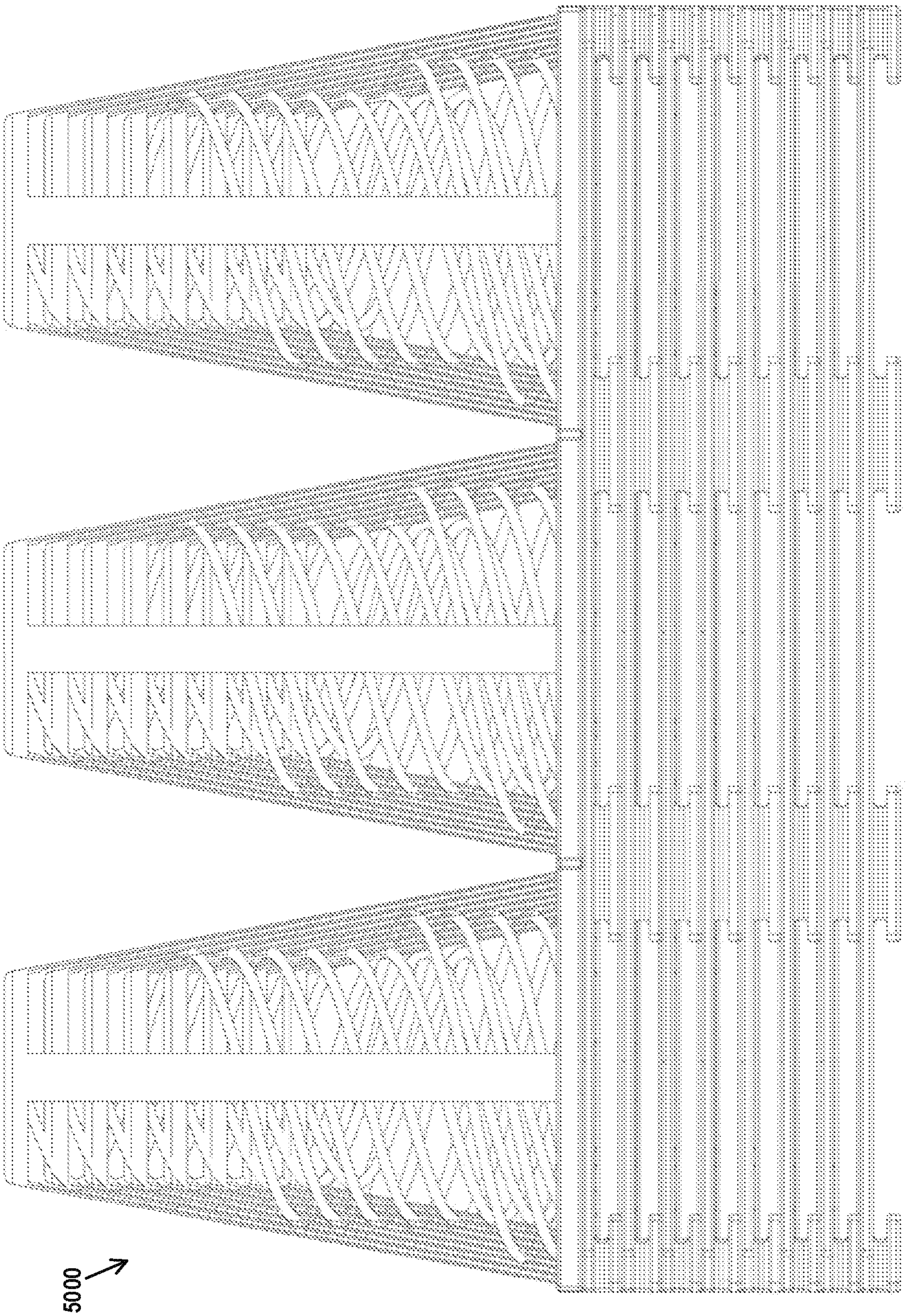
FIG. 15 exemplarily shows a condition when a plurality of the spring modules in FIG. 14A are stacked and nested together.

As described above, the spring bracket 5220 presents a plurality of substantially frustoconical shapes, which enables the end covers 5222 of the spring module 5000 to enter into the interior of another spring module through the openings 52211 of the base 5221 of the other spring module thus forming nesting, as shown in FIG. 15.

Figure 14A:
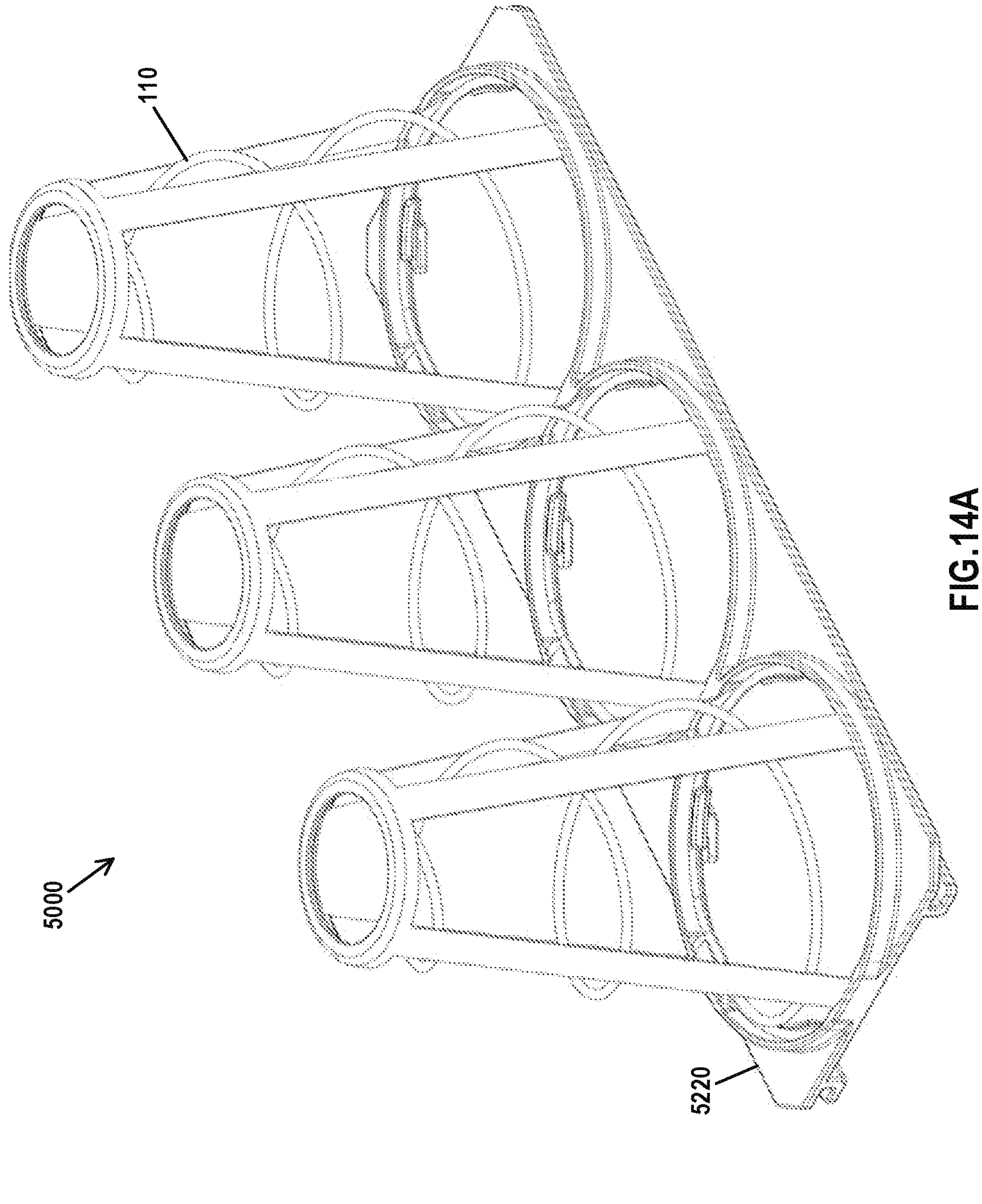
FIG. 14A exemplarily shows a perspective view of a spring module according to yet another preferred embodiment of the present disclosure.
Figure 14B:
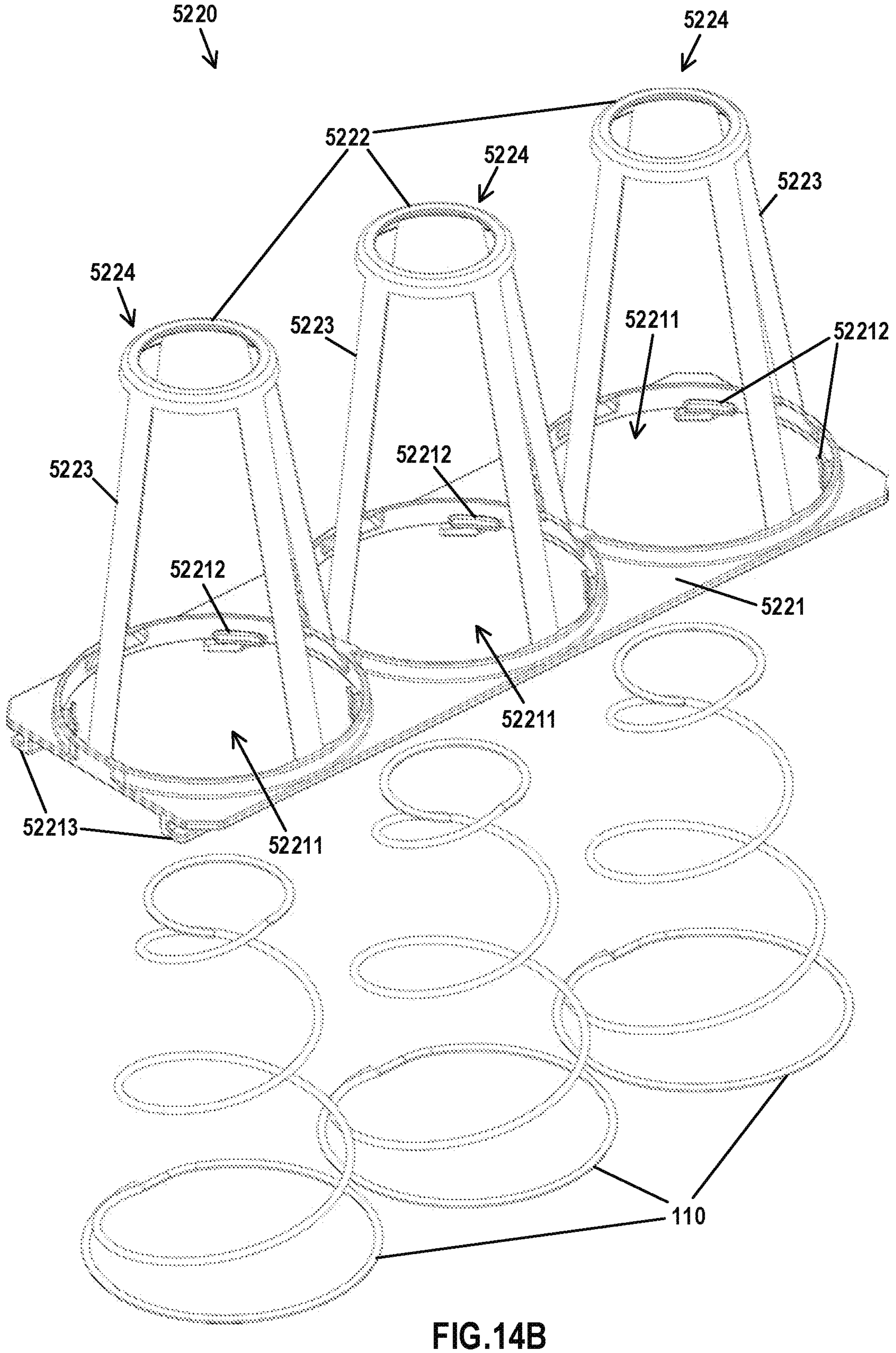
FIG. 14B exemplarily shows an exploded view of the spring module in FIG. 14A.
Figure 14C:
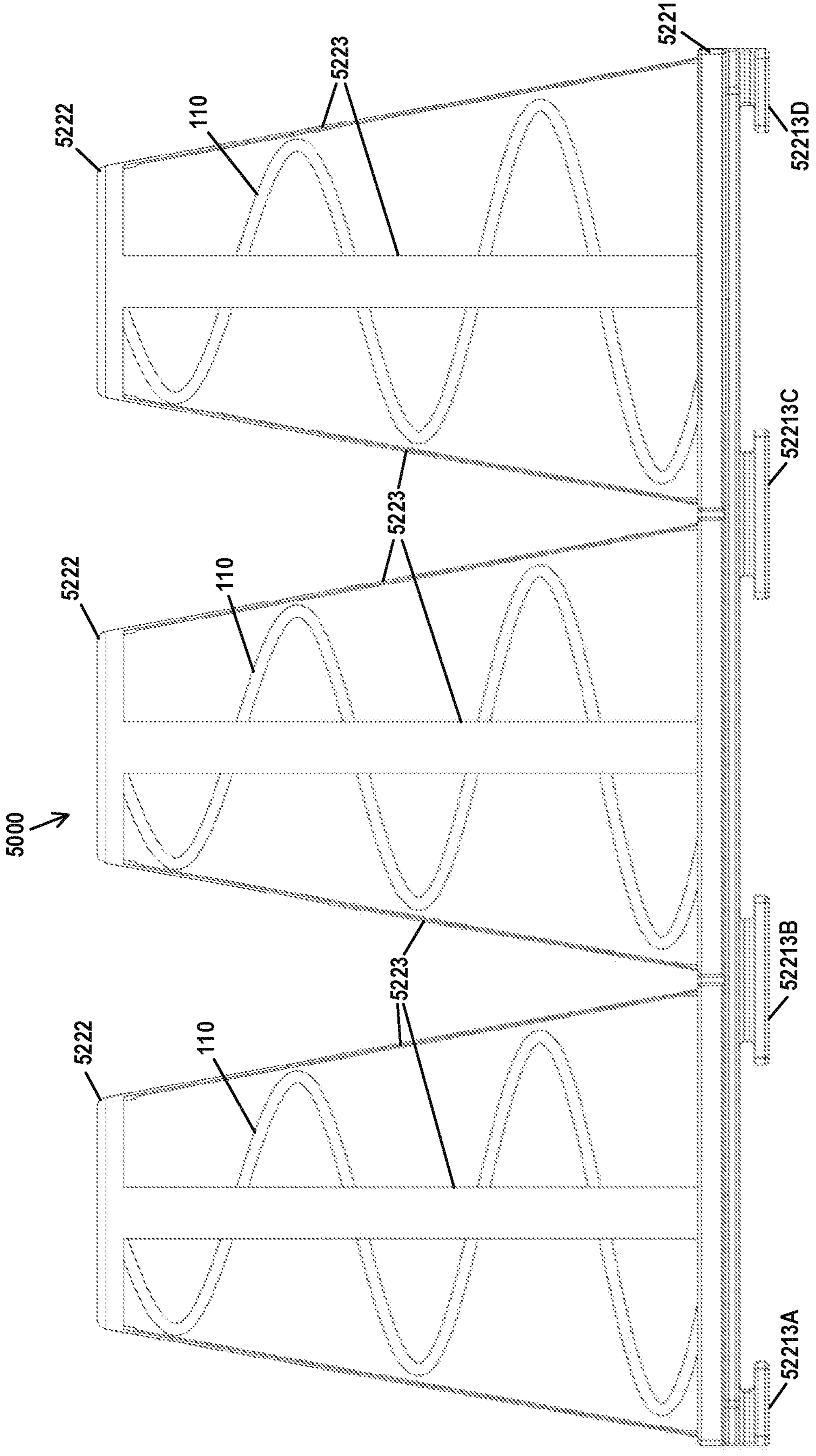
FIG. 14C exemplarily shows a front view of the spring module in FIG. 14A.
Figure 14D:
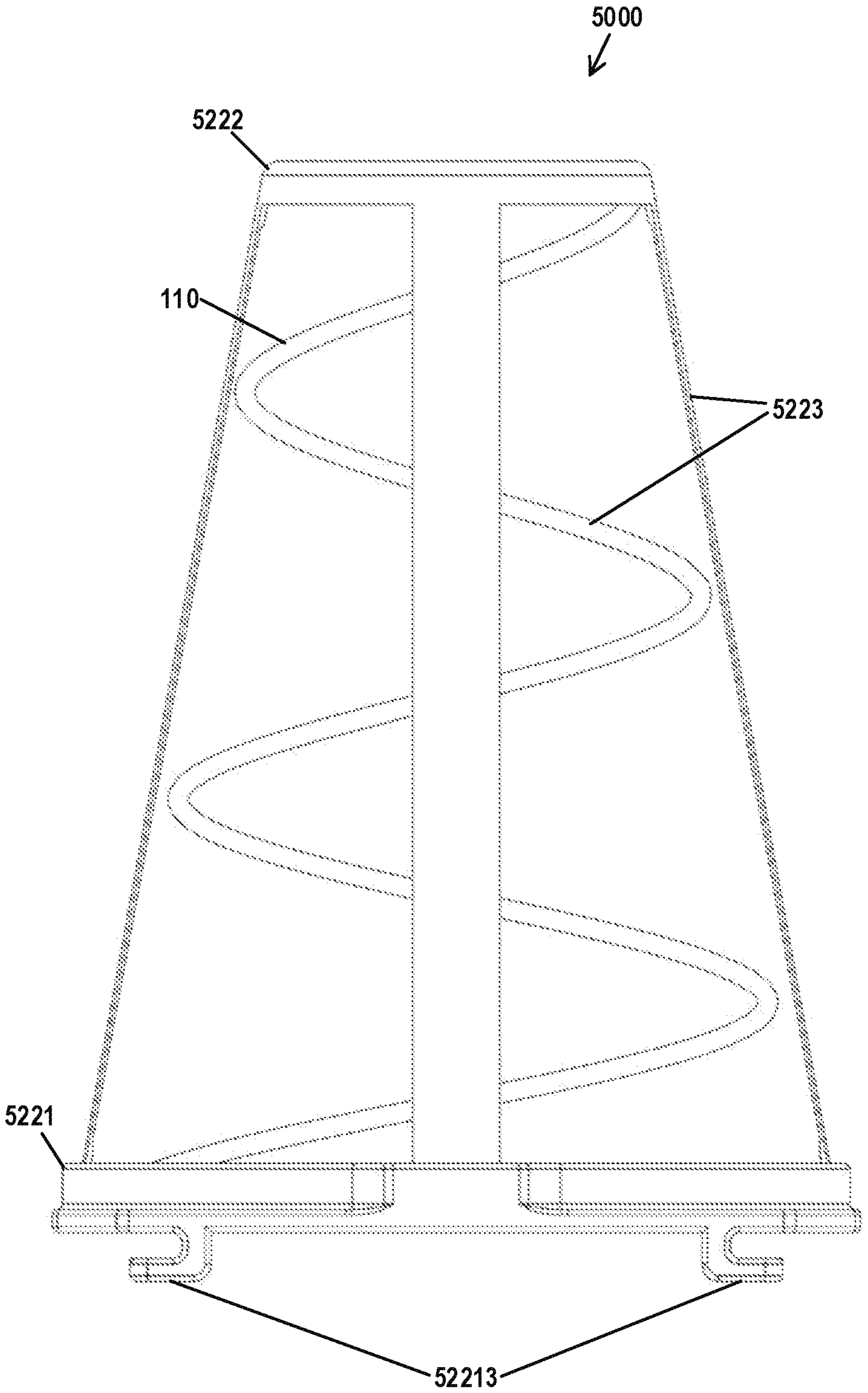
FIG. 14D exemplarily shows a side view of the spring module in FIG. 14A.
Figure 14E:
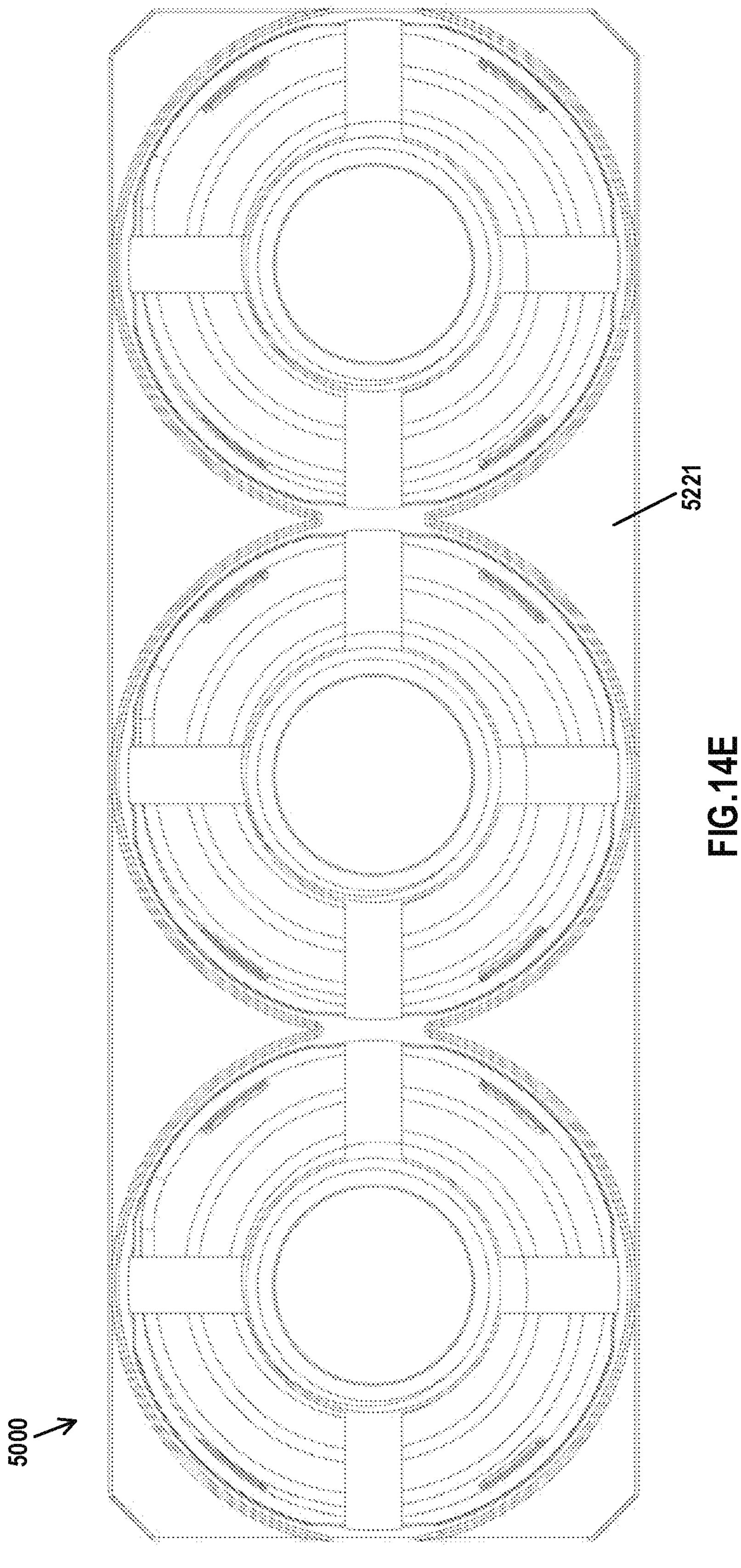
FIG. 14E exemplarily shows a top view of the spring module in FIG. 14A.

Preferably, the module mounting part of the spring module 5000 is configured as one or more pairs of parallel slideways 52213 arranged at the bottom surface of the base 5221. In the embodiment shown in FIGS. 14A-14E, the opening directions of the pair of slideways 52213 face with each other, as an alternative embodiment, the opening directions of each pair of slideways 52213 may also face away from each other. The base 5221 may be slidably mounted onto the mounting rack of the spring cushion through the slideways 52213. In the present embodiment, as shown in FIG. 14C, each slideway 52213 may be configured as segmented slideways which are discontinuous in-between, corresponding to the number of the conical springs 110 and the openings 52211 along the extending direction of the slideway 52213, in the present embodiment, each slideway 52213 comprises four segments 52213A, 52213B, 52213C and 52213D, and the purpose of segmentation is to prevent the slideways 52213 from interfering with the openings 52211, and further to reduce the size of the base 5221. The slideways 52213 are hook parts, which are configured to be hooked onto the slide rails of the mounting rack so as to prevent the spring module 5000 from being separating from the mounting rack.

Figure 16:
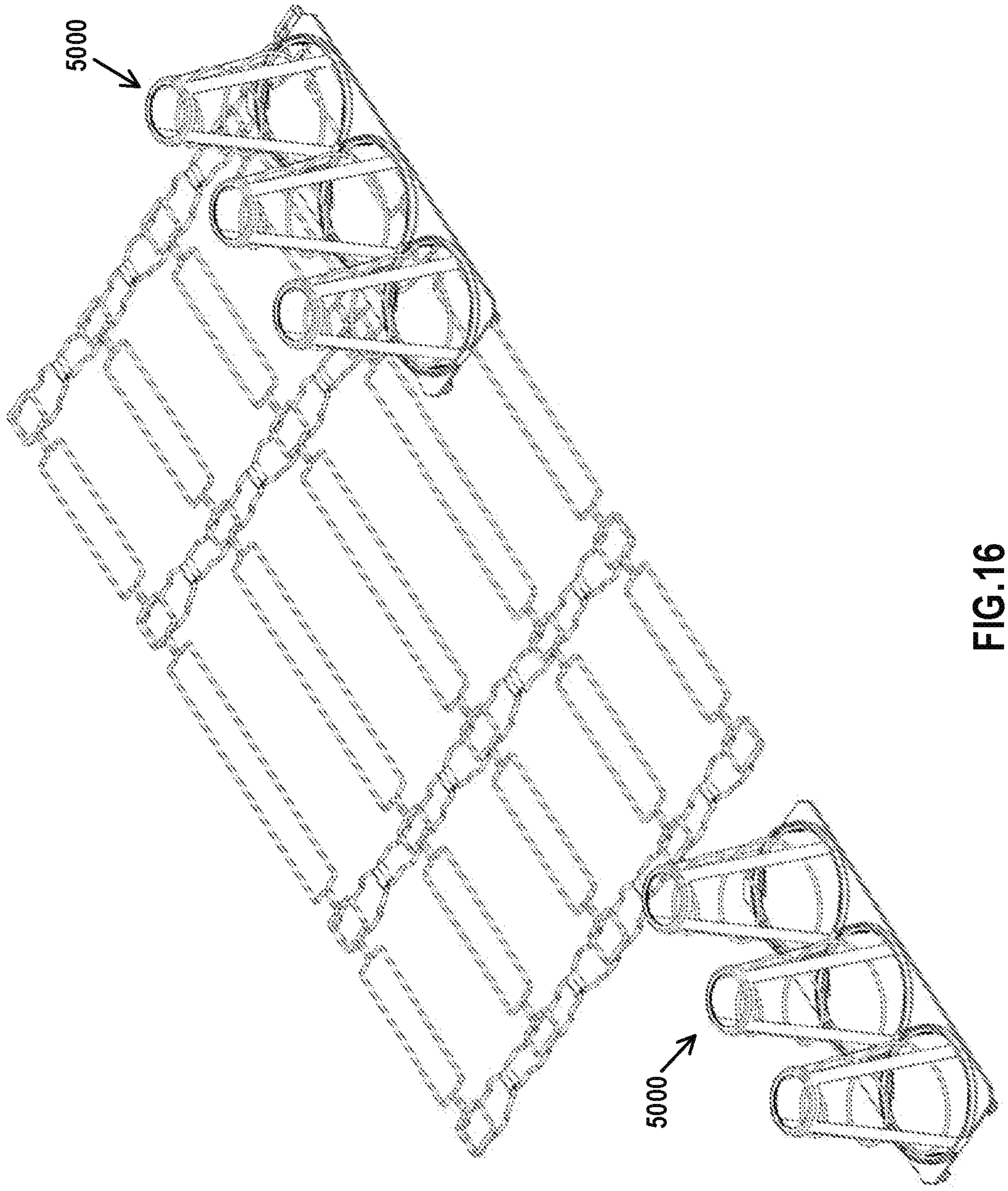
FIG. 16 exemplarily shows that the spring modules in FIG. 14A are assembled to a mounting rack of a spring cushion.

FIG. 16 exemplarily shows a condition when the spring modules 5000 having a plurality of conical springs 110 are mounted onto a mounting rack of a spring cushion.

FIGS. 17A-17E exemplarily show a spring module 6000 according to a sixth preferred embodiment of the present disclosure. As shown in the figures, the spring module 6000 comprises a spring bracket 6220 and four conical springs 110 distributed in an array manner arranged in the spring bracket 6220. The spring bracket 6220 may be used to removably mount the spring module 6000 onto the mounting rack of the spring cushion. The spring bracket 6220 comprises a common base 6221, a plurality of end covers 6222 and a plurality of flexible straps 6223, wherein two ends of each flexible strap 6223 are fixedly connected to the base 6221 and a corresponding end cover 6222, respectively. In a preferred embodiment, each end cover 6222 is connected with four flexible straps 6223 which are uniformly distributed around the outer side of the corresponding conical spring 110. The base 6221 has four spring mounting seats, each of which has a spring fixing part 62212 for fixing the conical spring 110, and a module mounting part 62213 for removably mounting the spring module onto the mounting rack. Each end cover 6222 and the plurality of flexible straps 6223 connected thereto are configured as substantially frustoconical as a whole, and the internal shape of which matches the shape of the conical spring 110. Each end cover 6222 forms a frustoconical-shaped small-diameter end, and the corresponding spring mounting seats of the base 6221 form a plurality of frustoconical-shaped large-diameter ends, the base 6221 has an opening 62211 at the central position of each large-diameter end, such that a plurality of end covers 6222 as well as most or all flexible straps 6223 of another spring module 6000 may enter into the interior of said spring module 6000 via the corresponding openings 62211 thus forming nesting. The large-diameter end of the conical spring 110 is fixed to the spring fixing part 62212 while the small-diameter end of the conical spring 110 abuts against the end cover 6222. In this preferred embodiment, the spring fixing part 62212 is composed of a plurality of hook parts 62212 uniformly arranged around the inner circumference of the opening 62211. The flexible straps 6223 are located outside the conical spring 110, and two ends of each flexible strap 6223 are fixedly connected to the base 6221 and the corresponding end cover 6222, respectively. When the spring 110 is installed in the spring bracket 6220, it may be provided with a predetermined initial pressure, such that the spring module has a desired stiffness. The center of the end cover 6222 of the spring bracket 6220 may be provided with a circular opening 6224, that is, the end cover 6222 may be an annular end cover.

Preferably, the spring bracket 6220 is a one-piece spring bracket formed integrally.

Figure 18:
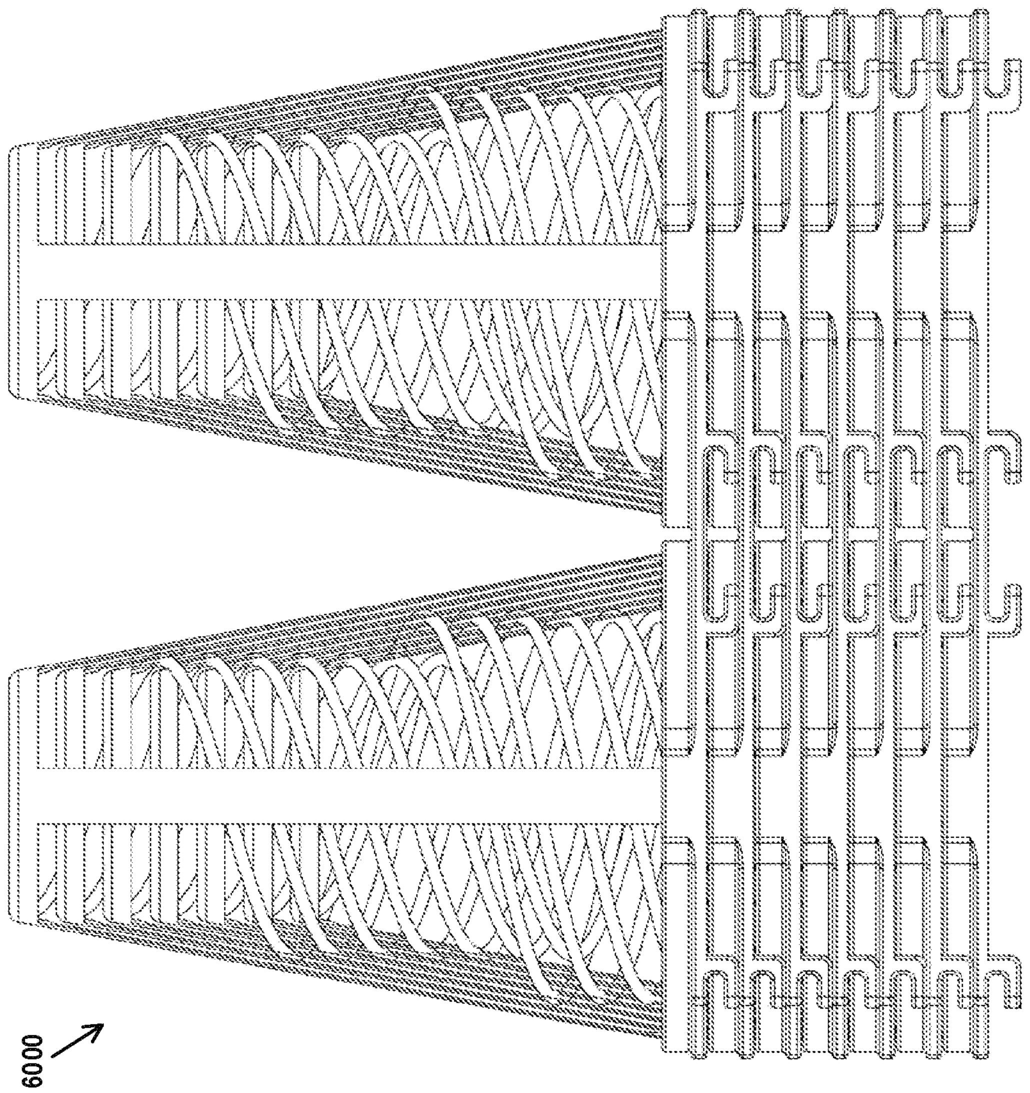
FIG. 18 exemplarily shows a condition when a plurality of the spring modules in FIG. 17A are stacked and nested together.

As described above, the spring bracket 6220 is substantially frustoconical, which enables the end covers 6222 of the spring module 6000 to enter into the interior of another spring module through the openings 62211 of the base 6221 of the other spring module thus forming nesting, as shown in FIG. 18.

Figure 17A:
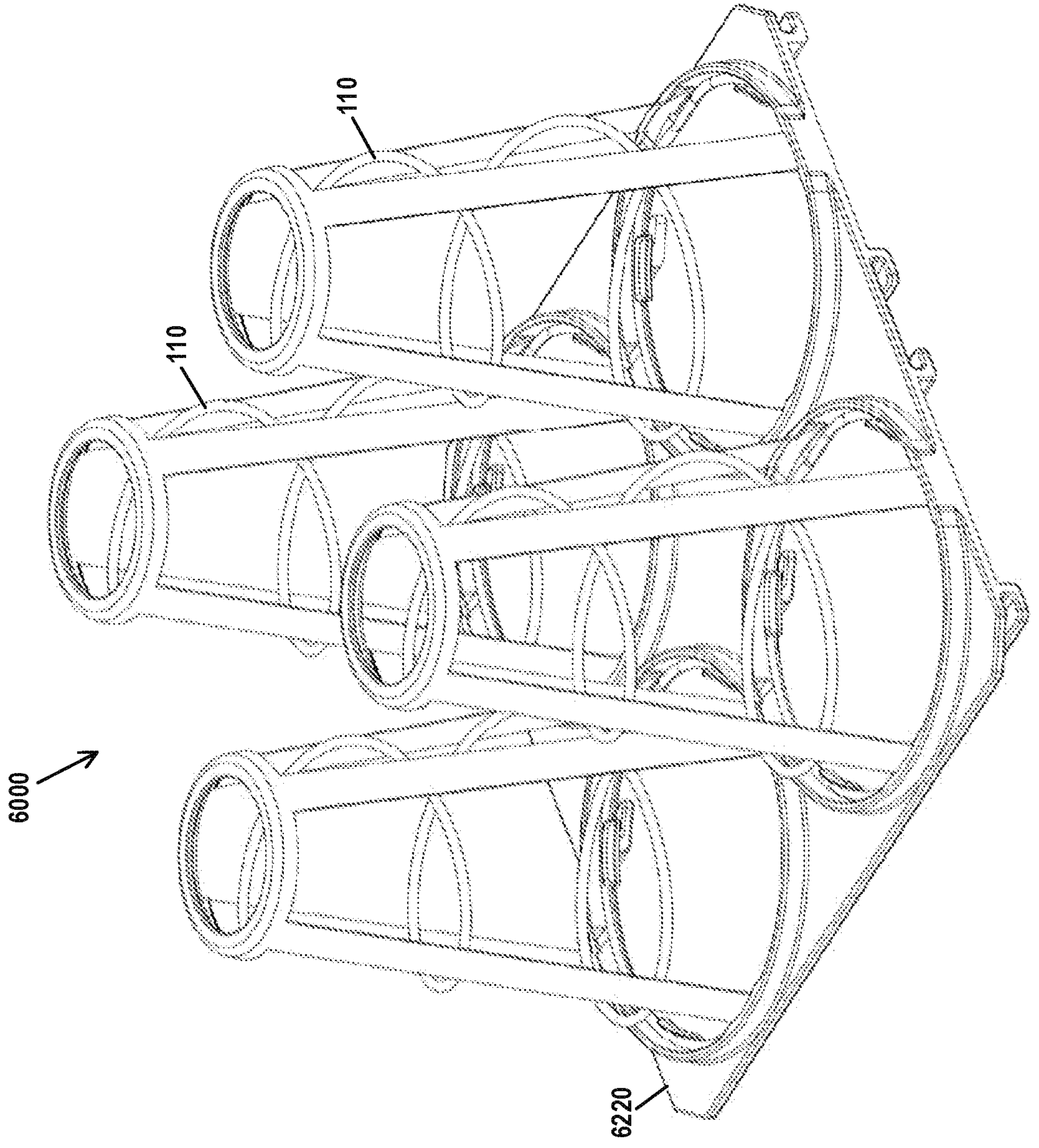
FIG. 17A exemplarily shows a perspective view of spring modules according to yet another preferred embodiment of the present disclosure.
Figure 17B:
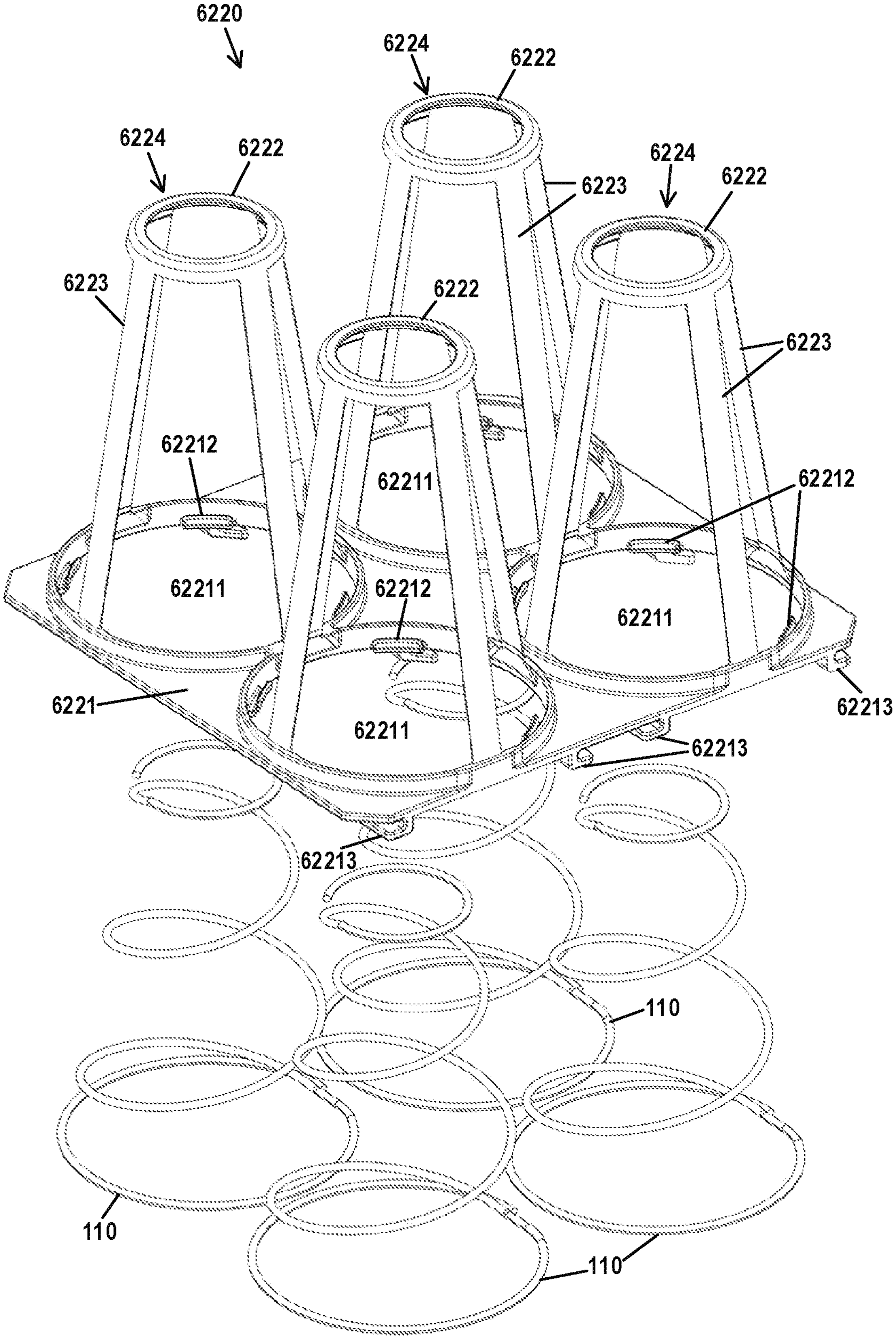
FIG. 17B exemplarily shows an exploded view of the spring modules in FIG. 17A.
Figure 17C:
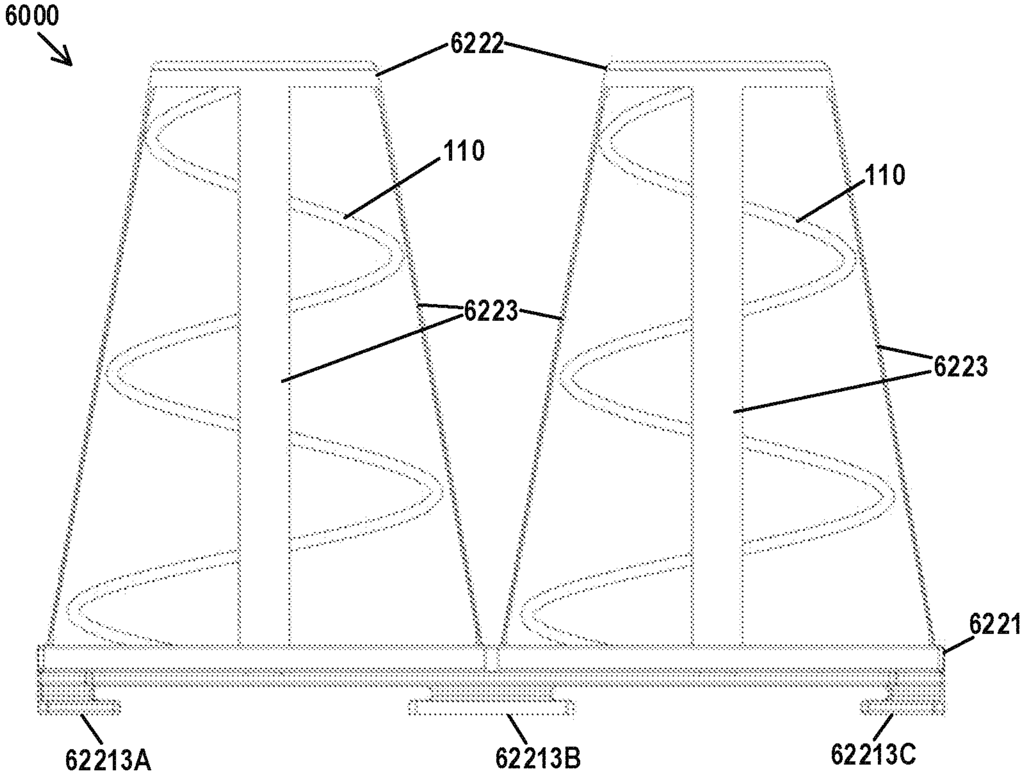
FIG. 17C exemplarily shows a front view of the spring modules in FIG. 17A.
Figure 17D:
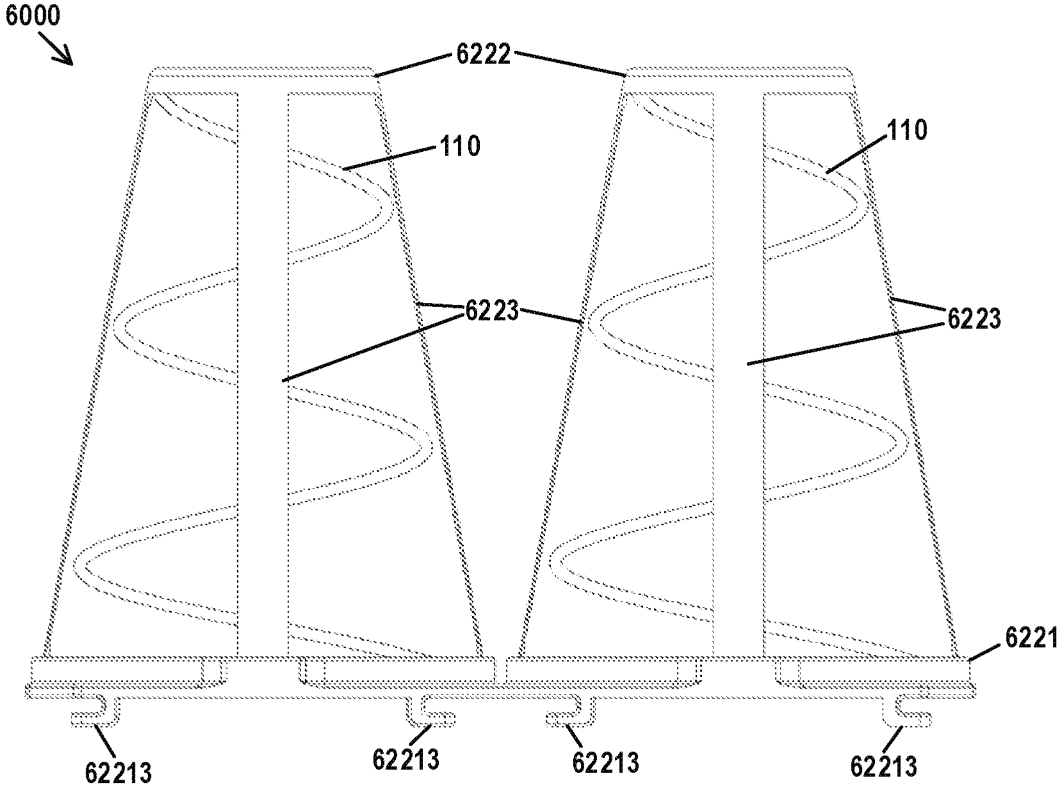
FIG. 17D exemplarily shows a side view of the spring modules in FIG. 17A.
Figure 17E:
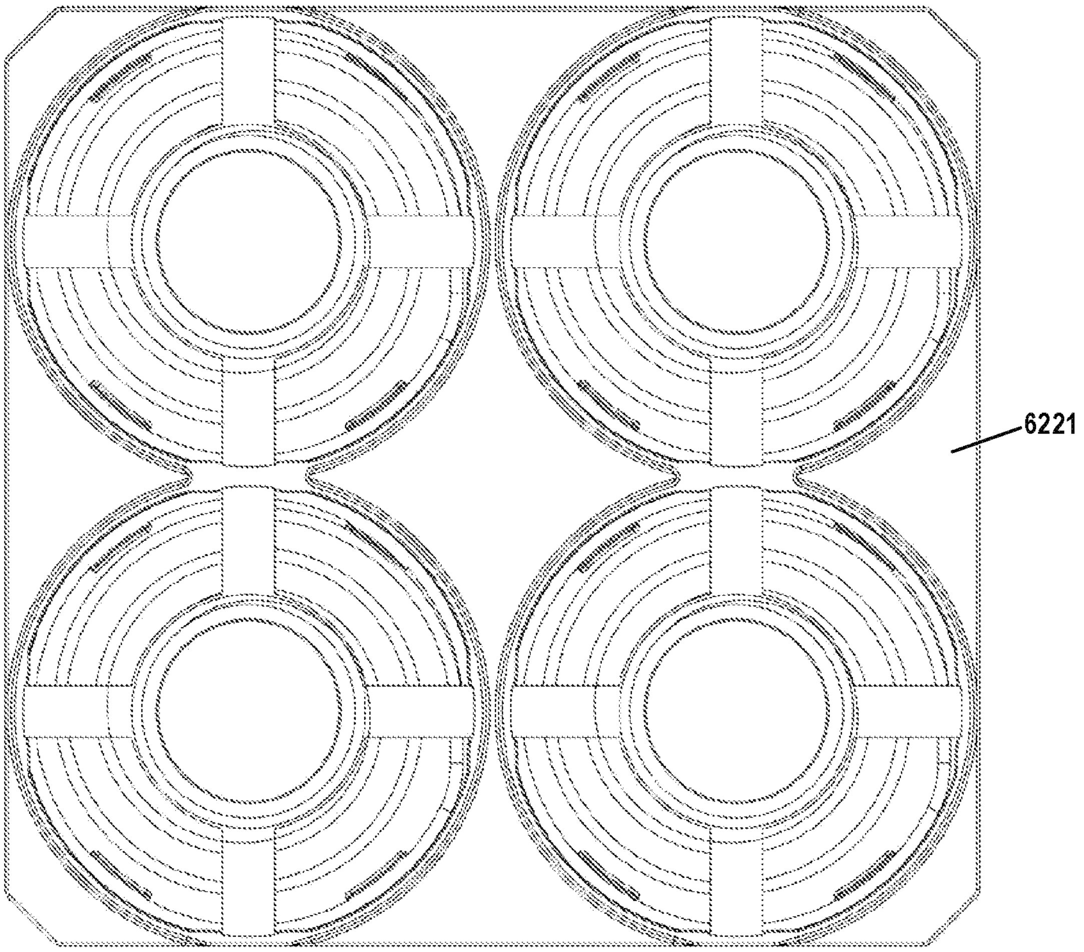
FIG. 17E exemplarily shows a top view of the spring modules in FIG. 17A.

Preferably, the module mounting part of the spring module 6000 is composed of one or more pairs of parallel slideways 62213 arranged at the bottom surface of the base 6221. In the embodiment shown in FIGS. 17A-17E, the opening directions of two pairs of slideways 62213 face away from each other, as an alternative embodiment, the opening directions of each pair of slideways 62213 may also face with each other. The base 6221 may be slidably mounted onto the mounting rack of the spring cushion through the slideways 62213. In the present embodiment, as shown in FIG. 17C, each slideway 62213 may be composed of segmented slideways which are discontinuous in-between and corresponding to the number of the conical springs 110 and the openings 62211 along the extending direction of the slideways 62213, in the present embodiment, each slideway 62213 comprises three segments 62213A, 62213B and 62213C, and the purpose of segmentation is to prevent the slideways 62213 from interfering with the openings 62211, and further to reduce the size of the base 6221, the slideways 62213 are hook parts, which are configured to be hooked onto the slide rails of the mounting rack so as to prevent the spring module 6000 from being separating from the mounting rack.

Figure 19:
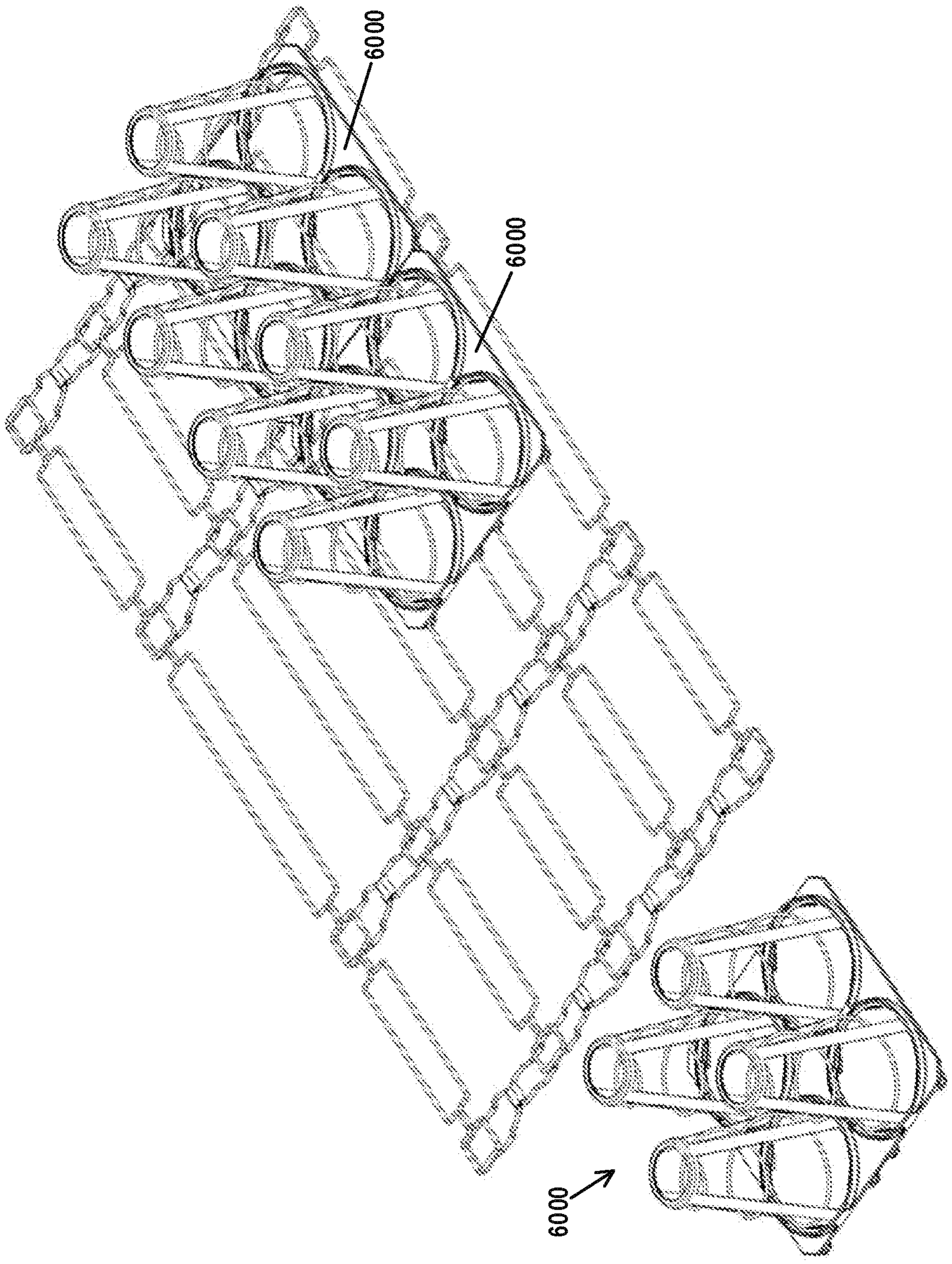
FIG. 19 exemplarily shows that the spring modules in FIG. 17A are assembled to a mounting rack of a spring cushion.

FIG. 19 exemplarily shows a condition when the spring modules 6000 having a plurality of conical springs 110 are mounted onto a mounting rack of a spring cushion.

It can be known from the above exemplary embodiments that the spring module according to the present disclosure may comprise any number of a plurality of conical springs, and the plurality of conical springs may be distributed in the spring module in any pattern.

Figure 21A:
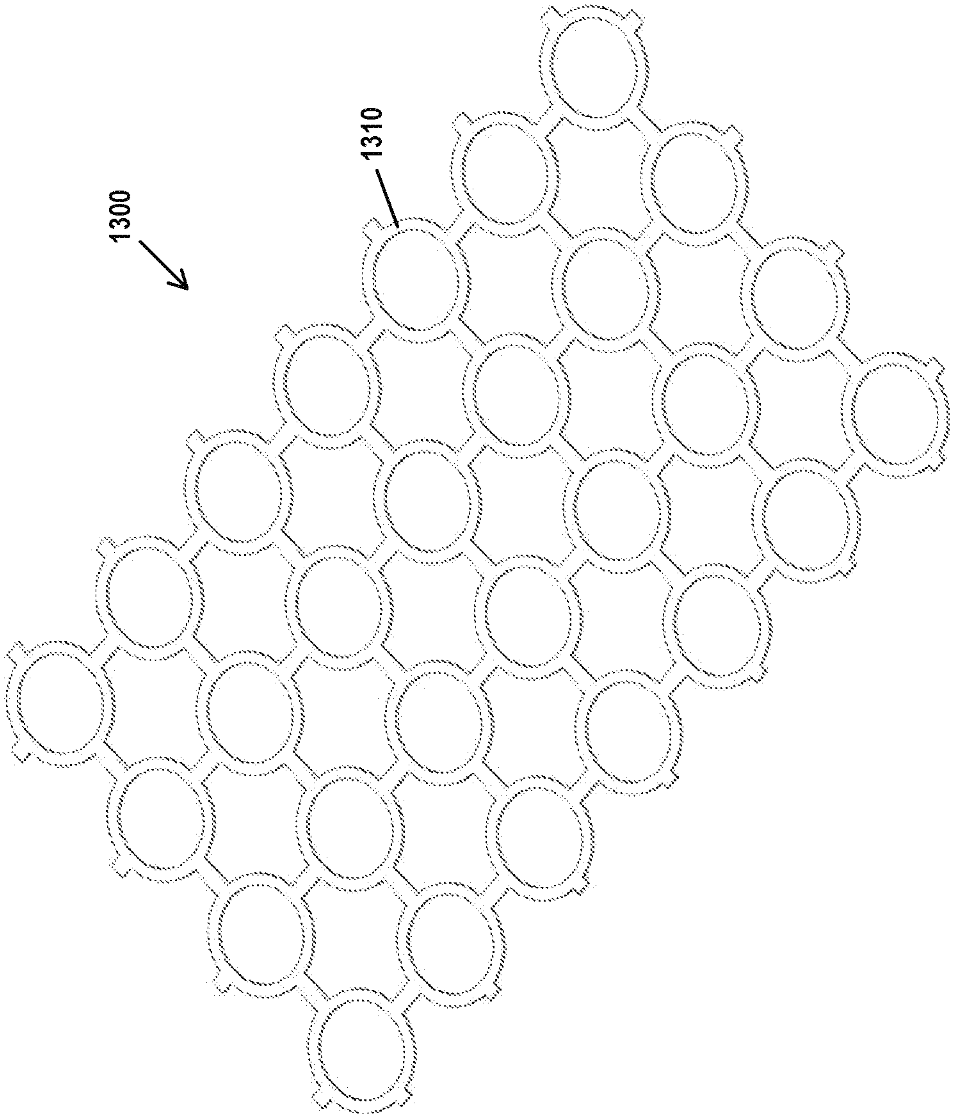
FIG. 21A exemplarily shows a one-piece fixing net for spring modules in a spring cushion according to a preferred embodiment of the present disclosure.
Figure 21B:
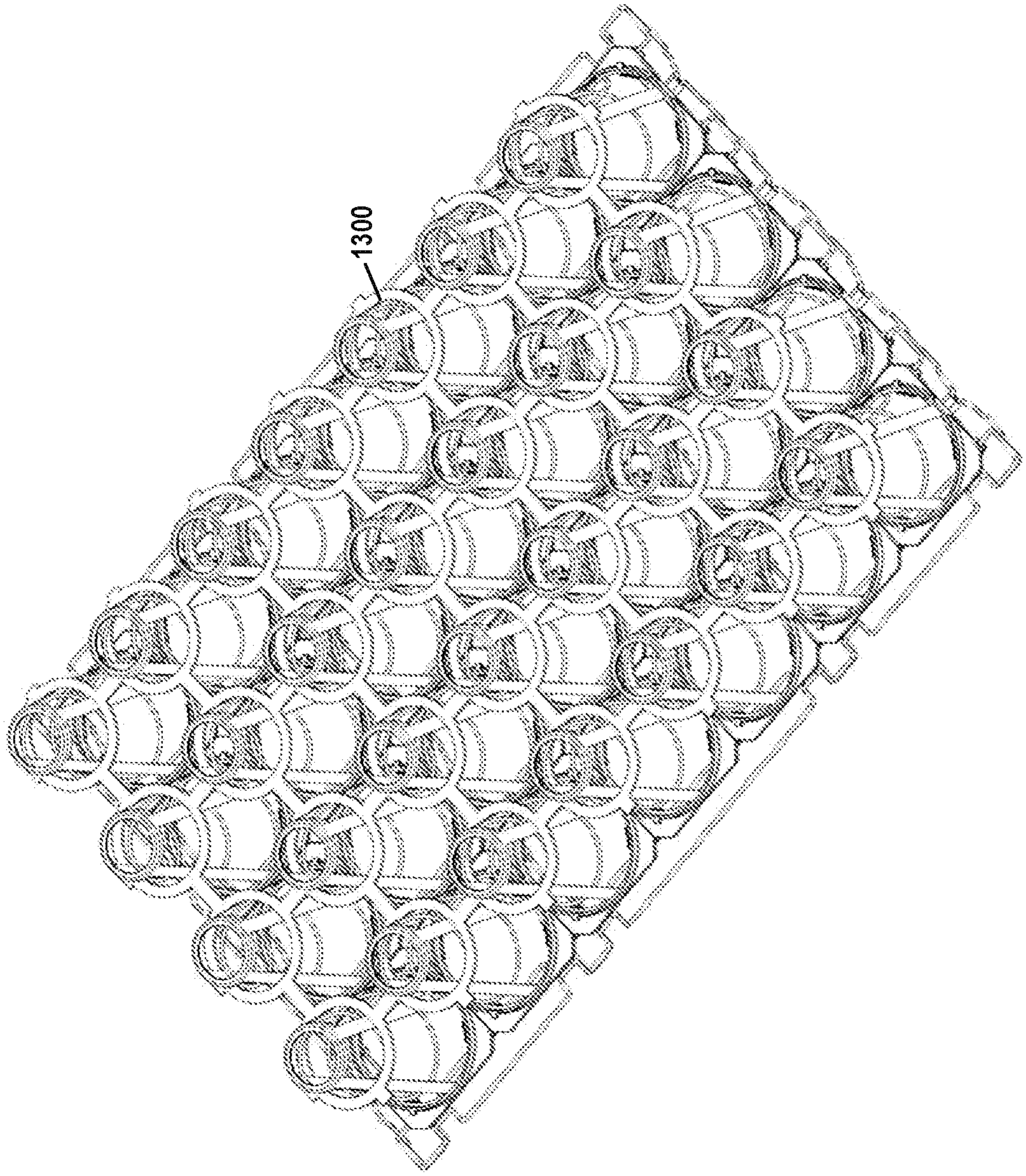
FIG. 21B exemplarily shows a condition when the one-piece fixing net in FIG. 21A is sleeved on spring modules.
Figure 22A:
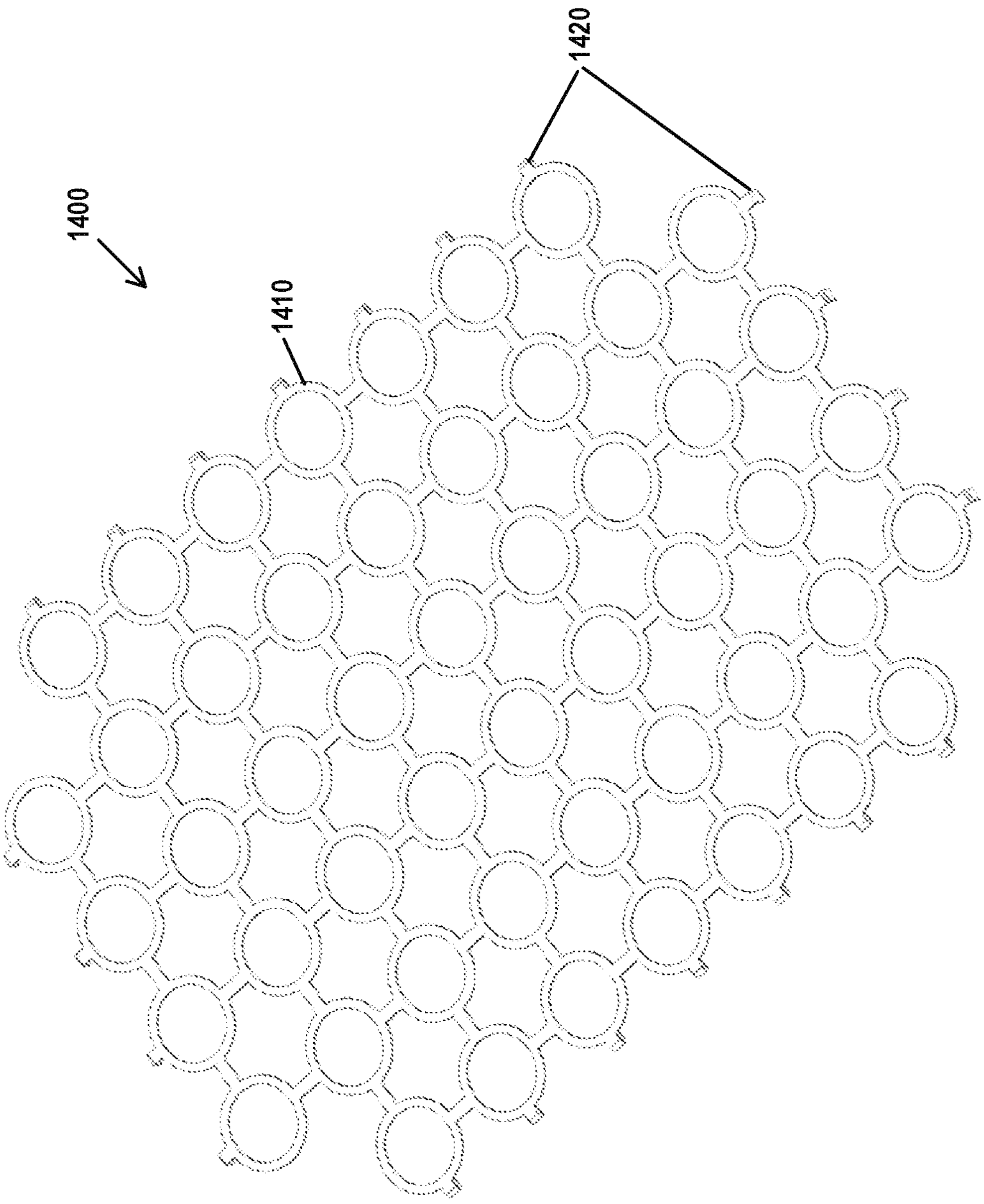
FIG. 22A exemplarily shows a one-piece fixing net for spring modules in a spring cushion according to another preferred embodiment of the present disclosure.
Figure 22B:
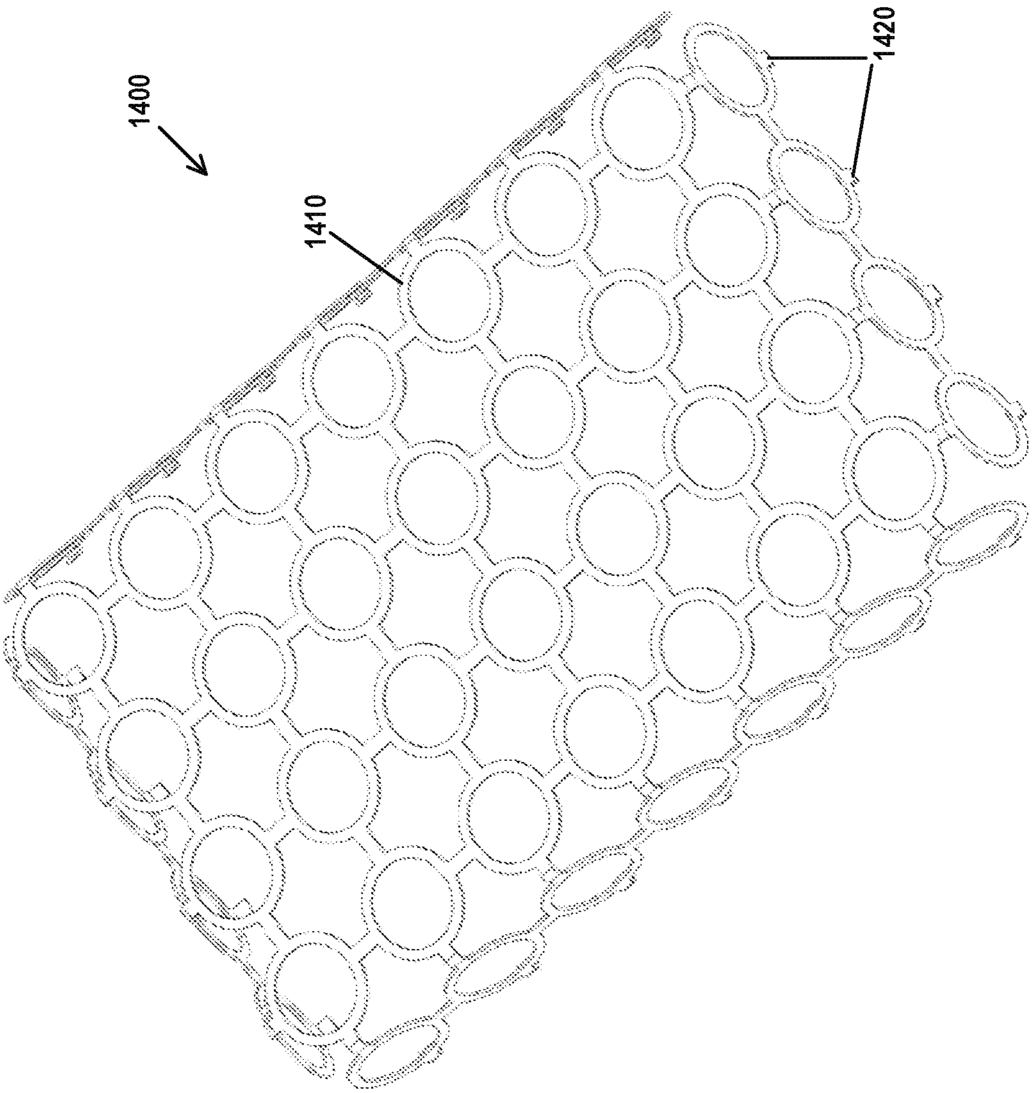
FIG. 22B exemplarily shows that the one-piece fixing net in FIG. 22A with its periphery bent.
Figure 22D:
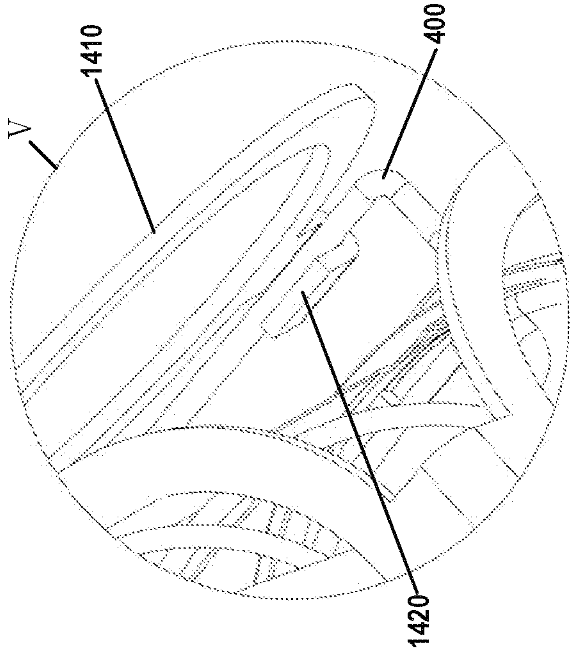
FIG. 22D exemplarily shows a partial enlarged view of part V in FIG. 22C.
Figure 22C:
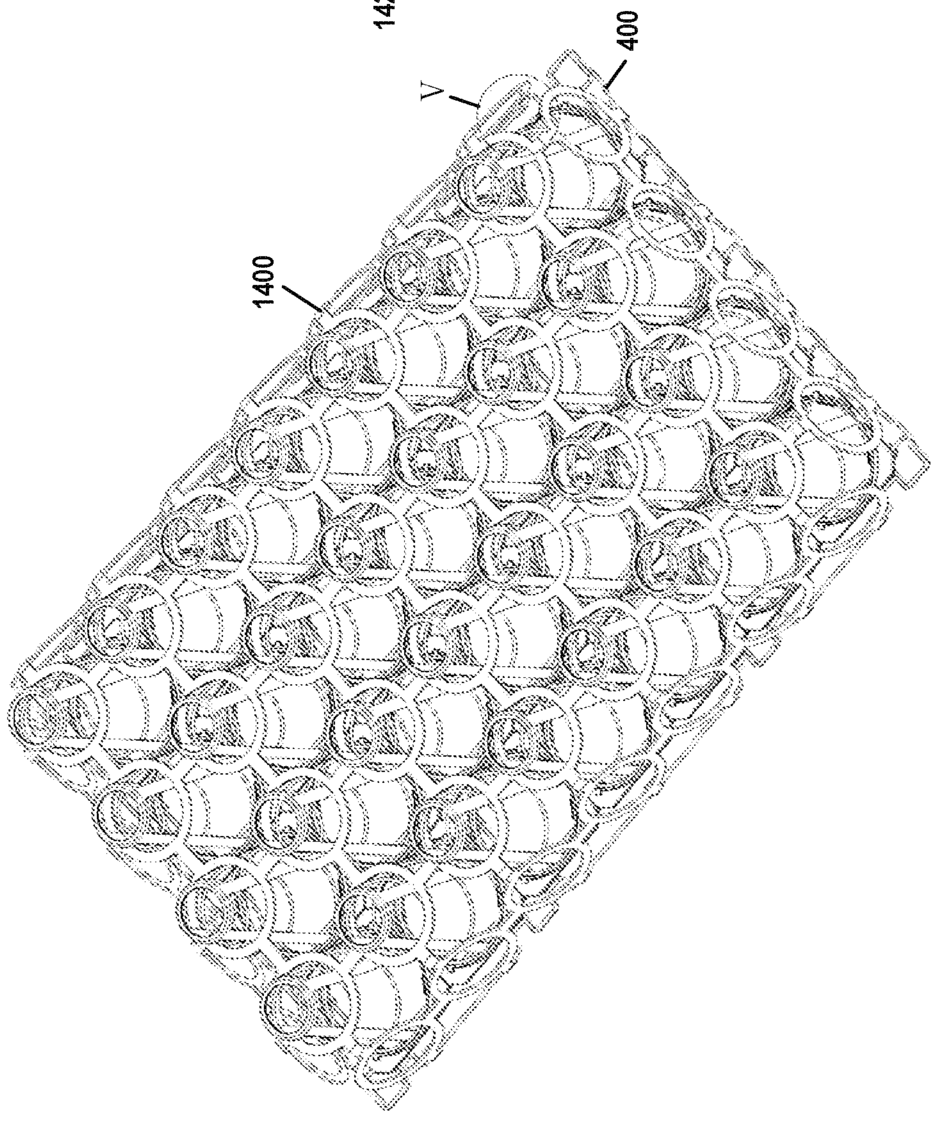
FIG. 22C exemplarily shows a condition when the one-piece fixing net in FIG. 22A is sleeved on the spring modules and hooked on the mounting rack.

According to a preferred embodiment of the present disclosure, in order to better maintain the spring module in the spring cushion in a proper position, the spring cushion 1000 may further comprise a one-piece fixing net. FIGS. 21A and 21B show a one-piece fixing net 1300 according to a first preferred embodiment of the present disclosure, which comprises a plurality of ring parts 1310 with each ring part 1310 such configured that part of the corresponding spring module in the spring cushion can pass therethrough. Preferably, when the one-piece fixing net 1300 is arranged on the spring modules, the vertical distance between the ring part 1310 and the end cover of the spring module is about ⅓ of the overall height of the spring module.

FIGS. 22A-22D show a one-piece fixing net 1400 according to a second preferred embodiment of the present disclosure. As shown in the figures, the one-piece fixing net 1400 is flexible, and a plurality of hook parts 1420 are provided at the edge of which. When the one-piece fixing net 1400 is arranged on the spring modules, the hook parts 1420 are configured to hook on the mounting rack 400.

Figure 23A:
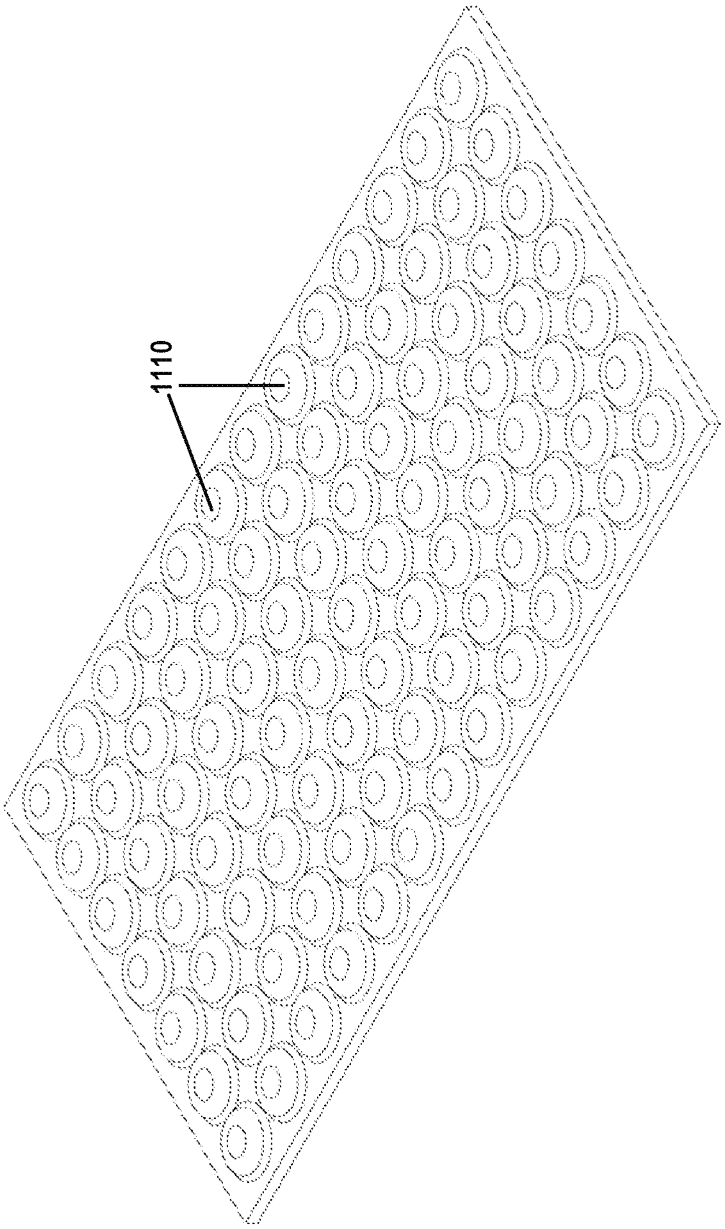
FIG. 23A exemplarily shows a top structure of a sponge cover for a spring cushion according to a preferred embodiment of the present disclosure.
Figure 23B:
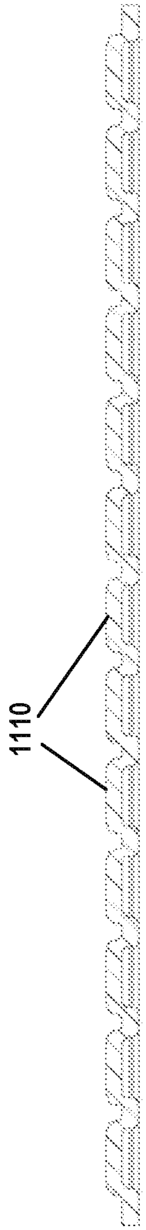
FIG. 23B exemplarily shows a sectional view of the top structure of the sponge cover in FIG. 23A.

Further preferably, the top of the sponge cover 1100 may comprise a plurality of nest structures 1110, as shown in FIGS. 23A and 23B, and the positions of the plurality of nest structures 1110 correspond to the positions of the end covers of each spring module on the foldable mounting rack in the spring cushion, such that the top of each spring module may be accommodated within the corresponding nest structure, thereby restricting the movement of the spring modules in the lateral direction and preventing the spring modules from being dislocated or the adjacent springs from being wound together.

Figure 24A:
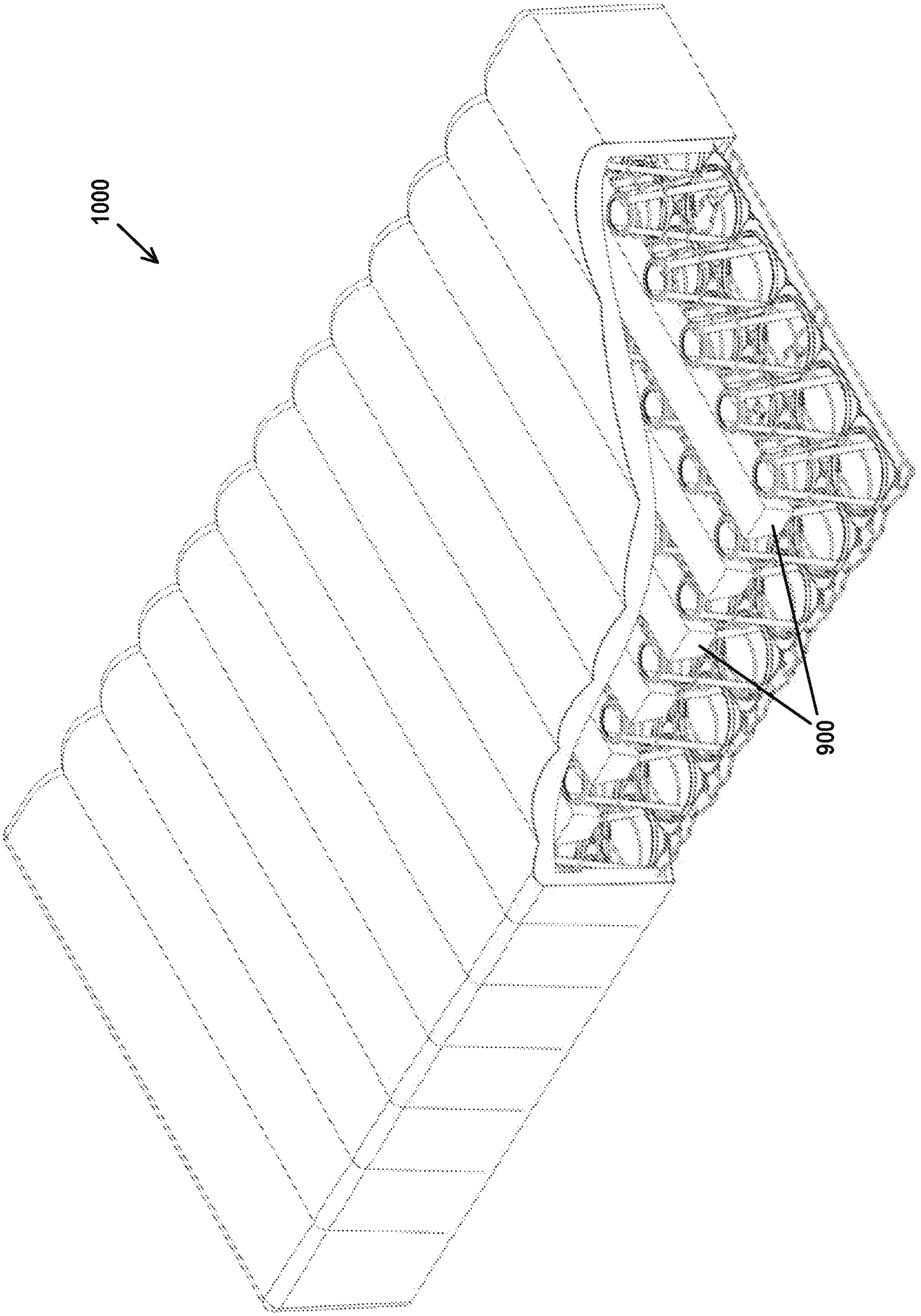
FIG. 24A exemplarily shows filling sponge strips for a spring cushion according to a preferred embodiment of the present disclosure.
Figure 24B:
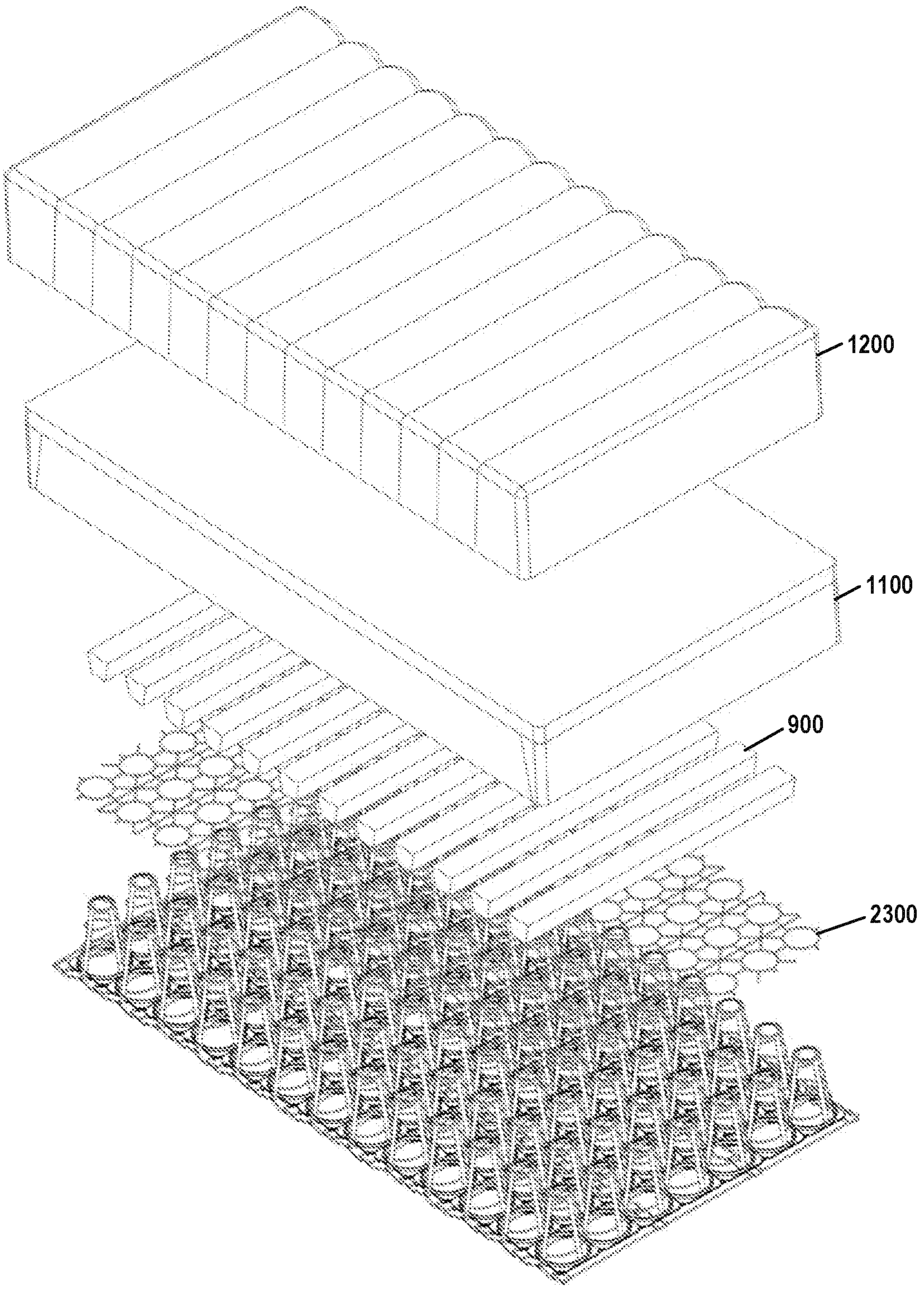
FIG. 24B exemplarily shows an exploded view of a spring cushion having the sponge filled strips shown in FIG. 24A.
Figure 24C:
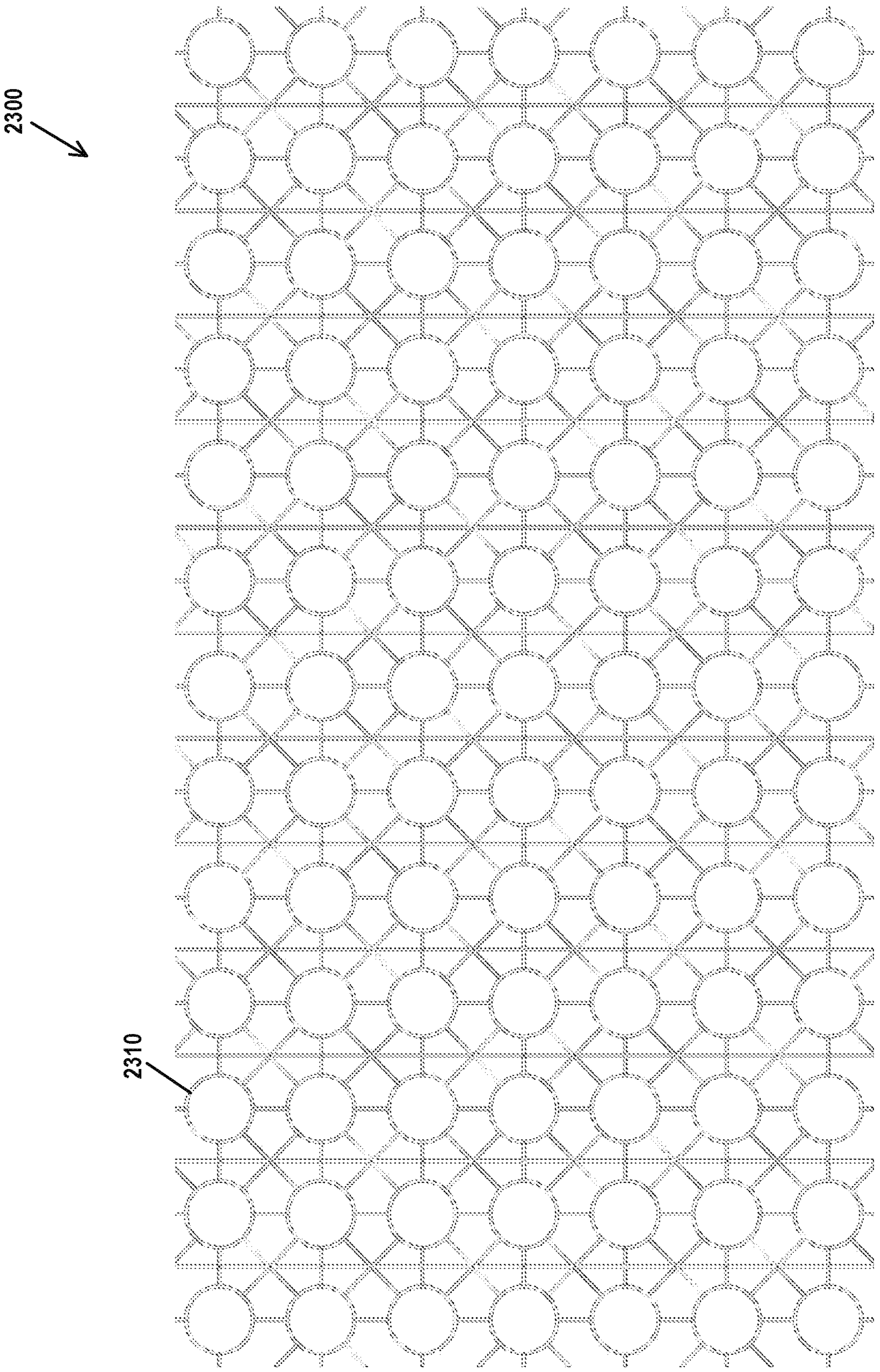
FIG. 24C exemplarily shows a one-piece fixing net in FIG. 24B.

As shown in FIGS. 24A to 24B, the spring cushion 1000 according to the present disclosure may further comprise a plurality of filling sponge strips 900, which are placed on the one-piece fixing net 2300, and the plurality of filling sponge strips 900 are sized to be filled in the gaps between the spring modules as well as the gaps between the frustocones of each spring module in the spring cushion, so as to prevent the spring modules from shaking and dislocation thus improving the use comfort of the spring cushion. As shown in FIG. 24C, similar to the one-piece fixing nets 1300, 1400, the one-piece fixing net 2300 comprises a plurality of ring parts 2310 with each ring part 2310 such configured that part of the corresponding spring module in the spring cushion can pass therethrough. Preferably, when the one-piece fixing net 2300 is arranged on the spring modules, the vertical distance between the ring part 2310 and the end cover of the spring module is about ⅓ of the overall height of the spring module.

Figure 25A:
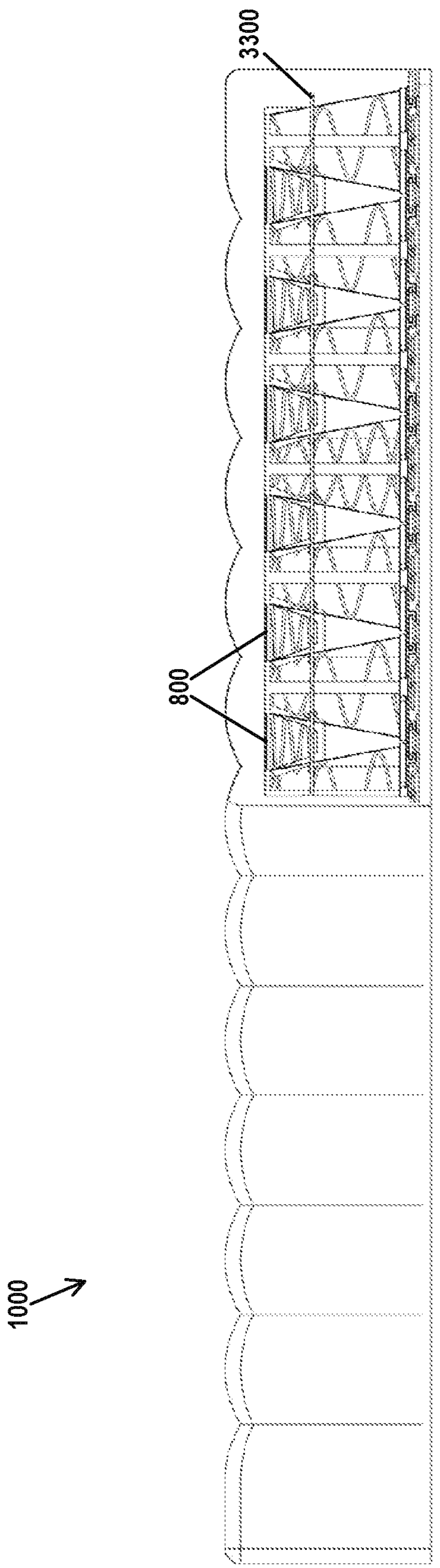
FIG. 25A exemplarily shows gap-filing spring modules for spring modules in a spring cushion according to a preferred embodiment of the present disclosure.
Figure 25B:
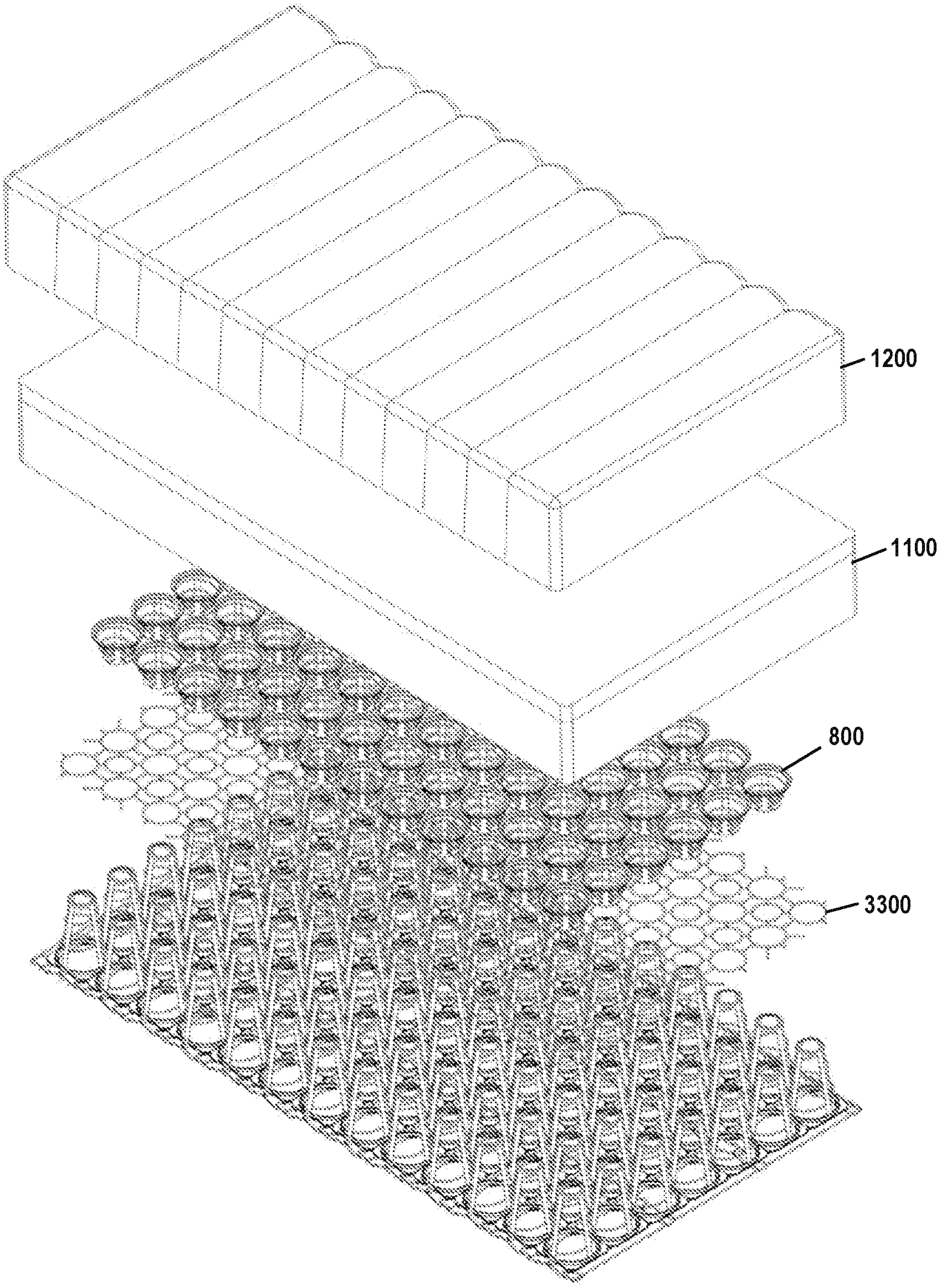
FIG. 25B exemplarily shows an exploded view of a spring cushion having the gap-filling spring modules shown in FIG. 25A.
Figure 25C:
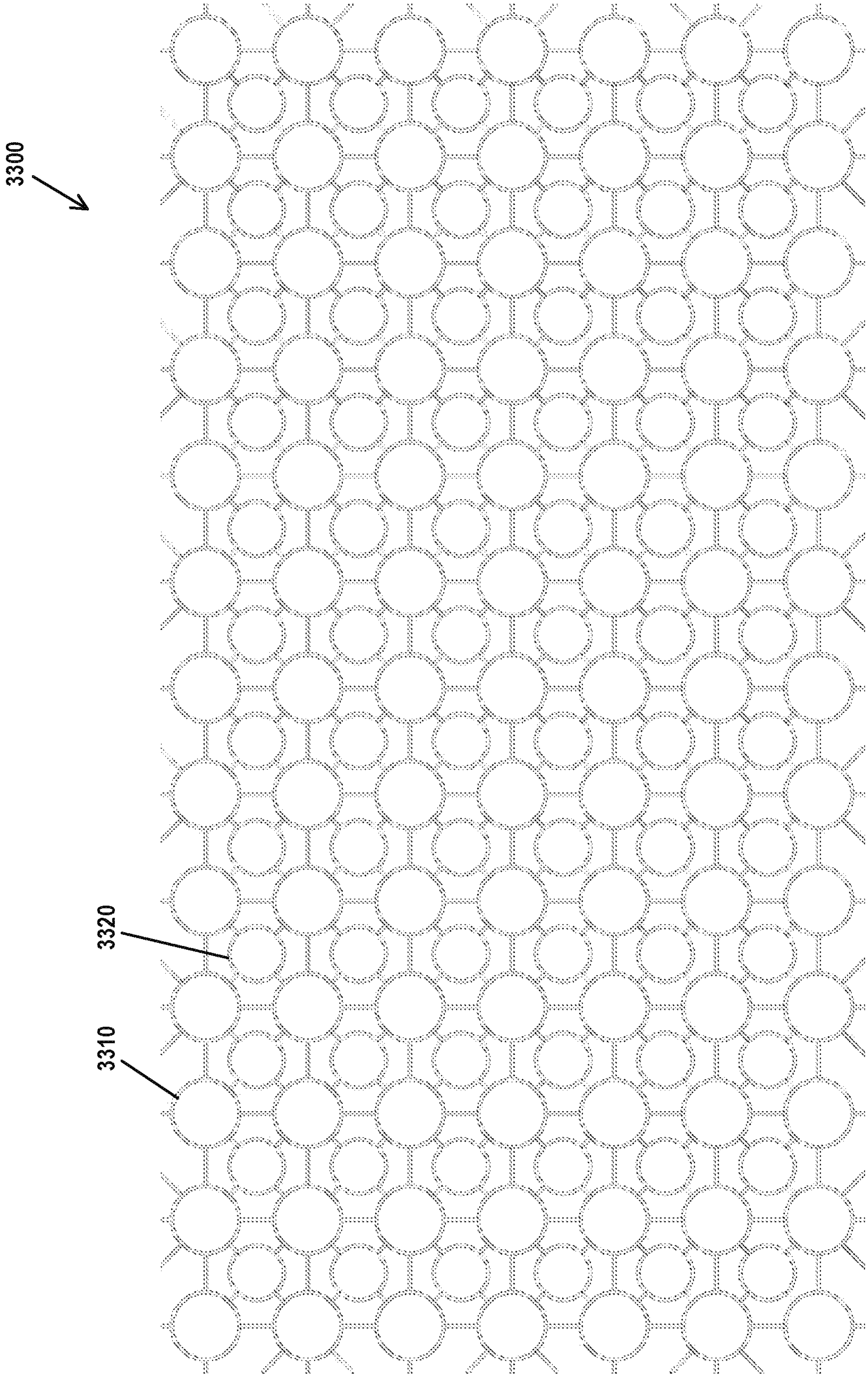
FIG. 25C exemplarily shows the one-piece fixing net in FIG. 25B.
Figure 25D:
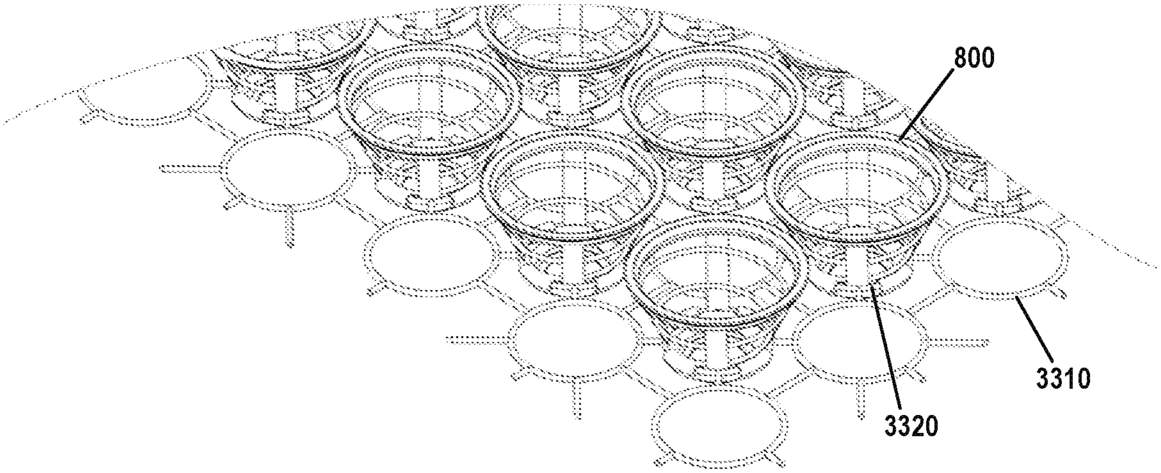
FIG. 25D exemplarily shows a condition when the gap-filling spring modules in FIG. 25A are assembled on the one-piece fixing net in FIG. 25C.

As shown in FIGS. 25C and 25D, the spring cushion 1000 of the present disclosure may comprise a one-piece fixing net 3300, which comprises a plurality of small ring parts 3320 for restraining the spring module in addition to the ring parts 3310, and the small ring parts 3320 are respectively located between the ring parts 3310, and the ring parts 3310 as well as the small ring parts 3320 are arranged at intervals in an array manner, such that when the one-piece fixing net 3300 is arranged on the spring modules, the plurality of small ring parts 3320 are just above the gaps between the spring modules as well as the gaps between the frustocones of each spring module.

Similarly, when the fixing net 3300 is arranged on the spring modules, the vertical distance between the ring part 3310 and the end cover of the spring module is about ⅓ of the overall height of the spring module.

As shown in FIGS. 25A and 25B, the spring cushion 1000 of the present disclosure may further comprise a plurality of gap-filling spring modules 800, which are generally frustoconical, and can be used to fill in the gaps between the spring modules as well as the gaps between the frustoconical shapes of each spring module with the thin end down, so as to prevent the spring modules from shaking and dislocation thus improving the use comfort of the spring cushion. The small-diameter ends of the gap-filling spring modules 800 may be fixed onto the small ring parts 3320 for filling the gaps.

Figure 25E:
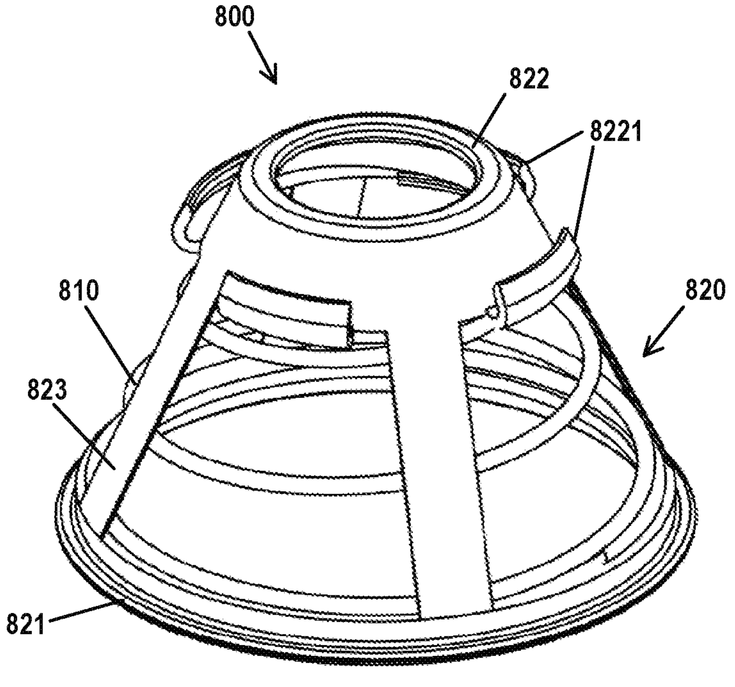
FIG. 25E exemplarily shows a perspective view of the gap-filling spring module in FIG. 25A.

FIG. 25E exemplarily shows a gap-filling spring module 800 for filling gaps according to a preferred embodiment of the present disclosure. As shown in the figure, the gap-filling spring module 800 comprises a spring bracket 820 and a small conical spring 810 provided in the spring bracket 820. The spring bracket 820 is used to removably assemble the gap-filling spring module 800 to the one-piece fixing net 3300. The spring bracket 820 comprises a base 821, an end cover 822 and a plurality of flexible straps 823, in a preferred embodiment, the number of the flexible straps 823 is four, and the flexible straps 823 are uniformly distributed around the periphery of the spring bracket 820. The center of the base 821 comprises a circular opening, and the large-diameter end of the small conical spring 810 is fixed to a spring fixing part of the base 821, the spring fixing part may be an annular groove extending around the inner circumference of the circular opening of the base 821. The small-diameter end of the conical spring 810 abuts against the end cover 822. The flexible straps 823 are located outside the small conical spring 810, and two ends of each flexible strap 823 are fixedly connected to the base 821 and the end cover 822, respectively. When the spring 810 is installed in the spring bracket 820, it may be provided with a predetermined initial pressure, so that the gap-filling spring module 800 may have a desired stiffness. With the support of the spring, the gap-filling spring module 800 has a frustoconical shape as a whole.

Preferably, the spring bracket 820 is a one-piece spring bracket formed integrally, but of course, it may also be an assembly assembled from multiple components.

As described above, the spring bracket 820 is substantially frustoconical, which enables the end cover 822 of the gap-filling spring module 800 to enter into the interior of another gap-filling spring module through the circular opening of the base 821 of the other gap-filling spring module thus forming nesting.

Furthermore, in order to allow the end cover 822 of the gap-filling spring module 800 to be more stably fixed on the small ring part 3320 of the one-piece fixing net 3300, a plurality of hook parts 8221 extending toward the small-diameter end of the small conical spring 810 may be formed at the outer periphery of the end cover 822, and the small-diameter end of the gap-filling spring module 800 may be fixed on the small ring part 3320 through the hook parts 8221 so as to fill the gaps. Preferably, the plurality of hook parts 8221 and the plurality of flexible straps 823 are arranged at intervals along the periphery of the gap-filling spring module 800. Alternatively, the hook part 8221 may also be configured as an annular hook part extending 360 degrees along the entire periphery of the end cover 822.

Figure 20A:
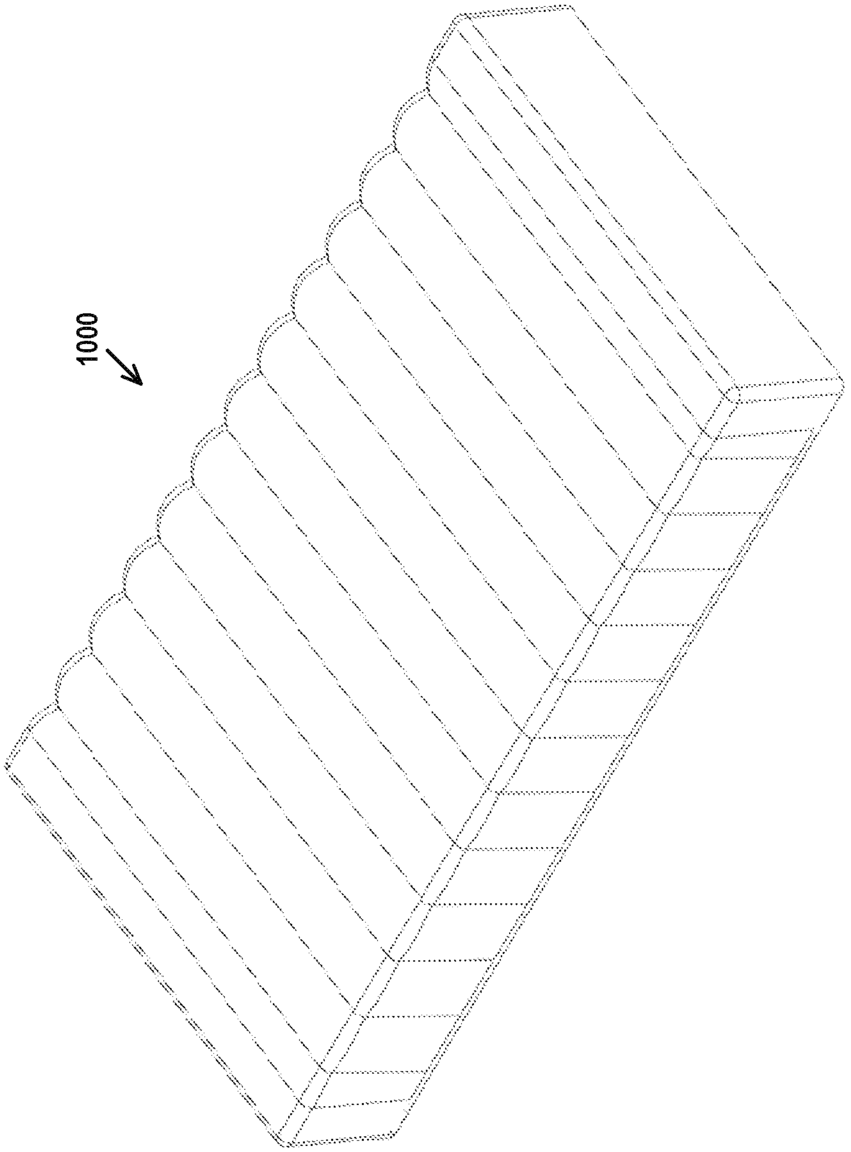
FIG. 20A exemplarily shows a spring cushion according to a preferred embodiment of the present disclosure.
Figure 20B:
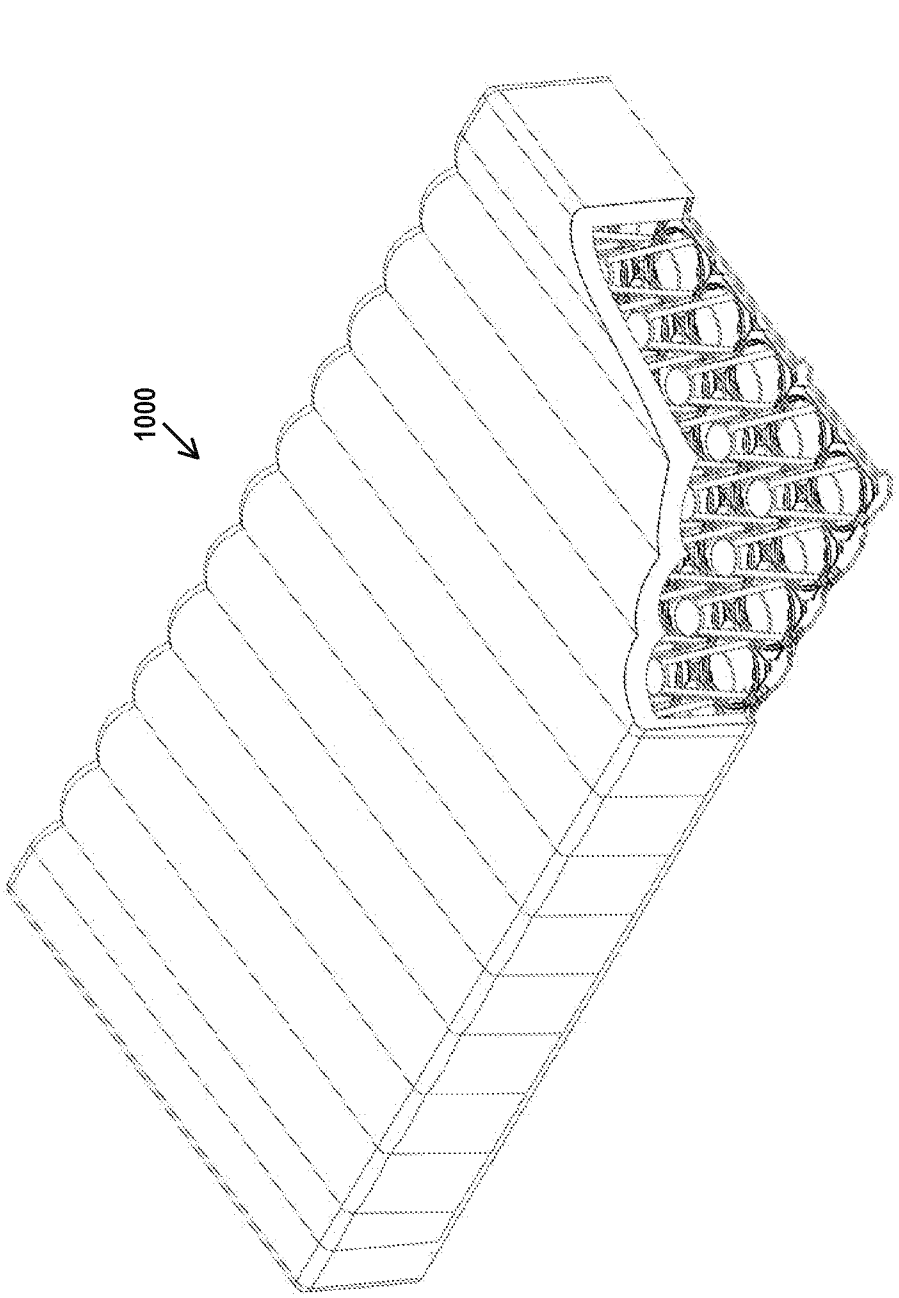
FIG. 20B exemplarily shows the internal structure of the spring cushion in FIG. 20A.
Figure 20C:
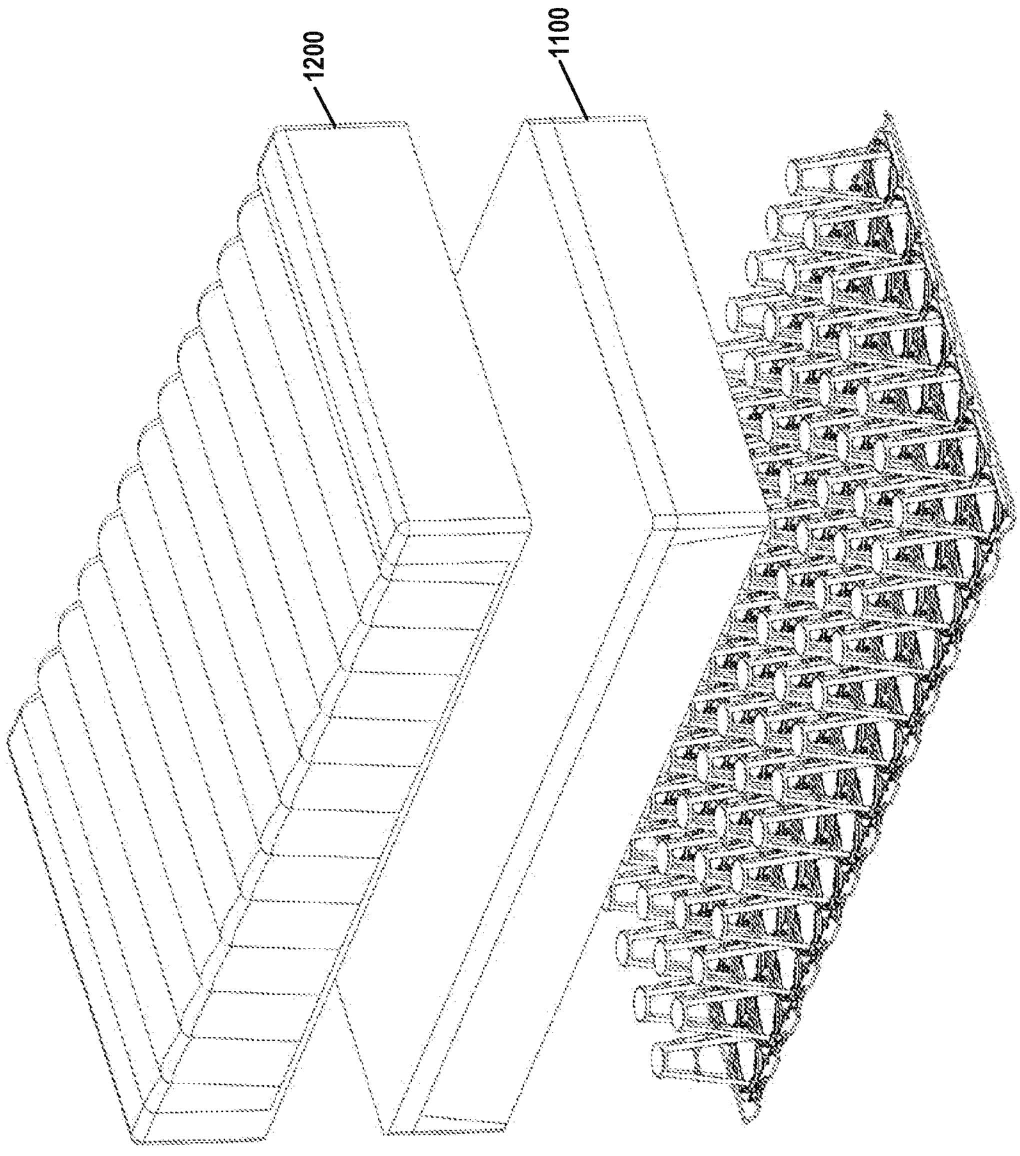
FIG. 20C exemplarily shows an exploded view of the spring cushion in FIG. 20A.

The present disclosure further provides a spring cushion. As shown in FIGS. 20A-20C, a spring cushion 1000 according to a preferred embodiment of the present disclosure may comprise the mounting rack 400, 500, 600 as described in the above embodiments, and a plurality of spring modules 100, 200, 300, 700, 5000, 6000 mounted on the mounting rack. The spring cushion 1000 may further comprise the sponge cover 1100 sleeved on the plurality of spring modules mounted on the mounting rack, and a cloth cover 1200 sleeved on the sponge cover.

Various spring modules according to various embodiments of the present disclosure may also have other functional parts/components, which will be described in detail below.

Figure 26A:
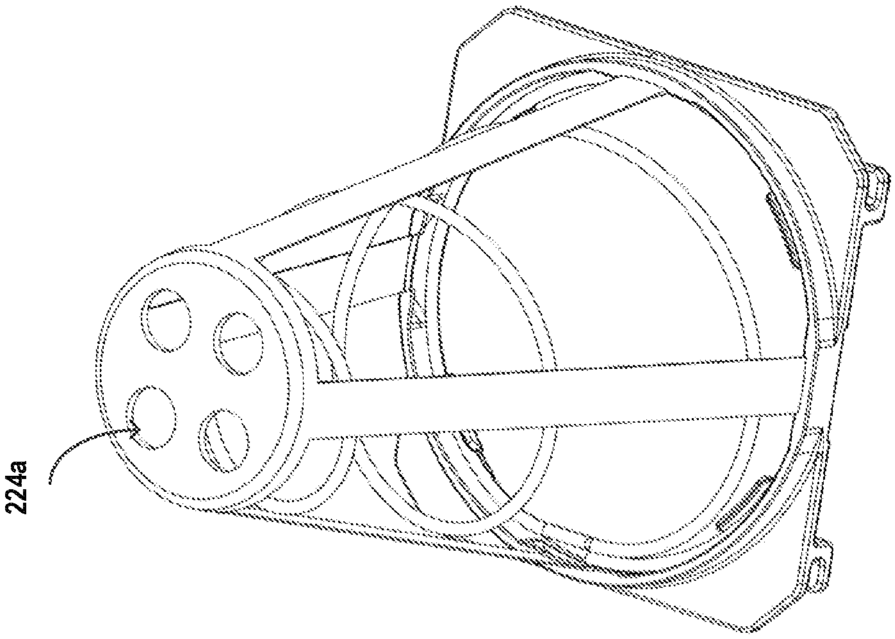
FIGS. 26A-26B exemplarily show a spring module with constraint holes.
Figure 26B:
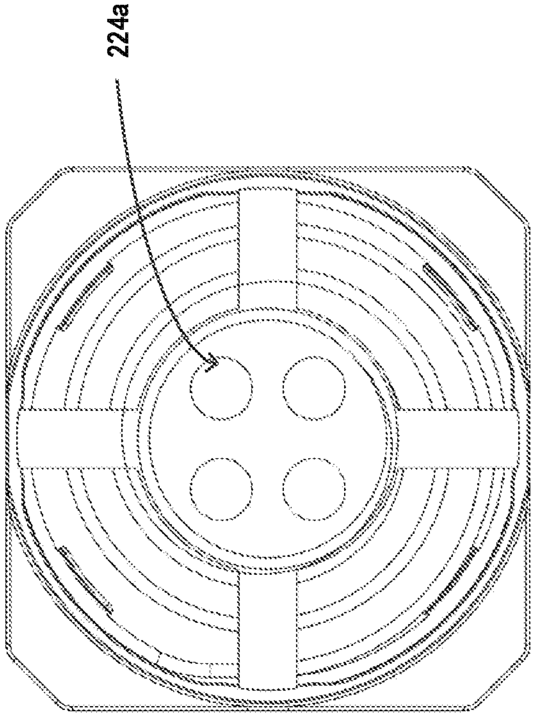
Figure 27A:
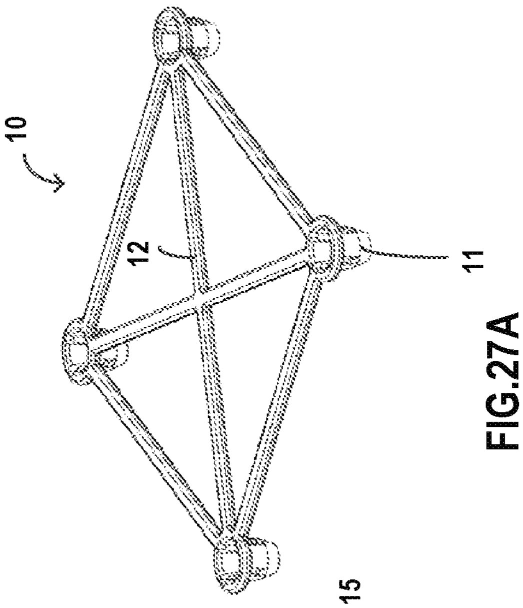
FIGS. 27A-27C exemplarily show a constraint member for constraining a spring module.
Figure 27B:
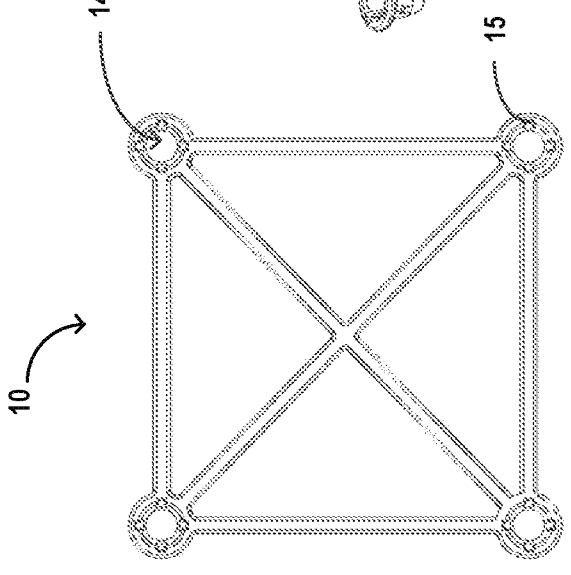
Figure 27C:
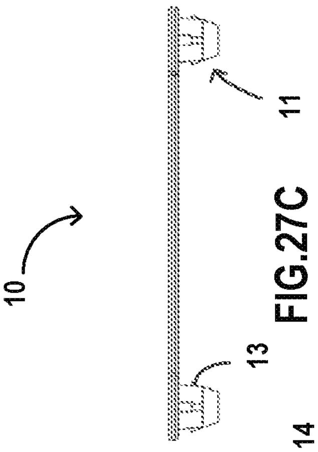
Figure 27D:
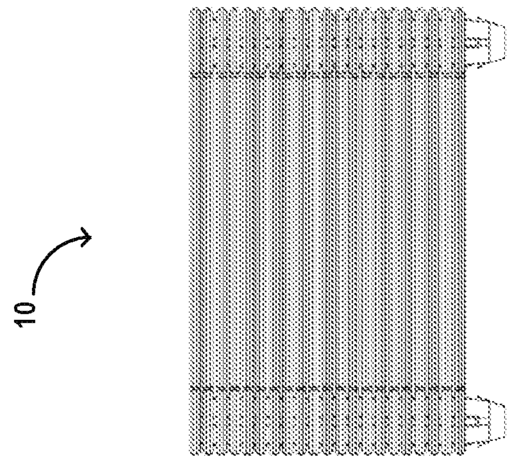
FIG. 27D exemplarily shows a condition when a plurality of constraint members shown in FIGS. 27A-27C are stacked and nested together.

FIGS. 26A and 26B show a spring module with constraint holes according to a preferred embodiment of the present disclosure, wherein the end cover is provided with a main body part which is substantially planar, and four constraint holes 224*a* uniformly distributed around the center of the end cover may be provided in the main body part, and the constraint holes are configured to receive constraint members (FIG. 27A) so as to constrain the relative position between four adjacent spring modules. FIGS. 27A-27C exemplarily show a constraint member 10 for constraining the spring module, the constraint member comprises a square main frame and four cylindrical parts 11 located at four corners of the square main frame, as shown in the figures, the square main frame is provided with reinforcing bars 12 extending along the diagonals of which; Each cylindrical part 11 extends from the square main frame toward the same side in the direction perpendicular to the square main frame, and the main frame as well as the cylindrical part are such sized that each cylindrical part 11 may be inserted into the corresponding constraint hole 224*a* in the end covers of four adjacent spring modules. In addition, each cylindrical part 11 has a tapered end for guiding the cylindrical part 11 to be inserted into the constraint hole 224*a*. As shown in FIG. 27C, an snap-fit part 13 is provided on the outer surface of the cylindrical part 11, and the snap-fit part 13 is configured to be snap fitted in the constraint hole 224*a*. As shown in FIG. 27B, the cylindrical part 11 is provided with a central hole 14 in which a groove 15 for receiving the snap-fit part 13 is formed, and the central hole 14 is such sized to receive the tapered end of the cylindrical part 11 of another constraint member 10 so that a plurality of constraint members 10 may be nested with each other, as shown in FIG. 27D.

Figure 27E:
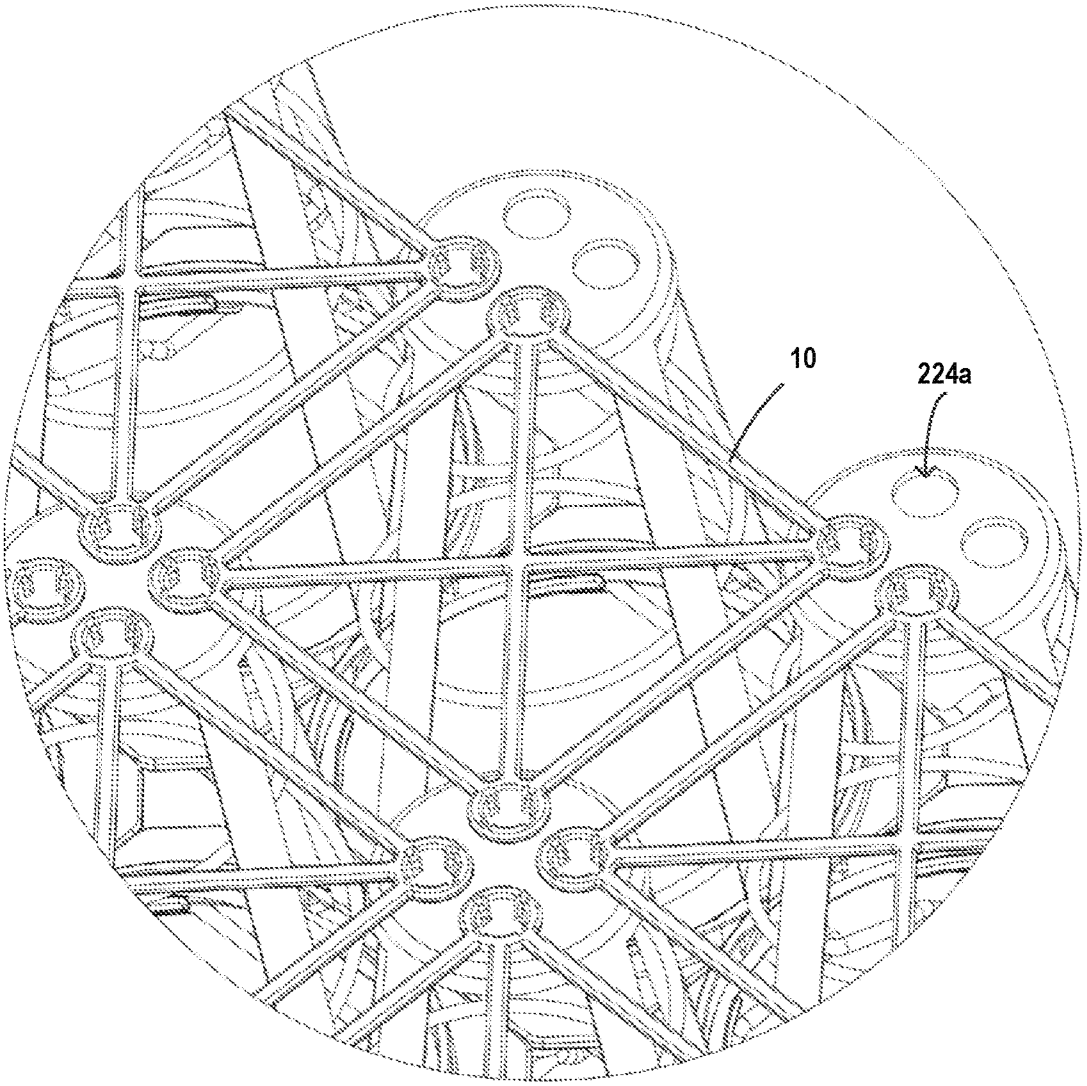
FIG. 27E exemplarily shows a condition when the constraint members shown in FIGS. 27A-27C are arranged on the spring modules.

FIG. 27E exemplarily shows a condition when a plurality of the spring modules shown in FIG. 26A are fixed together through the constraint members 10 shown in FIG. 27A.

Figure 28B:
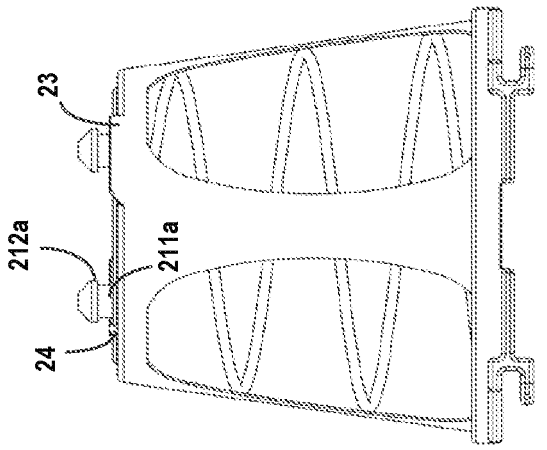
FIGS. 28A-28C exemplarily show a rotary fixing device of a spring module.
Figure 28C:
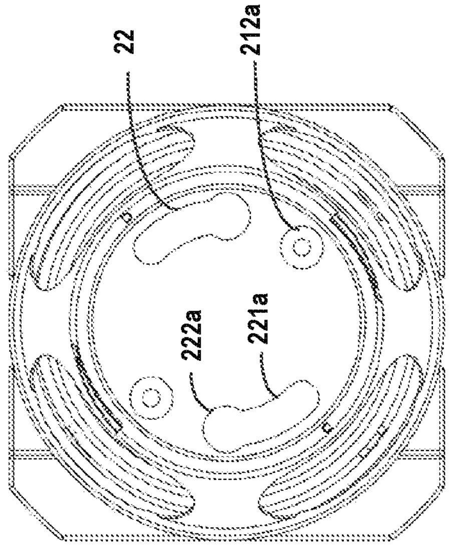
Figure 28A:
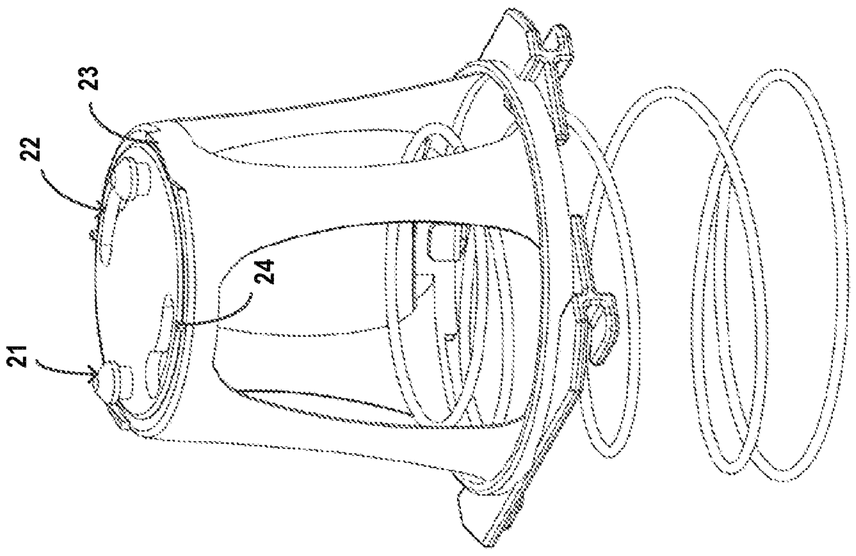

FIGS. 28A-28C show a spring module with a rotary fixing device according to a preferred embodiment of the present disclosure, the rotary fixing device comprises a pair of protrusions 21 and a pair of arc openings 22 provided on the end cover of the spring module in a central symmetrical manner along the circumferential direction, and the protrusions 21 as well as the arc openings 22 are alternately arranged along the circumferential direction of the end cover. Each protrusion 21 comprises a thin base portion 211*a* which is substantially cylindrical, and a thick end 212*a* which is substantially frustoconical. Each arc opening 22 comprises a narrow arc extending portion 221*a*, and a wide end opening portion 222*a* located at one end of the arc opening 22, that is, the radial dimension of the end opening portion 222*a* is larger than that of the arc extending portion 221*a*. The radial (width) dimension of the opening portion 222*a* is designed to allow the thick end 212*a* of the protrusion 21 to pass therethrough, while the radial (width) dimension of the arc extending portion 221*a* is designed to prevent the thick end 212*a* from passing therethrough, so that when the end covers of two spring modules face with each other, a pair of protrusions 21 of one end cover may pass through a pair of end opening portions 222*a* of the other end cover, at the same time, a pair of protrusions 21 of the other end cover may pass through a pair of end opening portions 222*a* of the one end cover, by rotating the two spring modules along a locking direction, the base portion 211*a* of each protrusion 21 moves into the arc extending portion 221*a* of which along the corresponding arc opening 22 and is locked into the narrow arc extending portion 221*a* through the thick end 212*a* of each protrusion, thereby fixing the two spring modules together in an end cover-to-end cover manner, as shown in the figures.

Figure 28E:
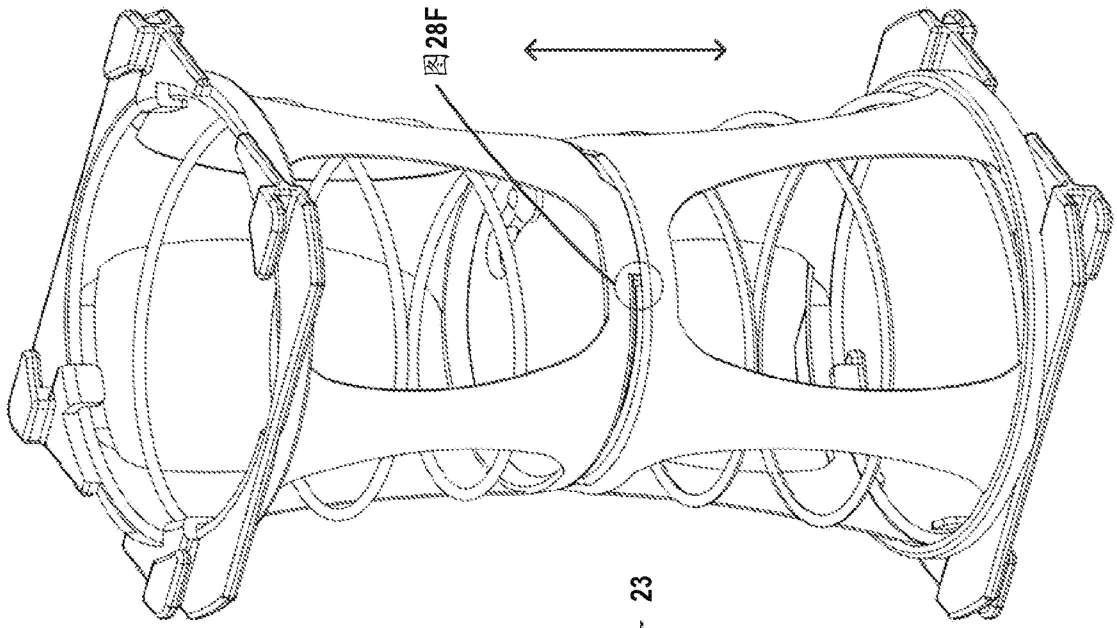
FIGS. 28D and 28E exemplarily show a condition when two spring modules are fixed together via the rotary fixing device shown in FIGS. 28A-28C.
Figure 28F:
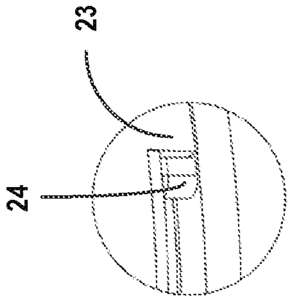
FIG. 28F is a partial enlarged view of FIG. 28E.
Figure 28D:
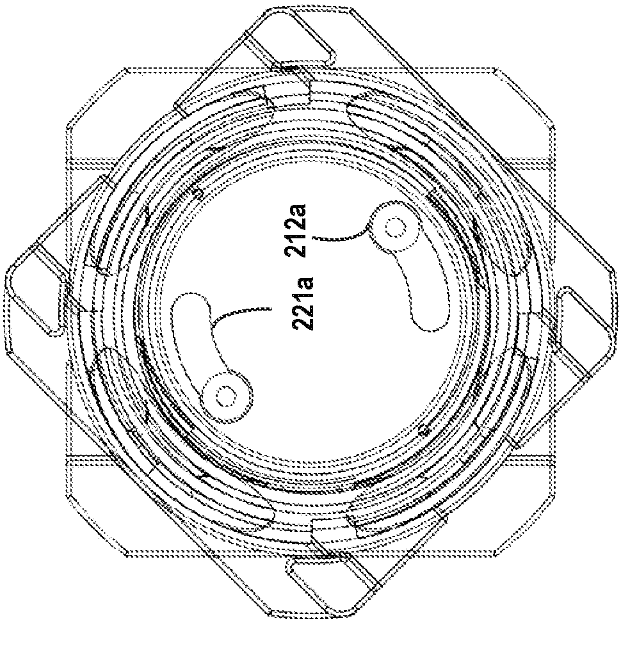

FIG. 28F is a partial enlarged view of FIG. 28E, showing an optional interlocking device provided on the end cover, which comprises a pair of arc walls 23 and a pair of uprights 24 arranged on the end cover in a central symmetrical manner along the circumferential direction of the end cover, the arc walls 23 and the uprights 24 are alternately arranged mutually along the circumferential direction of the end cover. Corresponding to the interlocking device, the base portions 211*a* of the protrusions 21 of the rotary fixing device of in the height direction of the spring modules are sized to allow the two spring modules to move a certain distance relative to each other along the height direction of the spring modules when fixing together in an end cover-to-end cover manner, the distance is designed to be larger than the dimension of the uprights 24 in the height direction of the spring modules, so that when rotating the two spring modules along the locking direction, the arc walls 23 of one spring module are allowed to pass over the uprights 24 of the other spring module. When the two spring modules are already locked in an end cover-to-end cover manner, the uprights 24 of one spring module engage one end of the arc walls 23 of the other spring module to prevent the two spring modules from rotating relative to each other in an unlocking direction opposite to the locking direction, as shown in FIG. 28F. When requiring disassembly, the two spring modules may be moved away from each other manually thus disengaging the arc walls 23 from the uprights 24, and then, the two spring modules may be rotated in the unlocking direction. Preferably, the interlocking devices 23, 24 are positioned radially outside the rotary fixing device 21, 22.

Figure 29A:
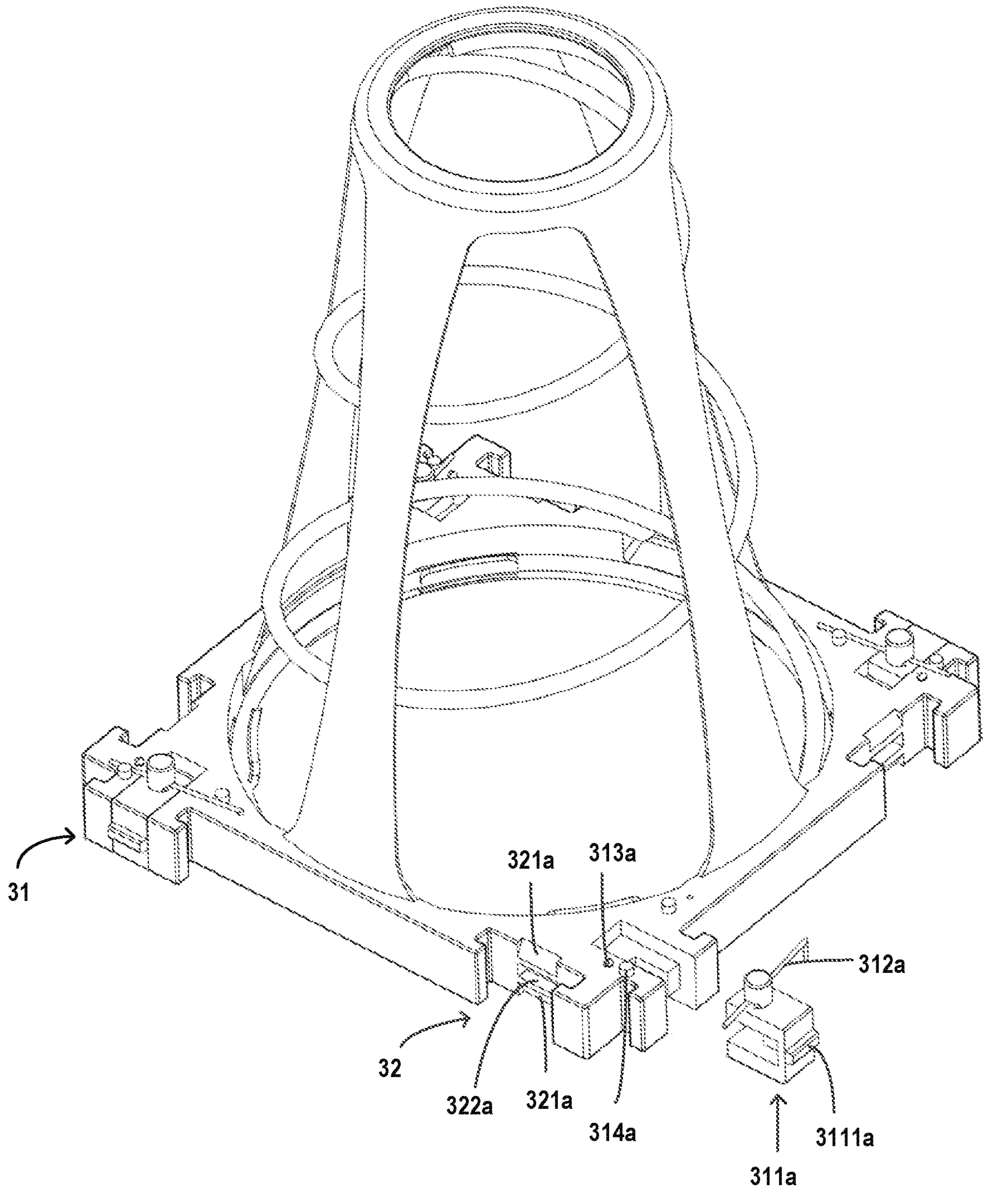
FIGS. 29A and 29B exemplarily show an embodiment of a locking structure of a spring module.
Figure 29B:
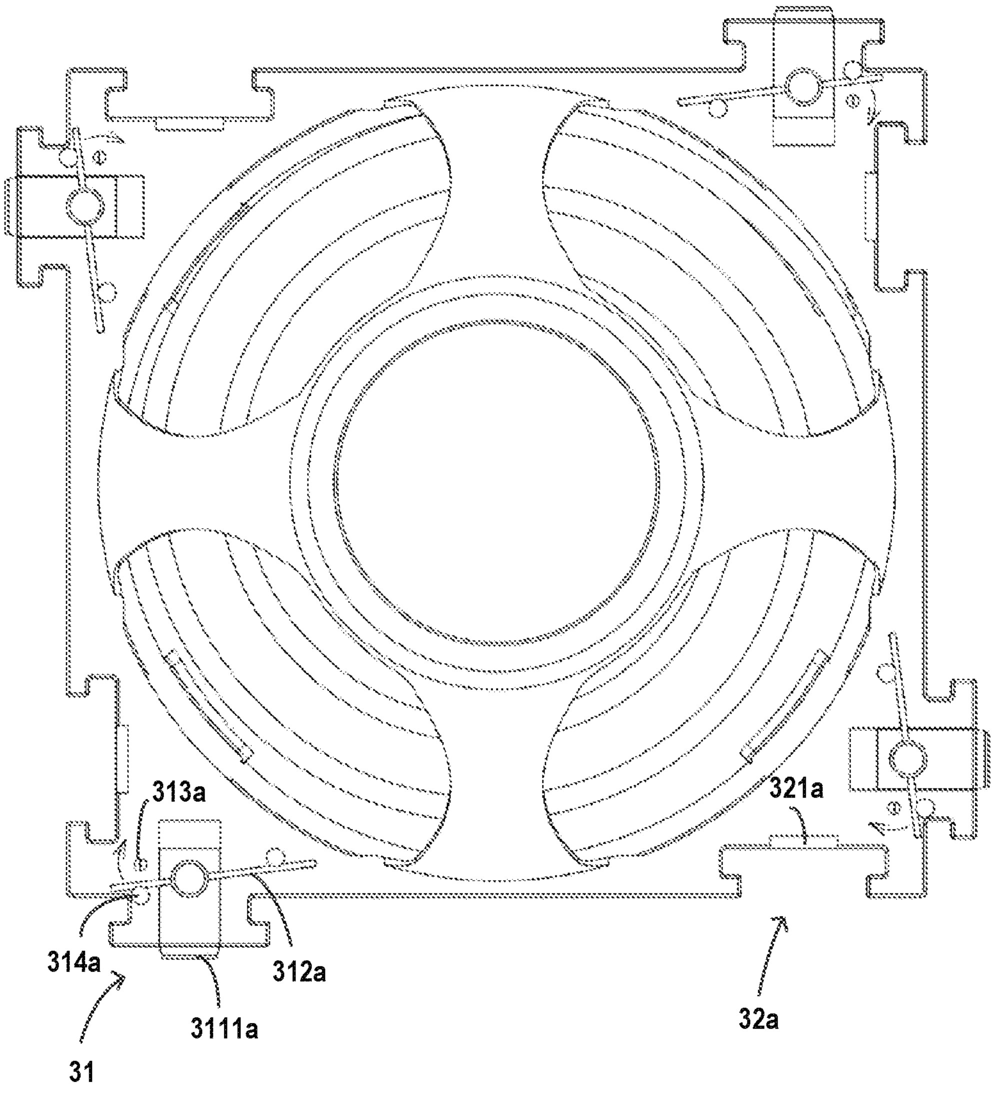

FIGS. 29A and 29B show a spring module having locking structures 31, 32 adapted in shape according to a preferred embodiment of the present disclosure, which are arranged on four sides of the base of the spring module and comprise convex parts 31 extending outward perpendicular to the corresponding sides in the horizontal direction of the base and concave parts 32 extending inward perpendicular to the corresponding sides in the horizontal direction of the base. The convex parts 31 and the concave parts 32 are mutually arranged in alternation on the sides of the base, and the convex parts 31 and the concave parts 32 are shaped to be adapted mutually, so that the convex parts 31 and the concave parts 32 of one spring module may respectively insert into and receive the corresponding concave parts 32 and the corresponding convex parts 31 of another adjacent spring module in the direction perpendicular to the plane of the base, thereby limiting relative movement between adjacent spring modules in the horizontal direction. The convex part 31 comprises a neck and a head positioned at the end of the neck and wider than which. The concave part 32 comprises an opening part and an enlarged concave part positioned inside the opening part and wider than which, and the shapes of the opening part as well as the enlarged concave part are respectively adapted to the neck as well as the head of the convex part, so that the convex part 31 and the concave part 32 of one spring module may respectively insert into and receive the corresponding concave part and the corresponding convex part of another adjacent spring module in the direction perpendicular to the surface of the base.

Figure 29C:
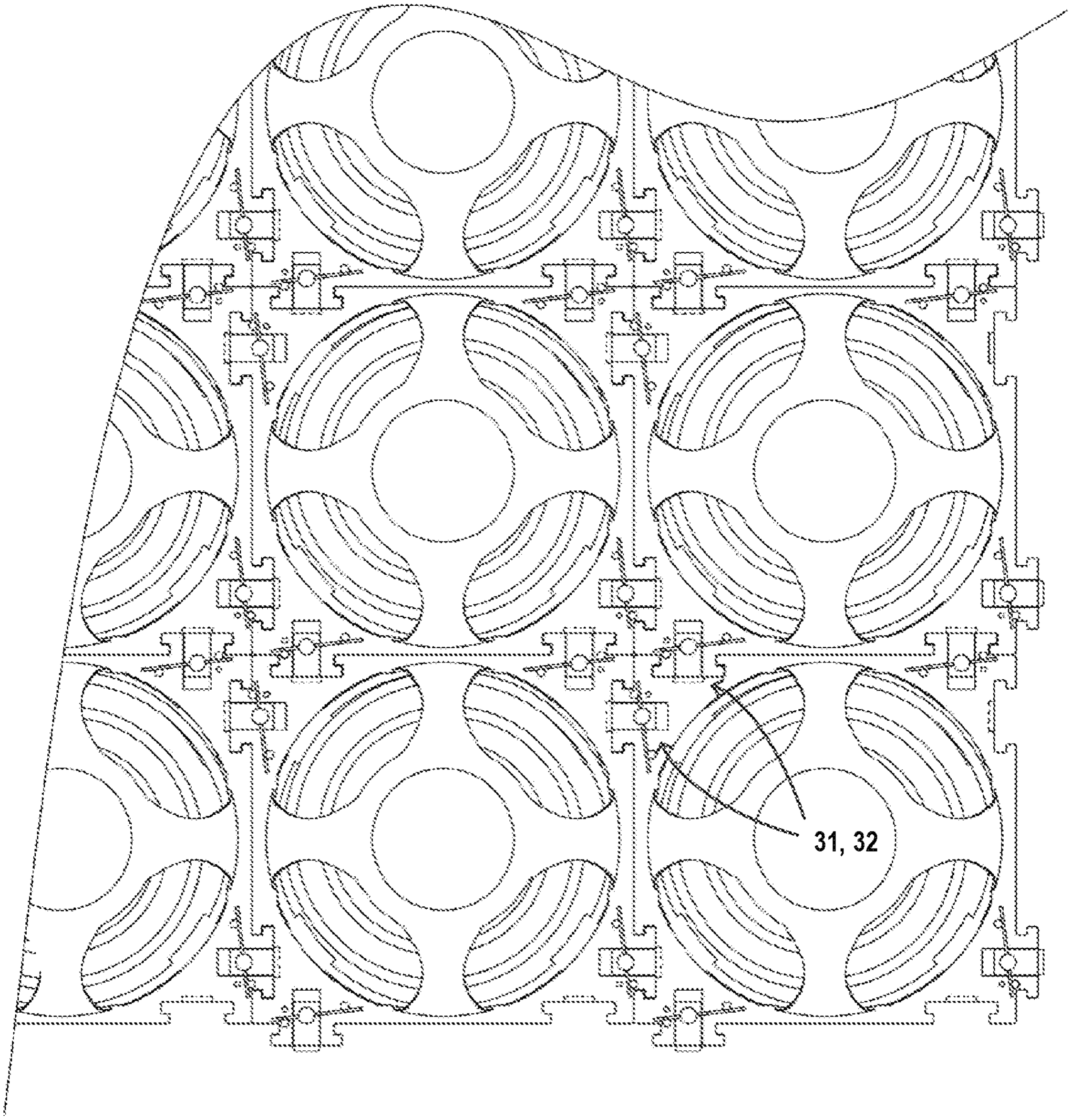
FIG. 29C exemplarily shows a condition when a plurality of spring modules are interlocked together through the locking structures shown in FIGS. 29A and 29B.

Preferably, each convex part 31 further comprises a slider 311*a* and an spring member 312*a*. The slider 311*a* is configured to slide outward and inward along the horizontal direction of the base perpendicular to the corresponding side in the convex part 31, and the outer side of the slider 311*a* is provided with an outwardly protruding tongue part 3111*a*. One end of the spring member 312*a* is fixed on the base while the other end of which is a free end, the spring member 312*a* passes through the slider 311*a* and fixes which between the fixed end and the free end of the spring member 312*a*, the spring member 312*a* is used to apply elasticity to the slider allowing it to slide outward. Two limiting members 313*a*, 314*a* are provided on the base for limiting the movement range of the free end of the spring member 312*a*, wherein the first limiting member 313*a* is used to limit the free end of the spring member 312*a* in a first position so that the slider is in a retracted position, and the second limiting member 314*a* is used to limit the free end of the spring member 312*a* in a second position so that the slider is in an extended position. A groove 322*a* for accommodating the tongue part 3111*a* of the slider in the extended position is provided in each concave part 32 so as to limit relative movement along the height (vertical) direction between the adjacent spring modules. Preferably, the edges of each concave part 32 on the upper and lower surfaces of the base are further provided with a guiding inclined surface 321*a* for guiding the tongue part 3111*a* into the concave part 32. FIG. 29C exemplarily shows a condition when a plurality of spring modules are interlocked together through the interlocking device shown in FIGS. 29A, 29B, as can be seen from the figures, the convex parts 31 of each spring module are adapted within the concave parts 32 of the adjacent spring module, and the slider 311*a* is in an extended position so that the tongue part 311*a* is inserted into the groove 322*a*.

Figure 30A:
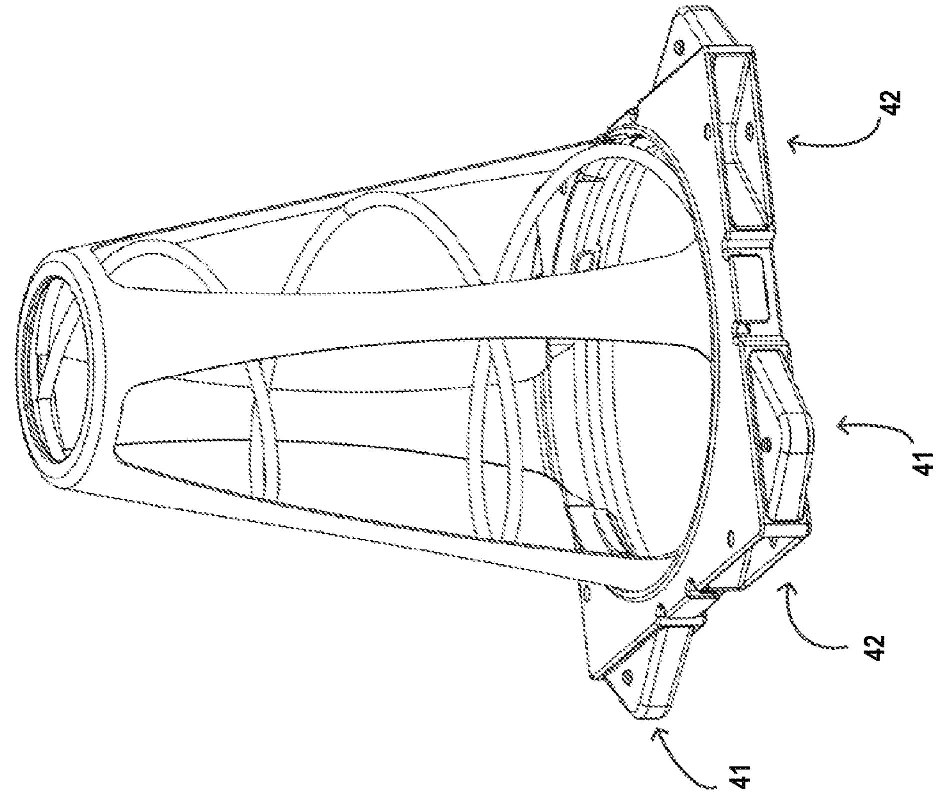
FIGS. 30A and 30B exemplarily show another embodiment of a locking structure of a spring module.
Figure 30B:
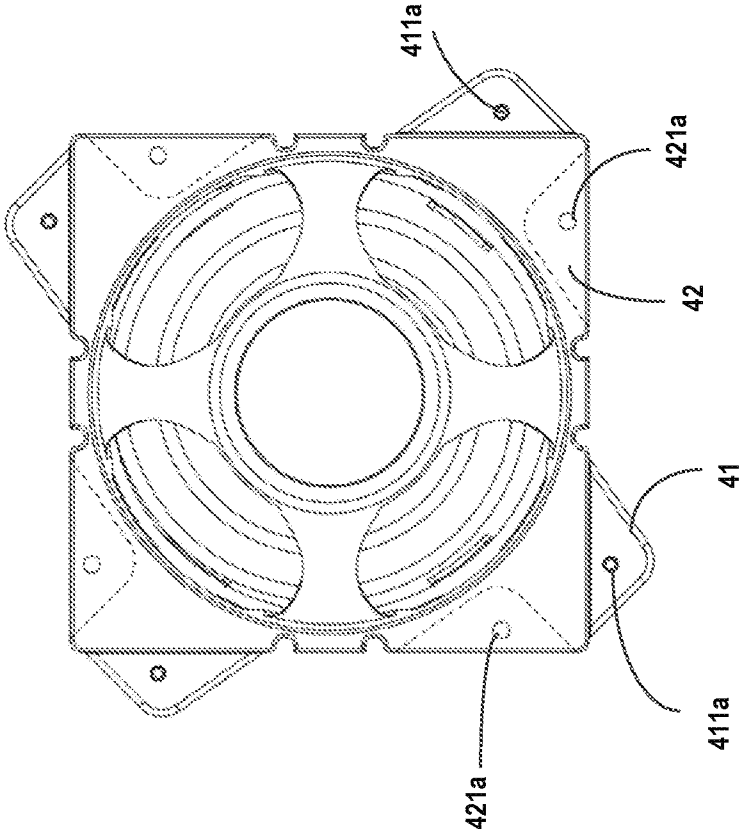
Figure 30C:
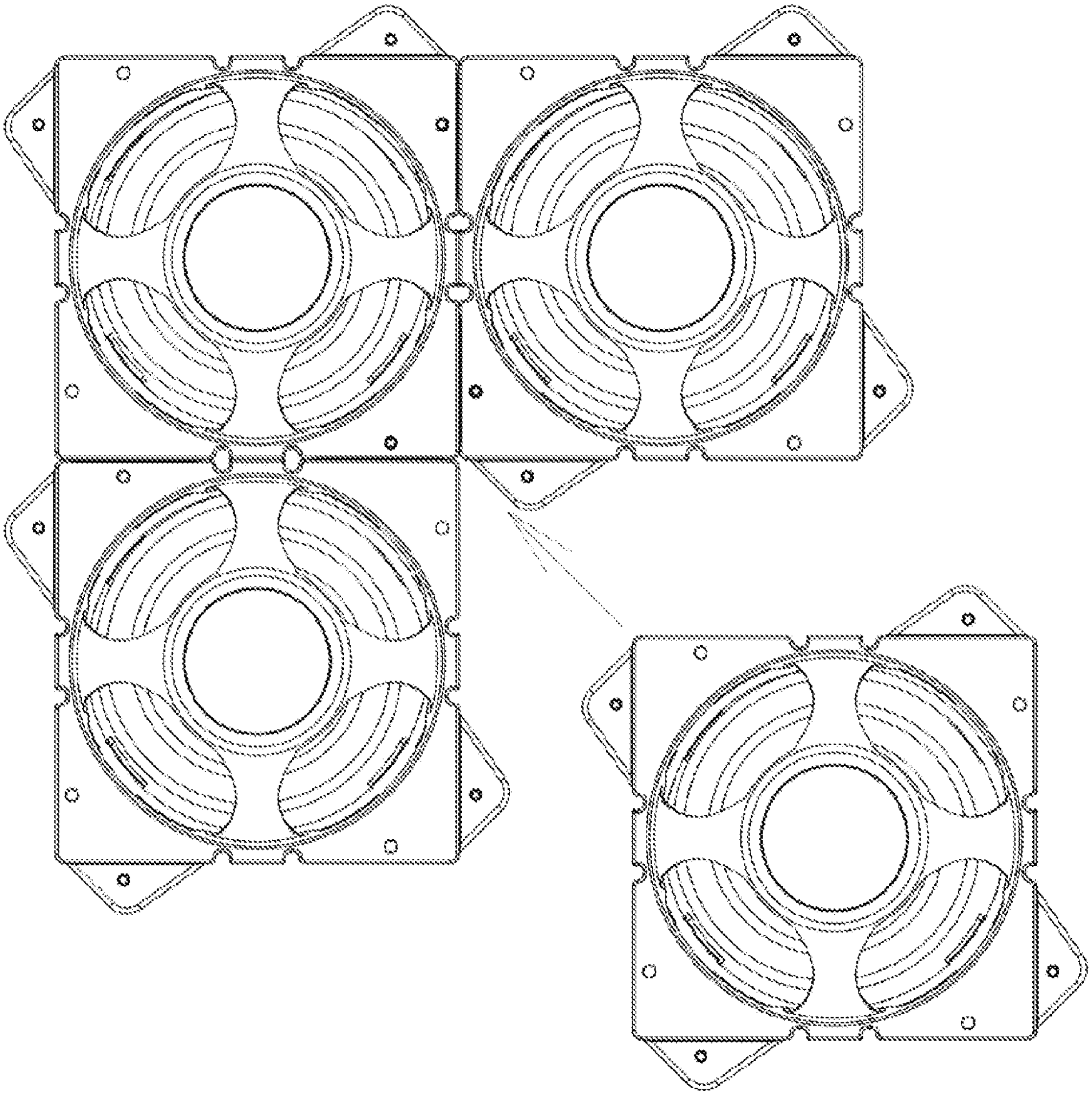
FIG. 30C exemplarily shows a condition when a plurality of spring modules are combined together via the locking structures shown in FIGS. 30A and 30B.

FIGS. 30A and 30B show a spring module having locking structures 41, 42 adapted in shape according to another preferred embodiment of the present disclosure, wherein the convex parts 41 and the concave parts 42 are mutually arranged in alternation on four sides of the base. As shown in the figures, the spring module comprises locking structures provided on four sides of the base, and the locking structure comprises a convex part 41 extending outward perpendicular to the corresponding side along the horizontal direction of the base and a concave part 42 extending inward perpendicular to the corresponding side in the horizontal direction of the base. The shape of the convex part 41 and the shape of the concave part 42 are mutually adapted or complementary, so that the convex part 41 of one spring module may be inserted into the concave part 42 of another spring module in the horizontal direction. Preferably, the convex part 41 and the concave part 42 are substantially triangular. Further preferably, a boss 411*a* is provided on the upper surface and/or the lower surface of the convex part 41, and a through hole 421*a* is provided in the upper wall and/or the lower wall of the concave part 42, and the boss 411*a* may enter into and exit from the through hole 421*a* of the concave part of another spring module. FIG. 30C exemplarily shows a condition when a plurality of spring modules are combined together through the locking structures shown in FIGS. 30A and 30B, since the locking structure on each side of the base of the spring module is the same, thereby allowing various splicing.

Figure 30D:
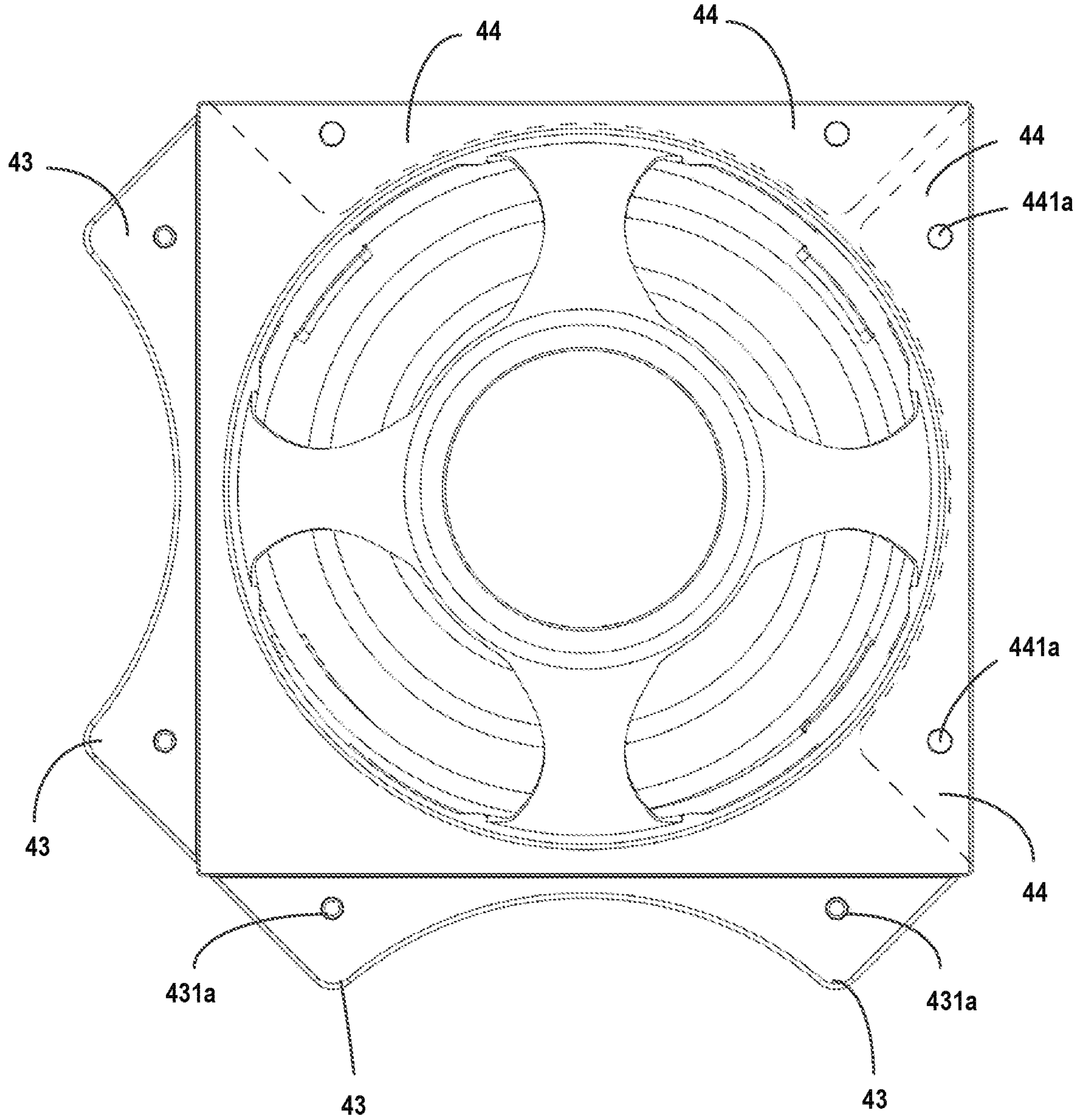
FIG. 30D exemplarily shows yet another embodiment of a locking structure of a spring module.
Figure 30E:
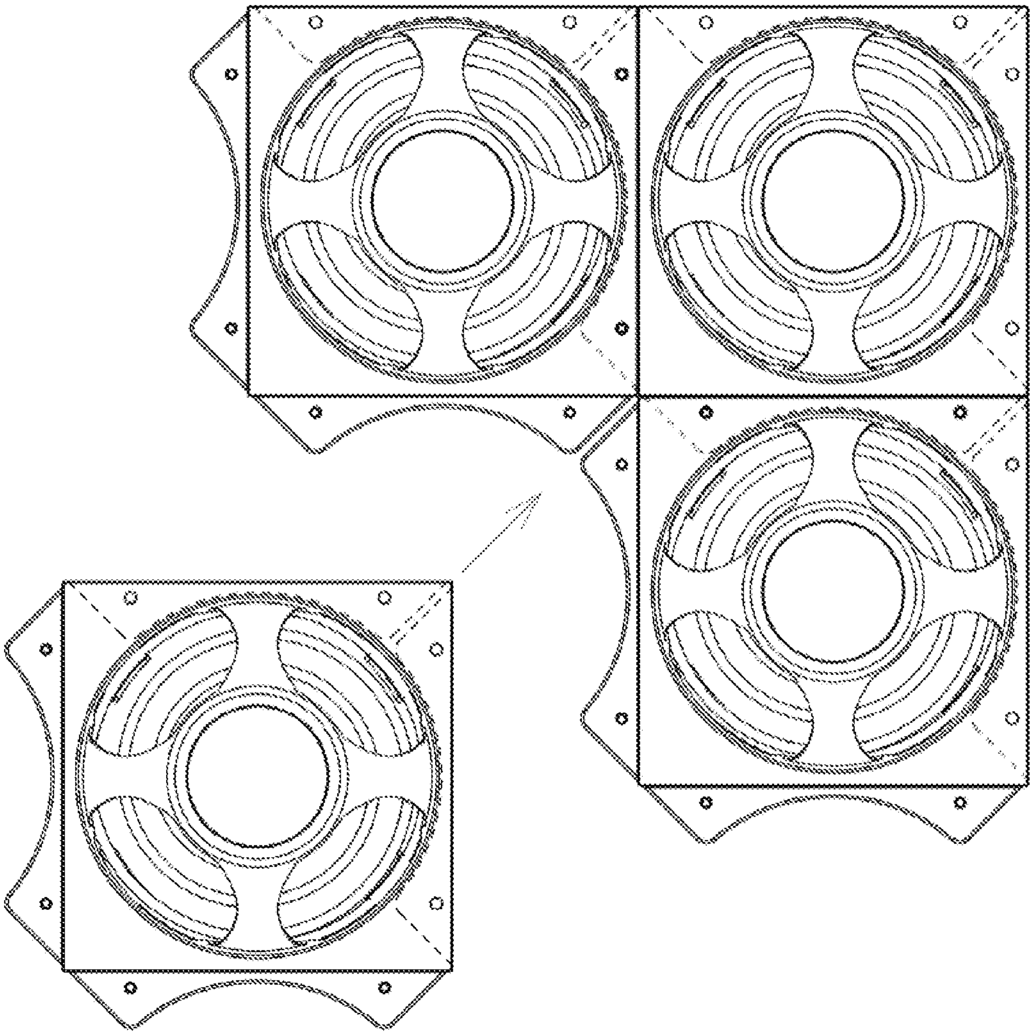
FIGS. 30E and 30F exemplarily show two conditions when a plurality of spring modules are combined together via the locking structures shown in FIG. 30D.
Figure 30F:
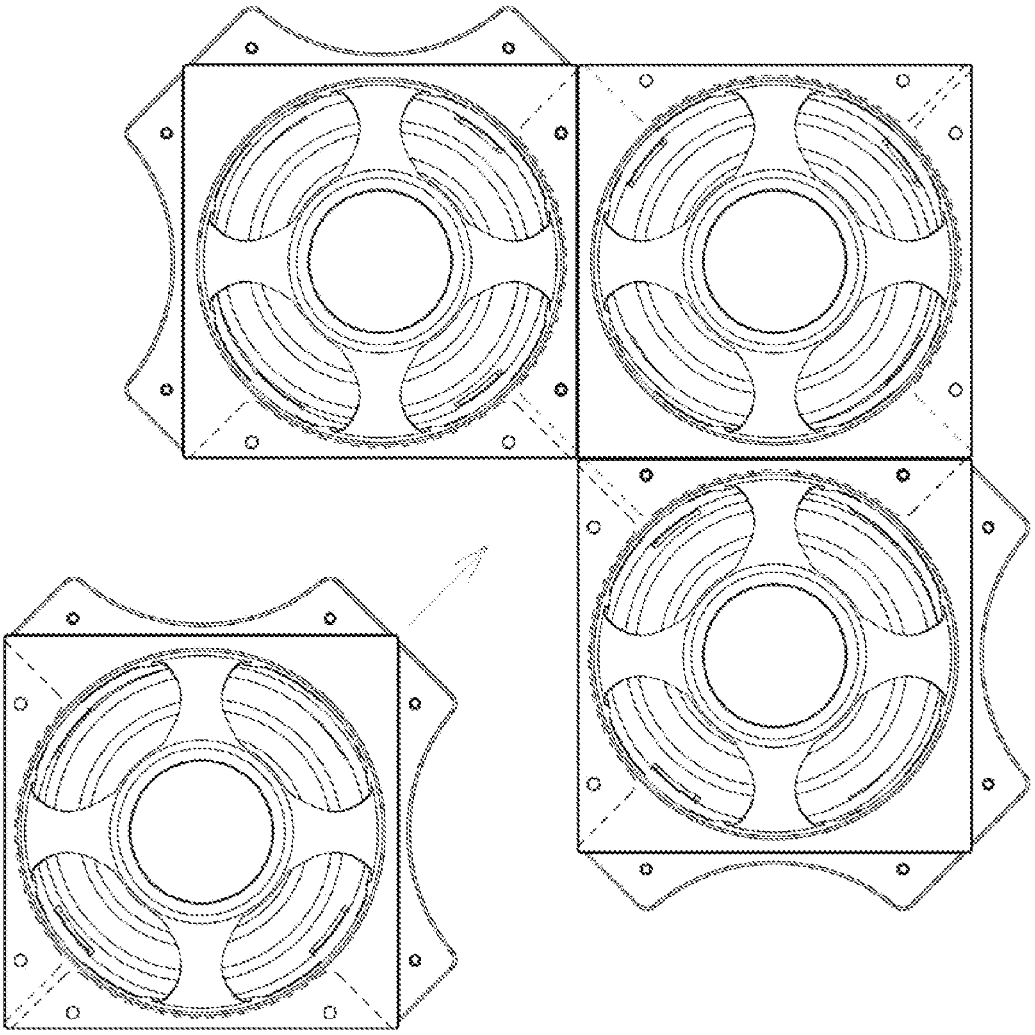

FIG. 30D shows a spring module having locking structures adapted in shape according to yet another preferred embodiment of the present disclosure. As shown in the figure, the spring module comprises locking structures provided on four sides of the base, the locking structure comprises a convex part 43 extending outward perpendicular to the corresponding side in the horizontal direction of the base, and a concave part 44 extending inward perpendicular to the corresponding side in the horizontal direction of the base, the convex parts 43 and the concave parts 44 are arranged opposite to each other on four sides of the base, for example, one side of the base is provided with a pair of convex parts 43, and another side of the base opposite to said side is provided with a pair of concave parts 44, as shown in the figure. The shape of the convex part 43 and the concave part 44 are mutually adapted or complementary, so that the convex part 43 of one spring module may be inserted into the concave part 44 of another spring module in the horizontal direction. Preferably, the convex part 43 and the concave part 44 are substantially triangular. Further preferably, a boss 431*a* is provided on the upper surface and/or the lower surface of the convex part 43, and a through hole 441*a* is provided in the upper wall and/or the lower wall of the concave part 44, and the boss 431*a* may enter into and exit from the through hole 441*a* of the concave part of another spring module. FIGS. 30E and 30F exemplarily show two conditions when a plurality of spring modules are combined together through the locking structures shown in FIGS. 30C and 30D.

Figure 31B:
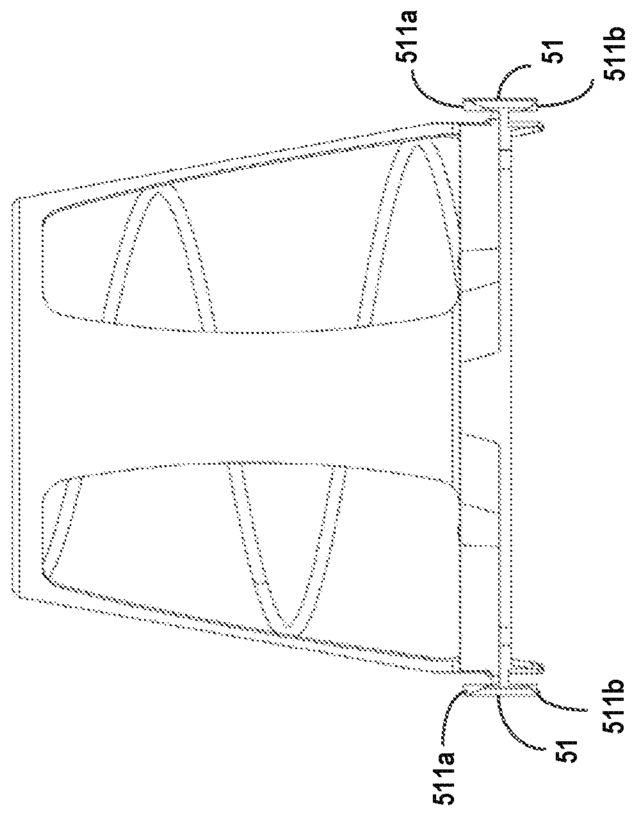
FIGS. 31A and 31B exemplarily show an embodiment of a spring module having a T-shaped connection.
Figure 31A:
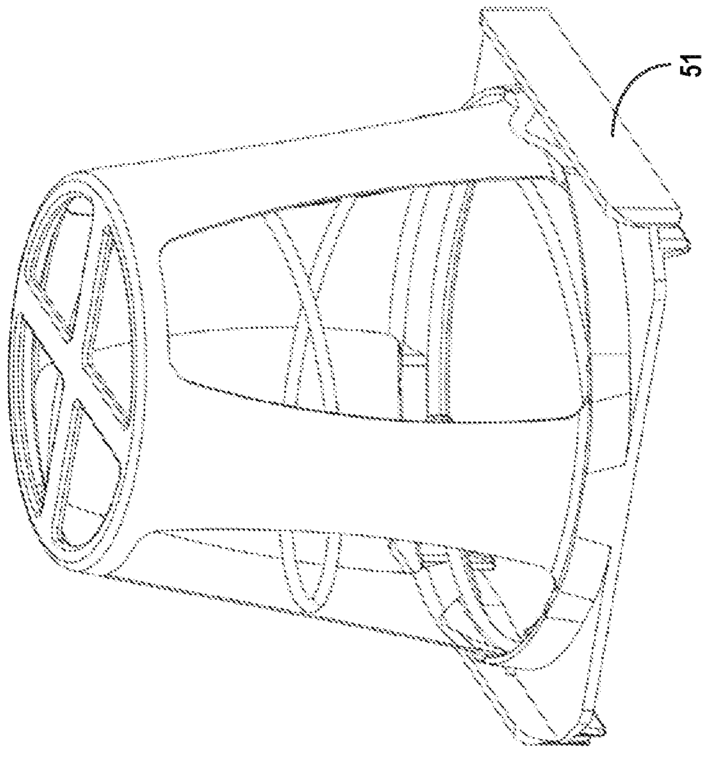
Figure 31C:
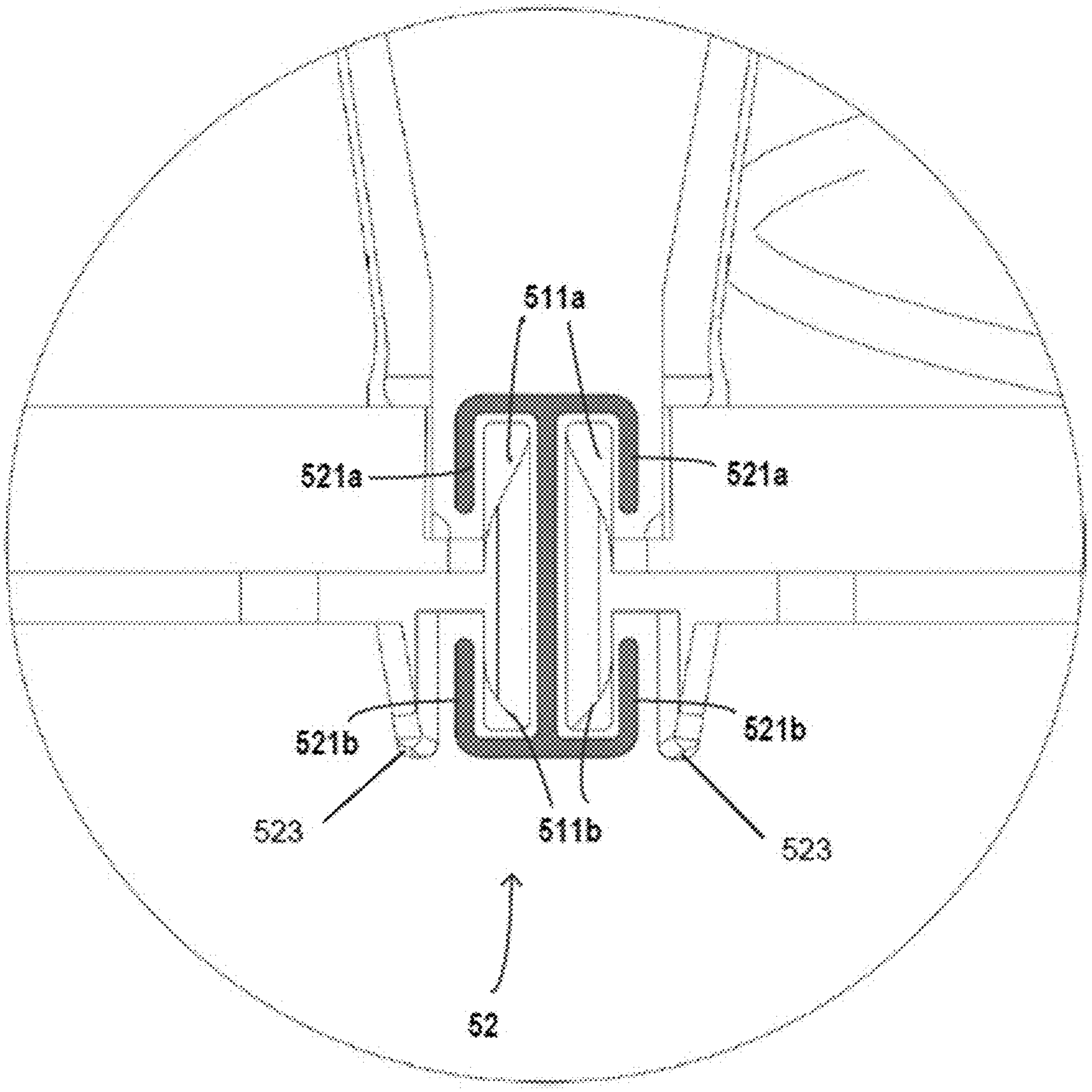
FIG. 31C exemplarily shows a condition when two spring modules having the T-shaped connections shown in FIGS. 31A and 31B are connected together via an I-shaped connector.
Figure 31D:
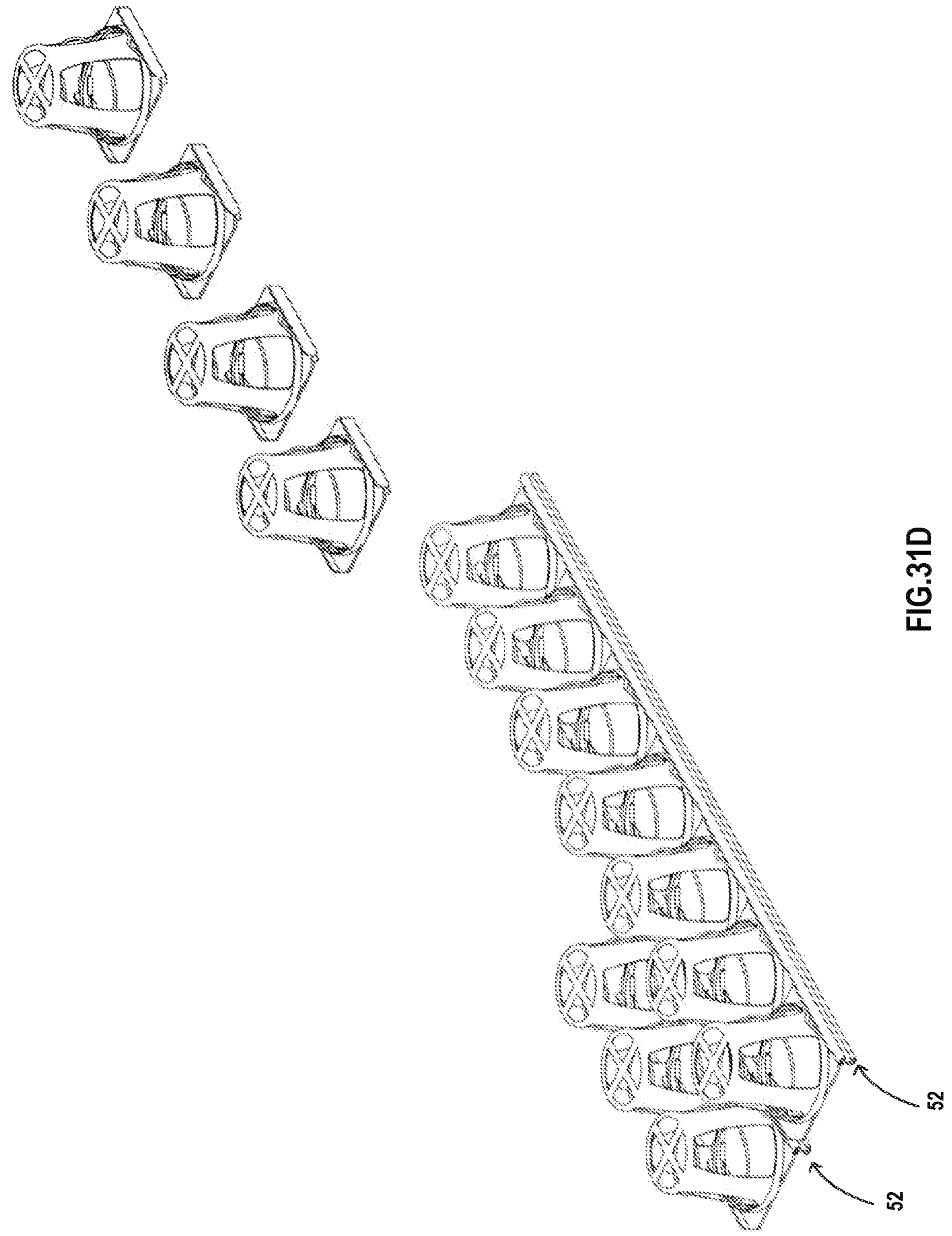
FIG. 31D exemplarily shows a condition when multiple rows of the spring modules having the T-shaped connections shown in FIGS. 31A and 31B are connected together via the I-shaped connectors shown in FIG. 31C.

FIGS. 31A and 31B show a spring module having a T-shaped (or wedge-shaped) connection according to a preferred embodiment of the present disclosure. As shown in the figures, one or more sides of the base of the spring module are provided with a T-shaped (or wedge-shaped) connection 51 extending along the corresponding side, and the T-shaped connection 51 comprises a first flange 511*a* extending upward along the height direction of the spring module, and a second flange 511*b* extending downward along the height direction of the spring module, when two T-shaped connections 51 of two spring modules are arranged adjacently, the two T-shaped connections 51 may be connected together by a connector 52 (as seen in FIGS. 31C and 31F) having a pair of upper flanges 521*a* extending downward as well as a pair of lower flanges 521*b* extending upward, and the connector 52 may slide along the first flange 511*a* as well as the second flange 511*b* so as to pass between two spring modules arranged side by side and connect them together. As shown in FIG. 31C, the connector 52 comprise: an intermediate wall; a pair of upper flanges 521*a* extending downward as well as a pair of lower flanges 521*b* extending upward positioned at both sides of the intermediate wall which may pass between two adjacently arranged connections 51 of two adjacently arranged spring modules so as to connect the two adjacently arranged spring modules together through the upper flanges 521*a* as well as the lower flanges 521*b*. The upper flange 521*a* and the lower flange 521*b* of the connection 52 on the same side of the intermediate wall form a slideway in which the first flange 511*a* and the second flange 511*b* of the spring module may slide through. Preferably, the slideway may be wedge-shaped, and the first flange 511*a* as well as the second flange 511*b* may form a wedge-shaped shape adapted to the wedge-shaped shape of the slideway. FIG. 31D exemplarily shows a condition when the spring modules having the T-shaped connections 51 shown in FIGS. 31A and 31B are connected in rows through the I-shaped connectors shown in FIG. 31C. As shown in FIG. 31C, first and second supporting portions 523, separate from the first and second connections, extend vertically downward from a bottom surface of the base, adjacent to the first and second connections.

Figure 31E:
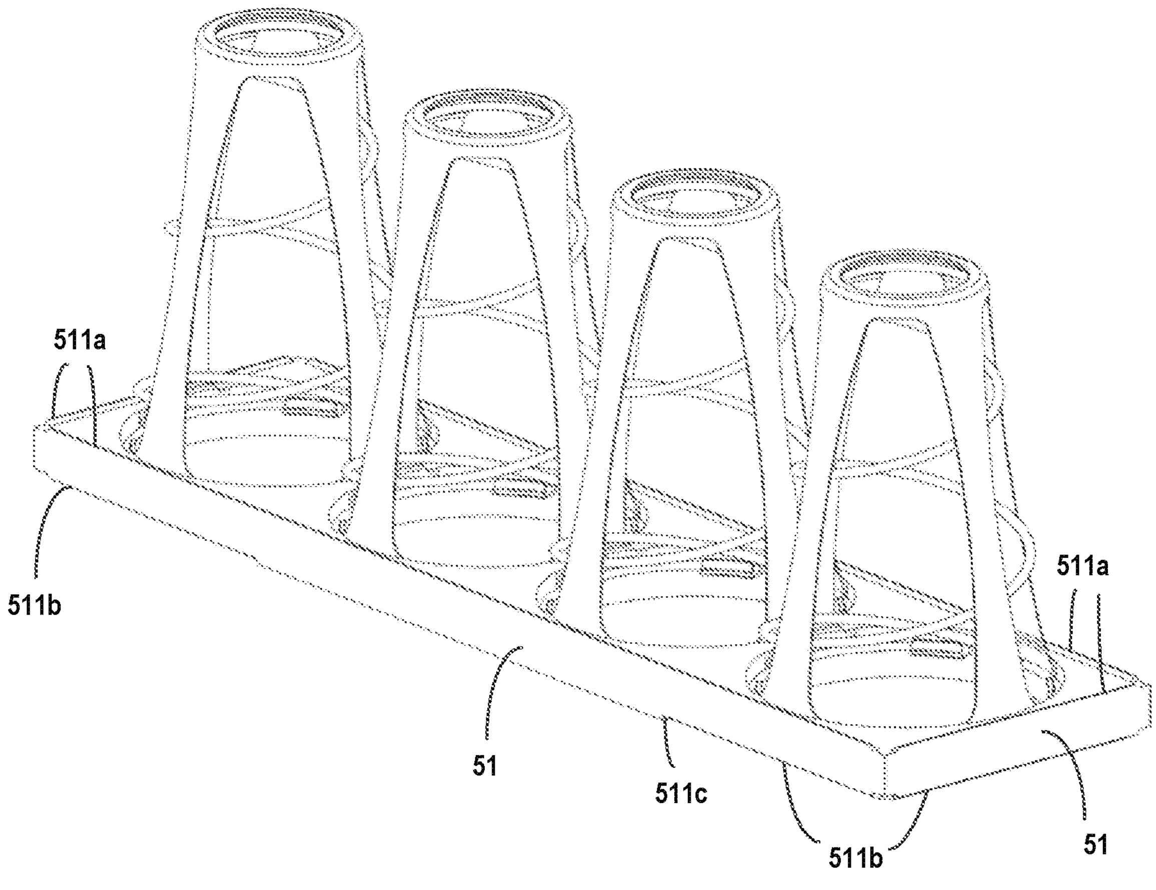
FIG. 31E exemplarily shows another embodiment of a spring module having a T-shaped connection.
Figure 31F:
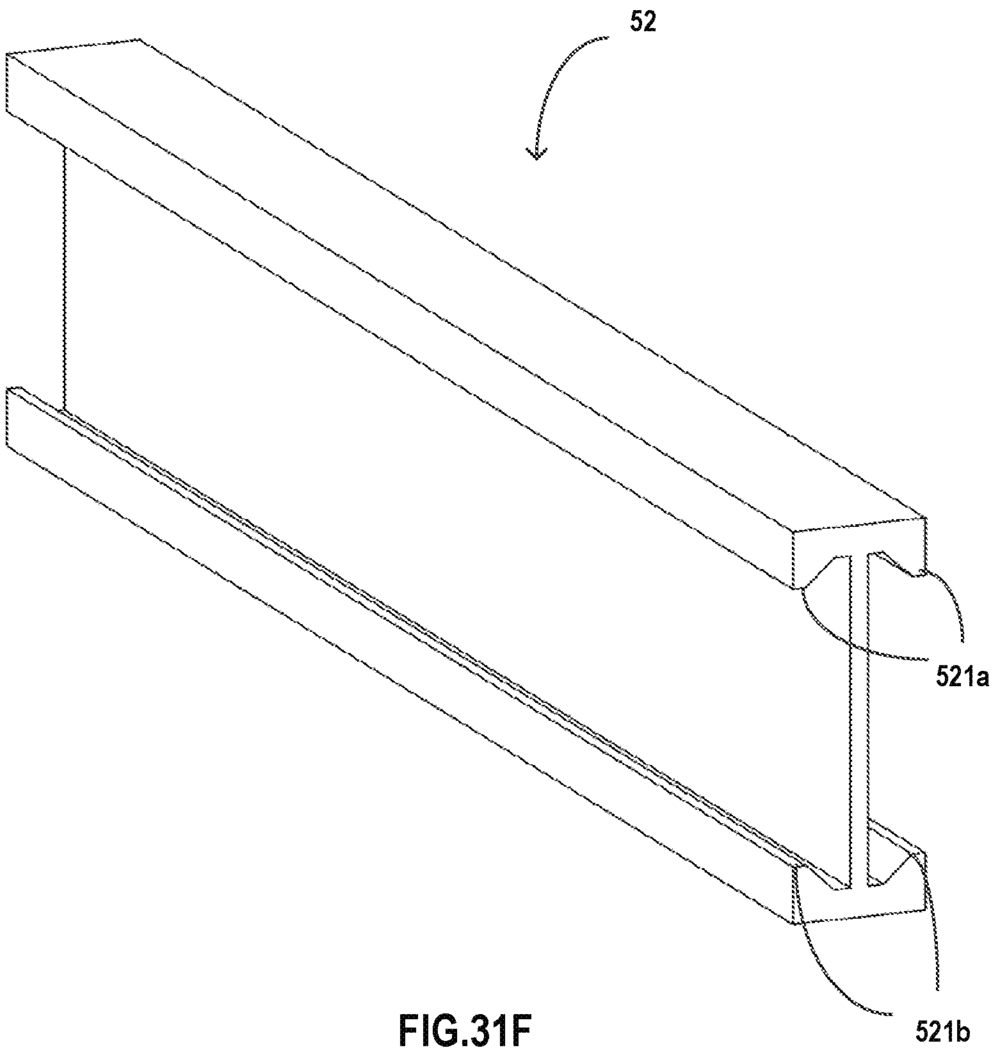
FIG. 31F exemplarily shows an I-shaped connector for connecting the spring module shown in FIG. 31E.

FIG. 31E shows a spring module having a T-shaped (or wedge-shaped) connection 51 according to another preferred embodiment of the present disclosure. As shown in the figure, four sides of the base of the spring module with multiple springs (the spring module shown in the figure comprises four springs, which may also comprise any other number of springs, such as three, five, etc.) are all provided with T-shaped connections 51, and a stop part 511*c* for limiting the I-shaped connector 52 is provided in the middle of the second flange 511*b* in order to prevent the I-shaped connector 52 from sliding further inward.

Figure 31G:
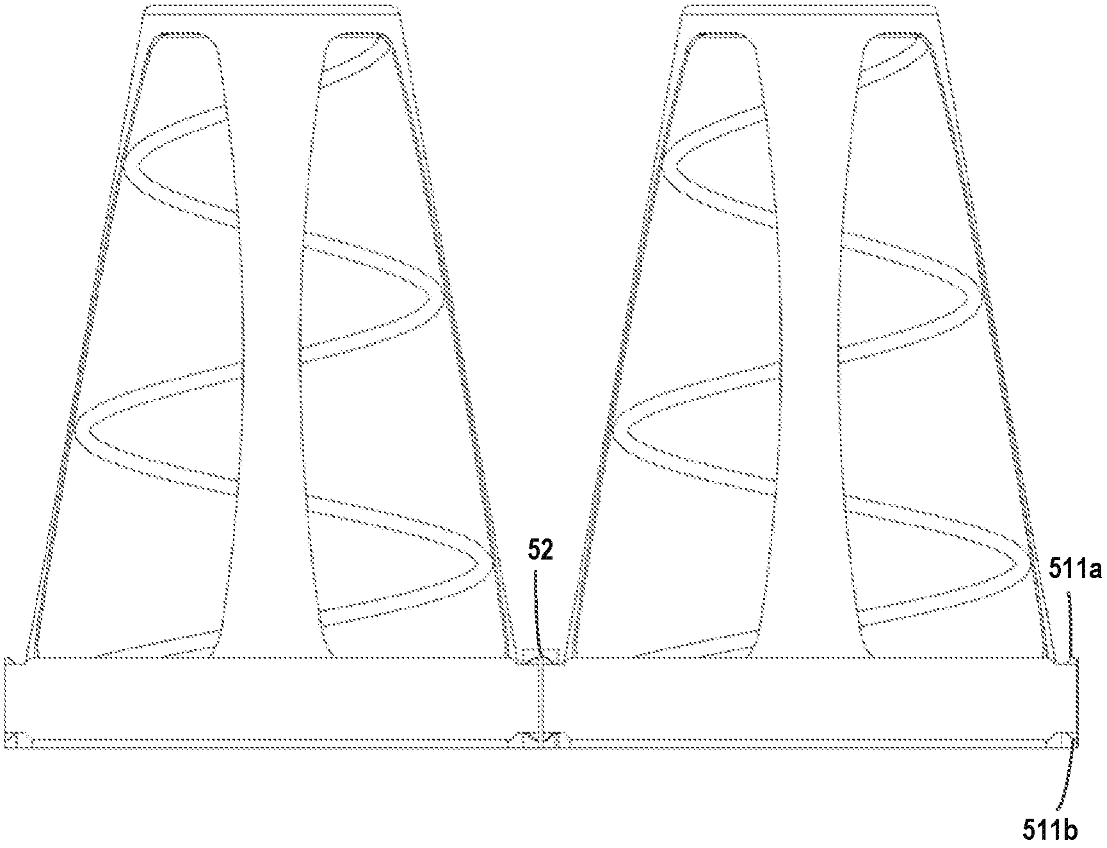
FIGS. 31G and 31H exemplarily show a condition when a plurality of spring modules shown in FIG. 31E are connected together through the I-shaped connectors shown in FIG. 31F.
Figure 31H:
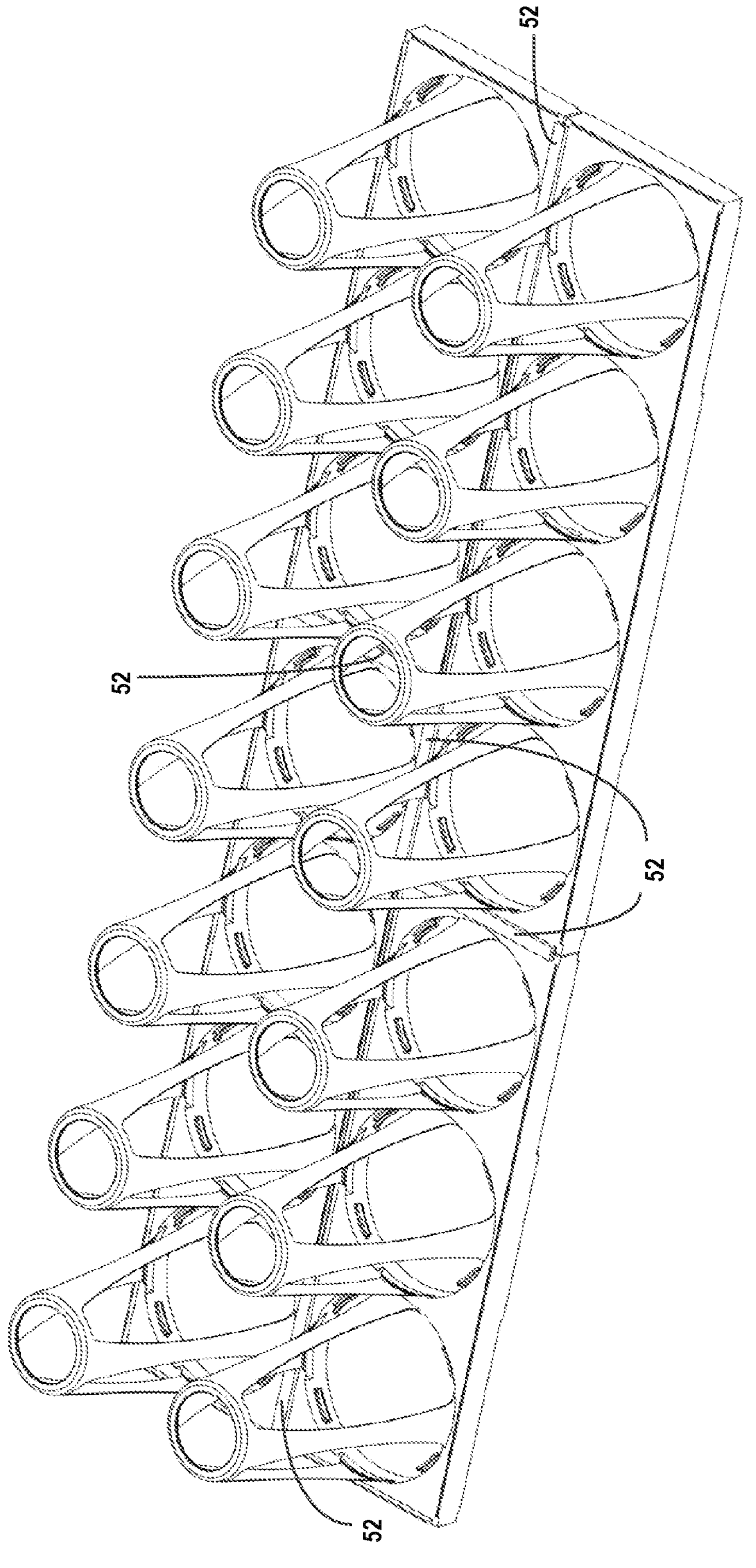

FIGS. 31G and 31H exemplarily show a condition when a plurality of spring modules shown in FIG. 31E (springs omitted) are connected together through the I-shaped connectors shown in FIG. 31F, wherein a three-in-one spring module (three springs installed in one one-piece spring bracket) and a four-in-one spring module (four springs installed in one one-piece spring bracket) are shown, those skilled in the art will realize that the spring module may also be a spring module containing other numbers of springs. Any number of spring modules may be spliced together in any way according to actual requirements (such as the size of the spring cushion).

Figure 31I:
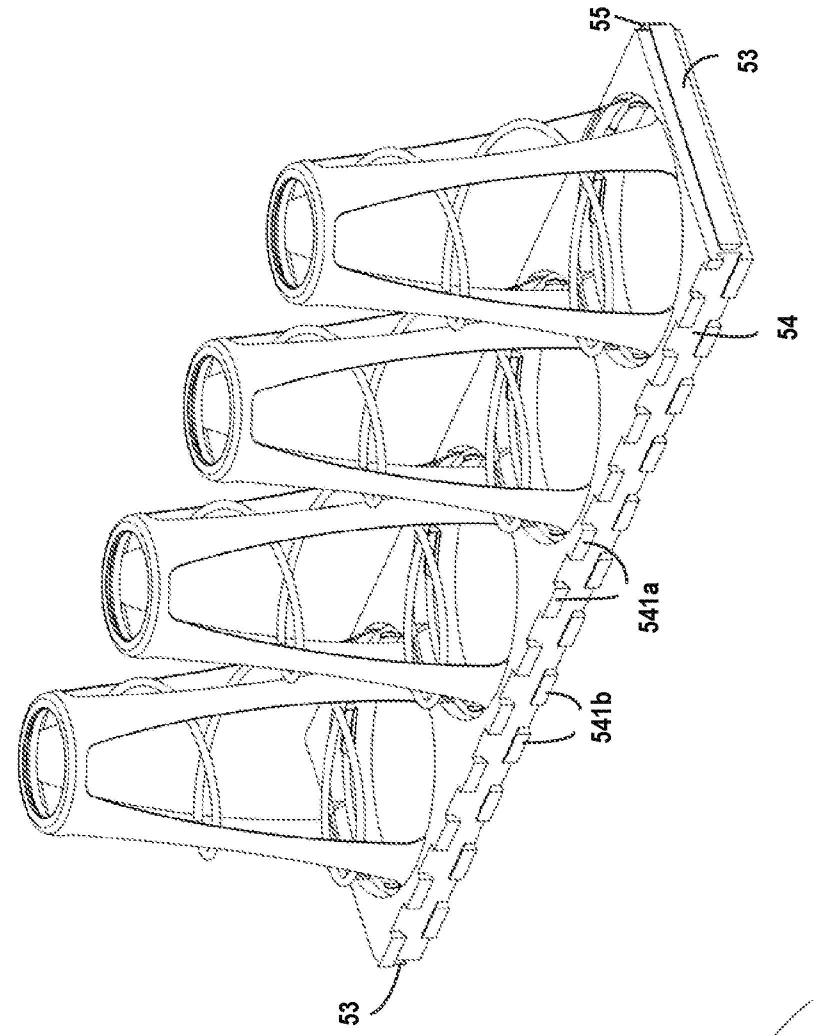
FIGS. 31I and 31J exemplarily show an embodiment of a spring module having a wedge-shaped splicing part.
Figure 31K:
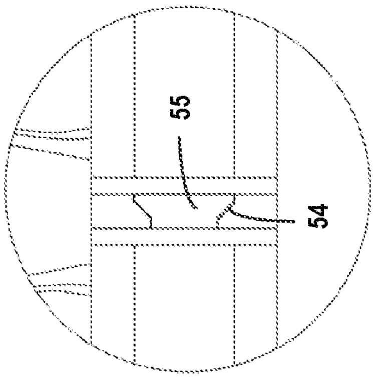
FIG. 31K exemplarily shows a condition when two spring modules shown in FIGS. 31I and 31J are spliced together.
Figure 31J:
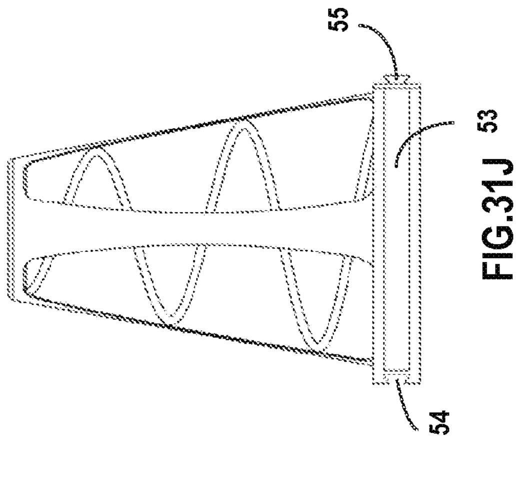
Figure 31M:
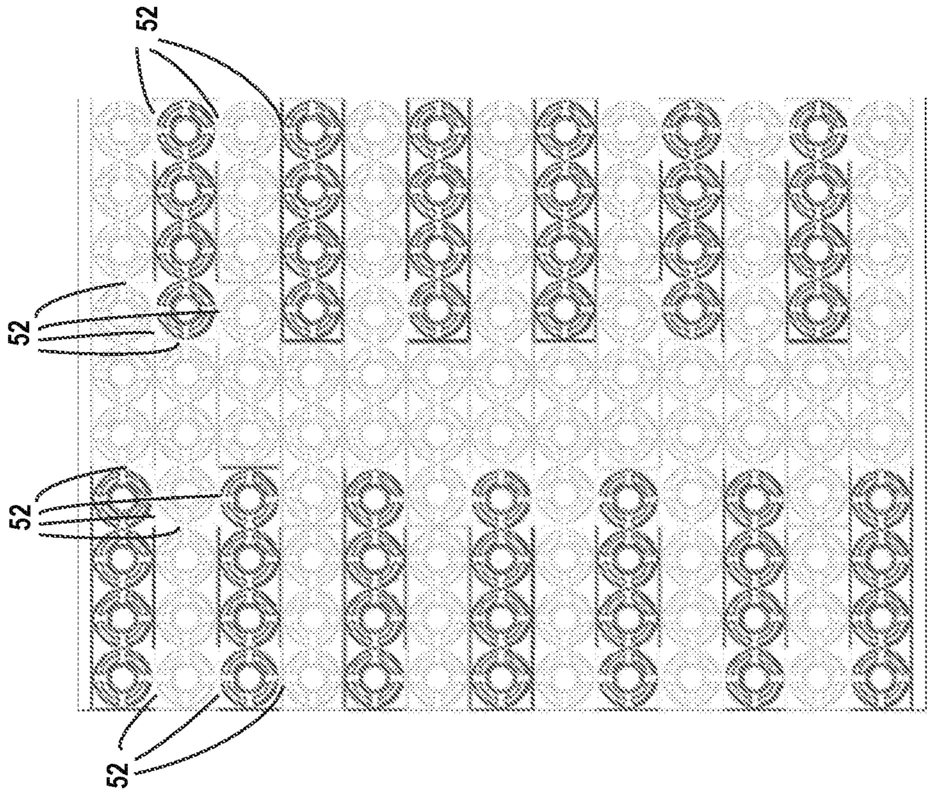
FIGS. 31L and 31M exemplarily show spring cushions of different sizes assembled by the spring modules and the I-shaped connectors shown in FIGS. 31E-31H.
Figure 31L:
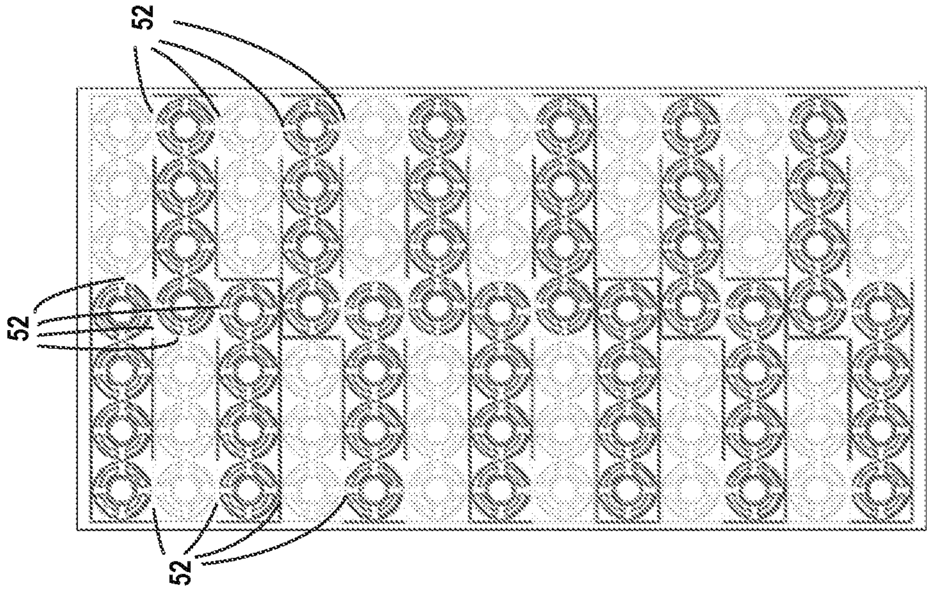

FIGS. 31L and 31M exemplarily show spring cushions of different sizes which are made by splicing the spring modules and the I-shaped connectors shown in FIG. 31E-31H, because four sides of the base of the spring module of the present embodiment are all provided with T-shaped (or wedge-shaped) connections 51, the spring modules arranged adjacently in the transverse and longitudinal directions are connected together through the I-shaped connectors 52.

FIGS. 31I and 31J show a spring module having wedge-shaped (or T-shaped) splicing parts 53, 54 according to a preferred embodiment of the present disclosure. As shown in the figures, one side of the base is provided with a wedge-shaped (or T-shaped) groove 54, and the opposite side is provided with a wedge-shaped (or T-shaped) protrusion 55 capable of shape matching with the wedge-shaped (or T-shaped) groove 54, the other two opposite sides are respectively provided with wedge-shaped protrusions 53, the wedge-shaped protrusion 55 may slide within the wedge-shaped groove 54 of the base of another spring module so as to connect the two spring modules together, and the wedge-shaped protrusion 53 of one spring module may be connected together with the wedge-shaped protrusion 53 of another spring module by the I-shaped connector 52 shown in FIG. 31F. Preferably, the two side walls 541*a*, 541*b* forming the wedge-shaped grooves 54 are discontinuous, and the side walls 541*a*, 541*b* are distributed in a staggered manner. FIG. 31K exemplarily shows an enlarged sectional view when two spring modules shown in FIGS. 31I and 31J are spliced together through the wedge-shaped protrusions 55 and the wedge-shaped grooves 54.

Figure 31P:
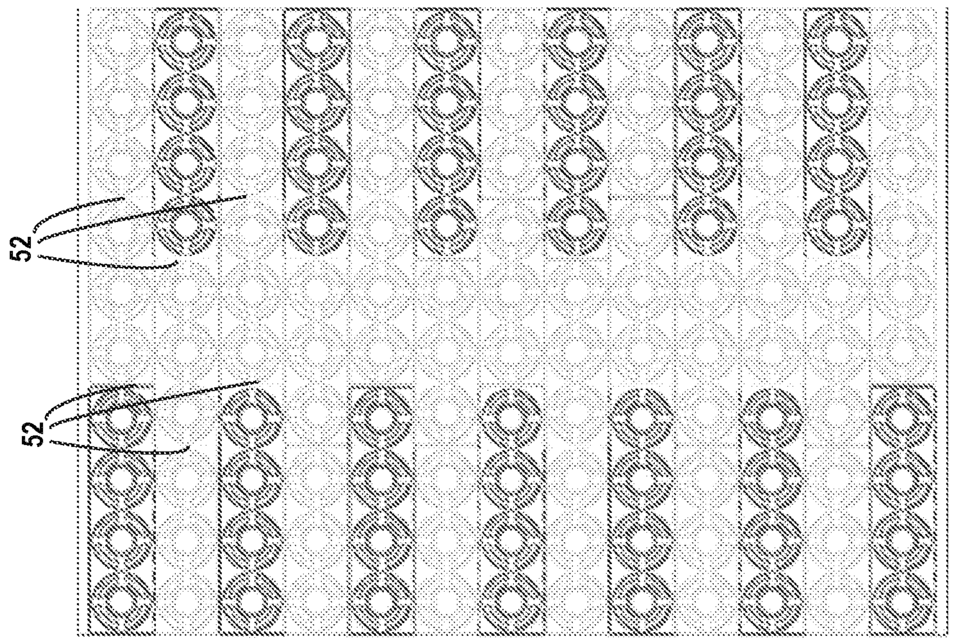
FIGS. 31N and 31P exemplarily show spring cushions of different sizes assembled by the spring modules shown in FIGS. 31I-31K and the I-shaped connectors shown in FIG. 31F.
Figure 31N:
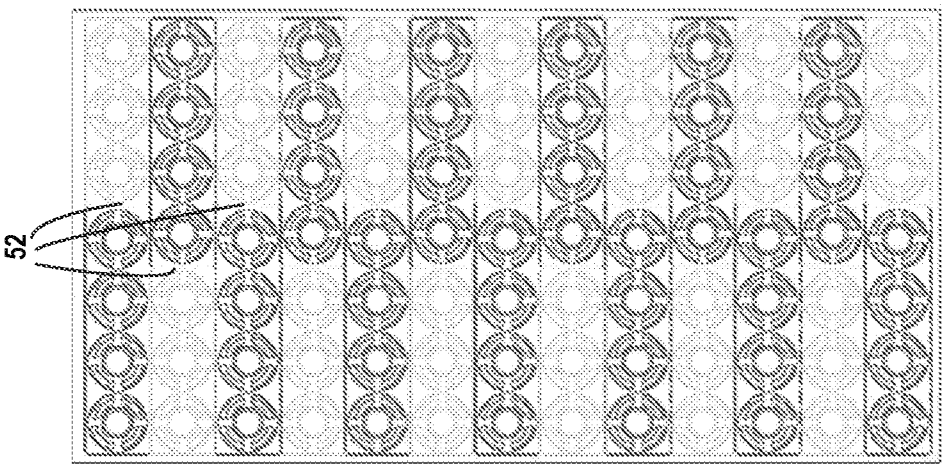

FIGS. 31N and 31P exemplarily show spring cushions of different sizes assembled by the spring modules shown in FIGS. 31I-31K and the I-shaped connectors shown in FIG. 31F, as shown in the figures, because one pair of opposite sides of the base of the spring module of the present embodiment are respectively provided with the wedge-shaped grooves 54 and the wedge-shaped protrusions 55 which may be matched with each other, and further, the other pair of opposite sides are respectively provided with the T-shaped (or wedge-shaped) connections 53, transversely (the horizontal direction shown in the figures) adjacent spring modules are connected with each other by the I-shaped connectors 52, while longitudinally (the vertical direction shown in the figures) adjacent spring modules are connected with each other by their own wedge-shaped grooves 54 and wedge-shaped protrusions 55.

Figure 32A:
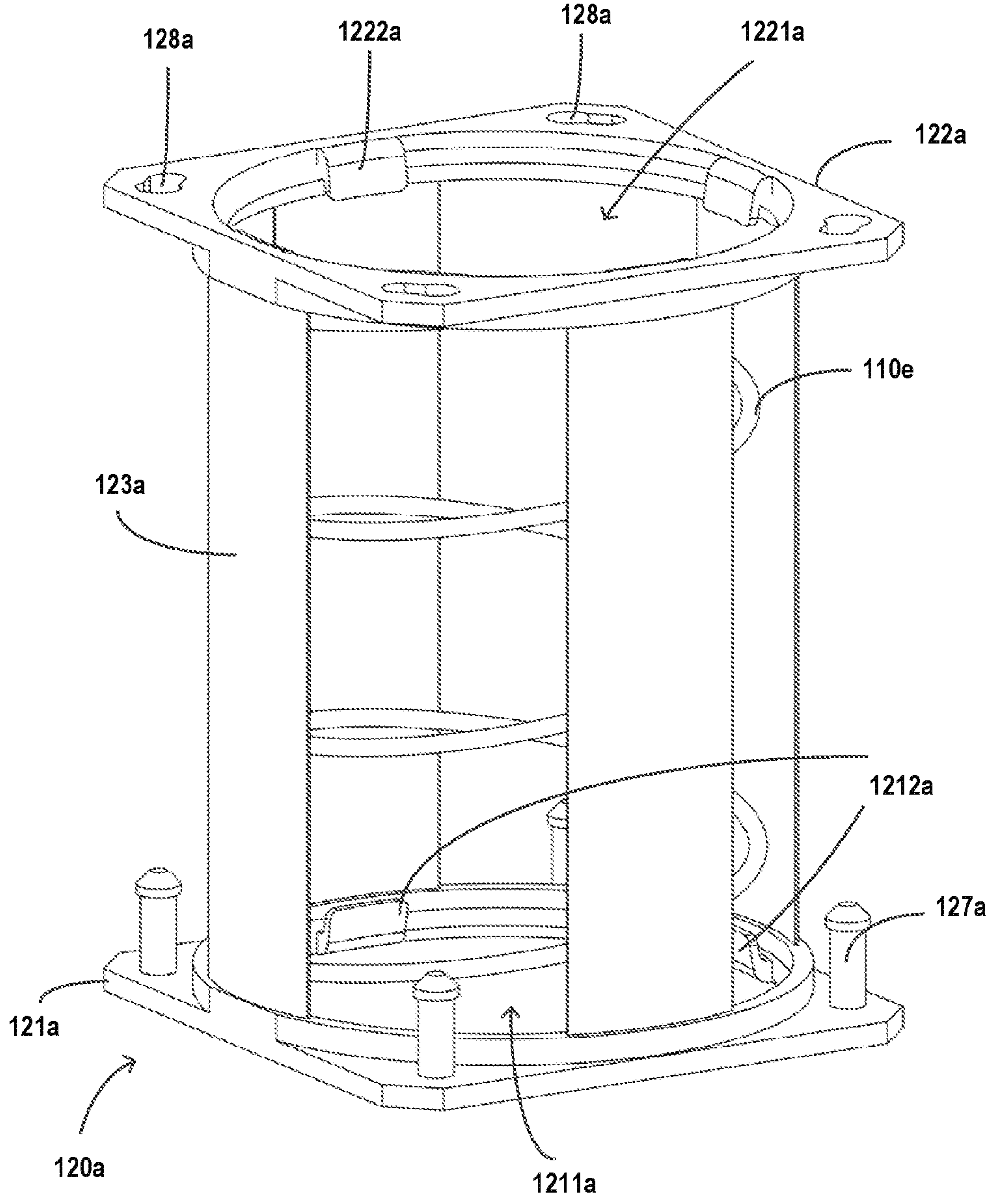
FIG. 32A exemplarily shows a spring module in which a base and an end cover can be snapped together according to a preferred embodiment of the present disclosure.
Figure 32B:
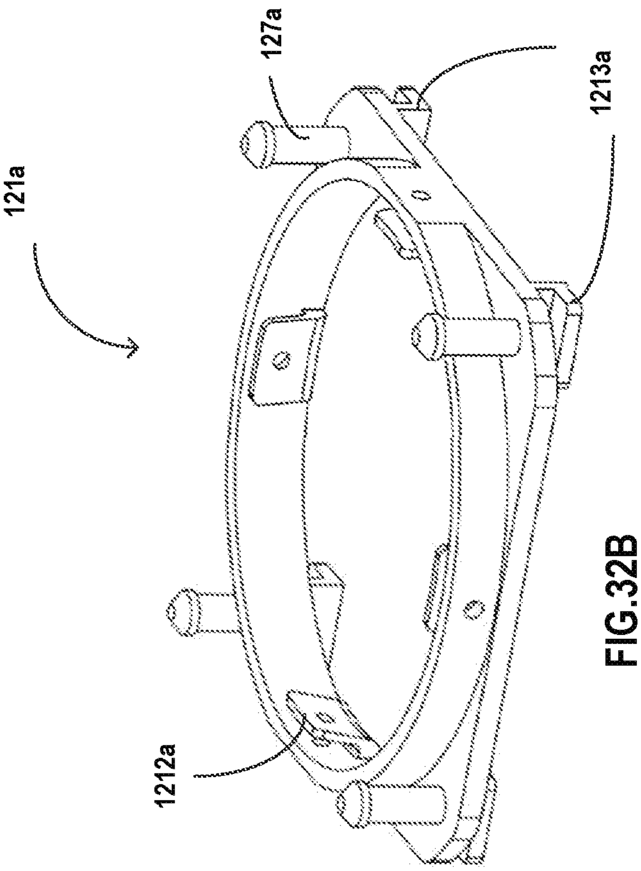
FIGS. 32B-32D exemplarily show a perspective view, a top view and a side view of the base of the spring module shown in FIG. 32A, respectively.
Figure 32D:
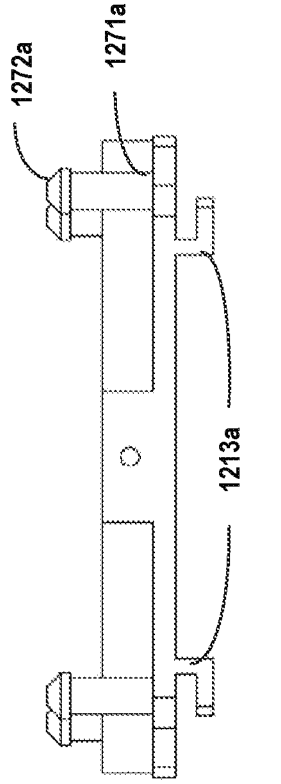
Figure 32C:
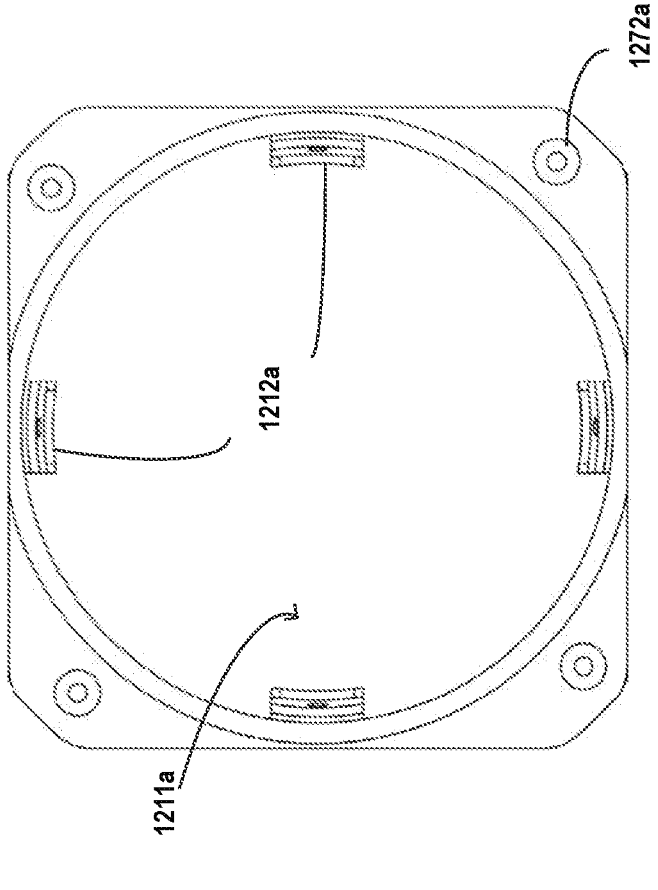
Figure 32E:
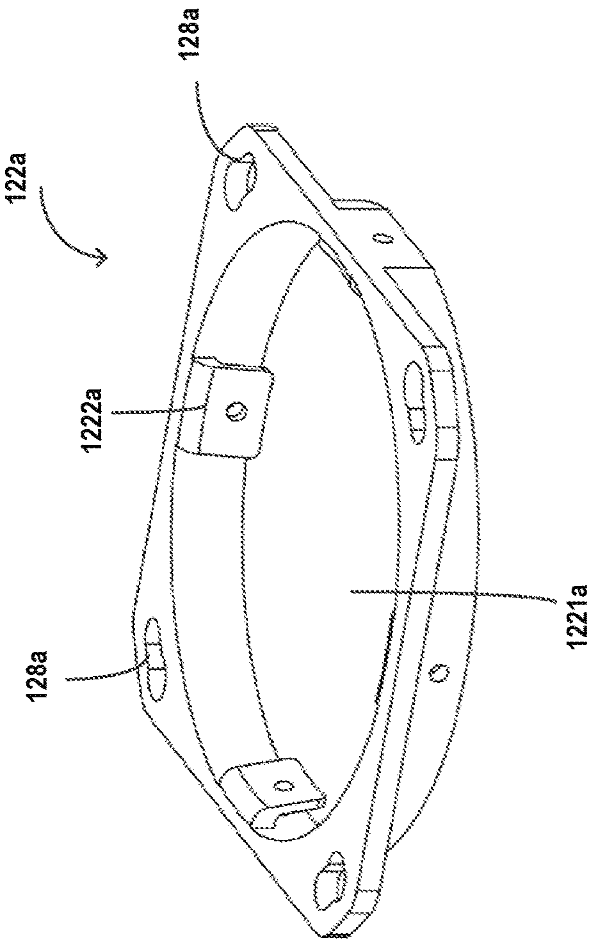
FIGS. 32E and 32F exemplarily show a perspective view and a top view of the end cover of the spring module shown in FIG. 32A, respectively.
Figure 32F:
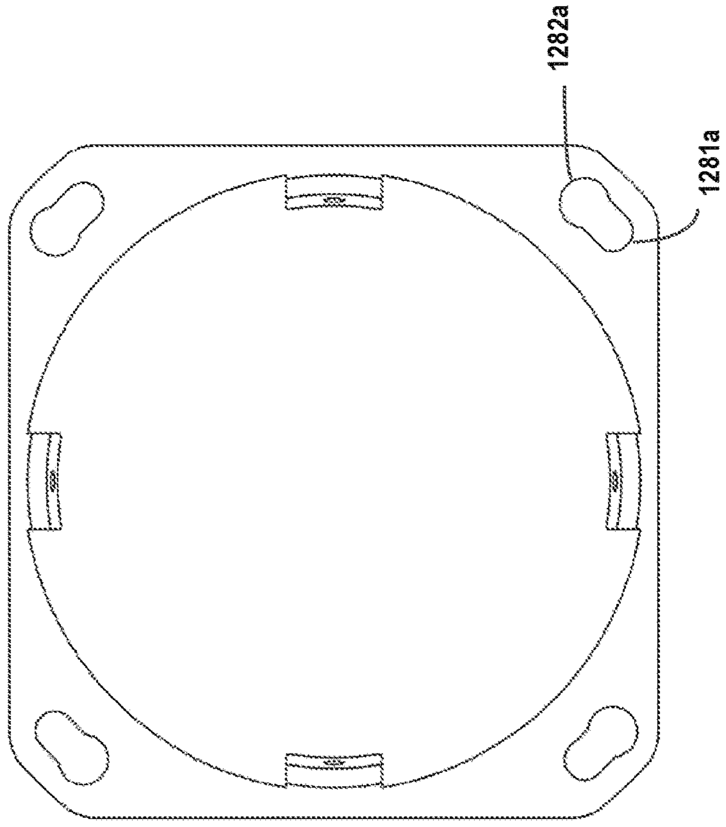
Figure 32I:
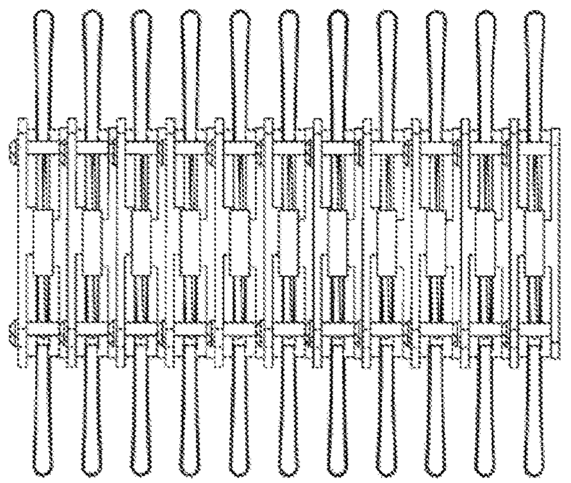
FIG. 32I exemplarily shows a condition when a plurality of the spring modules in a compressed configuration shown in FIGS. 32G and 32H are stacked together.
Figure 32G:
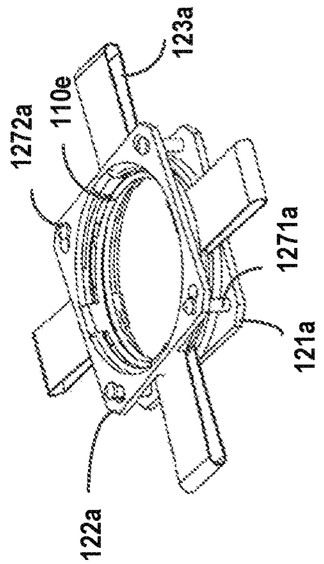
FIG. 32G and FIG. 32H exemplarily show a perspective view and a top view when the base and the end cover of the spring module shown in FIG. 32A are snapped together, respectively.
Figure 32H:
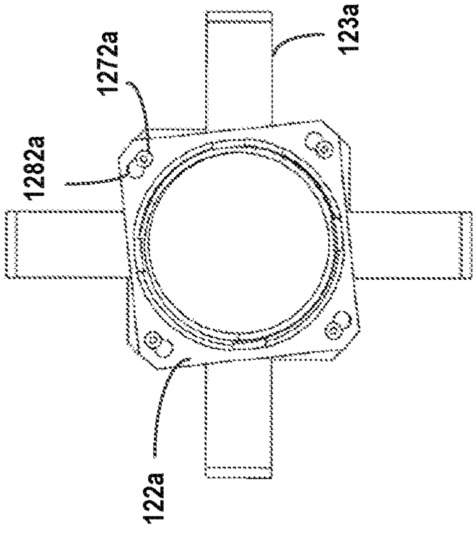

FIG. 32A shows a spring module according to a preferred embodiment of the present disclosure in which the base and the end cover may be snapped together so that the spring is compressed therebetween, the volume of the spring module is greatly reduced when the base and the end cover are snapped together, thus convenient for storage and transportation. FIGS. 32B-32D respectively illustrate a perspective view, a top view and a side view of the base of the spring module shown in FIG. 32A, and FIGS. 32E, 32F respectively illustrate a perspective view and a top view of the end cover of the spring module shown in FIG. 32A. As shown in the figures, the spring module comprises a spring 110*e* and a spring bracket 120*a* capable of holding and fixing the spring, and the spring bracket 120*a* comprises a base 121*a*, an end cover 122*a* and flexible connecting straps 123*a*. The base 121*a* comprises a spring mounting seat having first spring fixing parts 1212*a*, each of which may be configured to fix a first end of the spring 110*e*. The end cover 122*a* comprises a spring mounting seat having second spring fixing parts 1222*a* capable of fixing a second end of the spring. Two ends of each flexible connecting strap 123*a* are fixedly connected to the base 121*a* and the end cover 122*a*, respectively, and are positioned outside each spring 110*e*. A rotary locking assembly is provided on the base 121*a* as well as the end cover 122*a*, and the base is configured to be removably locked together with the end cover through the rotary locking assembly, so that the spring is compressed therebetween. As shown in FIGS. 32B-32F, the rotary locking assembly comprises one or more locking posts 127*a* provided on the outer region of the base 121*a*, and one or more arc openings 128*a* provided on the corresponding outer region of the end cover 122*a*. Each locking post 127*a* comprises a base 1271*a* as well as an end 1272*a* having a larger sectional size than that of the base. Each arc opening 128*a* comprises an arc extending portion 1281*a* and an end opening portion 1282*a* positioned at one end of the arc opening and larger in size than the arc extending portion. The end opening portion 1282*a* of each arc opening 128*a* is sized to allow the thicker end 1272*a* of the corresponding locking post 127*a* to pass therethrough, and the narrower arc extending portion of each arc opening 128*a* is sized not to allow the end 1272*a* of the corresponding locking post 127*a* to pass therethrough, therefore, when compressing the spring and rendering the thick end of each locking post 127*a* to pass through the corresponding end opening portion 1282*a*, by rotating the base 121*a* and the end cover 122*a* along the locking direction, the base 1271*a* of each locking post 127*a* moves along the corresponding arc opening 128*a* into the arc extending portion 1281*a* of which and is locked therein by the end 1272*a*, thereby releasably locking the base and the end cover together. FIGS. 32G and 32H schematically respectively show a perspective view and a top view when the base and the end cover of the spring module shown in FIG. 32A are snapped together. FIG. 32I exemplarily shows a condition when a plurality of spring modules shown in FIGS. 32G and 32H are stacked together, wherein the spring modules are in a compressed configuration. The compressed and locked spring modules may greatly save space for storage and transportation.

Figure 32K:
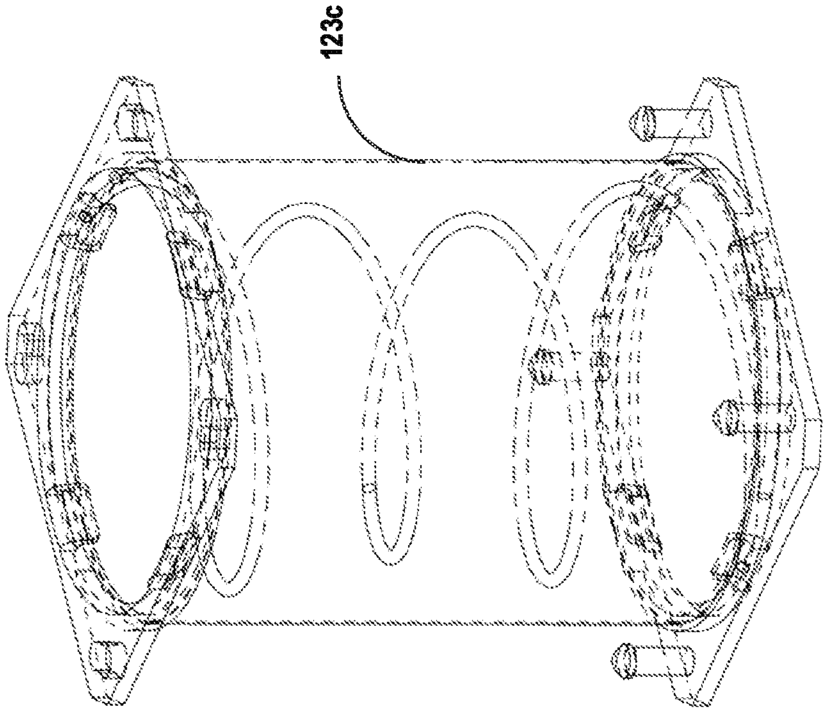
FIGS. 32J-32M exemplarily show spring modules in which a base and an end cover can be snapped together according to other preferred embodiments of the present disclosure, respectively.
Figure 32J:
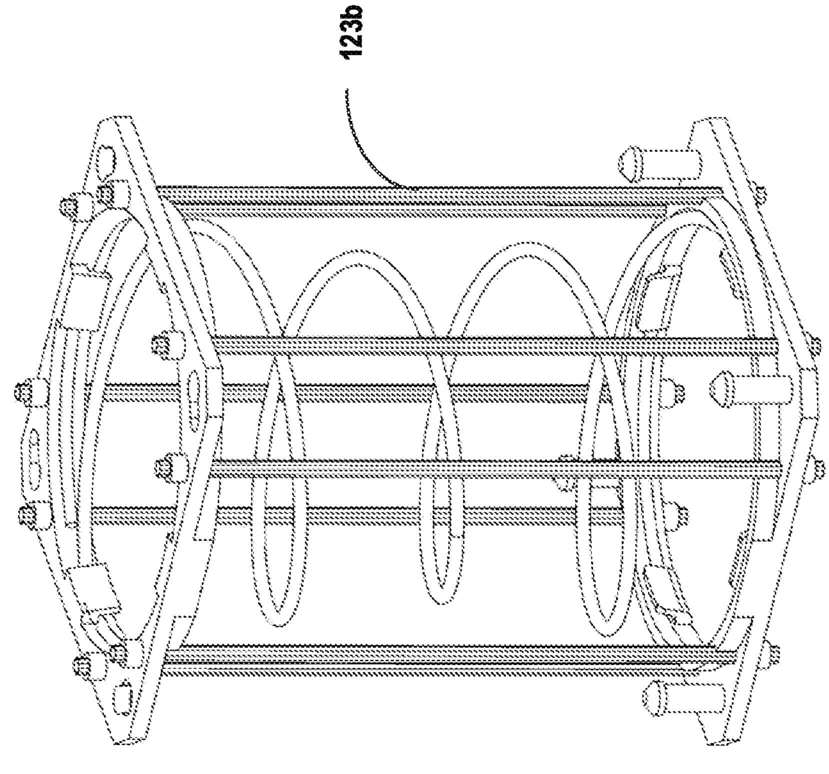

FIGS. 32J and 32K exemplarily show spring modules with the base and the end cover of which can be snapped together according to another preferred embodiments of the present disclosure, respectively, wherein the flexible connecting part of the spring module shown in FIG. 32J is composed of flexible ropes 123*b*, and the flexible connecting part of the spring module shown in FIG. 32K is a one-piece flexible sleeve 123*c* surrounding the spring with 360 degrees.

Figure 32L:
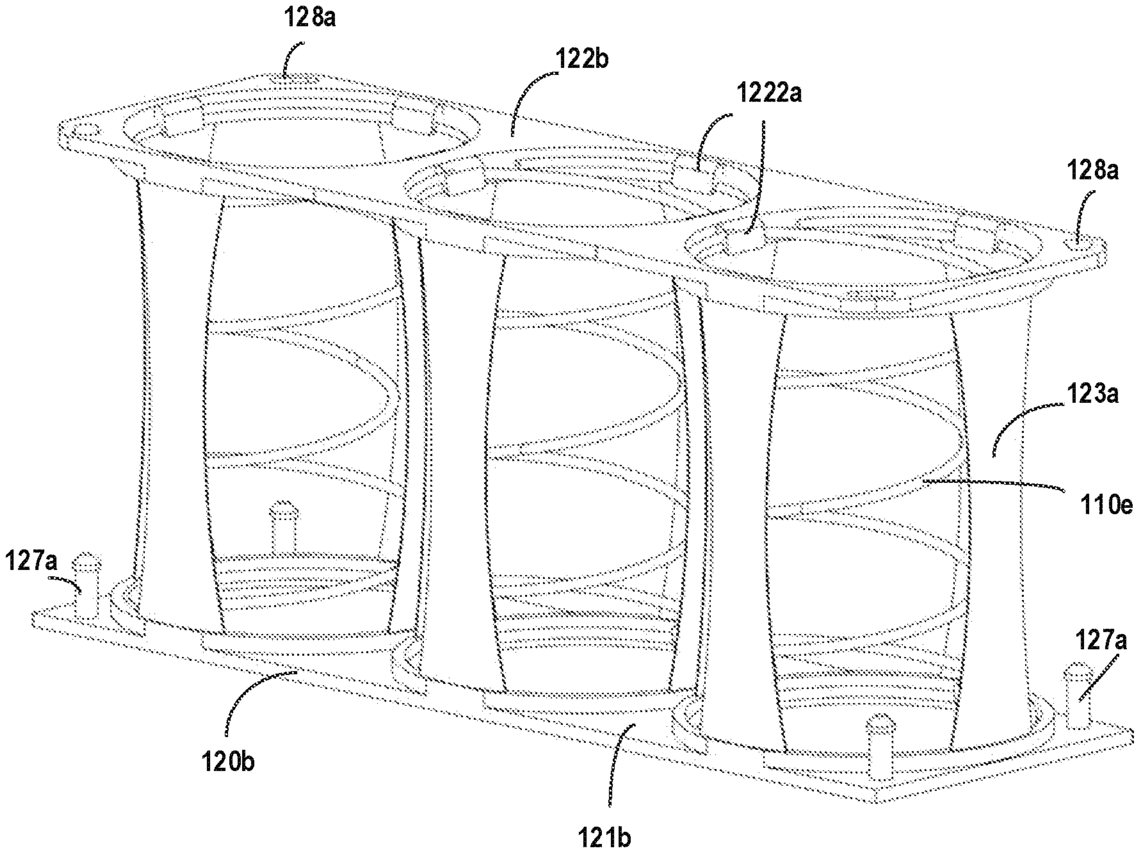
Figure 32M:
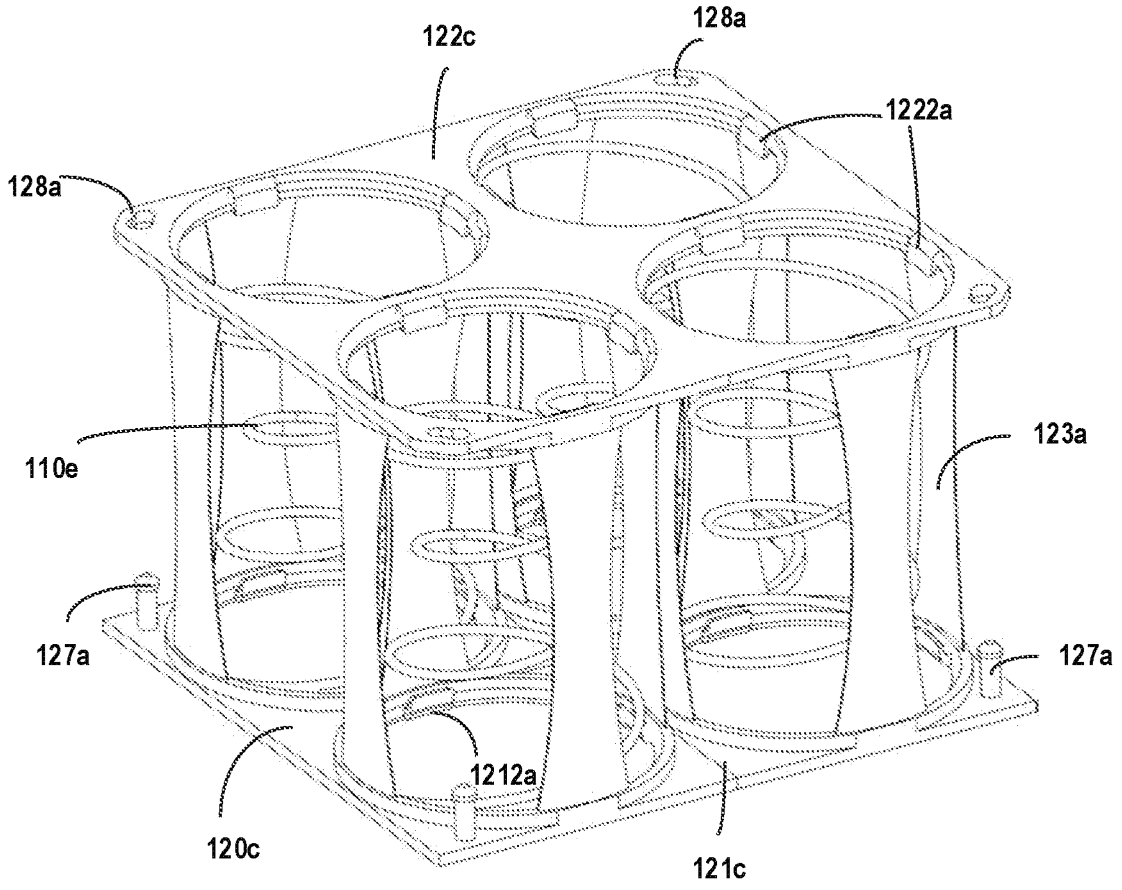

FIGS. 32L and 32M exemplarily show spring modules with the base and the end cover of which can be snapped together according to other preferred embodiments of the present disclosure, respectively, wherein the spring module shown in FIG. 32L has a spring bracket 120*b* in which three springs can be accommodated, and the spring bracket 120*b* comprises a base 121*b* and an end cover 122*b* in which three springs can be accommodated, and the spring module shown in FIG. 32M has a spring bracket 120*c* in which four springs can be accommodated, and the spring bracket 120*c* comprises a base 121*c* and an end cover 122*c* in which four springs can be accommodated. The bottom surfaces of the bases 121*a*, 121*b* and 121*c* of the spring modules as described above may also be provided with module mounting parts 1213*a* for detachably mounting the spring modules into the spring cushions. Preferably, the module mounting part 1213*a* is a slideway or a slide rail, so that the base of the spring module may be slidably assembled onto the mounting rack in the spring cushion. Furthermore, the spring brackets 120*a*, 120*b* and 120*c* may be integrally formed. More preferably, the spring is installed in the spring bracket with a predetermined initial compression force. Alternatively, the base may be provided with an opening 1211*a* at the center of which, and the end cover may be provided with an opening 1221*a* at the center of which.

FIGS. 33A-33F exemplarily show a spring module as well as its components according to another preferred embodiment of the present disclosure, in which a base and an end cover can be snapped together. As shown in the figures, the spring module comprises a base 121*d*, an end cover 122*d* and a spring bag. The base 121*d* comprises a pair of first locking mechanisms 1211*d* provided at the periphery of which, and the end cover 122*d* comprises a pair of second locking mechanisms 1221*d* provided at the periphery of which. The spring bag is removably fixed between the base 121*d* and the end cover 122*d*, each spring bag comprises a spring 110*f* and a flexible sleeve 123*d* encompassing the spring. The base 121*d* and the end cover 122*d* may be releasably snapped together by the first locking mechanism 1211*d* and the second locking mechanism 1221*d* to compress the spring bag between the base and the end cover. Preferably, the spring is enclosed in the flexible sleeve 123*d* with a predetermined initial compression force. Although the spring shown in the figures is a convex spring with a convex center, those skilled in the art may realize that the spring may also be a cylindrical spring or a concave spring with a concave center. The locking mechanisms 1211*d*, 1221*d* will be described in detail below with reference to FIGS. 33E-33G, as shown in the figures, the pair of first locking mechanisms 1211*d* extend outward from the base 121*d* along the radial direction, and each first locking mechanism comprises a first protrusion 12112*d* located between the first locking mechanism 1211*d* and the base 121*d*. The pair of second locking mechanisms 1221*d* extend outward from the end cover 122*d* along the radial direction, and each second locking mechanism comprises a spring tongue part 12211*d* capable of moving toward and away from the end cover 122*d*, and a second protrusion 12212*d* located outside the tongue part. And the second protrusion 12212*d* may engage with the first protrusion 12112*d* so as to lock the base with the end cover. The second protrusion 12212*d* may be disengaged from the first protrusion 12112*d* as the tongue part 12211*d* moves toward the end cover, thereby releasing the end cover from the base. Preferably, each first locking mechanism 1211*d* further comprises a notch 12111*d*, which is located in the middle of the first locking mechanism, so that a user may press the tongue part 12211*d* toward the end cover through the notch 12111*d* thus releasing the end cover.

FIG. 33H exemplarily shows a spring module according to another preferred embodiment of the present disclosure in which the base and the end cover can be locked together, and FIG. 33I shows the compressed configuration of the spring module, as shown in the figures, unlike the spring module shown in FIGS. 33A-33G, the spring module comprises a base 121*e* and an end cover 122*e* in which four spring bags can be accommodated. Similarly, the base 121*e* comprises a pair of first locking mechanisms 1211*e* provided at the periphery of which and the end cover 122*e* comprises a pair of second locking mechanisms 1221*e* provided at the periphery of which. The spring bags are detachably fixed between the base 121*e* and the end cover 122*e*, and the base 121*e* and the end cover 122*e* may be releasably locked together through the first locking mechanism 1211*e* and the second locking mechanism 1221*e* so as to compress the spring bags between the base and the end cover. The first pair of locking mechanisms 1211*e* extend outward from the base 121*e* along the radial direction, and each first locking mechanism comprises a first protrusion 12112*e* positioned between the first locking mechanism 1211*e* and the base 121*e*. The pair of second locking mechanisms 1221*e* extend outward from the end cover 122*e* along the radial direction, and each second locking mechanism comprises a spring tongue part 1221*e* capable of moving toward and away from the end cover 122*e*, and a second protrusion 12212*e* positioned outside the tongue part. The second protrusion 12212*e* may engage with the first protrusion 12112*e* in order to lock the base and the end cover together. The second protrusion 12212*e* may be disengaged from the first protrusion 12112*e* as the tongue part 12211*e* move towards the end cover, thereby releasing the end cover from the base.

FIGS. 33J-33L exemplarily show a condition when a plurality of the spring modules shown in FIG. 33A or 33H are connected in rows through flexible bottom pads 60*a*, 60*b* and 60*c*, as shown in the figures, the spring modules are fixed on a first surface of the flexible bottom pad, and the flexible bottom pad may be bent to allow a first part of a second surface of which opposite to the first surface to engage with a second part of the second surface, as shown in FIGS. 33M, 33N. FIG. 33P exemplarily shows a spring cushion having the spring modules as well as the flexible bottom pads 60*b* or 60*c* shown in FIG. 33L.

FIG. 34A exemplarily shows a spring module with a base and an end cover of which may be locked together according to another preferred embodiment of the present disclosure. FIGS. 34B-34D illustrate a perspective view, a top view and a side view of the base of the spring module shown in FIG. 34A, and FIGS. 34E, 34F illustrate a perspective view and a top view of the end cover of the spring module shown in FIG. 34A, respectively. As shown in the figures, the spring module comprises a spring 110*e*, a base 121*f* and an end cover 122*f*. The base 121*f* comprises a spring mounting seat with a first spring fixing part 1212*f* capable of fixing a first end of the spring, and the end cover 122*f* comprises a spring mounting seat with a second spring fixing part 1222*f* capable of fixing a second end of the spring. The base and the end cover are provided with a rotary locking assembly, and the base may be releasably locked together with the end cover by the rotary locking assembly, so that the spring is compressed therebetween. Specifically, the rotary locking assembly comprises one or more locking posts 127*f* positioned on the outer region of the base and one or more arc openings 128*f* positioned on the corresponding outer region of the end cover. Each locking post 127*f* comprises a thin base 1271*f* and a thick end 1272*f*. Each arc opening 128*f* comprises a narrow arc extending portion 1281*f* and a wide end opening portion 1282*f*, and the end opening portion 1282*f* is positioned at one end of the arc opening 128*f*. The end opening portion 1282*f* of each arc opening 128*f* is sized to allow the end 1272*f* of the corresponding locking post 127*f* to pass therethrough, while the arc extending portion 1281*f* of each arc opening 128*f* is sized not to allow the end of the corresponding locking post to pass therethrough, so that when compressing the spring and rendering the end 1272*f* of each locking post to pass through the corresponding end opening portion 1282*f*, by rotating the base and the end cover along the locking direction, the base 1271*f* of each locking post moves along the corresponding arc opening 128*f* into the arc extending portion 1281*f* of which and is locked in the arc extending portion 1281*f* through the end 1272*f*, thereby releasably locking the base and the end cover together. FIG. 34G exemplarily shows a condition when the base and the end cover of the spring module shown in FIG. 34A are locked together. Preferably, the base 121*f* further comprises a module mounting part 1213*f* for removably mounting the spring module into the spring cushion, and the module mounting part 1213*f* may be a slideway or a slide rail arranged on the bottom surface of the base, so that the base of the spring module may be slidably assembled onto the mounting rack in the spring cushion through the module mounting part 1213*f*. Alternatively, the base may be provided with an opening 1211*f* at the center of which, and the end cover may be provided with an opening 1221*f* at the center of which.

FIGS. 35A and 35B schematically show a perspective view and a side view, respectively, of a spring module according to yet another preferred embodiment of the present disclosure. As shown in the figures, the spring module comprises a conical spring 110 and a plurality of flexible straps 123*e*, each flexible strap 123*e* respectively comprises a main body 1231*e*; a first hook 1232*e* at one end of the main body; and a second hook 1233*e* at the other end of the main body. The first hook 1232*e* is removably hooked on the large-diameter end of the conical spring, and the second hook 1233*e* is removably hooked on the small-diameter end of the conical spring, and the flexible straps 123*e* are all positioned outside the conical spring. Preferably, the lengths of the plurality of flexible straps 123*e* are designed such that the conical spring has a predetermined initial compression force. Further preferably, the flexible straps 123*e* are integrally formed and made of plastic. Optionally, the width and/or thickness of the main body 1231*e* of the flexible strap 123*e* gradually decreases from one end to the other end.

FIGS. 35C and 35D exemplarily show a perspective view and a side view, respectively, of a spring module according to yet another preferred embodiment of the present disclosure. As shown in the figures, the spring module comprises a conical spring 110 and a plurality of flexible straps 123*f*, and each flexible strap 123*f* comprises a main body 1231*f*; a first hook 1232*f* positioned at one end of the main body; and a second hook 1233*f* positioned at the other end of the main body. The first hook 1232*f* is hooked on the large-diameter end of the conical spring, the second hook 1233*f* is hooked on the small-diameter end of the conical spring, and the flexible straps 123*f* are all positioned outside the conical spring. The lengths of the plurality of flexible straps 123*f* are preferably designed such that the conical spring has a predetermined initial compression force. Further preferably, the main body 1231*f* of the flexible strap 123*f* is made of woven fabric, and the first hook 1231*f* as well as the second hook 1232*f* of the flexible straps 123*f* are made of metal or plastic. Optionally, the width and/or thickness of the main body 1231*e* of the flexible straps 123*e* gradually decreases from one end to the other.

FIG. 35E exemplarily shows a condition when the plurality of spring modules shown in FIGS. 35A to 35D are nested together.

FIGS. 35F and 35G exemplarily show an exploded view and a sectional view of a spring module, respectively, according to yet another preferred embodiment of the present disclosure, and FIG. 35H is a partial enlarged view of FIG. 35G. As shown in the figures, the spring module comprises a conical spring 110, a one-piece flexible sleeve 1231*g* having a closed end and an open end, and one or more fasteners 129*g*. The conical spring 110 passes through the open end of the one-piece flexible sleeve 1231*g* and enters the interior of which, so that the one-piece flexible sleeve encompasses outside the conical spring, and wherein the end of the open end of the one-piece flexible sleeve 1231*g* is bent around the large-diameter end of the conical spring 110 toward the interior of the conical spring and fixed to an adjacent part of the one-piece flexible sleeve 1231*g* positioned outside the conical spring 110 by one or more fasteners 129*g* (as shown in FIG. 35H). Preferably, the one-piece flexible sleeve 1231*g* and the one or more fasteners 129*g* cooperate with each other so that the conical spring may have a predetermined initial compression force. In a preferred embodiment, the one-piece flexible sleeve 1231*g* is a one-piece cloth sleeve, and the fastener 129*g* is a rivet. FIG. 35I exemplarily shows a condition when a plurality of spring modules shown in FIGS. 35F and 35G are nested together.

FIG. 35J exemplarily shows a spring module according to another preferred embodiment of the present disclosure, and FIG. 35K shows a conical spring 110*b* of which. Unlike the spring module shown in FIGS. 35F-35H, the flexible sleeve 1231*h* as well as the conical spring 110*b* are square conical.

FIGS. 36A and 36B exemplarily show a perspective view and a perspective view of a spring module according to yet another preferred embodiment of the present disclosure, which comprises a plurality of connected cylindrical cloth sleeves 1231*i* in rows and a plurality of cylindrical springs encompassed therein. FIG. 36C exemplarily shows a perspective view of a spring module according to another preferred embodiment of the present disclosure, FIG. 36D exemplarily shows a condition when the spring module shown in FIG. 36C is compressed and stored in a storage box, and FIG. 36E exemplarily shows a condition when a plurality of storage boxes shown in FIG. 36D are stacked together.

FIG. 37 exemplarily shows a perspective view of a spring module according to yet another preferred embodiment of the present disclosure. As shown in the figure, the spring module comprises a conical spring 110, a base 121*j* and a plurality of flexible straps 123*j*. The base has a spring mounting seat with a spring fixing part 1212*j* for fixing the large-diameter end of the conical spring, one end of each flexible strap 123*j* is fixedly coupled to the base, while the other end has a hook part 1233*j* which is detachably hooked on the small-diameter end of the conical spring, and the plurality of the flexible straps 123*j* are all positioned outside the conical spring 110. Preferably, the lengths of the plurality of flexible straps 123*j* are designed such that the conical spring 110 has a predetermined initial compression force. Further preferably, the flexible strap 123*j* is entirely made of plastic. Optionally, the main body of the flexible strap 123*j* is made of woven fabric, and the hook part 1233*j* is made of metal or plastic. Optionally, the width and/or thickness of the main body of the flexible strap 123*j* gradually decreases from one end to the other end. In a preferred embodiment, the bottom surface of the base 121*j* is further provided with a module mounting part 1213*j* for removably mounting the spring module into a spring cushion. Preferably, the module mounting part 1213*j* may be slideways or slide rails arranged on the bottom surface of the base, so that the base can be slidably assembled to the mounting rack in the spring cushion through the module mounting part 1213*j*. In another preferred embodiment, the base 121*j* may also be provided with locking structures 31 and 32 shown in FIGS. 29A-29C, locking structures 41, 42 shown in FIGS. 30A-30C, locking structures 43, 44 shown in FIGS. 30D-30F, or T-shaped (or wedge-shaped) connections 51 shown in FIGS. 31A-31D.

FIGS. 38A, 38B exemplarily show a perspective exploded view and a perspective sectional view of a spring module (spring bag) according to yet another preferred embodiment of the present disclosure, respectively. As shown in the figures, the spring module (spring bag) comprises a conical spring 110 and a double-layer flexible sleeve, the double-layer flexible sleeve comprises: a frustoconical outer layer 123*m* having a closed end and an open end, and the open end of the frustoconical outer layer is provided with a first flange 1231*m* extending outward; and a frustoconical inner layer 123*n* positioned inside the frustoconical outer layer 123*m*, wherein the frustoconical inner layer 123*n* has a closed end and an open end, and the open end of the frustoconical inner layer 123*n* is provided with a second flange 1231*n* extending outward. The radial dimension of the frustoconical inner layer 123*n* is smaller than that of the frustoconical outer layer 123*m*, and the height dimension of the frustoconical inner layer 123*n* is approximately equal to that of the frustoconical outer layer 123*m*, the conical spring 110 is positioned between the frustoconical outer layer 123*m* and the frustoconical inner layer 123*n*. The first flange 1231*m* of the frustoconical outer layer 123*m* is fixedly coupled with the second flange 1231*n* of the frustoconical inner layer 123*n*, and the closed end of the frustoconical outer layer is fixedly coupled with the closed end of the frustoconical inner layer. Preferably, the height dimension of the frustoconical outer layer 123*m* and that of the frustoconical inner layer 123*n* are designed to allow the conical spring therebetween to have a predetermined initial compression force. Preferably, the frustoconical outer layer 123*m* and the frustoconical inner layer 123*n* are coupled together by adhesive or ultrasonic welding.

FIGS. 39A, 39B respectively illustrate conditions when the spring bag shown in FIGS. 38A, 38B are fixed on the base through different fixing ways, the spring bag is fixedly coupled to the base through an engaging part on the base in FIG. 39A, while in FIG. 39B the spring bag is fixedly coupled to the base through fasteners. FIG. 39C exemplarily shows a condition when a plurality of spring modules shown in FIG. 39A or 39B are nested together. The base may be provided with locking structures 31 and 32 shown in FIGS. 29A-29C, locking structures 41 and 42 shown in FIGS. 30A-30C, locking structures 43 and 44 shown in FIGS. 30D-30F, or T-shaped (or wedge-shaped) connections 51 shown in FIGS. 31A-31D.

FIGS. 40A-40C exemplarily show different embodiments of non-conical springs that can be used in the above-mentioned spring module, and FIG. 40D exemplarily shows a spring module having the spring shown in FIG. 40B. FIG. 40E exemplarily shows a different embodiment of a conical spring that can be used in the above-mentioned spring module, and FIG. 40F exemplarily shows a spring module 200*a* comprising the conical spring shown in FIG. 40E, which comprises a spring bracket 220*a* and a square conical spring 110*b* installed therein.

FIG. 40G exemplarily shows a different embodiment of a conical spring that can be used in the spring module of the present disclosure, wherein at least a part of the conical spring is formed by a double spiral wire, and preferably, a double-wire spring part with the double spiral wire occupies about ⅔ of the overall height of the conical spring. FIG. 40H exemplarily shows a spring module comprising the conical spring shown in FIG. 40G.

On the other hand, the present disclosure also provides a spring cushion comprising various spring modules as described above.

FIG. 41A exemplarily shows a spring cushion according to a preferred embodiment of the present disclosure. As shown in the figure, the spring cushion comprises various spring modules described in the above embodiments; a first sponge pad 1300*a*, each having a plurality of holes, each hole being configured such that a part of the corresponding spring module may pass therethrough; a second sponge pad 1100*a* sleeved on the first sponge pad 1300*a*; an outer cover 1200*a* sleeved on the second sponge pad 1100*a* so as to wrap the spring module, the first sponge pad as well as the second sponge pad therein.

FIG. 41B exemplarily shows a spring cushion according to another preferred embodiment of the present disclosure, which is different from the spring cushion shown in FIG. 41A in that a first sponge pad 1300*b* comprises a plurality of separate parts arranged side by side, wherein each separate part may have different stiffness and color, so as to be arranged at different positions of the mattress as required and be easy to distinguish, as shown in FIG. 41C.

FIG. 41D exemplarily shows a spring cushion according to yet another preferred embodiment of the present disclosure. As shown in the figure, the spring cushion is different from the spring cushions shown in FIGS. 41A, 41B in that it further comprises a fixing net 1400*a* having a plurality of ring parts, each of which is configured to allow a part of the corresponding spring module to pass therethrough. When the fixing net 1400*a* is arranged on the spring module, the vertical distance between the ring part and the top of the spring module is about ⅓ of the overall height of the spring module.

FIG. 42A exemplarily shows a fixing net assembly 1400*b* for a spring cushion according to a preferred embodiment of the present disclosure, and FIG. 42B exemplarily shows a partial sectional view of the fixing net assembly shown in FIG. 42A. As shown in the figures, the fixing net assembly 1400*b* comprises a flexible sheet 1410*b* having a plurality of holes, and a plurality of caps 1420*b*, wherein the holes of the flexible sheet 1410*b* are positioned corresponding to the positions of the spring modules, and each cap 1420*b* comprises a cavity 1421*b* for accommodating the top end part of the spring module and a flange 1422*b* surrounding the cavity, wherein, the wall forming the cavity 1421*b* is sized to be smaller than the hole so as to enable the wall to pass therethrough, and the flange 1422*b* is sized to be larger than the hole so as to enable the flange to engage with part of the flexible sheet around the hole, and wherein the flange 1422*b* is fixedly coupled to the part of the flexible sheet around the hole by adhesive or ultrasonic welding, and the cavity 1421*b* may accommodate the top of the spring module.

FIG. 42C exemplarily shows an exploded view of a fixing net assembly 1400*c* for a spring cushion according to a preferred embodiment of the present disclosure, as shown in the figure, the fixing net assembly 1400*c* comprises a flexible sheet 1410*c* without holes; a plurality of upper caps 1420*c* or 1420*d* located on one side of the flexible sheet, each of which is provided with a first snap feature 1422*c* or 1422*d*: a plurality of lower caps 1430*c* or 1430*d* located on the other side of the flexible sheet, each of which is provided with a second snap feature 1432*c* or 1432*d*. The first snap feature of the upper cap is configured to snap fit with the second snap feature of the lower cap and clamp the flexible sheet therebetween, and the lower cap 1430*c* and 1430*d* may accommodate the top of the spring module.

FIGS. 42D, 42E exemplarily show a process in which the upper cap 1420*c* and the lower cap 1430*c* are clamped on the flexible sheet 1410*c*, as shown in the figures, the upper cap 1420*c* has an annular wall 1421*c* and an annular protrusion 1422*c* located outside the annular wall 1421*c*, while the lower cap 1430*c* has a circular hole 1431*c*, and the annular protrusion 1422*c* may be locked on the edge 1432*c* of the circular hole 1431*c* so as to clamp the flexible sheet 1410*c* therebetween.

FIGS. 42F and 42G exemplarily show a process in which the upper cap 1420*d* and the lower cap 1430*d* are clamped on the flexible sheet 1410*c*, as shown in the figures, different from the above-mentioned caps 1420*c* and 1430*c*, the inner and outer sides of the annular wall of the upper cap 1420*d* are all provided with annular protrusions 1422*d*, and the lower cap 1430*d* is provided with an annular groove 1431*d*, in which an snap-fit part 1432*d* is provided, and the annular protrusions 1422*d* may be locked with the snap-fit part 1432*d* in the annular groove 1431*d* so as to clamp the flexible sheet 1410*c* therebetween.

FIG. 42H exemplarily shows a spring cushion according to yet another preferred embodiment of the present disclosure, and FIG. 42I exemplarily shows a sectional view of the spring cushion. As shown in the figures, the spring cushion comprises various spring module assemblies shown in the above embodiments, especially in FIGS. 33J-33N. The spring cushion of the present embodiment further comprises a spring pad 1500*a* spread on the spring module assemblies, and an outer cover 1600*a* having a quilted sponge layer, which covers the spring pad 1500*a* and wraps the spring module assemblies as well as the spring pad 1500*a*.

Furthermore, FIG. 42L exemplarily shows the foregoing spring pad 1500*a*, and FIG. 42M exemplarily shows a partial sectional view of the spring pad 1500*a*. As shown in the figures, the spring pad 1500*a* comprises: a plurality of cylindrical springs 1530*a*, a first non-woven fabric layer 1510*a* located at one side of the plurality of cylindrical springs 1530*a*, and a second non-woven fabric layer 1520*a* at the other side of the plurality of cylindrical springs 1530*a*. The first non-woven fabric layer 1510*a* and the second non-woven fabric layer 1520*a* are coupled together around each cylindrical spring 1530*a* by adhesive or ultrasonic welding, so as to separate adjacent cylindrical springs and fix the cylindrical springs between the two non-woven fabric layers thus forming a one-piece spring pad. In other words, the first non-woven fabric layer 1510*a* and the second non-woven fabric layer 1520*a* are coupled together around each small cylindrical spring 1530*a* by adhesive or ultrasonic welding so as to form compartments for accommodating the plurality of small cylindrical springs, such that the adjacent small cylindrical springs may be separated mutually. The elastic coefficient of the cylindrical spring 1530*a* is preferably smaller than that of the spring in the spring module positioned at the bottom layer, thus providing stiffness close to sponge. Furthermore, the plurality of cylindrical springs 1530*a* are preferably denser than the plurality of spring modules positioned at the bottom layer so as to provide better comfort. In other words, the radial dimension of the cylindrical springs 1530*a* is preferably smaller than that of the springs in the spring modules, and the number of the cylindrical springs 1530*a* is preferably larger than that of the spring modules. The spring pad 1500*a* may be used to replace the sponge pad, and is comfortable, air-permeable and cost-saving.

FIG. 42J exemplarily shows a spring cushion according to yet another preferred embodiment of the present disclosure, and FIG. 42K exemplarily shows a sectional view of the spring cushion. As shown in the figures, the spring cushion comprises various spring modules or spring module assemblies shown in the above embodiments, especially in FIGS. 29A-31P. The spring cushion of the present embodiment further comprises a spring pad 1500*a* spread on the spring module assemblies, and an outer cover 1600*a* having a quilted sponge layer, which covers the spring pad 1500*a* and wraps the spring module assemblies as well as the spring pad 1500*a*. Unlike the spring cushion shown in FIGS. 42H, 42I, the spring cushion of the present embodiment further comprises a fixing net assembly 1400*b* or 1400*c* shown in FIGS. 42A-42G. The fixing net assembly 1400*b* or 1400*c* is provided between the spring modules and the spring pad 1500*a*.

FIG. 42N exemplarily shows a spring cushion according to yet another preferred embodiment of the present disclosure. Unlike the embodiment shown in FIGS. 42J and 42K, in the present embodiment, the sponge pad 1300*a* shown in FIG. 41A is used instead of the fixing net assembly 1400*b* or 1400*c*. As described above, the sponge pad 1300*a* has a plurality of holes, each hole configured to allow part of the corresponding spring module to pass therethrough. Similarly, the sponge pad 1300*a* may also be replaced by the sponge pad 1300*b* having the plurality of separate parts arranged side by side as shown in FIGS. 41B and 41C.

FIG. 42P exemplarily shows a spring cushion according to yet another preferred embodiment of the present disclosure, which comprises the above-mentioned spring pad 1500*a* and an outer cover 1700*a* covering the outside of the spring pad 1500*a*. As shown in the figure, the outer cover 1700*a* has a quilted sponge layer 1710*a* which is positioned on the upper side and the lower side of the spring pad 1500*a*. As described above, since the elastic coefficient of the spring in the spring pad 1500*a* is low, the spring cushion may be rolled up in a compressed state to save the storage space, the process of compression as well as rolling up is shown in FIG. 42Q.

FIG. 43A exemplarily shows a spring cushion according to yet another preferred embodiment of the present disclosure. As shown in the figure, the spring cushion comprises: a base cloth 1200*d*; a first outer cover 1300*d*, a bottom end of the first outer cover being open and a top end being closed, and an edge of the bottom end of the first outer cover 1300*d* is sewn together with an edge of the base cloth 1200*d* so as to form a closed accommodating space; a plurality of spring modules described in the above embodiments, each spring module comprising a spring bracket and a spring installed in the spring bracket, and the plurality of spring modules are arranged in the accommodating space; a plurality of sponge blocks 1400*d* arranged in the accommodating space, and each sponge block is respectively arranged on the top of the corresponding spring module among the plurality of spring modules. The first outer cover 1300*d* comprises a plurality of separate compartments, with one or more spring modules as well as one or more sponge blocks 1400*d* respectively arranged in each compartment. The base cloth 1200*d* is provided with a plurality of openings, each of which is aligned with one or more compartments of the plurality of compartments, and is provided with a curtain 1210*d* and a zipper 1220*d* provided on the curtain (as seen in FIG. 43D) for opening and closing each of the openings. Preferably, as shown in FIG. 43B, the spring cushion may further comprise a second outer cover 1500*d* sleeved outside the first outer cover 1300*d*.

FIG. 43C exemplarily shows the outer cover 1300*d* having compartments in the spring cushions shown in FIGS. 43A, 43B, wherein the shape of each compartment is the same.

FIGS. 43D and 43E exemplarily show the first outer cover 1300*d* sewn with the base cloth 1200*d*, in FIG. 43D, the curtains 1210*d* as well as the zippers 1220 of the base cloth are in an open state, each elongated opening of the base cloth is aligned with a row of compartments of the outer cover 1300*d*, as can be seen from the figure. In FIG. 43E, the curtains 1210*d* as well as the zippers 1220 of the base cloth are in a closed state.

FIGS. 43F-43H exemplarily show outer covers with compartments of different shapes/sizes according to different embodiments of the present disclosure, which can be used to accommodate different types of spring modules. FIG. 43I exemplarily shows an outer cover having honeycomb-shaped (hexagonal) compartments according to a preferred embodiment of the present disclosure.

FIGS. 44A-44E exemplarily show sponge blocks according to different embodiments of the present disclosure, as can be seen from the figures, in order to be used for different types of spring modules, the sponge block may be flat, or it may have protrusions or depressions.

FIG. 45A exemplarily shows a sponge block according to a preferred embodiment of the present disclosure. As shown in the figure, the sponge block 1400*d* comprises a concave part 1410*d* for accommodating the top of the spring module, and grooves 1420*d* positioned on four sides of the concave part 1410*d*, which are helpful for folding and compressing the sponge block, FIG. 45B exemplarily shows the sponge block shown in FIG. 45A in a folded/compressed state, and the folded sponge block may be stored in a storage cup as shown in FIG. 45C. The sponge block 1400*d* may also be placed in an elongated storage bag in a natural state, and the storage bag filled with the sponge blocks may be rolled up and placed in a box or packaged and fixed as shown in FIGS. 46A-46C.

FIGS. 47A-47C exemplarily show another packaging method of the sponge blocks according to the present disclosure, and each sponge block 1400*d* may be compressed and stored in a single box.

FIGS. 48A-48F exemplarily show a sponge block storage box and a sponge block storage method according to a preferred embodiment of the present disclosure. As shown in the figures, the sponge block storage box has a long and narrow hollow rectangular shape, and at least one end along the longitudinal direction of the sponge block storage box is provided with an opening 2010*d* for inserting the sponge block 1400*d* therethrough. The lateral wall of the sponge block storage box may be opened integrally to form a storage box cover 2020*d* for taking out the sponge block 1400*d* stored therein. A flange 2030*d* is provided around the opening 2010*d* for engaging with the periphery of the sponge block 1400*d* accommodated therein so as to prevent which from exiting the storage box from the opening 2010*d*. Optionally, the other end along the longitudinal direction of the sponge block storage box may also be provided with an opening.

FIGS. 49A, 49B exemplarily show an outer cover 2000*d* used for a spring cushion, according to a preferred embodiment of the present disclosure, the outer cover 2000*d* is provided with an open bottom end (shown as an upper end in the figures) and a closed top end (shown as a bottom end in the figures), and the outer cover 2000*d* comprises: a top part 2100*d* having four edges 2110*d*; and four side parts 2200*d*, each side part of the four side parts 2200*d* being sewn to a corresponding edge of the four edges 2110*d* of the top part 2100*d*, and mutually adjacent edges of every two adjacent side parts 2200*d* being provided with zippers 2210*d*, so as to detachably connecting the edges mutually adjacent of the side parts 2200*d* together to partially wrap the spring modules. Preferably, the top part 2100*d* sequentially comprises a non-woven fabric layer, a high-elastic sponge layer, a non-woven fabric layer, a quilted sponge layer, a silk floss layer and a cloth layer, from an inner side to an outer side of the spring cushion; each side part 2200*d* sequentially comprises a non-woven fabric layer, a quilted sponge layer, a silk floss layer and a cloth layer, from the inner side to the outer side of the spring cushion.

Preferably, each side part 2200*d* comprises a hem part 2300*d* sewn with it, and each hem part only comprises a cloth layer.

In a preferred embodiment, the spring cushion further comprises one or more pairs of tethers 2400*d* arranged on the hem parts 2200*d* for fastening the outer cover to the plurality of spring modules.

FIGS. 50A, 50B exemplarily show an outer cover for a spring cushion, according to another preferred embodiment of the present disclosure. As shown in the figures, the outer cover 3000*d* is a closed outer cover and comprises: a top part 3100*d*; four side parts 3210*d*, 3220*d*, 3230*d* and 3240*d*; and a bottom part 3300*d*. The first edge of the top part 3100*d* is sewn to the first side part 3210*d*, the second edge of the top part opposite to its first edge is sewn to the second side part 3220*d*, the first edge of the bottom part 3300*d* is sewn to the first side part 3210*d*, and two edges perpendicular to the first edge of the bottom part 3300*d* are respectively sewn to the third side part 3230*d* and the fourth side part 3240*d*. Wherein zippers 3400*d* are provided at all non-sewn edges of the top part 3100*d*, the four side parts 3210*d*, 3220*d*, 3230*d*, 3240*d*, and the bottom part 3300*d*, in order to detachably connect the non-sewn edges together to wrap a plurality of spring modules. Preferably, the top part 3100*d* sequentially comprises a non-woven fabric layer, a high-elastic sponge layer, a non-woven fabric layer, a quilted sponge layer, a silk floss layer and a cloth layer from the inner side to the outer side of the spring cushion; and the lateral parts 3210*d*, 3220*d*, 3230*d* and 3240*d* sequentially comprise non-woven fabric layers, quilted sponge layers, silk floss layers and cloth layers from the inner side to the outer side of the spring cushion; and the bottom part 3300*d* only comprises a cloth layer.

FIGS. 51A-51C show the structures of different parts of the spring cushion outer covers, marked by "AA", "BB" and "CC" in FIGS. 49A, 49B and 50A, 50B, respectively.

Those skilled in the art may realize that various springs, spring brackets, bases, end covers, flexible straps, flexible sleeves, various functional components/parts (such as module mounting parts used for mounting spring modules onto mounting racks, various snap-fit parts/components, fixing parts/components, locking structures/components and constraint members, for limiting or fixing relative position relationship between adjacent spring modules) described in the above embodiments. At the same time, different spring cushions may be formed by any combination of spring bags, spring modules, mounting brackets, sponge covers, sponge blocks, fixing nets, spring cushion outer covers, spring cushion base cloths, etc. described in the above embodiments as required.

The scope of protection of the present disclosure is limited only by the claims. Thanks to the teaching of the present disclosure, those skilled in the art will appreciate that alternative structures of the structures disclosed in the present disclosure may be regarded as feasible alternative embodiments, and the embodiments disclosed in the present disclosure may be combined to produce new embodiments, which also fall within the scope of the accompanying claims.

I claim:

1. A spring module for making a spring cushion of furniture, the spring module comprising:
- one or more conical springs;
- a spring bracket configured to fix the one or more conical springs therein, the spring bracket comprising:
  - a base comprising a spring mounting seat for each conical spring, each spring mounting seat having a spring fixing part for fixing a first end of the one or more conical springs;
  - an end cover at a second end of each conical spring;
  - a plurality of flexible straps extending from each spring mounting seat to each corresponding end cover;
  - first and second connections extending along opposite sides of the base, each connection comprising:
    - a first flange extending upward;
    - a second flange extending downward; and
    - first and second supporting portions extending substantially vertically downward from a bottom surface of the base, adjacent to the first and second connections, respectively beyond the second flange of each connection, and spaced apart from the second flange of each connection, respectively.

2. The spring module according to claim 1, further comprising a connector having a pair of upper flanges extending downward and a pair of lower flanges extending upward, wherein the connector is configured to slide along the first flange and the second flange.

3. The spring module according to claim 2, wherein opposite sides of the base are respectively provided with a wedge-shaped protrusion and a wedge-shaped groove extending along a respective side, the wedge-shaped protrusion configured to pass through the wedge-shaped groove of the base of another spring module.

4. The spring module according to claim 3, wherein two side walls forming the wedge-shaped groove are discontinuous and staggered.

5. The spring module according to claim 4, wherein the second flange is provided with a stop part capable of limiting sliding of the connector.

6. The spring module according to claim 1 wherein 1, wherein the one or more conical springs is fixed in the spring bracket with a predetermined initial compression force.

7. The spring module according to claim 1, wherein an opening is formed in a center of the end cover.

8. The spring module according to claim 1, wherein a corresponding pair of the spring mounting seat and the end cover forms a shape of a substantially frustocone, wherein the end cover forms a small end of the frustocone, the spring mounting seat forms a large end of the frustocone, and an opening is formed at a central position of the spring mounting seat, such that the end cover and flexible straps of another spring module are able to enter into the interior of the spring module via the opening.

9. A spring module assembly for furniture, the spring module assembly having a first spring module and a second spring module, each spring module comprising:
- one or more conical wire springs;
- a first end of each conical wire spring attached to a base having four sides;
- an end cover at a second end of each conical wire spring;
- the second end of each conical wire spring having a diameter greater than the first end;
- each conical wire spring making more than one complete turn between the base and the end cover;
- a plurality of flexible straps extending from the base to the end cover;
- first upper and lower flanges on a first side of the base;
- second upper and lower flanges on a second side of the base, opposite from the first side of the base; and
- the upper and lower flanges extending entirely vertically in a direction parallel to a central longitudinal axis of the one or more conical wire springs;
- a connector slidable onto the first upper and lower flanges to connect the first spring module to the second spring module; and
- a first supporting portion extending from a bottom of the first spring module beyond the lower flanges of the first spring module, and a second supporting portion extending from a bottom of the second spring module beyond the lower flanges of the second spring module.

10. The spring module of claim 9 wherein each first upper flange has a first upper free end and each first lower flange has a first lower free end, and wherein the first upper free end is parallel to the first lower free end.

11. The spring module of claim 9, wherein the connector comprises:
- an intermediate wall;
- a pair of upper flanges extending downward on both sides of the intermediate wall; and
- a pair of lower flanges extending upward on both sides of the intermediate wall;
  - wherein the intermediate wall of the connector is configured to pass between the first and second spring modules such that the first and second spring modules are configured to connect together through the upper flanges and the lower flanges.

12. The spring module of claim 11, wherein the upper flange and the lower flange of the connector, which are located on the same side of the intermediate wall, form a slideway.

13. The spring module of claim 12, wherein the slideway has a wedge- shaped configuration.

14. The spring module of claim 13, wherein the connector is configured to accommodate the upper and lower flanges of the first and second spring modules, in alignment within the slideway on the same side of the connector.

* * * * *